United States Patent
Tsukuba

(10) Patent No.: US 11,350,127 B2
(45) Date of Patent: May 31, 2022

(54) APPARATUS AND METHOD FOR IMAGE PROCESSING

(71) Applicant: SONY CORPORATION, Tokyo (JP)

(72) Inventor: Takeshi Tsukuba, Chiba (JP)

(73) Assignee: SONY CORPORATION, Tokyo (JP)

( * ) Notice: Subject to any disclaimer, the term of this patent is extended or adjusted under 35 U.S.C. 154(b) by 742 days.

(21) Appl. No.: 16/099,339

(22) PCT Filed: Apr. 28, 2017

(86) PCT No.: PCT/JP2017/016988
§ 371 (c)(1),
(2) Date: Apr. 19, 2019

(87) PCT Pub. No.: WO2017/195667
PCT Pub. Date: Nov. 16, 2017

(65) Prior Publication Data
US 2021/0297701 A1    Sep. 23, 2021

(30) Foreign Application Priority Data

May 13, 2016  (JP) .............................. JP2016-097311

(51) Int. Cl.
*H04N 11/02*   (2006.01)
*H04N 19/61*   (2014.01)
(Continued)

(52) U.S. Cl.
CPC ........... *H04N 19/61* (2014.11); *H04N 19/127* (2014.11); *H04N 19/129* (2014.11); *H04N 19/176* (2014.11); *H04N 19/30* (2014.11)

(58) Field of Classification Search
CPC .... H04N 19/61; H04N 19/127; H04N 19/129; H04N 19/176; H04N 19/30
(Continued)

(56) References Cited

U.S. PATENT DOCUMENTS

2009/0175333 A1   7/2009  Hsiang
2011/0090952 A1*  4/2011  Cohen .................. H04N 19/176
                                                         375/240.2
(Continued)

FOREIGN PATENT DOCUMENTS

WO   WO 2015/183375 A2   12/2015
WO   WO 2017/191782 A1   11/2017

OTHER PUBLICATIONS

Zhao et al., TU-level non-separable secondary transform, Joint Video Exploration Team (JVET) of ITU-T SG 16 WP 3 and ISO/IEC JTC 1/SC 29/WG 11, Feb. 20-26, 2016, pp. 1-5, 2nd Meeting: San Diego, USA.
(Continued)

*Primary Examiner* — Jayanti K Patel
*Assistant Examiner* — Richard B Carter
(74) *Attorney, Agent, or Firm* — Paratus Law Group, PLLC

(57) ABSTRACT

The present disclosure relates to an apparatus and a method for image processing each of which enables reduction of a coding efficiency to be suppressed. In the case where primary transformation as transformation processing for a predictive residue as a difference between an image and a predictive image of the image and secondary transformation as transformation processing for a primary transformation coefficient obtained by subjecting the predictive residue to the primary transformation are caused to be skipped, a switch also causes bandwidth limitation for a secondary transformation coefficient obtained by subjecting the primary transformation coefficient to the secondary transformation to be skipped. The present disclosure, for example, can be applied to an image processing apparatus, an image coding apparatus, an image decoding apparatus or the like.

10 Claims, 49 Drawing Sheets

(51) Int. Cl.
  *H04N 19/127* (2014.01)
  *H04N 19/129* (2014.01)
  *H04N 19/176* (2014.01)
  *H04N 19/30* (2014.01)

(58) Field of Classification Search
  USPC .............. 375/240.15, 240.18, 240.02, 240.2; 341/87
  See application file for complete search history.

(56) References Cited

U.S. PATENT DOCUMENTS

| | | | | |
|---|---|---|---|---|
| 2012/0127003 | A1* | 5/2012 | Shibahara | H04N 19/124 341/87 |
| 2013/0003856 | A1* | 1/2013 | Saxena | H04N 19/12 375/240.18 |
| 2015/0139300 | A1* | 5/2015 | Lee | H04N 19/44 375/240.02 |
| 2017/0094313 | A1* | 3/2017 | Zhao | H04N 19/122 |

OTHER PUBLICATIONS

Chen et al., Algorithm Description of Joint Exploration Test Model 2, Joint Video Exploration Team (JVET) of ITU-T SG 16 WP 3 and ISO/IEC JTC 1/SC 29/WG 11, Feb. 20-26, 2016, pp. 1-30, 2nd Meeting: San Diego, USA.

Tsukuba et al., RExt coding tools support on JEM, Joint Video Exploration Team (JVET) of ITU-T SG 16 WP 3 and ISO/IEC JTC 1/SC 29/WG 11, May 26-Jun. 1, 2016, pp. 1-6, 3rd Meeting: Geneva, CH.

ITU-T, Infrastructure of audiovisual services—Coding of moving video, High efficiency video coding, Recommendation ITU-T H.265, Apr. 2013, pp. 51,52, 91-93,141, and 142, Series H: Audiovisual and Multimedia Systems, International Telecommunication Union.

Mrak et al., Transform skip mode, Joint Collaborative Team on Video Coding (JCT-VC) of ITU-T SG16 WP3 and ISO/IEC JTC1/SC29/WG 11, Nov. 21-30, 2011, pp. 1-13, 7th Meeting: Geneva, CH.

Jun. 18, 2019, European Search Report issued for related EP Application No. 17796028.3.

Mar. 18, 2019, European Search Report issued for related EP Application No. 17796028.3.

Sharman et al., Transform Skip and Scaling Lists, Joint Collaborative Team on Video Coding (JCT-VC) of ITU-T SG 16 WP 3 and ISO/IEC JTC 1/SC 29/WG 11, Oct. 23-Nov. 1, 2013, pp. 1-5, 15th Meeting: Geneva, CH.

Chen et al., Algorithm Description of Joint Exploration Test Model 1, Joint Video Exploration Team (JVET) of ITU-T SG 16 WP 3 and ISO/IEC JTC 1/SC 29/WG 11, Oct. 19-21, 2015, pp. 1-25, 1st Meeting: Geneva, CH.

* cited by examiner

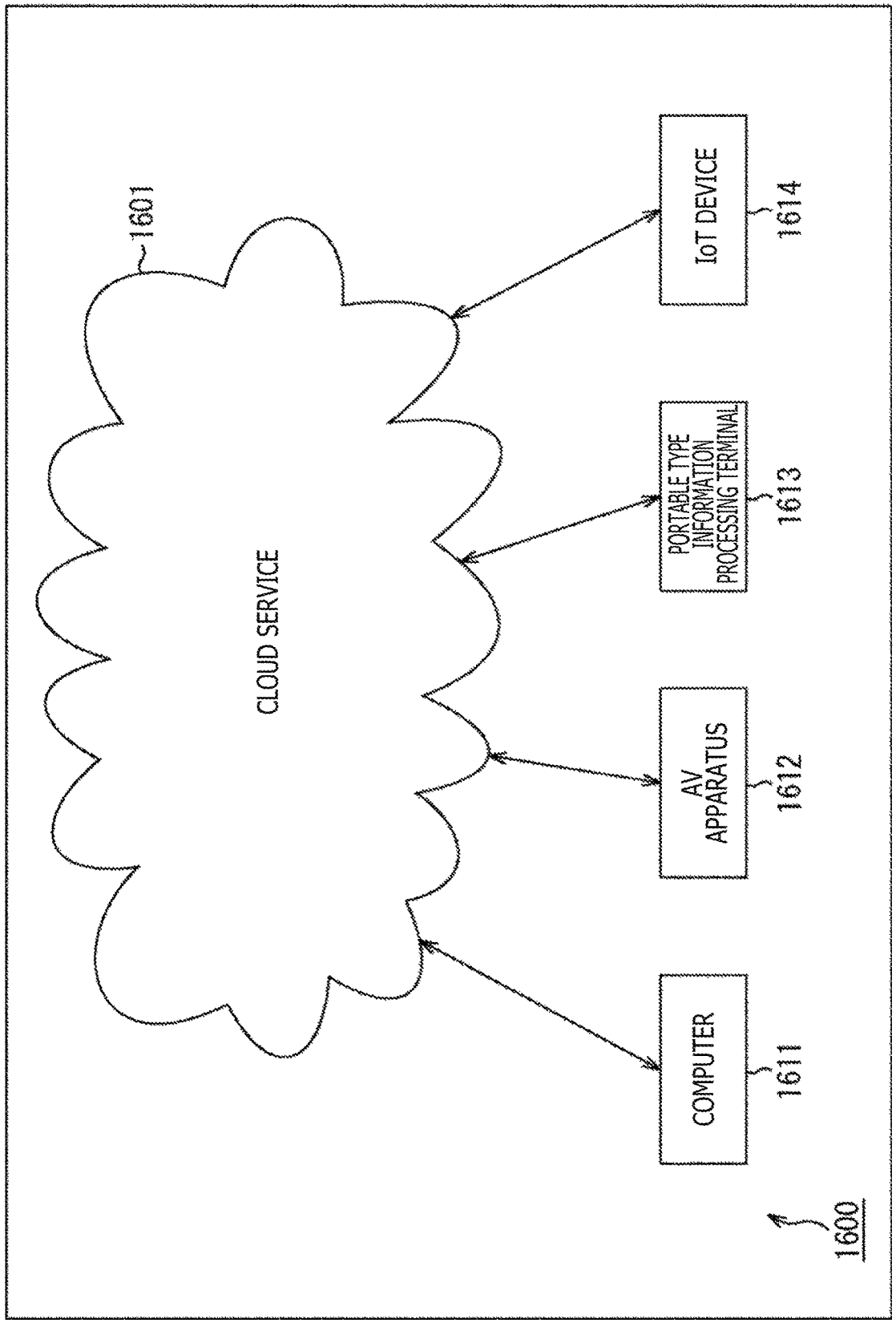

APPARATUS AND METHOD FOR IMAGE PROCESSING

CROSS REFERENCE TO PRIOR APPLICATION

This application is a National Stage Patent Application of PCT International Patent Application No. PCT/JP2017/016988 (filed on Apr. 28, 2017) under 35 U.S.C. § 371, which claims priority to Japanese Patent Application Nos. 2016-097311 (filed on May 13, 2016), 2016-101616 (filed on May 20, 2016), and 2016-114766 (filed on Jun. 8, 2016), which are all hereby incorporated by reference in their entirety.

TECHNICAL FIELD

The present disclosure relates to an apparatus and a method for image processing, and more particularly to an apparatus and a method for image processing each of which enables reduction of coding efficiency to be suppressed.

BACKGROUND ART

Heretofore, it has been disclosed that in image coding, after primary transformation is carried out for a predictive residue as a difference between an image and a predictive image of the image, and for the purpose of increasing energy compaction (concentrating transformation coefficients on a low-frequency region), secondary transformation is applied for each sub-block within a transform block (for example, refer to NPL 1). NPL 1 also discloses that a secondary transformation identifier representing which of the secondary transformation is to be applied is signaled in units of a CU.

In addition, it is disclosed that determining which of the secondary transformation is applied in units of a CU described in NPL 1 based on Rate-Distortion Optimization (RDO) in an encoder results in that computational complexity is large, and thus a secondary transformation flag representing whether or not the secondary transformation is applied in units of a transformation block is signaled (for example, refer to NPL 2). NPL 2 also discloses that the secondary transformation identifier representing which of the secondary transformations is applied is derived based on the primary transformation identifier and an intra-predictive mode.

However, in both of the methods described in NPL 1 and NPL 2, there is the possibility that in the case where a sub-block having sparse non-zero coefficients is inputted to the secondary transformation coefficient, the secondary transformation is applied, coefficients are diffused from a low-order component to a high-order component within the sub-block to reduce the energy compaction, thereby reducing the coding efficiency.

In addition, it is disclosed in Joint Exploration Test Model 1 (JEM 1), for the purpose of enhancing the coding efficiency in the image having high resolution such as 4K, a maximum size of Coding Tree Unit (CTU) is expanded to 256×256, and in responding to this expansion, a maximum size of the transformation block is also expanded to 64×64 (for example, refer to NPL 1). NPL 1 also discloses that in the case where the transformation block size is 64×64, the encoder carries out the bandwidth limitation in such a way that the transformation coefficient of the high-frequency component other than the low-frequency component of 32×32 in the upper left of the transformation block becomes forcibly zero (rounding-off of the high frequency component), and encodes only the non-zero coefficients of the low-frequency component.

In this case, it is only necessary that a decoder decodes only the non-zero coefficients of the low-frequency component, and carries out inverse quantization and inverse transformation for the non-zero coefficient. Therefore, the computational complexity and the mounting cost of the decoder can be reduced as compared with the case where the encoder does not carry out the bandwidth limitation.

However, in the case where the encoder carries out Transform Skip, or the skip of the transformation and quantization (hereinafter, referred to as transformation quantization bypass) for a transformation block of 64×64, the transformation coefficient of the transformation block of 64×64 is the predictive residue before the transformation. Therefore, when the bandwidth limitation is carried out in this case, the distortion is increased. As a result, there is the possibility that the coding efficiency is reduced. In addition, although the transformation/quantization bypass (Trans/Quant Bypass) is carried out for the purpose of realizing the lossless coding, the lossless coding cannot be carried out.

CITATION LIST

Non Patent Literature

[NPL 1]
Jianle Chen, Elena Alshina, Gary J. Sullivan, Jens-Rainer Ohm, Jill Boyce, "Algorithm Description of Joint Exploration Test Model 2," JVET-B1001_v3, Joint Video Exploration Team (JVET) of ITU-T SG 16 WP 3 and ISO/IEC JTC 1/SC 29/WG 11 2nd Meeting: San Diego, USA, 20-26 Feb. 2016

[NPL 2]
X. Zhao, A. Said, V. Seregin, M. Karczewicz, J. Chen, R. Joshi, "TU-level non-separable secondary transform," JVET-B0059, Joint Video Exploration Team (JVET) of ITU-T SG 16 WP 3 and ISO/IEC JTC 1/SC 29/WG 11 2nd Meeting: San Diego, USA, 20-26 Feb. 2016

SUMMARY

Technical Problem

As described above, there is the possibility that the coding efficiency is reduced.

The present disclosure has been made in the light of such a situation, and is intended to enable suppression of reduction of a coding efficiency.

Solution to Problem

An image processing apparatus of a first aspect of the present technique is an image processing apparatus including a control portion. In the case where primary transformation as transformation processing for a predictive residue as a difference between an image and a predictive image of the image and secondary transformation as transformation processing for a primary transformation coefficient obtained by subjecting the predictive residue to the primary transformation are caused to be skipped, the control portion also causes bandwidth limitation for a secondary transformation coefficient obtained by subjecting the primary transformation coefficient to the secondary transformation to be skipped.

An image processing method of the first aspect of the present technique is an image processing apparatus including a control portion. In the case where inverse primary transformation as inverse transformation of primary transformation as transformation processing for a predictive residue as a difference between an image and a predictive image of the image and inverse secondary transformation as inverse transformation of secondary transformation as transformation processing for a primary transformation coefficient obtained by subjecting the predictive residue to the primary transformation are caused to be skipped, the control portion also causes bandwidth limitation for a secondary transformation coefficient obtained by subjecting the primary transformation coefficient to the secondary transformation so as for the primary transformation coefficient to undergo the bandwidth limitation to be skipped.

An image processing apparatus of a second aspect of the present technique is an image processing apparatus including a control portion. In the case where inverse primary transformation as inverse transformation of primary transformation as transformation processing for a predictive residue as a difference between an image and a predictive image of the image and inverse secondary transformation as inverse transformation of secondary transformation as transformation processing for a primary transformation coefficient obtained by subjecting the predictive residue to the primary transformation are caused to be skipped, the control portion also causes bandwidth limitation for a secondary transformation coefficient obtained by subjecting the primary transformation coefficient to the secondary transformation so as for the primary transformation coefficient to undergo the bandwidth limitation to be skipped.

An image processing method of the second aspect of the present technique is an image processing method including a control step executed by an image processing apparatus. In the case where inverse primary transformation as inverse transformation of primary transformation as transformation processing for a predictive residue as a difference between an image and a predictive image of the image and inverse secondary transformation as inverse transformation of secondary transformation as transformation processing for a primary transformation coefficient obtained by subjecting the predictive residue to the primary transformation are caused to be skipped, the image processing apparatus also causes bandwidth limitation for a secondary transformation coefficient obtained by subjecting the primary transformation coefficient to the secondary transformation so as for the primary transformation coefficient to undergo the bandwidth limitation to be skipped.

An image processing apparatus of a third aspect of the present technique is an image processing apparatus including a control portion. The control portion controls, for each sub-block, skip of inverse transformation processing for a transformation coefficient from which a predictive residue as a difference between an image and a predictive image of the image is obtained by executing inverse transformation processing based on the number of non-zero coefficients of the transformation coefficient for each sub-block.

An image processing method of the third aspect of the present technique is an image processing method. The image processing method includes controlling, for each sub-block, skip of inverse transformation processing for a transformation coefficient from which a predictive residue as a difference between an image and a predictive image of the image is obtained by executing inverse transformation processing based on the number of non-zero coefficients of the transformation coefficient for each sub-block.

An image processing apparatus of a fourth aspect of the present technique is an image processing apparatus including a setting portion, a rasterization portion, a matrix calculating portion, a scaling portion and a matrix transforming portion. The setting portion sets a matrix of inverse transformation processing for a transformation coefficient based on content of the inverse transformation processing and a scanning method. The rasterization portion transforms a transformation coefficient from which a predictive residue as a difference between an image and a predictive image of the image is obtained by executing inverse transformation processing into a one-dimensional vector. The matrix calculating portion carries out matrix calculation for the one-dimensional vector by using the matrix set by the setting portion. The scaling portion scales the one-dimensional vector for which the matrix calculation is carried out. The matrix transforming portion matrix-transforms the scaled one-dimensional vector.

An image processing method of the fourth aspect of the present technique is an image processing method. The image processing method includes setting a matrix of inverse transformation processing for a transformation coefficient based on content of the inverse transformation processing and a scanning method, transforming a transformation coefficient for which a predictive residue as a difference between an image and a predictive image of the image is obtained by executing inverse transformation processing into a one-dimensional vector, carrying out matrix calculation for the one-dimensional vector by using the set matrix, scaling the one-dimensional vector for which the matrix calculation is carried out, and matrix-transforming the scaled one-dimensional vector.

In the apparatus and method for image processing of the first aspect of the present technique, in the case where primary transformation as transformation processing for a predictive residue as a difference between an image and a predictive image of the image and secondary transformation as transformation processing for a primary transformation coefficient obtained by subjecting the predictive residue to the primary transformation are caused to be skipped, bandwidth limitation for a secondary transformation coefficient obtained by subjecting the primary transformation coefficient to the secondary transformation is also skipped.

In the apparatus and method for image processing of the second aspect of the present technique, in the case where inverse primary transformation as inverse transformation of primary transformation as transformation processing for a predictive residue as a difference between an image and a predictive image of the image and inverse secondary transformation as inverse transformation of secondary transformation as transformation processing for a primary transformation coefficient obtained by subjecting the predictive residue to the primary transformation are caused to be skipped, bandwidth limitation for a secondary transformation coefficient obtained by subjecting the primary transformation coefficient to the secondary transformation so as for the primary transformation coefficient to undergo the bandwidth limitation is also skipped.

In the apparatus and method for image processing of the third aspect of the present technique, skip of inverse transformation processing for a transformation coefficient from which a predictive residue as a difference between an image and a predictive image of the image is obtained by executing inverse transformation processing is controlled for each sub-block based on the number of non-zero coefficients of the transformation coefficient for each sub-block.

In the apparatus and method for image processing of the fourth aspect of the present technique, a matrix of inverse transformation processing for a transformation coefficient is set based on content of the inverse transformation processing and a scanning method, a transformation coefficient from which a predictive residue as a difference between an image and a predictive image of the image is obtained by executing inverse transformation processing is transformed into a one-dimensional vector, matrix calculation for the one-dimensional vector is carried out by using the set matrix, the one-dimensional vector for which the matrix calculation is carried out is scaled, and the scaled one-dimensional vector is matrix-transformed.

Advantageous Effect of Invention

According to the present disclosure, an image can be processed. In particular, the reduction of the coding efficiency can be suppressed.

BRIEF DESCRIPTION OF DRAWINGS

FIG. 49 is a block diagram depicting an example of a schematic configuration of a network system.

DESCRIPTION OF EMBODIMENTS

Hereinafter, modes for carrying out the present disclosure (hereinafter referred to as embodiments) will be described. It should be noted that the description will be given in accordance with the following order.

1. First embodiment (skip of secondary transformation for each sub-block)
2. Second embodiment (selection of secondary transformation using a scanning method).
3. Third embodiment (skip of bandwidth limitation in the case where a block is a square)
4. Fourth embodiment (skip of bandwidth limitation in the case where a block is a rectangle composed of a square or an oblong)
5. Fifth embodiment (others)

1. First Embodiment

<Block Partition>

In a traditional image coding system such as Moving Picture Experts Group 2 (ISO/IEC 13818-2) (MPEG 2) or Advanced Video Coding (hereinafter described as AVC) (MPEG-4 Part 10), coding processing is executed in units of processing called a macro-block. The macro-block is a block having a uniform size of 16×16 pixels. On the other hand, in High Efficiency Video Coding (HEVC), the coding processing is executed in units of processing (coding unit) called a Coding Unit (CU). The CU is a block, having a variable size, which is formed by recursively partitioning the Largest Coding Unit (LCU) as a maximum coding unit. The selectable maximum size of the CU is 64×64 pixels. The selectable minimum size of the CU is 8×8 pixels. The CU having the minimum size is called the Smallest Coding Unit (SCU). It should be noted that the maximum size of the CU is by no means limited to 64×64 pixels, and may be set to a larger block size such as 128×128 pixels, or 256×256 pixels.

In such a manner, the CU having the variable size is adopted and as a result, in the HEVC, the image quality and the coding efficiency can be adaptively adjusted in response to the content of the image. The predictive processing for the predictive coding is executed in units of processing (prediction unit) called Prediction Unit (PU). The PU is formed by partitioning the CU with one of several partition patterns. In addition, the PU is composed of a processing unit (prediction block) called a Prediction Block (PB) for each luminance (Y) and color difference (Cb, Cr). Moreover, orthogonal transformation processing is executed in units of processing (transform unit) called a Transform Unit (TU). The TU is formed by partitioning the CU or PU to a certain depth. In addition, the TU is composed of a processing unit (transform block) called Transform Block (TB) for each luminance (Y) and color difference (Cb, Cr).

<Recursive Partition of Block>

Figure 1:
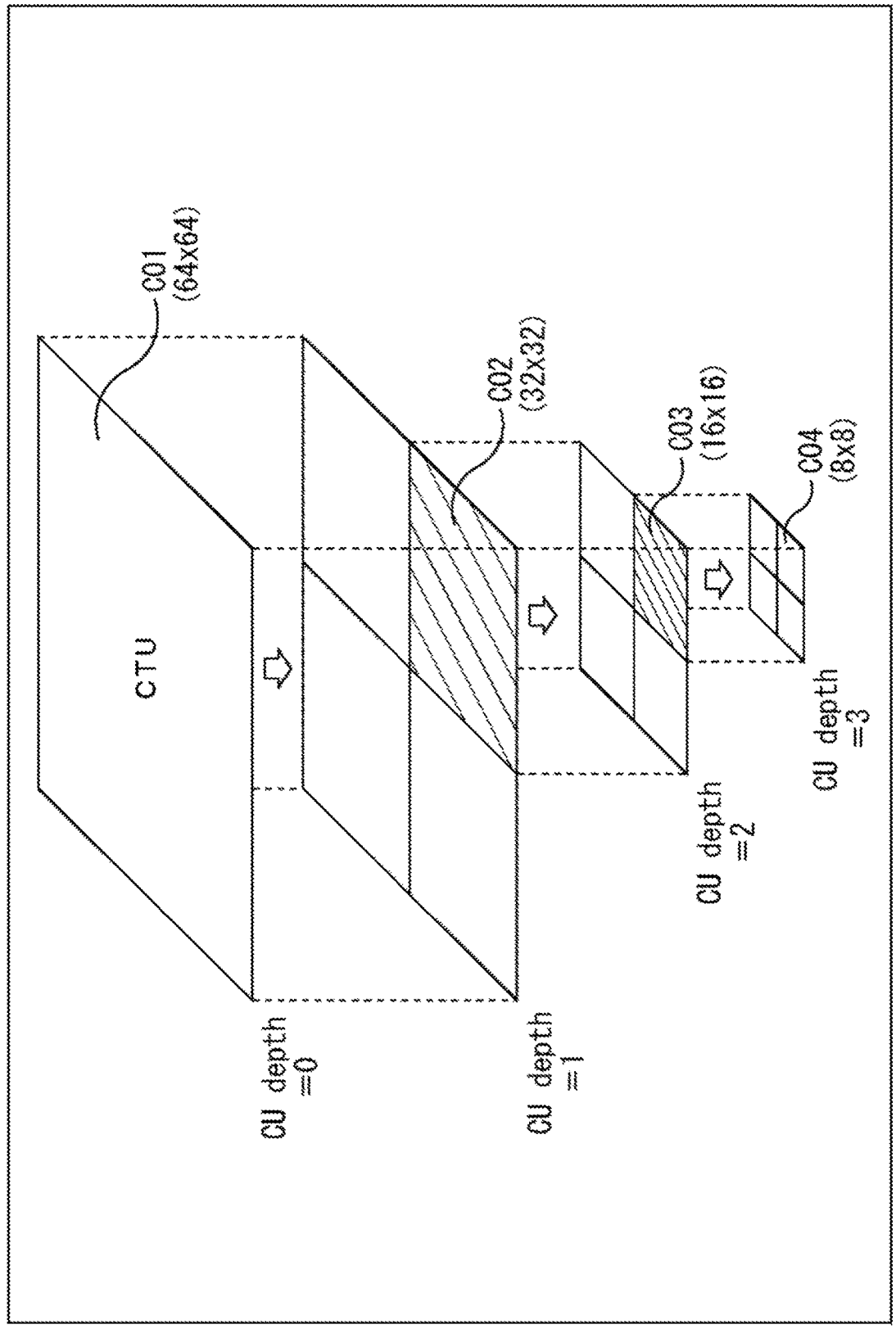
FIG. 1 is an explanatory view for explaining an outline of recursive block partition regarding CU.

FIG. 1 is an explanatory view for explaining an outline of recursive block partition regarding the CU in the HEVC. The block partition of the CU is carried out by recursively repeating the partition from one block into four (=2×2) sub-blocks, and as a result, a Quad-Tree shaped tree structure is formed. The whole quad-tree is called Coding Tree Block (CTB), and a logical unit corresponding to the CTB is called CTU.

An upper portion of FIG. 1 depicts C01 as the CU having a size of 64×64 pixels. A depth of the partition of C01 is equal to zero. This fact means that C01 is a route of the CTU and corresponds to the LCU. The LCU size can be specified by a parameter coded in a Sequence Parameter Set (SPS) or a Picture Parameter Set (PPS). C02 as the CU is one of four CUs obtained by partitioning C01 and has a size of 32×32 pixels. The depth of the partition of C02 is equal to 1. C03 as the CU is one of four CUs obtained by partitioning C02 and has a size of 16×16 pixels. The depth of the partition of C03 is equal to 2. C04 as the CU is one of four CUs obtained by partitioning C03 and has a size of 8×8 pixels. The depth of the partition of C04 is equal to 3. In such a manner, the CU is formed by recursively partitioning an image to be coded. The depth of the partition is variable. For example, the CU having the larger size (that is, the depth is smaller) can be set in a flat image area like a blue sky. On the other hand, the CU having the smaller size (that is, the depth is larger) can be set in a steep image area containing many edges. Then, each of the set CUs becomes the processing unit of the coding processing.

<Setting of PU to CU>

Figure 2:
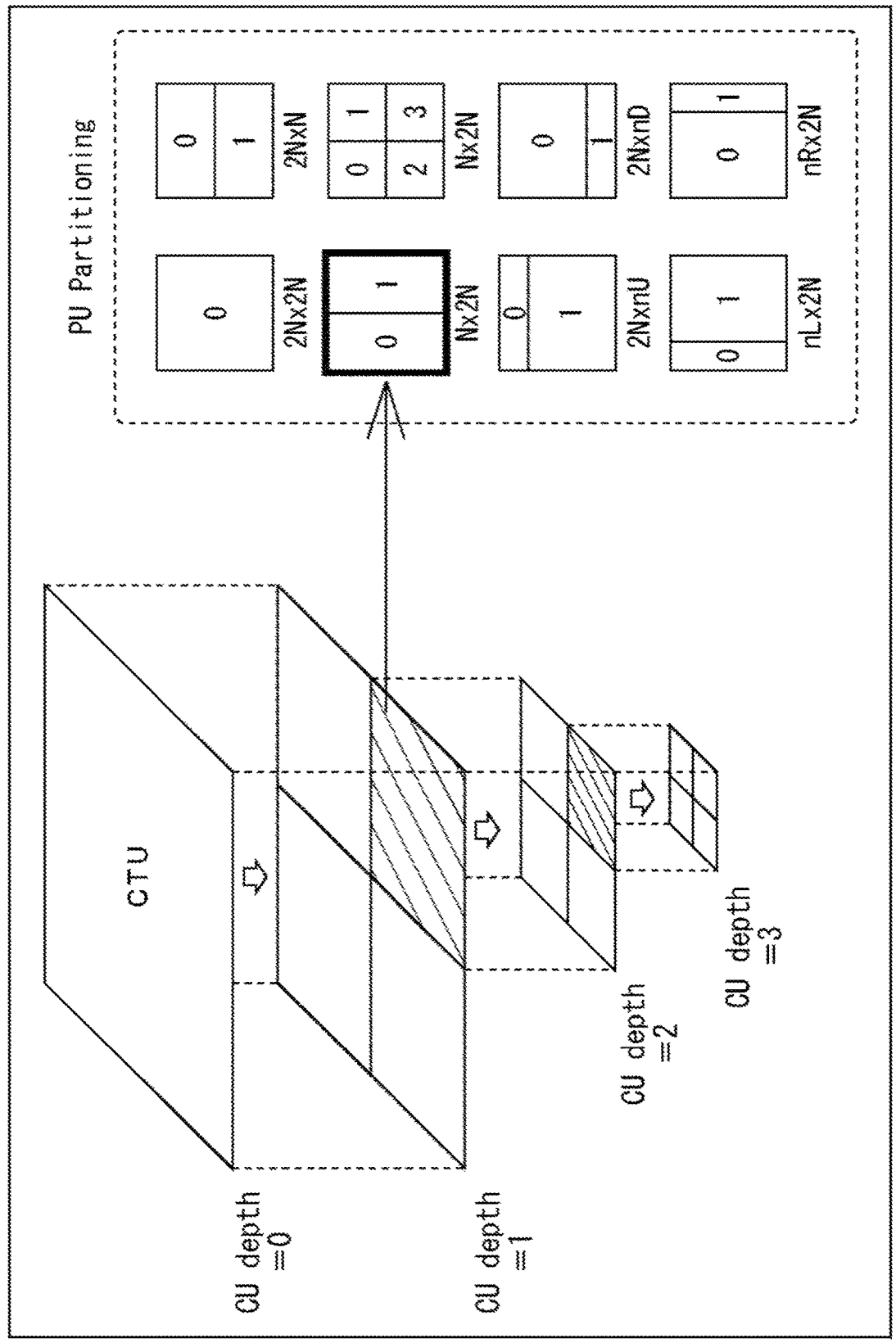
FIG. 2 is an explanatory view for explaining setting of PU to CU depicted in FIG. 1.

The PU is the processing unit of the predictive processing including the intra prediction and the inter prediction. The PU is formed by partitioning the CU with one of the several partition patterns. FIG. 2 is an explanatory view for explaining the setting of the PU to the CU depicted in FIG. 1. A right-hand side of FIG. 2 depicts eight kinds of partition patterns: 2N×2N, 2N×N, N×2N, N×N, 2N×nU, 2N×nD, nL×2N, and nR×2N. Of these partition patterns, two kinds of partition patterns: 2N×2N and N×N can be selected (N×N can be selected only in the SCU) in the intra prediction. On the other hand, in the inter prediction, in the case where asymmetrical motion partition is validated, all the eight kinds of partition patterns can be selected.

<Setting of TU to CU>

Figure 3:
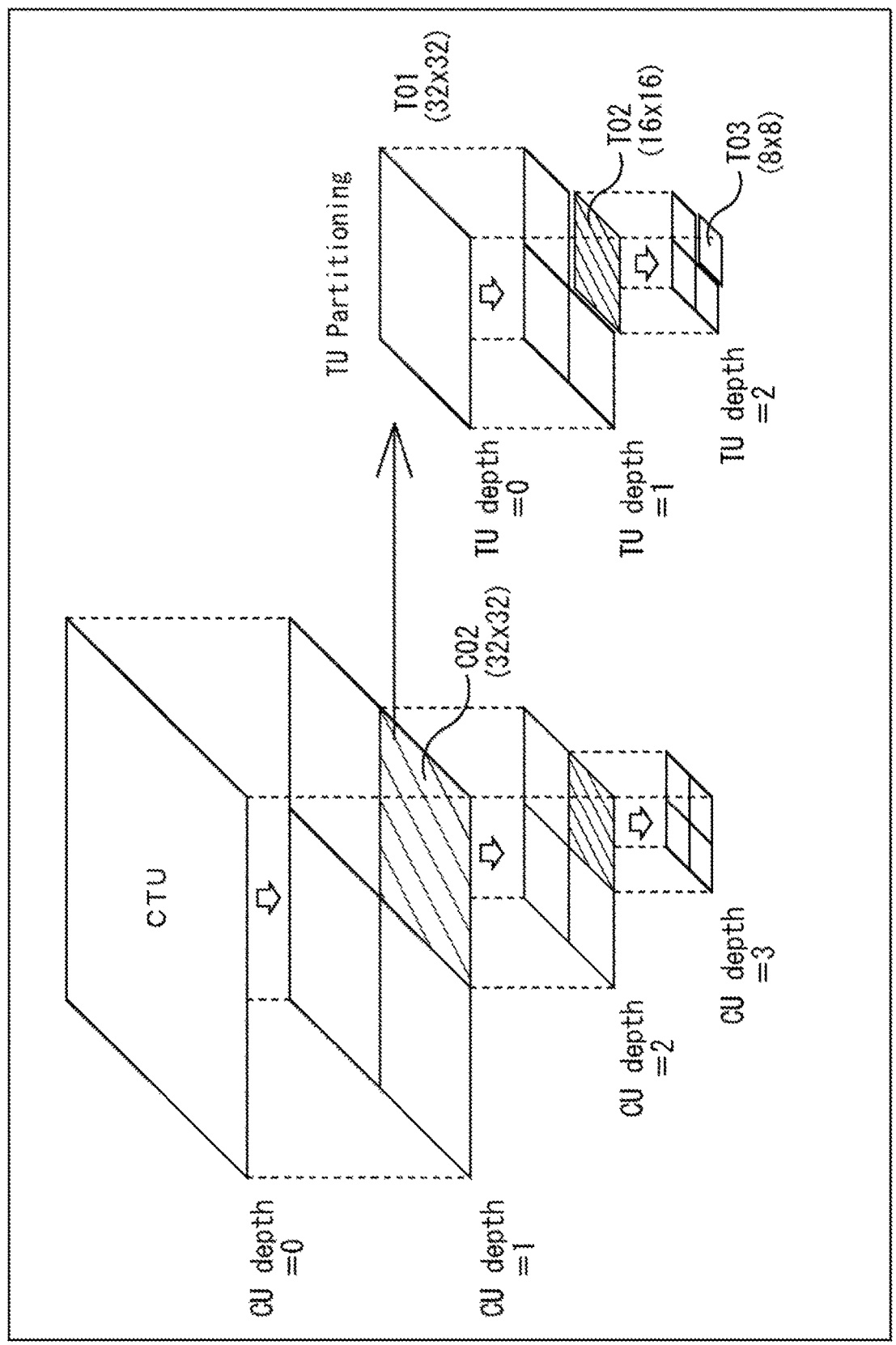
FIG. 3 is an explanatory view for explaining setting of TU to CU depicted in FIG. 1.

The TU is the processing unit of the orthogonal transformation processing. The TU is formed by partitioning the CU (in the case of the intra CU, the PUs within the CU) to a certain depth. FIG. 3 is an explanatory view for explaining the setting of the TU to the CU in the depicted in FIG. 2. The right-hand side of FIG. 3 depicts one or more TUs which can be set in C02. For example, T01 as the TU has the size of 32×32 pixels, and the depth of the TU partition thereof is equal to zero. T02 as the TU has the size of 16×16 pixels, and the depth of the TU partition thereof is equal to 1. T03 as the TU has the size of 8×8 pixels, and the depth of the TU partition thereof is equal to 2.

What kind of block partition is carried out for the purpose of setting the blocks such as the CU, PU and TU described above to an image is typically determined based on the comparison of the costs affecting the coding efficiency. The encoder, for example, compares the costs between one CU of 2M×2M pixels, and the four CUs of M×M pixels. If the coding efficiency is higher when the four CUs of M×M pixels are set, then, the encoder determines that the CU of 2M×2M pixels is partitioned into the four CUs of M×M pixels.

<Scanning Order of CU and PU>

Figure 4:
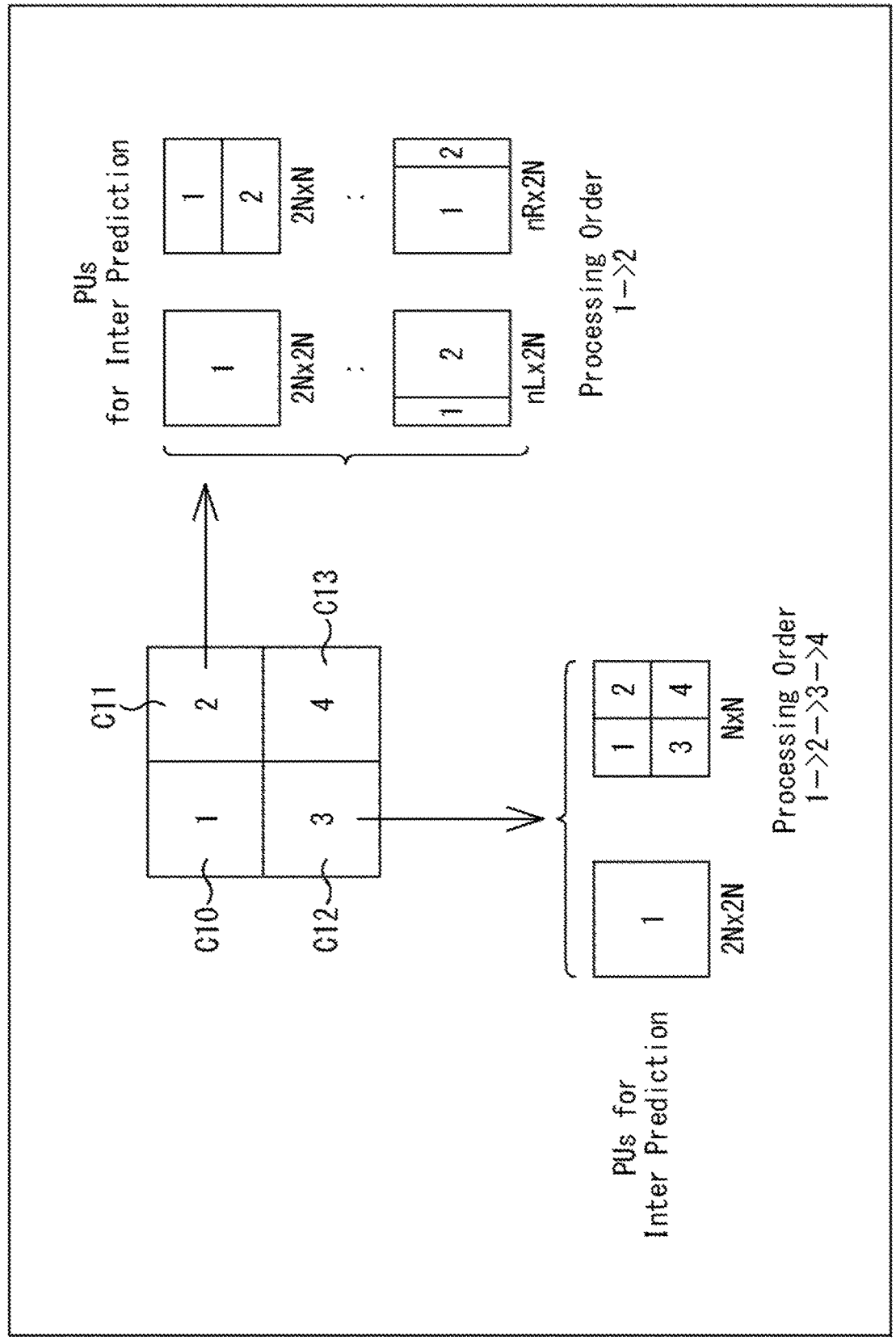
FIG. 4 is an explanatory view for explaining order of scanning of CU/PU.

In coding the image, the CTBs (or the LCUs) which are set in the image (or the slice, tile) in a lattice shape are scanned in the raster scanning order. Within one CTB, the CU is scanned so as to follow from the left to the right, and from the upper side to the lower side of the quad-tree. In processing the current block, information associated with the upper side and left-hand side adjacent blocks is used as input information. FIG. 4 is an explanatory diagram for explaining the scanning order of the CU and the PU. The upper left portion of FIG. 4 depicts C10, C11, C12, and C13 as four CUs that can be included in one CTB. Numerical values within frames of the CUs represent the processing order. The coding processing is executed in the order of C10 as the upper left CU, C11 as the upper right CU, C12 as the lower left CU, and C13 as the lower right CU. One or more PUs for the inter prediction which can be set in C11 as the CU are depicted in the right-hand side of FIG. 4. One or more PUs for the intra prediction which can be set in C12 as the CU are depicted in the lower side of FIG. 4. As depicted as the numerical values within the frames of these PUs, the PUs are also scanned so as to follow from the left to the right, and from the upper side to the lower side.

In the following, a description is given by using "a block" (not the block in the processing portion) as the partial area of an image (picture) or the processing unit in some cases. The "block" in this case indicates an arbitrary partial area within a picture, and a size, a shape, characteristics and the like thereof are by no means limited. In a word, the "block" in this case, for example, includes an arbitrary partial area (processing unit) such as TB, TU, PB, PU, SCU, CU, LCU (CTB), sub-block, macro-block, tile or slice.

<Secondary Transformation>

NPL 1 and NPL 2 each state that after the primary transformation is carried out for the predictive residue as the difference between the image and the predictive image of that image, for the purpose of increasing the energy compaction (for the purpose of concentrating the transformation coefficients on the low-frequency region), the secondary transformation is applied for each sub-block within the transformation block.

However, if the secondary transformation is carried out for the predictive residue having the sparse non-zero coefficients, then, there is the possibility that the coefficients are diffused from the low-order component to the high-order component to reduce the energy compaction, and thus the coding efficiency is reduced.

Figure 5:
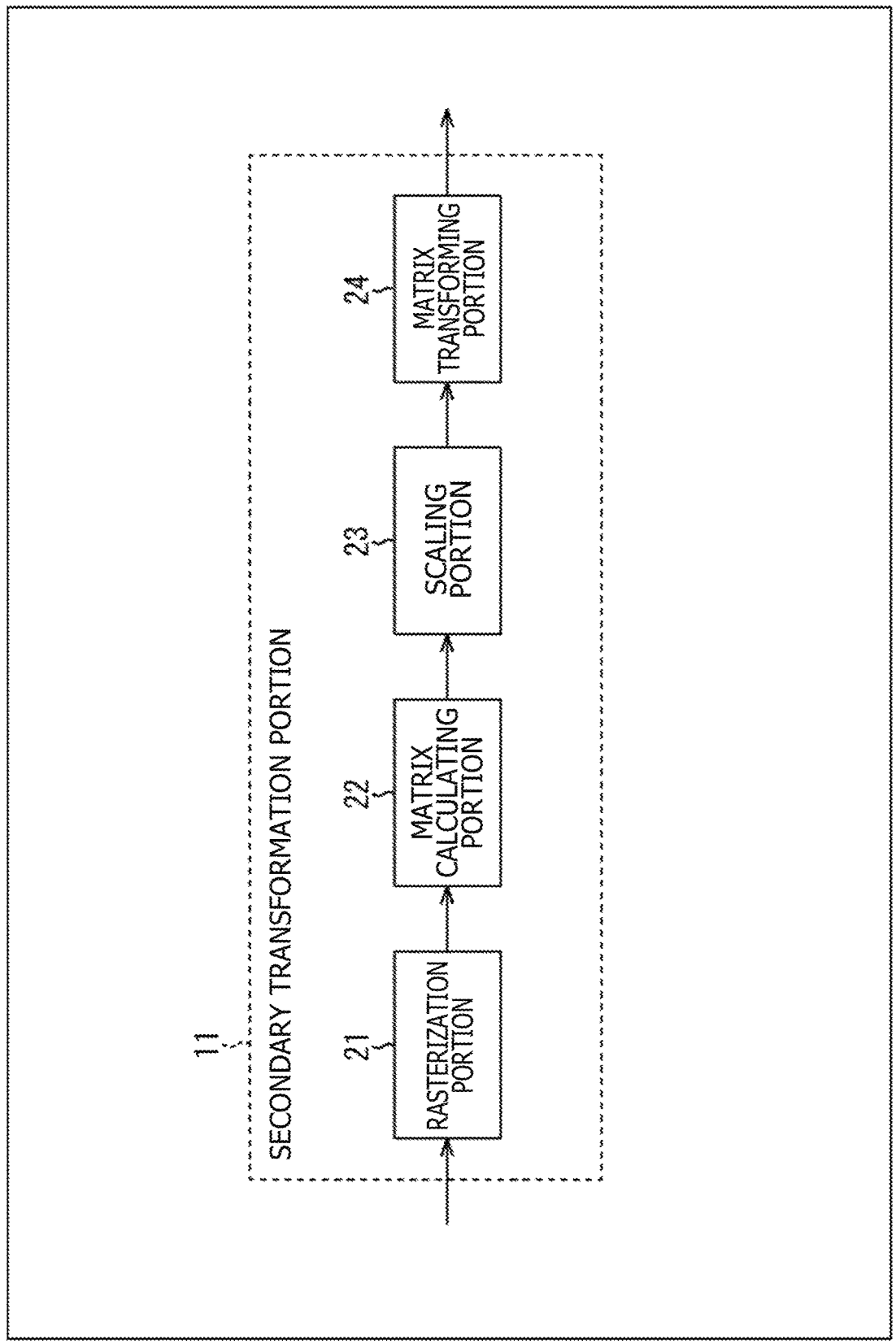
FIG. 5 is a block diagram depicting an example of a main configuration of a secondary transformation portion.

FIG. 5 is a block diagram depicting an example of a main configuration of the secondary transformation portion configured to carry out the secondary transformation. The secondary transformation portion 11 depicted in FIG. 5 is a processing portion configured to carry out the secondary transformation by using the method described in NPL 1 or and NPL 2 for the primary transformation coefficients for which the predictive residue is subjected to the primary transformation. As depicted in FIG. 5, the secondary transformation portion 11 has a rasterization portion 21, a matrix calculating portion 22, a scaling portion 23, and a matrix transforming portion 24.

The rasterization portion 21 scans the inputted primary transformation coefficient Coeff_P in accordance with a scanning method indicated by a scanning identifier scanIdx to transform the primary transformation coefficient Coeff_P into one-dimensional vector $X_{1d}$. For example, if the primary transformation coefficient Coeff_P is a matrix of 4×4 having sparse non-zero coefficients as expressed by following Expression (1), and the scanning identifier scanIdx indicates horizontal scanning (hor), then, the rasterization portion 21 transforms the primary transformation coefficient Coeff_P into one-dimensional vector $X_{1d}$ as expressed by following Expression (2):

[Math. 1]

$$Coeff\_P = \begin{bmatrix} 255 & 0 & 0 & 0 \\ 0 & 0 & 0 & 0 \\ 0 & 0 & 0 & 0 \\ 0 & 0 & 0 & 0 \end{bmatrix} \quad (1)$$

[Math. 2]

$$X_{1d} = [255, 0, 0, 0, 0, 0, 0, 0, 0, 0, 0, 0, 0, 0, 0, 0] \quad (2)$$

The matrix calculating portion 22 carries out the matrix calculation like following Expression (3) by using a matrix R of the secondary transformation for the one-dimensional vector $X_{1d}$ obtained in the manner as described above. For example, this matrix calculation is carried out for the one-dimensional vector $X_{1d}$ expressed in Expression (2) described above, thereby obtaining the one-dimensional vector $Y_{1d}$ as expressed in following Expression (4).

$$Y_{1d}^T = R \cdot X_{1d}^T \quad (3)$$

[Math. 3]

$$Y_{1d} = [62730, -10710, -4590, -7650, -7650, -7905, 765, -510, 2805, -1020, -2295, 1020, 765, -510, 255, 0] \quad (4)$$

The scaling portion 23, for normalizing the norm, carries out bit shift calculation of N (N is a natural number) bits like following Expression (5) for the one-dimensional vector $Y_{1d}$ obtained in the manner as depicted above. For example, this bit shift calculation is carried out for the one-dimensional vector $Y_{1d}$ indicated by Expression (4) described above, thereby obtaining one-dimensional vector $Z_{1d}$ as indicated in following Expression (6).

$$Z_{1d} = (Y_{1d}) >> N \quad (5)$$

[Math. 4]

$$Z_{1d} = [245, -42, -18, -30, -30, -31, 3, -2, 11, -4, -9, 4, 3, -2, 1, 0] \quad (6)$$

The matrix transforming portion 24 transforms the one-dimensional vector $Z_{1d}$ obtained in the manner as depicted above into a matrix based on the scanning method specified by the scanning identifier scanIdx. This matrix is supplied as the secondary transformation coefficient Coeff with which the primary transformation coefficient Coeff_P is subjected to the secondary transformation to a processing portion (for example, a quantization portion or the like) in a subsequent stage. For example, this matrix transformation is carried out for the one-dimensional vector $Z_{1d}$ indicated by Expression (4) described above, thereby obtaining the secondary transformation coefficient Coeff of a matrix of 4×4 as indicated by following Expression (7).

[Math. 5]

$$Coeff = \begin{bmatrix} 245 & -42 & -18 & -30 \\ -30 & -31 & 3 & -2 \\ 11 & -4 & -9 & 4 \\ 3 & -2 & 1 & 0 \end{bmatrix} \quad (7)$$

As described above, if the primary transformation coefficient Coeff_P having the sparse non-zero coefficients is subjected to the secondary transformation, then, there is the possibility that the coefficients are diffused from the low-order component to the high-order component to reduce the energy compaction, and thus the coding efficiency is reduced.

It should be noted that NPL 2 discloses that for the purpose of reducing the overhead of a secondary transformation flag, in the case where the non-zero coefficient within the transformation block is equal to or lower than a predetermined threshold value, the secondary transformation shall not be applied, and a signal of the flag is omitted. For example, when the threshold value TH=2, in the case where the primary transformation coefficient Coeff_P is the matrix as indicated in Expression (1) described above, the secondary transformation is skipped (omitted).

Figure 6:
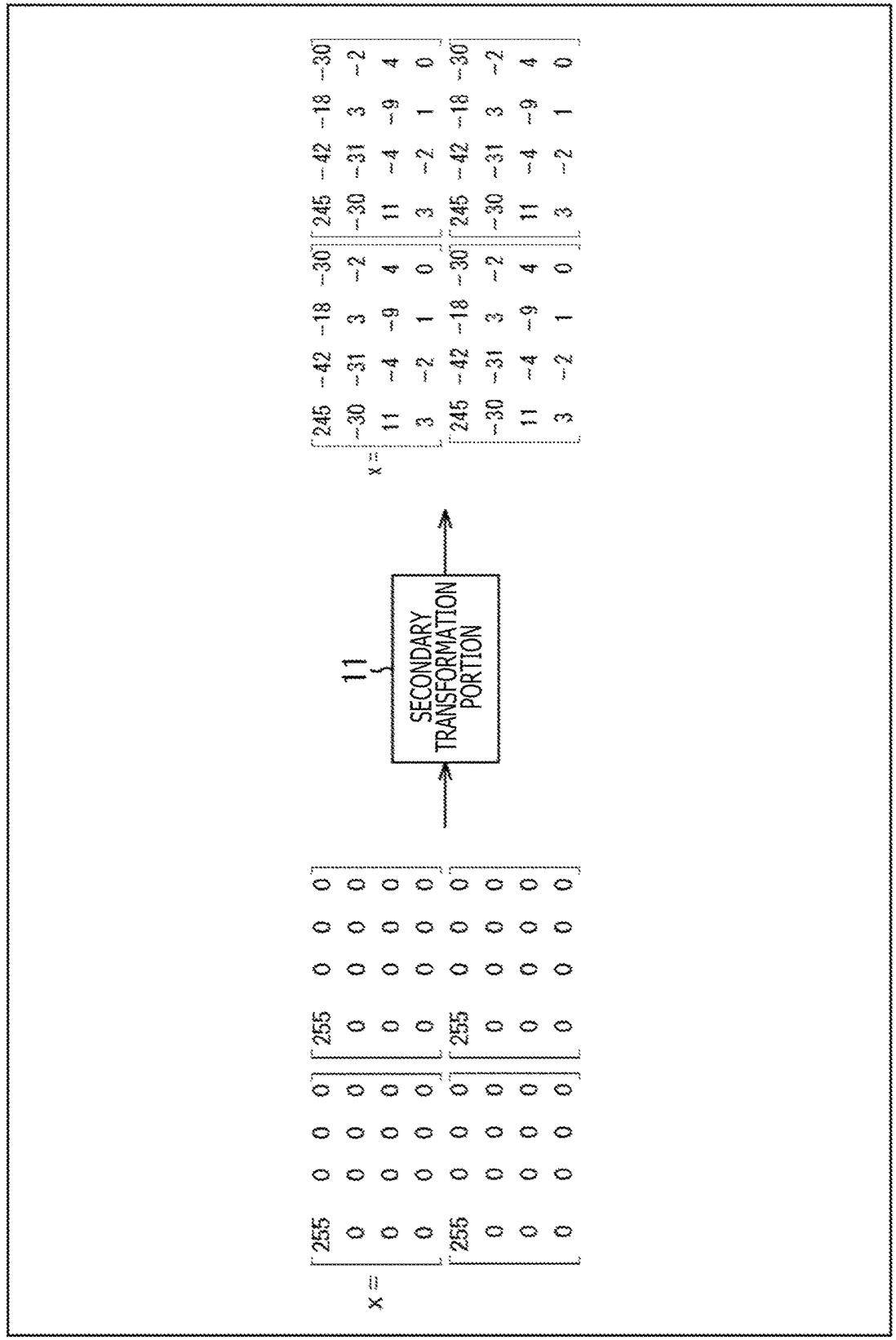
FIG. 6 is a diagram explaining an example of a situation of secondary transformation.

However, in the case of the method described in NPL 1 or NPL 2, the transformation block is subjected to the secondary transformation for each sub-block. Therefore, for example, in the case where as depicted in FIG. 6, the transformation block of the primary transformation coefficient Coeff_P includes sub-blocks of 2×2, and each of the sub-blocks is the matrix of 4×4 as indicated by Expression (1) described above, since the non-zero coefficient within the transformation block is 4, the non-zero coefficient is larger than the threshold value TH (=2), and thus the secondary transformation shall be applied. Since as described above, the secondary transformation is carried out for each sub-block (every matrix of 4×4), the secondary transformation coefficient Coeff of each of the sub-blocks becomes as indicated by Expression (7) described above. In a word, there is the possibility that the coefficients are diffused from the low-order component to the high-order component to reduce the energy compaction, and thus the coding efficiency is reduced.

<Secondary Transformation Skip Control in Sub-Block Unit>

Then, the skip of the transformation processing for the transformation coefficients obtained from the predictive residue as the difference between the image and the predictive image of that image is controlled for each sub-block based on the number of non-zero coefficients of the transformation coefficient for each sub-block. In addition, the skip of the inverse transformation processing for the transformation coefficients with which the predictive residue as the difference between the image and the predictive image of that image is obtained by executing the inverse transformation processing is controlled for each sub-block based on the number of non-zero coefficients of the transformation coefficient for each sub-block. For example, in the case where the non-zero coefficient within the sub-block is equal to or smaller than the threshold value, the secondary transformation or the inverse secondary transformation shall be skipped (omitted).

By adopting such a procedure, the application of the transformation processing (inverse transformation processing) to the transformation coefficient of the sub-block having the sparse non-zero coefficients can be suppressed. Therefore, the reduction of the energy compaction can be suppressed, and the reduction of the coding efficiency can be suppressed.

<Image Coding Apparatus>

Figure 7:
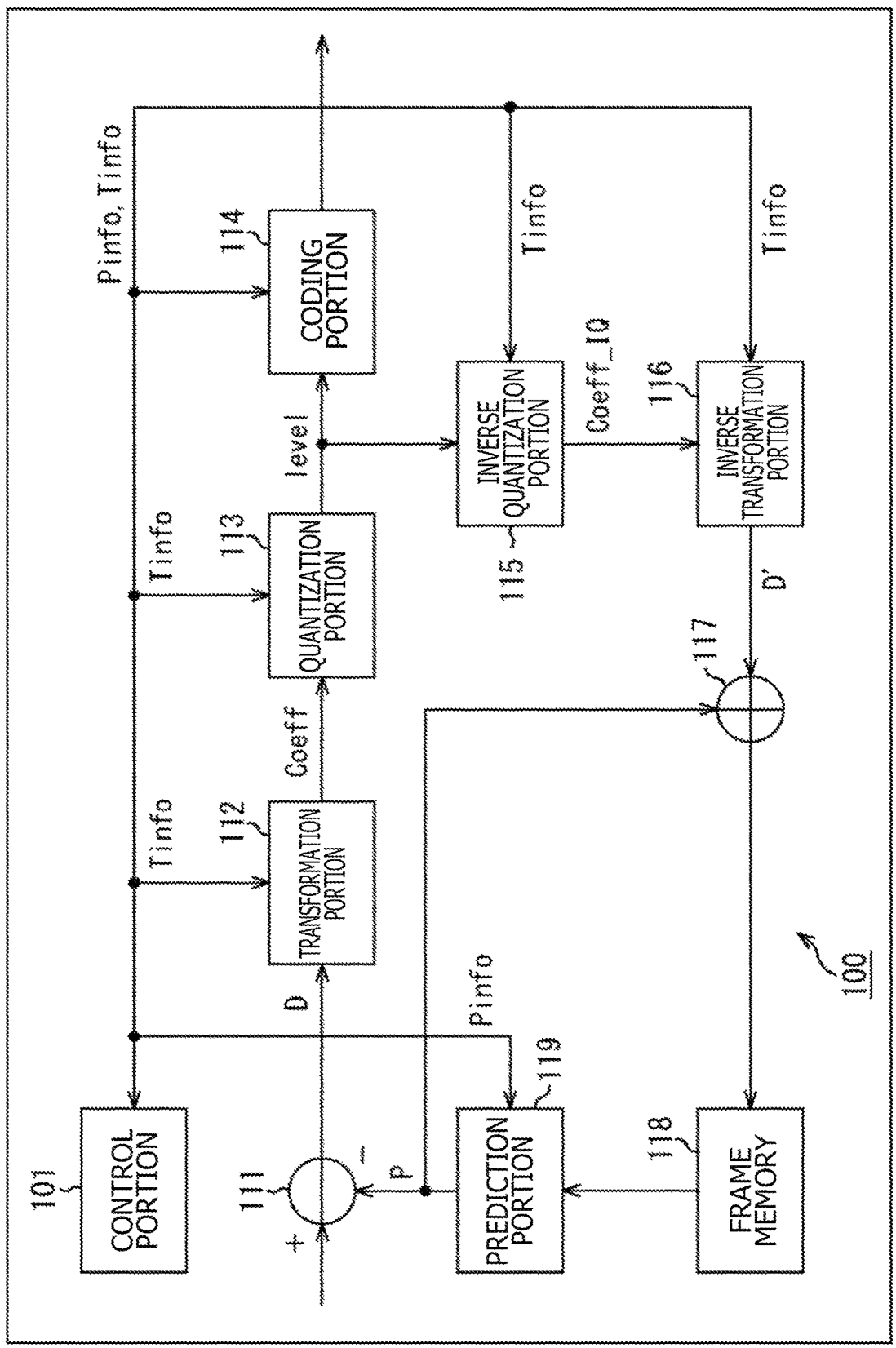
FIG. 7 is a block diagram depicting an example of a main configuration of an image coding apparatus.

FIG. 7 is a block diagram depicting an example of a configuration of an image coding apparatus as a mode of an image processing apparatus to which the present technique is applied. The image coding apparatus 100 depicted in FIG. 7, like the AVC or the HEVC, is an apparatus for encoding the predictive residue between the image and the predictive image of that image. For example, the technique proposed in the HEVC, or a technique proposed in a Joint Video Exploration Team (JVET) is mounted to the image coding apparatus 100.

It should be noted that FIG. 7 depicts the main constituent elements such as the processing portion and the flow of the data, and the constituent elements depicted in FIG. 7 are not all the constituent elements. In a word, in the image coding apparatus 100, a processing portion which is not depicted as a block in FIG. 7 may be present, or processing or a flow of data which is not indicated by an arrow or the like in FIG. 7 may be present.

As depicted in FIG. 7, the image coding apparatus 100 has a control portion 101, a calculation portion 111, a transformation portion 112, a quantization portion 113, a coding portion 114, an inverse quantization portion 115, an inverse transformation portion 116, a calculation portion 117, a frame memory 118, and a predictive portion 119.

The control portion 101 partitions a moving image inputted to the image coding apparatus 100 into blocks (CU, PU, transformation block (TB), and the like) of a processing unit based on a block size of an outside or a previously specified processing unit. Then, the control portion 101 causes an image I corresponding to the blocks obtained through the partition to be supplied to the calculation portion 111. In addition, the control portion 101 determines coding parameters (header information Hinfo, predictive mode information Pinfo, transformation information Tinfo, and the like) which are to be supplied to the blocks based on, for example, Rate-Distortion Optimization (RDO). The determined coding parameters are supplied to the respective blocks.

The header information Hinfo, for example, includes a Video Parameter Set (VPS), a Sequence Parameter Set (SPS), a Picture Parameter Set (PPS), a slice header (SH), and the like. For example, the header information Hinfo includes information used to prescribe image size (transverse width PicWidth, longitudinal width PicHeight), bit depth (luminance bitDepthY, a color difference bitDepthC), a maximum value MaxCUSize/minimum value MinCUSize of a CU size, a maximum value MaxTBSize/minimum value MinTBSize of a transformation block size, a maximum value MaxTSSize of a transformation skip block (referred to as a maximum transformation skip block size as well), an ON/OFF flag of coding tools (referred to as a valid flag as well), and the like. Needless to say, the content of the header information Hinfo is arbitrary, and any information other than the examples described above may also be included in the header information Hinfo.

The predictive mode information Pinfo, for example, includes a PU size PUSize, intra predictive mode information IPinfo (for example, prev_intra_luma_pred_flag, mpm_idx, rem_intra_pred_mode and the like in JCTVC-W1005, 7.3.8.5 Coding Unit syntax), movement predictive information MVinfo (for example, merge_idx, merge_flag, inter_pred_idc, ref_idx_LX, mvp_lX_flag, X={0, 1}, mvd and the like in JCTVC-W1005, 7.3.8.6 Prediction Unit Syntax), and the like. In this case, the PU size PUSize is information indicating a PU size (predictive block size) of a proceeding target. The intra predictive mode information IPinfo is information associated with an intra predictive mode of a block of a processing target. The movement predictive information MVinfo is information associated with movement prediction of a block of a processing target. Needless to say, the content of the predictive mode information Pinfo is arbitrary, and any information other than the examples described above may also be included in that predictive mode information Pinfo.

The transformation information Tinfo, for example, includes the following information.

The block size TBSize (or, referred to as a logarithmic value log 2TBSize of TBSize with 2 as a base, a transform block size as well) is information indicating the block size of the processing target transformation block.

The secondary transformation identifier (st_idx) is an identifier indicating which of the secondary transformation or the inverse secondary transformation (referred to as (inverse) secondary transformation as well) is applied to a target data unit (for example, refer to JVET-B1001, 2.5.2 Secondary Transforms. In JEM2, referred to as nsst_idx, rot_idx as well). In other words, the secondary transformation identifier is information associated with the content of the (inverse) secondary transformation in a target data unit.

For example, in the case where the secondary transformation identifier st_idx is larger in value thereof than zero, the secondary transformation identifier st_idx is an identifier specifying a matrix of an (inverse) secondary transformation. In other words, in this case, the secondary transformation identifier st_idx indicates carrying-out of the (inverse) secondary transformation. In addition, for example, in the case where the secondary transformation identifier st_idx is zero in value thereof, the secondary transformation identifier st_idx indicates the skip of the (inverse) secondary transformation.

The scanning identifier (scanIdx) is information associated with the scanning method. The quantization parameter (qp) is information exhibiting the quantization parameter used in the (inverse) quantization in a target data unit. The quantization matrix (scaling_matrix) is information (for example, JCTVC_W1005, 7.3.4 Scaling list data syntax) exhibiting a quantization matrix used in the (inverse) quantization in a target data unit.

Needless to say, the content of the transformation information Tinfo is arbitrary, and any information other than the examples described above may also be included in that transformation information Tinfo.

The header information Hinfo, for example, is supplied to each of the blocks. The predictive mode information Pinfo, for example, is supplied to the coding portion 114 and the prediction portion 119. The transformation information Tinfo, for example, is supplied to the transformation portion 112, the quantization portion 113, the coding portion 114, the inverse quantization portion 115, and the inverse transformation portion 116.

The calculation portion 111 subtracts a predictive image P supplied thereto from the prediction portion 119 from an image I corresponding to the inputted block in a processing unit in a manner as exhibited in Expression (8) to obtain the predictive residue D, and supplies the resulting predictive residue D to the transformation portion 112.

$$D = I - P \qquad (8)$$

The transformation portion 112 executes the transformation processing for the predictive residue D supplied thereto from the calculation portion 111 based on the transformation information Tinfo supplied thereto from the control portion 101 to derive the transformation coefficient Coeff. The transformation portion 112 supplies the transformation coefficient Coeff to the quantization portion 113.

The quantization portion 113 scales (quantizes) the transformation coefficient Coeff supplied thereto from the transformation portion 112 based on the transformation information Tinfo supplied thereto from the control portion 101. In a word, the quantization portion 113 quantizes the transformation coefficient Coeff for which the transformation processing has been executed. The quantization portion 113 supplies a transformation coefficient after the quantization obtained by that quantization, that is, a quantization transformation coefficient level to the coding portion 114 and the inverse quantization portion 115.

The coding portion 114 codes the quantization transformation coefficient level or the like supplied thereto from the quantization portion 113 by using a predetermined method. For example, the coding portion 114 transforms the coding parameters (header information Hinfo, predictive mode information Pinfo, transformation information Tinfo, and the like) supplied thereto from the control portion 101, and the quantization transformation coefficient level supplied thereto from the quantization portion 113 into syntax values of syntax elements in accordance with the definition of a syntax table to code (for example, arithmetically code) the syntax values, thereby producing a bit stream (coded data).

In addition, the coding portion 114 derives residual information RInfo from the quantization transformation coefficient level, and codes the residual information RInfo, thereby producing a bit stream (coded data).

The residual information RInfo, for example, includes a last non-zero coefficient X coordinate (last_sig_coeff_x_pos), a last non-zero coefficient Y coordinate (last_sig_coeff_y_pos), a sub-block non-zero coefficient presence/absence flag (coded_sub_block_flag), a non-zero coefficient presence/absence flag (sig_coeff_flag), a GR1 flag (gr1_flag), a GR2 flag (gr2_flag), a sign code (sign_flag), a non-zero coefficient residue level (coeff_abs_level_remaining), and the like (for example, refer to JCTVC-W1005, 7.3.8.11 Residual Coding syntax). In this case, the GR1 flag (gr1_flag) is flag information representing whether or not a level of a non-zero coefficient is larger than 1. The GR2 flag (gr2_flag) is flag information representing whether or not a level of a non-zero coefficient is larger than 2. The sign code (sign_flag) is a code representing plus or minus of the non-zero coefficient. The non-zero coefficient residue level (coeff_abs_level_remaining) is information representing a residue level of the non-zero coefficient. Needless to say, the content of the residue information RInfo is arbitrary, and any information other than the examples described above may also be included in the residue information RInfo.

The coding portion 114, for example, multiplexes the bit streams (coded data) of the coded syntax elements, and outputs the multiplexing result in the form of a bit stream.

The inverse quantization portion 115 scales (inverse-quantizes) a value of the quantization transformation coefficient level supplied thereto from the quantization portion 113 based on the transformation information Tinfo supplied thereto from the control portion 101 to derive a transformation coefficient Coeff_IQ after the inverse quantization. The inverse quantization portion 115 supplies the resulting transformation coefficient Coeff_IQ to the inverse transformation portion 116. The inverse quantization which is carried out by the inverse quantization portion 115 is inverse processing of the quantization which is carried out by the quantization portion 113, and is processing similar to the inverse quantization which is carried out in an image decoding apparatus which will be described later. Therefore, the inverse quantization will be described later in a description relating to the image decoding apparatus.

The inverse transformation portion 116 carries out the inverse transformation for the transformation coefficient Coeff_IQ supplied thereto from the inverse quantization portion 115 based on the transformation information Tinfo supplied thereto from the control portion 101 to derive a predictive residue D'. The inverse transformation portion 116 supplies the resulting predictive residue D' to the calculation portion 117. The inverse transformation which is carried out by the inverse transformation portion 116 is inverse processing of the transformation which is carried out by the transformation portion 112, and is processing similar to the inverse transformation which is carried out in the image decoding apparatus which will be described later. Therefore, the inverse transformation will be described later in the description relating to the image decoding apparatus.

The calculation portion 117 adds the predictive residue D' supplied thereto from the inverse transformation portion 116, and a predictive image P (predictive signal) supplied thereto from the predictive portion 119 and corresponding to the predictive residue D' to each other in the manner expressed by following Expression (9) to derive a local decoded image Rec. The calculation portion 117 supplies the resulting local decoded image Rec to the frame memory 118.

$$Rec=D'+P \qquad (9)$$

The frame memory 118 rebuilds decoded image for each picture unit by using the local decoded image Rec supplied thereto from the calculation portion 117, and stores the resulting decoded image in a buffer within the frame memory 118. The frame memory 118 reads out the decoded image specified by the predictive portion 119 as a reference image from the buffer, and supplies the decoded image to the prediction portion 119. In addition, the frame memory 118 may store the header information Hinfo, the predictive mode information Pinfo, the transformation information Tinfo, and the like pertaining to the production of the decoded image in the buffer within the frame memory 118.

The prediction portion 119 acquires the decoded image which is stored in the frame memory 118 and which is specified by the predictive mode information PInfo as the reference image, and produces the predictive image P by using a prediction method specified by the predictive mode information Pinfo. The predictive portion 119 supplies the produced predictive image P to the calculation portion 111 and the calculation portion 117.

Such an image coding apparatus 100 is provided with a control portion. The control portion controls the skip of the transformation processing for the transformation coefficients obtained from the predictive residue as the difference between the image and the predictive image of that image for each sub-block based on the number of non-zero coefficients of the transformation coefficient for each sub-block. In a word, the transformation portion 112 controls the skip of the transformation processing for the transformation coefficient obtained from the predictive residue as the difference between the image and the predictive image of that image for each sub-block based on the number of non-zero coefficients of the transformation coefficient for each sub-block.

<Transformation Portion>

Figure 8:
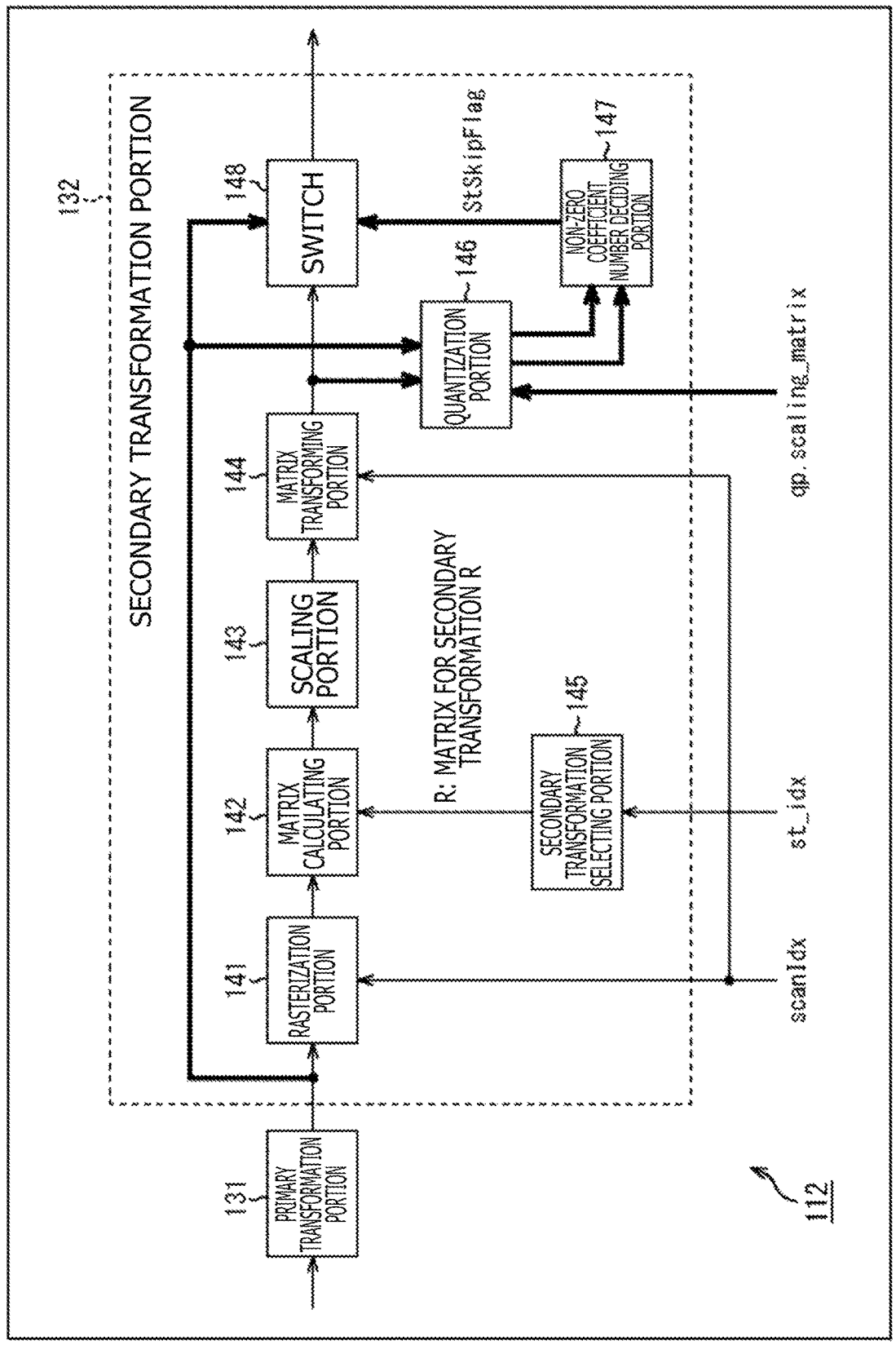
FIG. 8 is a block diagram depicting an example of a main configuration of a transformation portion.

FIG. 8 is a block diagram depicting an example of a main configuration of the transformation portion 112. In FIG. 8, the transformation portion 112 has a primary transformation portion 131 and a secondary transformation portion 132.

The primary transformation portion 131 carries out the primary transformation such as the orthogonal transformation for the predictive residue D supplied thereto from the calculation portion 111 to derive a transformation coefficient Coeff_P after the primary transformation (referred to as a primary transformation coefficient as well) corresponding to the predictive residue D. That is, the primary transformation portion 131 transforms the predictive residue D into the primary transformation coefficient Coeff_P. The primary transformation portion 131 supplies the derived primary transformation coefficient Coeff_P to the secondary transformation portion 132 (a rasterization portion 141 and a switch 148 which will be described later).

The secondary transformation portion 132 transforms the primary transformation coefficient Coeff_P supplied thereto from the primary transformation portion 131 into one-dimensional vector (referred to as a row vector as well) and carries out the matrix calculation for the one-dimensional vector. In addition, the secondary transformation portion 132 scales the one-dimensional vector for which the matrix calculation is carried out, and carries out the secondary transformation as the transformation processing for transforming the scaled one-dimensional vector into a matrix.

The secondary transformation portion 132 carries out the secondary transformation for the primary transformation coefficient Coeff_P based on a secondary transformation identifier st_idx as the information associated with the content of the secondary transformation and a scanning identifier scanIdx as information associated with a scanning method for the transformation coefficient to derive the transformation coefficient Coeff after the secondary transformation (referred to as the secondary transformation coefficient as well). In a word, the secondary transformation portion 132 transforms the primary transformation coefficient Coeff_P into the secondary transformation coefficient Coeff. The secondary transformation portion 132 supplies the secondary transformation coefficient Coeff to the quantization portion 113.

It should be noted that the secondary transformation portion 132 can also skip (omit) the secondary transformation to supply the primary transformation coefficient Coeff_P as the secondary transformation coefficient Coeff to the quantization portion 113.

As depicted in FIG. 8, the secondary transformation portion 132 has a rasterization portion 141, a matrix calculating portion 142, a scaling portion 143, a matrix transforming portion 144, a secondary transformation selecting portion 145, a quantization portion 146, a non-zero coefficient number deciding portion 147, and a switch 148.

The rasterization portion 141 transforms the primary transformation coefficient Coeff_P supplied thereto from the primary transformation portion 131 into one-dimensional vector $X_{1d}$ every sub-block unit (4×4 sub-blocks) based on the scanning method for the transformation coefficient specified by the scanning identifier scanIdx. The rasterization portion 141 supplies the resulting one-dimensional vector $X_{1d}$ to the matrix calculating portion 142.

Figure 9:
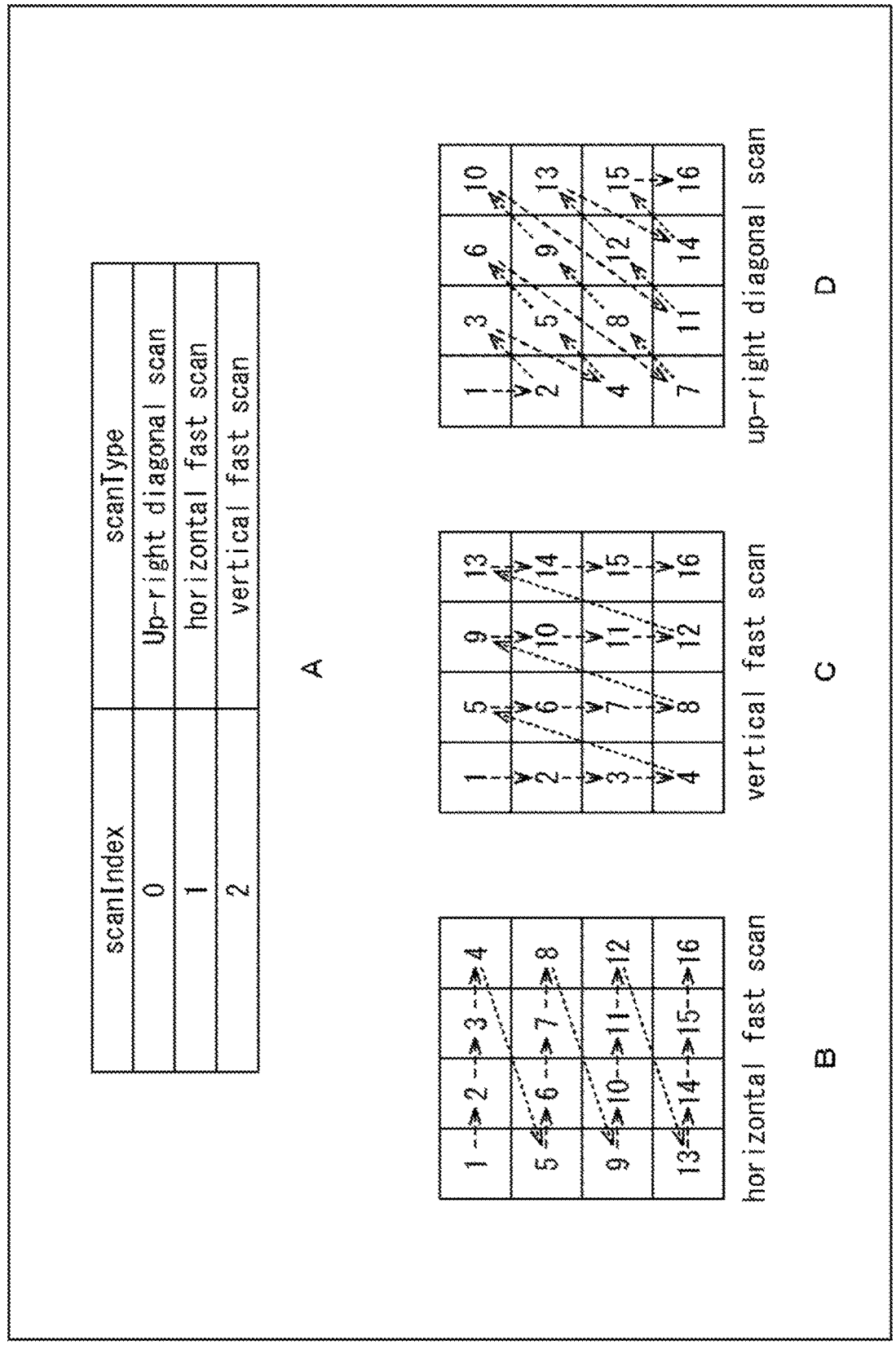
FIG. 9 is a diagram depicting an example of scanning methods corresponding to respective scan identifiers.

A of FIG. 9 depicts scanning types scanType which are specified with values of the scanning identifier scanIdx. As depicted in A of FIG. 9, in the case where the scanning identifier scanIdx is 0, an oblique direction scanning (up-right diagonal scan) is specified. In the case where the scan identifier scanIdx is 1, a horizontal direction scanning (horizontal fast scan) is specified. In the case where the scan identifier scanIdx is 2, a vertical direction scanning (vertical fast scan) is specified. B of FIG. 9 to D of FIG. 9 depict orders, for the coefficients, of the scanning in 4×4 sub-blocks. In B of FIG. 9 to D of FIG. 9, the numerical values added to the respective coefficient positions represent the order in which the coefficient positions are scanned. B of FIG. 9 depicts an example of the scanning order of the horizontal direction scanning (horizontal fast scan). C of FIG. 9 depicts an example of the scanning order of the vertical direction scanning (vertical fast scan). D of FIG. 9 depicts an example of the scanning order of the oblique direction scanning (up-right diagonal scan).

The secondary transformation selecting portion 145 reads out a matrix R of the secondary transformation specified with the secondary transformation identifier st_idx from an internal memory (not depicted) of the secondary transformation selecting portion 145, and supplies the matrix R of the secondary transformation thus read out to the matrix calculating portion 142. For example, when the secondary transformation identifier st_idx is set to a certain value, the secondary transformation selecting portion 145 reads out the matrix R of 16×16 depicted in FIG. 10 as the secondary transformation, and supplies the matrix R of 16×16 thus read out to the matrix calculating portion 142.

Incidentally, the secondary transformation selecting portion 145 may select the matrix R for the secondary transformation in response to the secondary transformation identifier st_idx and the intra predictive mode information IPinfo (for example, a predictive mode number). In addition, the secondary transformation selecting portion 145 may select the matrix R for the secondary transformation in response to the movement predictive information MVinfo and the secondary transformation identifier st_idx instead of the intra predictive mode information IPinfo.

The matrix calculating portion 142 carries out the matrix calculation as depicted in following Expression (10) by using one-dimensional vector $X_{1d}$ and the matrix R for the secondary transformation, and supplies the resulting one-dimensional vector $Y_{1d}$ to the scaling portion 143. In Expression (10), an operator "·" represents an operation for carrying out inner product (matrix product) between matrices, and an operator "T" represents an operation for a transpose.

$$Y_{1d}^T = R \cdot X_{1d}^T \tag{10}$$

For the purpose of normalizing norm of the signal $Y_{1d}$ (that is, one-dimensional vector $Y_{1d}$) supplied thereto from the matrix calculating portion 142, the scaling portion 143 carries out the bit shift calculation of N (N is a natural number) bits as expressed by following Expression (11) to obtain a signal $Z_{1d}$ (that is, one-dimensional vector $Z_{1d}$) after the bit shift. It should be noted that before the shift calculation of N bits like following Expression (12), a value of $1<<(N-1)$ may be added as the offset to each of the elements of the one-dimensional vector $Z_{1d}$.

$$Z_{1d} = (Y_{1d}) >> N \tag{11}$$

$$Z_{1d} = (Y_{1d} + ((N-1)<<1) \cdot E) >> N \tag{12}$$

Figure 10:
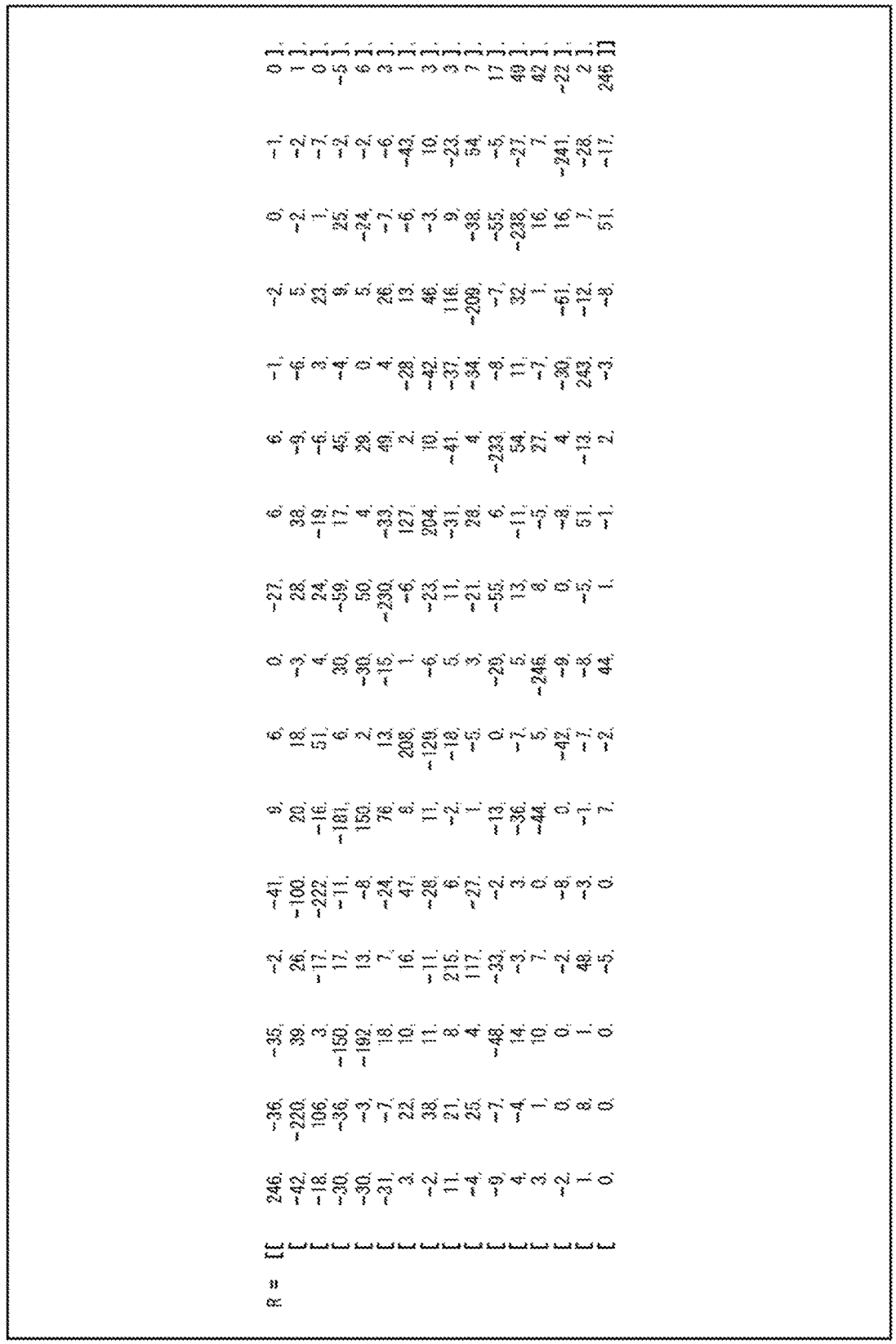
FIG. 10 is a view depicting an example of a matrix of secondary transformation.

It should be noted that in Expression (12), E is a vector in which a value of each of elements is 1×16 dimension of 1. For example, since the matrix R for the secondary transformation depicted in FIG. 10 is a matrix which is subjected to 8-bit scaling, in the scaling portion 143, a value of N used for normalization of the norm is 8. In general, in the case where the matrix R for the secondary transformation is subjected to the N-bit scaling, a bit shift amount of the norm normalization is N bits. The scaling portion 143 supplies the one-dimensional vector $Z_{1d}$ obtained in the manner as described above to the matrix transforming portion 144.

The matrix transforming portion 144 transforms the vector $Z_{1d}$ of 1×16 dimension after the norm normalization into a matrix of 4×4 based on the scanning method specified by the scanning identifier scanIdx. The matrix transforming portion 144 supplies the resulting transformation coefficient Coeff to the quantization portion 146 and the switch 148.

The quantization portion 146 executes processing (quantization) which is basically similar to that of quantization portion 113. However, the quantization portion 146 receives as inputs thereof the primary transformation coefficient Coeff_P, the secondary transformation coefficient Coeff (after execution of the processing up to the rasterization portion 141 to the matrix transforming portion 144), the quantization parameter qp as a part of transformation information Tinfo, and the quantization matrix scaling_matrix. The quantization portion 146 quantizes the primary transformation coefficient Coeff_P supplied thereto from the primary transformation portion 131, and the secondary transformation coefficient Coeff as the transformation coefficient supplied thereto from the matrix transforming portion 144, for example, like following Expression (13) and Expression (14) by referring to the quantization parameter qp and the quantization matrix scaling_matrix. Thus, the quantization portion 146 derives the primary transformation coefficient level_P after the quantization (referred to as the quantization primary transformation coefficient) and the secondary transformation coefficient level_S after the quantization (referred to as the quantization secondary transformation coefficient).

$$\text{level}\_P(i,j) = \text{sign}(\text{coeff}\_P(i,j)) \times ((\text{abs}(\text{coeff}\_P(i,j)) \times f[qp\%6] \times (16/w(i,j)) + \text{offsetQ}) >> qp/6) >> \text{shift1} \tag{13}$$

$$\text{level}\_S(i,j) = \text{sign}(\text{coeff}(i,j)) \times ((\text{abs}(\text{coeff}(i,j)) \times f[qp\%6] \times (16/w(i,j)) + \text{offsetQ}) >> qp/6) >> \text{shift1} \tag{14}$$

In Expression (13) and Expression (14), an operator sign (X) is an operator for returning a sign of positive or negative of an input value X. For example, if X>=0, then, +1 is returned, and if X<0, then, −1 is returned. In addition, f[ ] is a scaling factor depending on the quantization parameter, and takes values like following Expression (15).

$$F[qp\%6] = [26214, 23302, 20560, 18396, 16384, 16384, 14564] \tag{15}$$

In addition, in Expression (13) and Expression (14), w(i, j) is a value of the quantization matrix scaling_matrix corresponding to a coefficient position (i, j) of Coeff(i, j) or (Coeff_P(i, j)). In a word, this w(i, j) is obtained like following Expression (16). Moreover, shift1 and offsetQ are obtained like following Expression (17) and Expression (18), respectively.

$$w(i,j) = \text{scaling\_matrix}(i,j) \tag{16}$$

$$\text{shift1} = 29 - M - B \tag{17}$$

$$\text{offsetQ} = 28 - M - B \tag{18}$$

However, in Expression (17) and Expression (18), M is a logarithmic value of a block size TBSize of the transformation block with 2 as base, and B is a bit depth bitDepth of an input signal.

$$M = \log 2(\text{TBSize})$$

$$B = \text{bitDepth}$$

It should be noted that the quantization method can be changed within a feasible range irrespective of the quantization expressed in Expression (13) and Expression (14).

The quantization portion 146 supplies the quantization primary transformation coefficient level P and the quantization secondary transformation coefficient level_S which are obtained in the manner as described above to the non-zero coefficient number deciding portion 147.

The non-zero coefficient number deciding portion 147 receives as inputs thereof the quantization primary transformation coefficient level_P and the quantization secondary transformation coefficient level_S for each sub-block. The non-zero coefficient number deciding portion 147 refers to the quantization primary transformation coefficient level_P and the quantization secondary transformation coefficient level_S which are supplied from the quantization portion 146 to derive the number of non-zero coefficients numSigInSBK_P (referred to as the number of non-zero coefficients of the quantization primary transformation coefficient as well) and numSingInSBK_S (referred to as the number of non-zero coefficients of the quantization secondary transformation coefficient as well) within a sub-block with respect to the quantization primary transformation coefficient level_P and the quantization secondary transformation coefficient level_S, for example, from following Expression (19) and Expression (20). It should be noted that in Expression (19) and Expression (20), (i, j) represents the coordinates within the sub-block, and i=0, ..., 3, j=0, ..., 3. In addition, an operator abs(X) is an operator for returning an absolute value of an input value X. By using Expression (19) and Expression (20), it is possible to derive the number of transformation coefficients (non-zero coefficients) in each of which a level value of the transformation coefficient after the quantization is larger than 0. It should be noted that in Expression (19) and Expression (20), the decision condition (abs(level_X(i, j))>0) (X=P, S) for the non-zero coefficient may be replaced with the decision condition of (level_X(i, j)!=0).

$$\text{numSigInSBK}\_P = E\{\text{abs}(\text{level}\_P(i,j)) > 0 ? 1 : 0\} \quad (19)$$

$$\text{numSigInSBK}\_S = E\{\text{abs}(\text{level}\_S(i,j)) > 0 ? 1 : 0\} \quad (20)$$

The non-zero coefficient number deciding portion 147 refers to the number numSigInSBK_P of non-zero coefficients of the quantization primary transformation coefficient, the number numSigInSBK S of non-zero coefficients of the quantization secondary transformation coefficient, and the predetermined threshold value TH to derive a secondary transformation skip flag StSkipFlag as information associated with the skip of the secondary transformation by using following Expression (21).

$$\text{StSkipFlag} = (\text{numSigInSBK}\_P <= \text{numSigInSBK}\_S \&\& \text{numSigInSBK}\_P <= TH) ? 1 : 0 \quad (21)$$

Although the threshold value TH, for example, is set to 2, it is by no means limited to 2 and the threshold value TH can be set to any value within the range of 0 to 16. In addition, the threshold value TH may be notified in the header information such as VPS/SPS/PPS/slice header SH. In addition, the threshold value TH may be previously negotiated between the coding side (for example, the image coding apparatus 100) and the decoding side (for example, an image decoding apparatus 200 which will be described later), and the notification from the coding side to the decoding side (the transmission of the threshold value TH from the coding side to the decoding side) may be omitted.

In the case where the number numSigInSBK_P of non-zero coefficients of the quantization primary transformation coefficient is equal to or smaller than the number numSigInSBK_S of non-zero coefficients of the quantization secondary transformation coefficient, and in the case where the number numSigInSBK_P of non-zero coefficients of the quantization primary transformation coefficient is equal to or smaller than the threshold value TH, in Expression (21), the value of the secondary transformation skip StSkipFlag is set to 1. That is, in the secondary transformation skip StSkipFlag, it is indicated to skip the secondary transformation. In any of the other cases (numSigInSBK_P>numSigInSBK_S||numSigInSBK_P>TH), the value of the secondary transformation skip StSkipFlag is set to zero. That is, in the secondary transformation skip StSkipFlag, it is indicated to carry out the secondary transformation.

It should be noted that instead of Expression (21) described above, following Expression (22) or Expression (23) may be used. In the case where Expression (23) is used, the quantization processing for the secondary transformation coefficient may be omitted.

$$\text{StSkipFlag} = (\text{numSigInSBK}\_P <= \text{numSigInSBK}\_S \&\& \text{numSigInSBK}\_S <= TH) ? 1 : 0 \quad (22)$$

$$\text{StSkipFlag} = (\text{numSigInSBK}\_P <= TH) ? 1 : 0 \quad (23)$$

The non-zero coefficient number deciding portion 147 supplies the secondary transformation skip flag StSkipFlag thus derived to the switch 148.

The switch 148 receives as inputs thereof the primary transformation coefficient Coeff_P of the sub-block unit, the secondary transformation coefficient Coeff, and the secondary transformation skip flag StSkipFlag. The switch 148 controls the skip of the secondary transformation in response to the secondary transformation skip flag StSkipFlag supplied thereto from the non-zero coefficient number deciding portion 147.

For example, in the case where the value of the secondary transformation skip flag StSkipFlag is 0, that is, in the case where in the secondary transformation skip flag StSkipFlag, it is indicated to carry out the secondary transformation, the switch 148 causes the secondary transformation to be carried out. That is, the switch 148 supplies the secondary transformation coefficient Coeff supplied thereto from the matrix transforming portion 144 to the quantization portion 113. In addition, for example, in the case where the value of the secondary transformation skip flag StSkipFlag is 1, that is, in the case where in the secondary transformation skip StSkipFlag, it is indicated to skip the secondary transformation, the switch 148 causes the secondary transformation to be skipped. That is, the switch 148 supplies the primary transformation coefficient Coeff_P, supplied thereto from the primary transformation portion 131, as the secondary transformation coefficient Coeff to the quantization portion 113.

It should be noted that the switch 148 can control the skip of the secondary transformation based on the secondary transformation identifier st_idx as well. For example, in the case where the secondary transformation identifier st_idx is 0 (indicating the skip of the secondary transformation), the switch 148 causes the secondary transformation to be skipped irrespective of the value of the secondary transformation skip flag StSkipFlag. That is, the switch 148 supplies the primary transformation coefficient Coeff_P, supplied thereto from the primary transformation portion 131, as the secondary transformation coefficient Coeff to the quantization portion 113. In addition, for example, in the case where the secondary transformation identifier st_idx is larger than 0 (indicating carrying-out of the secondary transformation), the switch 148 refers to the secondary transformation skip flag StSkipFlag, thereby controlling the secondary transformation in the manner as described above.

As described above, the non-zero coefficient number deciding portion 147 sets the secondary transformation skip flag StSkipFlag based on the number of non-zero coefficients for each sub-block. The switch 148 controls the skip of the secondary transformation based on the secondary transformation skip flag StSkipFlag. By adopting such a procedure, the secondary transformation for the sub-block having the sparse non-zero coefficients can be skipped. Therefore, the reduction of the energy compaction can be suppressed, and the reduction of the coding efficiency can be suppressed.

<Flow of Image Coding Processing>

Next, a description will be given with respect to an example of a flow of pieces of processing which are executed by the image coding apparatus 100. First, an example of a flow of the image coding processing will be described with reference to a flow chart of FIG. 11.

When the image coding processing is started, in Step S101, the control portion 101 executes coding control processing, and carries out the block partition, the setting of the coding parameters, and the like.

In Step S102, the prediction portion 119 executes predictive processing, thereby producing a predictive image of an optimal predictive mode, and the like. For example, in this predictive processing, the prediction portion 119 carries out the intra prediction to produce a predictive image of an optimal intra predictive mode, and the like, carries out the inter prediction to produce a predictive image of an optimal inter predictive mode, and the like, and of them, selects the optimal predictive mode based on a cost function value and the like.

In Step S103, the calculation portion 111 calculates a difference between an input image, and the predictive image of the optimal mode selected in the predictive processing of Step S102. In a word, the calculation portion 111 produces a predictive residue D between the input image and the predictive image. In the predictive residue D obtained in the manner as described above, an amount of data is reduced relative to the original image data. Therefore, the amount of data can be compressed as compared with the case where the image is coded as it is.

In Step S104, the transformation portion 112 executes the transformation processing for the predictive residue D produced by the processing of Step S103 to derive the transformation coefficient Coeff. Details of the processing in Step S104 will be described later.

In Step S105, the quantization portion 113 quantizes the transformation coefficient Coeff obtained in the processing of Step S104 by, for example, using the quantization parameters calculated by the control portion 101 to derive the quantization transformation coefficient level.

In Step S106, the inverse quantization portion 115 inverse-quantizes the quantization transformation coefficient level produced in the processing of Step S105 with the characteristics corresponding to the characteristics of the quantization in Step S105 to derive a transformation coefficient Coeff_IQ.

In Step S107, the inverse transformation portion 116 inverse-transforms the transformation coefficient Coeff_IQ obtained in the processing of Step S106 by using a method corresponding to the transformation processing of Step S104 to derive a predictive residue D'. It should be noted that the inverse transformation processing is inverse processing of the transformation processing of Step S104, and is executed similarly to the inverse transformation processing which is executed in image decoding processing which will be described later. For this reason, the description of the inverse transformation processing will be given in a description regarding a decoding side.

In Step S108, the calculation portion 117 adds the predictive image obtained in the predictive processing of Step S102 to the predictive residue D' derived in the processing of Step S107, thereby producing a decoded image which is locally decoded.

In Step S109, the frame memory 118 stores therein the decoded image, locally decoded, which is obtained from the processing of Step S108.

In Step S110, the coding portion 114 codes the quantization transformation coefficient level obtained in the processing of Step S105. For example, the coding portion 114 codes the quantization transformation coefficient level as the information associated with the image by the arithmetic coding or the like to produce the coded data. In addition, at this time, the coding portion 114 codes the various kinds of coding parameters (the header information Hinfo, the predictive mode information Pinfo, the transformation information Tinfo). Moreover, the coding portion 114 derives the residue information RInfo from the quantization transformation coefficient level, and codes the residue information RInfo. The coding portion 114 collects the coded data of the various kinds of information thus produced, and outputs the collected coded data in the form of a bit stream to the outside of the image coding apparatus 100. This bit stream, for example, is transmitted to the decoding side through a transmission path or a recording medium.

When processing in Step S110 is ended, the image coding processing is ended.

It should be noted that the processing units of these pieces of processing are arbitrary, and may not be identical to one another. Therefore, these pieces of processing in Steps can also be suitably executed in parallel to the pieces of processing in other Steps, or can also be executed with the processing order being replaced with one another.

<Flow of Transformation Processing>

Next, a description will be given with respect to an example of a flow of the transformation processing which is executed in Step S104 of FIG. 11 with reference to a flow chart of FIG. 12.

When transformation processing is started, in Step S121, the primary transformation portion 131 carries out the primary transformation for the predictive residue D based on the primary transformation identifier pt_idx to derive the primary transformation coefficient Coeff_P.

In Step S122, the secondary transformation portion 132 (switch 148) decides whether or not the secondary transformation identifier st_idx applies the secondary transformation (st_idx>0). In the case where it is decided that the secondary transformation identifier st_idx is 0 (indicating the skip of the secondary transformation), the secondary transformation (processing from Step S123 to Step S134) is skipped to end the transformation processing, and the processing is reduced back to FIG. 11. That is, the secondary transformation portion 132 (switch 148) supplies the primary transformation coefficient Coeff_P as the transformation coefficient Coeff to the quantization portion 113.

In addition, in the case where it is decided in Step S122 that the secondary transformation identifier st_idx is larger than 0 (indicating carrying-out of the secondary transformation), the processing proceeds to Step S123.

In Step S123, the secondary transformation selecting portion 145 selects the matrix R of the secondary transformation which is specified by the secondary transformation identifier st_idx.

In Step S124, the secondary transformation portion 132 partitions the transformation block of the processing target into the sub-blocks, and selects an unprocessed sub-block.

In Step S125, the rasterization portion 141 transforms the primary transformation coefficient Coeff_P into one-dimensional vector $X_{1d}$ based on the scanning method specified by the scanning identifier scanIdx.

In Step S126, the matrix calculating portion 142 calculates the matrix product between the one-dimensional vector $X_{1d}$ and the matrix R of the secondary transformation to obtain one-dimensional vector $Y_{1d}$.

In Step S127, the scaling portion 143 normalizes the norm of the one-dimensional vector $Y_{1d}$ to obtain one-dimensional vector $Z_{1d}$.

In Step S128, the matrix transforming portion 144 transforms the one-dimensional vector $Z_{1d}$ into a matrix of 4×4 based on the scanning method specified by the scanning identifier scanIdx to obtain the secondary transformation coefficient Coeff of the sub-block of the processing target.

In Step S129, the quantization portion 146 quantizes the primary transformation coefficient Coeff_P and the secondary transformation coefficient Coeff by referring to the quantization parameter qp and the quantization matrix scaling_matrix to derive the quantization primary transformation coefficient level_P and the quantization secondary transformation coefficient level_S, respectively.

In Step S130, the non-zero coefficient number deciding portion 147 derives the secondary transformation skip flag StSkipFlag for each sub-block based on the quantization primary transformation coefficient level_P, the quantization secondary transformation coefficient level_S, and the threshold value TH in the manner as described above.

In Step S131, the switch 148 decides whether or not the secondary transformation skip flag StSkipFlag derived in Step S130 indicates the skip of the secondary transformation. In the case where the secondary transformation skip flag StSkipFlag indicates carrying-out of the secondary transformation, that is, the value of the secondary transformation skip flag StSkipFlag is 0, the processing proceeds to Step S132.

In Step S132, the switch 148 outputs the secondary transformation coefficient Coeff obtained in the processing of Step S128 (supplies the secondary transformation coefficient Coeff to the quantization portion 113). When the processing of Step S132 is ended, the processing proceeds to Step 3134.

In addition, in the case where in Step S131, the secondary transformation skip flag StSkipFlag indicates the skip of the secondary transformation, that is, the value of the secondary transformation skip flag StSkipFlag is 1, the processing proceeds to Step S133.

In Step S133, the switch 148 outputs the primary transformation coefficient Coeff_P obtained in the processing of Step S121 as the secondary transformation coefficient Coeff (supplies the primary transformation coefficient Coeff_P to the quantization portion 113). When the processing of Step S133 is ended, the processing proceeds to Step S134.

In Step S134, the secondary transformation portion 132 decides whether or not all the sub-blocks of the transformation block of the processing target have been processed. In the case where it is decided that the unprocessed sub-block is still present, the processing is returned back to Step S124 and the processing in and after Step S124 is repetitively executed. In a word, the pieces of processing (secondary transformation) of Step S124 to Step S134 are executed for the sub-blocks of the transformation block of the processing target. In the case where it is decided in Step S134 that all the sub-blocks have been processed (the execution or the skip of the secondary transformation of all the sub-blocks has been carried out), the transformation processing is ended, and the processing is returned back to FIG. 11.

It should be noted that in the transformation processing, in the range of the feasibility, steps may be replaced with one another in processing order, or the content of the processing may be changed. For example, in the case where it is decided in Step S122 that the secondary transformation identifier st_idx is 0, a unit matrix of 16×16 may be selected as the matrix R for the secondary transformation and the pieces of processing of Step S124 to Step S134 may be executed.

By executing the pieces of processing in the manner as described above, the skip (execution) of the secondary transformation can be controlled in the sub-block unit. Therefore, for the residue signal having the sparse non-zero coefficients, the reduction of the energy compaction can be suppressed. That is, the reduction of the coding efficiency can be suppressed. In other words, the increase of the load of the encoding (secondary transformation/inverse secondary transformation) can be suppressed while the reduction of the coding efficiency is suppressed.

<Image Decoding Apparatus>

Figure 13:
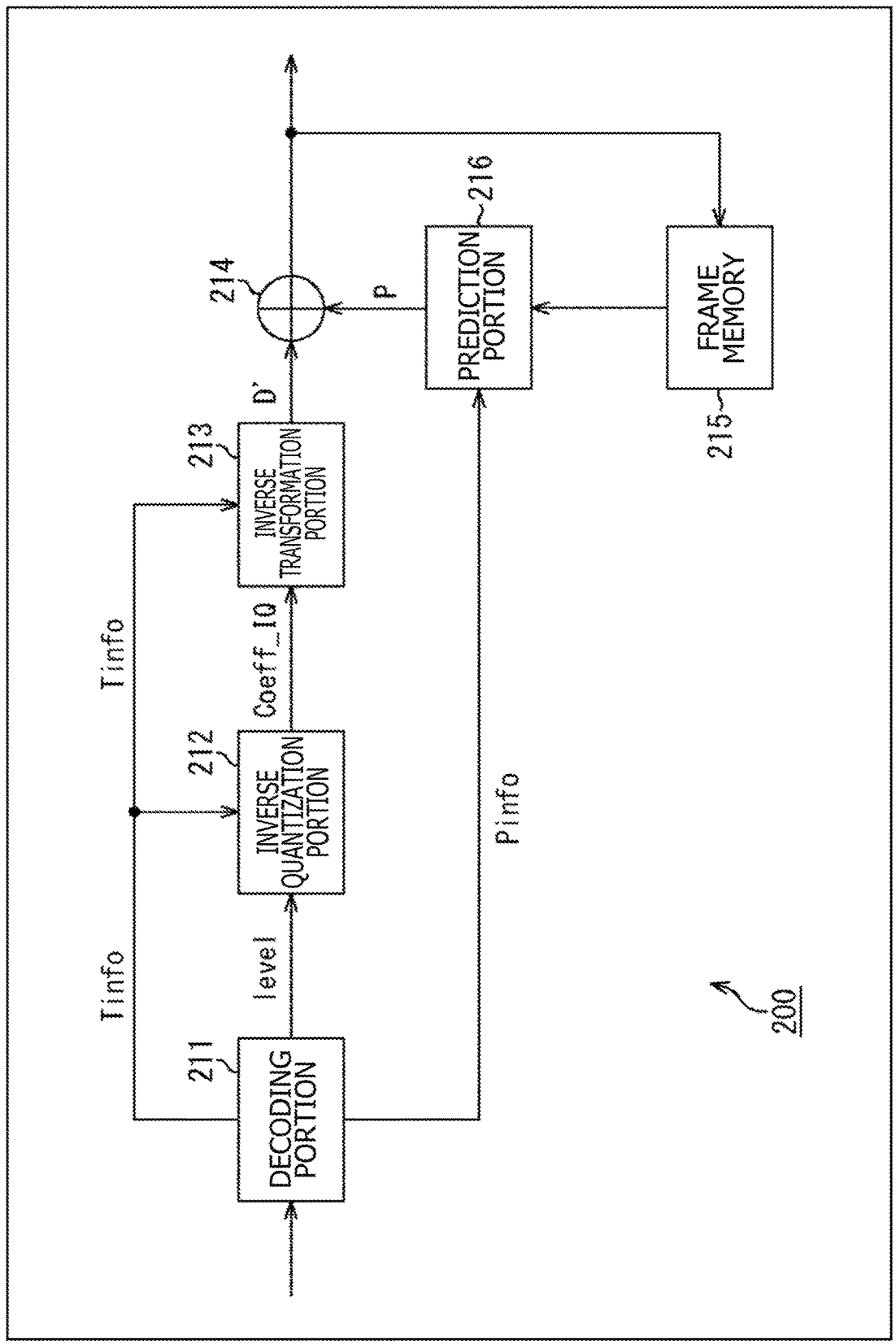
FIG. 13 is a block diagram depicting an example of a main configuration of an image decoding apparatus.

Next, a description will be given with respect to decoding of the coded data which is coded in the manner as described above. FIG. 13 is a block diagram depicting an example of a configuration of an image decoding apparatus as a mode of the image processing apparatus to which the present technique is applied. The image decoding apparatus 200 depicted in FIG. 13 is an image decoding apparatus corresponding to the image coding apparatus 100 of FIG. 7, and decodes the coded data (bit stream) produced by the image coding apparatus 100 by using a decoding method corresponding to the coding method by the image coding apparatus 100. For example, the technique proposed in the HEVC or the technique proposed in the JVET is mounted to the image decoding apparatus 200.

It should be noted that FIG. 13 depicts main constituent elements such as processing portions, and flows of the data, and the constituent elements depicted in FIG. 13 are not all the constituent elements. In a word, in the image decoding apparatus 200, the processing portion which is not depicted in the form of a block in FIG. 13 may be present, or the processing and the flow of the data which are not indicated by arrows or the like in FIG. 13 may be present.

As depicted in FIG. 13, the image decoding apparatus 200 has a decoding portion 211, an inverse quantization portion 212, an inverse transformation portion 213, a calculation portion 214, a frame memory 215, and a prediction portion 216. The coded data which is produced by the image coding apparatus 100 or the like, for example, is supplied as a bit stream or the like to the image decoding apparatus 200 through, for example, a transmission medium, a recording medium or the like.

The decoding portion 211 decodes the coded data supplied thereto by using a predetermined decoding method corresponding to the coding method. For example, the decoding portion 211 decodes a syntax value of each of the syntax elements from the bit string of the coded data (bit stream) supplied thereto in accordance with the definition of the syntax table. The syntax element, for example, includes the header information Hinfo, the predictive mode information Pinfo, the transformation information Tinfo, the residue information Rinfo, and the like.

The decoding portion 211 derives the quantization transformation coefficient levels level of the coefficient positions within the transformation blocks by referring to the residue information Rinfo. The decoding portion 211 supplies predictive mode information Pinfo, a quantization transformation coefficient level, transformation information Tinfo which have been obtained through the decoding processing to the blocks. For example, the decoding portion 211 supplies the predictive mode information Pinfo to the prediction portion 216, supplies the quantization transformation coefficient level to the inverse quantization portion 212, and supplies the transformation information Tinfo to the inverse quantization portion 212 and the inverse transformation portion 213.

The inverse quantization portion 212 scales (inverse-quantizes) the value of the quantization transformation coefficient level supplied thereto from the decoding portion 211 based on the transformation information Tinfo supplied thereto from the decoding portion 211, and derives the transformation coefficient Coeff_IQ after the inverse quantization. The inverse quantization is inverse processing of the quantization which is carried out by the quantization portion 113 (FIG. 7) of the image coding apparatus 100. It should be noted that the inverse quantization portion 115 (FIG. 7) carries out the inverse quantization similar to that of the inverse quantization portion 212. The inverse quantization portion 212 supplies the resulting transformation coefficient Coeff_IQ to the inverse transformation portion 213.

The inverse transformation portion 213 inverse-transforms the transformation coefficient Coeff_IQ supplied thereto from the inverse quantization portion 212 based on the transformation information Tinfo supplied thereto from the decoding portion 211, and derives the predictive residue D'. The inverse transformation is inverse processing of the transformation processing which is executed by the transformation portion 112 (FIG. 7) of the image coding apparatus 100. It should be noted that the inverse transformation portion 116 carries out the inverse transformation similar to that of the inverse transformation portion 213. Details of the inverse transformation will be described later. The inverse transformation portion 213 supplies the resulting predictive residue D' to the calculation portion 214.

The calculation portion 214, as depicted in following Expression (24), adds the predictive residue D' supplied thereto from the inverse transformation portion 213, and the predictive image P (predictive signal) corresponding to the predictive residue D' to each other, and derives the local decoded image Rec. The calculation portion 214 rebuilds the decoded image for each picture unit by using the resulting local decoded image Rec, and outputs the resulting decoded image to the outside of the image decoding apparatus 200. In addition, the calculation portion 214 supplies the local decoded image Rec to the frame memory 215 as well.

$$Rec = D' + P \qquad (24)$$

The frame memory 215 rebuilds the decoded image for each picture unit by using the local decoded image Rec supplied thereto from the calculation portion 214, and stores the decoded image thus rebuilt in the buffer within the frame memory 215. The frame memory 215 reads out the decoded image specified by the predictive mode information Pinfo of the prediction portion 216 as the reference image from the buffer, and supplies the decoded image thus read out to the prediction portion 216. In addition, the frame memory 215 may store the header information Hinfo, the predictive mode information Pinfo, the transformation information Tinfo, and the like pertaining to the production of the decoded image in the buffer within the frame memory 215.

The prediction portion 216 acquires the decoded image stored in the frame memory 215, specified by the predictive mode information PInfo supplied thereto from the decoding portion 211, as the reference image, and produces the predictive image P by the predicting method specified by the predictive mode information Pinfo by using the reference image. The prediction portion 216 supplies the predictive image P thus produced to the calculation portion 214.

Such an image decoding apparatus 200 is provided with a control portion. In the control portion, skip of the inverse transformation processing for the transformation coefficient with which the predictive residue as the difference between the image and the predictive image of that image is obtained by executing the inverse transformation processing is controlled for each sub-block based on the number of non-zero coefficients of the transformation coefficient for each sub-block. In a word, the inverse transformation portion 213 controls for each sub-block the skip of the inverse transformation processing for the transformation coefficient with which the predictive residue as the difference between the image and the predictive image of that image is obtained by executing the inverse transformation processing based on the number of non-zero coefficients of the transformation coefficient for each sub-block.

<Inverse Transformation Portion>

Figure 14:
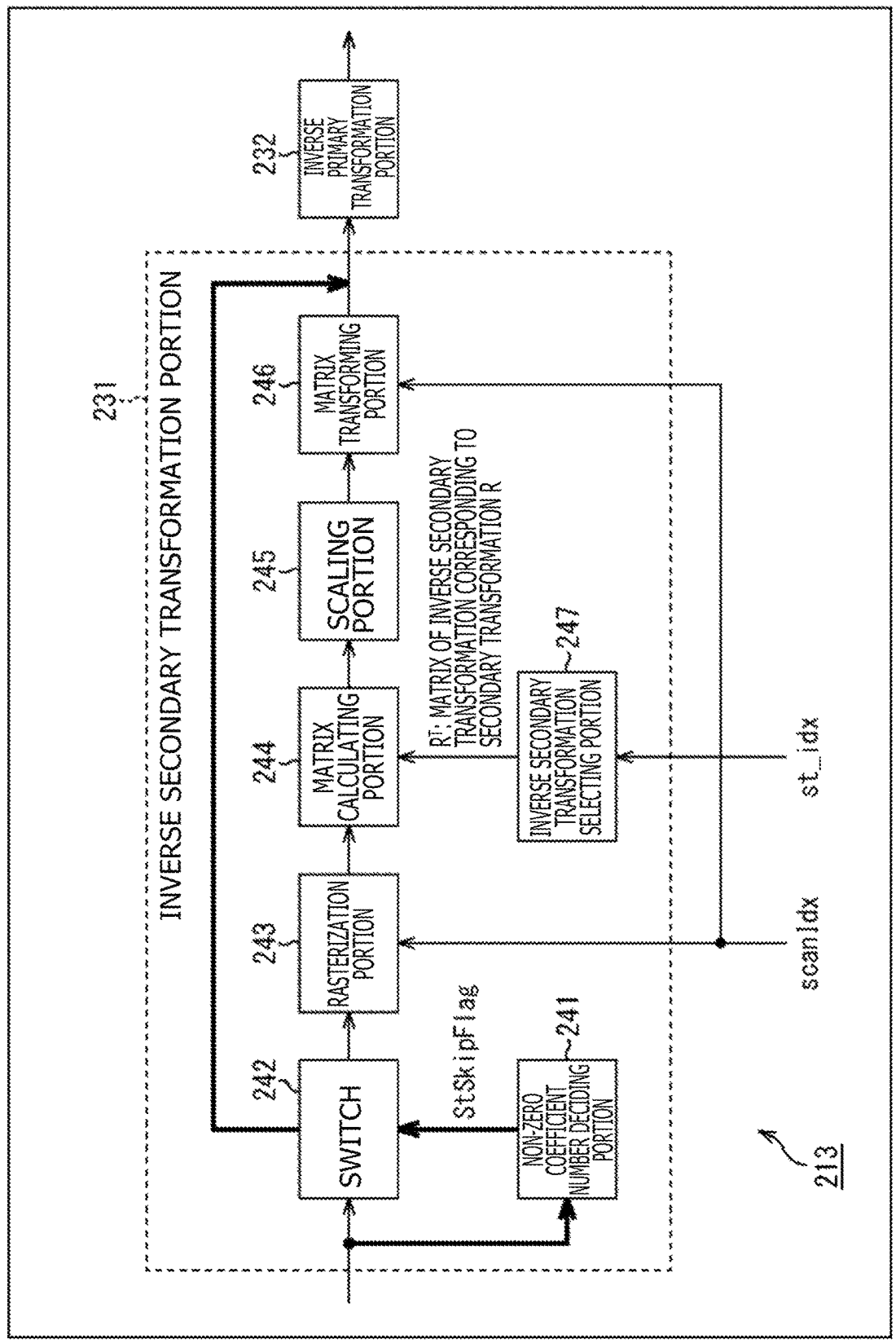
FIG. 14 is a block diagram depicting an example of a main configuration of an inverse transformation portion.

FIG. 14 is a block diagram depicting an example of a main configuration of the inverse transformation portion 213 of FIG. 13. As depicted in FIG. 14, the inverse transformation portion 213 has an inverse secondary transformation portion 231 and an inverse primary transformation portion 232.

The inverse secondary transformation portion 231 transforms the transformation coefficient Coeff_IQ supplied from the inverse quantization portion 212, that is, the transformation coefficient Coeff_IQ (referred to as the secondary transformation coefficient as well) which is obtained by decoding the coded data and inverse-quantizing the coded data thus decoded into one-dimensional vector. In addition, the inverse secondary transformation portion 231 carries out the matrix calculation for the resulting one-dimensional vector, carries out the scaling of the one-dimensional vector for which the matrix calculation is carried out, and carries out the inverse secondary transformation as the transformation processing for matrix-transforming the one-dimensional vector thus scaled.

The inverse secondary transformation portion 231 carries out the inverse secondary transformation for the secondary transformation coefficient Coeff_IQ based on the secondary transformation identifier st_idx as the information associated with the content of the secondary transformation, and the scanning identifier scanIdx as the information associated with the scanning method for the transformation coefficient. In addition, the inverse secondary transformation portion 231 derives the transformation coefficient Coeff_IS after the inverse secondary transformation (referred to as the primary transformation coefficient as well). In a word, the inverse secondary transformation portion 231 transforms the secondary transformation coefficient Coeff_IQ into the primary transformation coefficient Coeff_IS. The inverse secondary transformation portion 231 supplies the resulting primary transformation coefficient Coeff_IS to the inverse primary transformation portion 232.

It should be noted that the inverse secondary transformation portion 231 can also skip (omit) the inverse secondary transformation to supply the secondary transformation coefficient Coeff_IQ as the primary transformation coefficient Coeff_IS to the inverse primary transformation portion 232. Details of the inverse secondary transformation portion 231 will be described later.

The inverse primary transformation portion 232 carries out the inverse primary transformation such as inverse orthogonal transformation for the primary transformation coefficient Coeff_IS supplied thereto from the inverse secondary transformation portion 231 to derive the predictive residue D'. That is, the inverse primary transformation portion 232 transforms the primary transformation coefficient Coeff_IS into the predictive residue D'. The inverse primary transformation portion 232 supplies the predictive residue D' thus derived to the calculation portion 214.

Next, the inverse secondary transformation portion 231 will now be described. As depicted in FIG. 14, the inverse secondary transformation portion 231 has a non-zero coefficient number deciding portion 241, a switch 242, a rasterization portion 243, a matrix calculating portion 244, a scaling portion 245, a matrix transforming portion 246, and an inverse secondary transformation selecting portion 247.

The non-zero coefficient number deciding portion 241 receives as input thereof the secondary transformation coefficient Coeff_IQ of the sub-block unit. The non-zero coefficient number deciding portion 241 derives the number numSigInSBK of non-zero coefficients (referred to as the number of non-zero coefficients of the transformation coefficient) within the sub-block, for example, so as to follow following Expression (25) by referring to the secondary transformation coefficient Coeff_IQ supplied thereto from the inverse quantization portion 212. It should be noted that in Expression (25), (i, j) of the secondary transformation coefficient Coeff_IQ(i, j) represents the coordinates within the sub-block, and i=0, . . . , 3, and j=0, . . . , 3. In addition, an operator abs(X) is an operator for returning an absolute value of an input value X.

$$\text{numSigInSBK} = \Sigma\{\text{abs}(Coeff\_IQ(i,j)) > 0 ? 1 : 0\} \quad (25)$$

It should be noted that the number numSigInSBK of non-zero coefficients of the transformation coefficient may be derived based on the non-zero coefficient presence/absence flag sig_coeff_flag without referring to the secondary transformation coefficient Coeff_IQ.

Then, the non-zero coefficient number deciding portion 241 decides whether or not the number numSigInSBK of non-zero coefficients of the transformation coefficient is equal to or smaller than the predetermined threshold value TH. In addition, the non-zero coefficient number deciding portion 241 derives the secondary transformation skip flag StSkipFlag based on the decision result as expressed by following Expression (26).

$$\text{StSkipFlag} = \text{numSigInSBK} <= TH ? 1 : 0 \quad (26)$$

The threshold value TH, for example, may be 2, or may be any of the values of 0 to 16. In addition, the threshold value TH may be notified from the outside (for example, from on the coding side, the control side or the like) in the header information such as the VPS/SPS/PPS/slice header SH. In addition, the threshold value TH may be previously negotiated between the coding side (for example, the image coding apparatus 100) and the decoding side (for example, the image decoding apparatus 200 which will be described later), and the notification from the coding side to the decoding side (the transmission of the threshold value TH from the coding side to the decoding side) may be omitted.

In Expression (26), for example, in the case where the value of the number numSigInSBK of non-zero coefficients of the transformation coefficient is equal to or smaller than the threshold value TH, the value of the secondary transformation skip flag StSkipFlag is set to 1. In addition, for example, in the case where the value of the number numSigInSBK of non-zero coefficients of the transformation coefficient is larger than the threshold value TH, the value of the secondary transformation skip flag StSkipFlag is set to 0.

The non-zero coefficient number deciding portion 241 supplies the StSkipFlag thus derived to the switch 242.

The switch 242 receives as inputs thereof the secondary transformation coefficient Coeff_IQ of the sub-block unit, and the secondary transformation skip flag StSkipFlag. The switch 242 controls the skip of the inverse secondary transformation in response to the secondary transformation skip flag StSkipFlag supplied thereto from the non-zero coefficient number deciding portion 241.

For example, in the case where the value of the secondary transformation skip flag StSkipFlag is 0, that is, in the case where in the secondary transformation skip flag StSkipFlag, carrying-out of the secondary transformation is indicated, the switch 242 causes the secondary transformation to be carried out. That is, the switch 242 supplies the secondary transformation coefficient Coeff_IQ supplied thereto from the inverse quantization portion 212 to the rasterization portion 243. In addition, for example, in the case where the value of the secondary transformation skip flag StSkipFlag is 1, that is, in the case where in the secondary transformation skip StSkipFlag, the skip of the inverse secondary transformation is indicated, the switch 242 causes the inverse secondary transformation to be skipped. That is, the switch 242 supplies the secondary transformation coefficient Coeff_IQ, supplied thereto from the inverse quantization portion 212, as the primary transformation coefficient Coeff_IS to the inverse primary transformation portion 232.

The rasterization portion 243 transforms the transformation coefficient Coeff_IQ supplied thereto from the switch 242 into the one-dimensional vector $X_{1d}$ for each sub-block (4×4 sub-block) based on the scanning method for the transformation coefficient specified by the scanning identifier scanIdx supplied thereto from the decoding portion 211. The rasterization portion 243 supplies the resulting one-dimensional vector $X_{1d}$ to the matrix calculating portion 244.

The inverse secondary transformation selecting portion 247 reads out the matrix IR ($=R^T$) of the inverse secondary transformation specified by the secondary transformation identifier st_idx, as the information associated with the content of the inverse secondary transformation, supplied thereto from the decoding portion 211 from an internal memory (not depicted) of the inverse secondary transformation selecting portion 247. Then, the inverse secondary transformation selecting portion 247 supplies the matrix IR ($=R^T$) of the inverse secondary transformation to the matrix calculating portion 244. For example, when the secondary transformation identifier st_idx is set to a certain value, the inverse secondary transformation selecting portion 247 reads out the transpose $R^T$ of the matrix R of 16×16 depicted in FIG. 10 as the matrix IR of the inverse secondary transformation, and supplies the transpose $R^T$ thus read out to the matrix calculating portion 244.

Incidentally, the inverse secondary transformation selecting portion 247, for example, may select the matrix IR ($=R^T$) of the inverse secondary transformation in response to the secondary transformation identifier st_idx supplied thereto from the decoding portion 211 or the intra predictive mode information IPinfo (for example, an intra predictive mode number). In addition, the inverse transformation IR may be selected in response to the movement predictive information MVinfo and the secondary transformation identifier st_idx instead of the intra predictive mode information IPinfo.

The matrix calculating portion 244 carries out the matrix calculation as indicated in following Expression (27) by using one-dimensional vector $X_{1d}$ and the matrix IR ($=R^T$) of the inverse secondary transformation for each sub-block (4×4 sub-block) to derive the resulting one-dimensional vector $Y_{1d}$. Here, the operator "·" represents an operation for carrying out the inner product (matrix product) between the matrices, and the operator "T" represents the operation of the transpose. The matrix calculating portion 244 supplies the derived one-dimensional vector $Y_{1d}$ to the scaling portion 245.

$$Y_{1d}^T = IR \cdot X_{1d}^T = R^T \cdot X_{1d}^T \quad (27)$$

For the purpose of normalizing the norm of the one-dimensional vector $Y_{1d}$ supplied from the matrix calculating portion 244 for each sub-block (4×4 sub-block), the scaling portion 245 carries out the bit shift calculation of N (N is a natural number) bits as represented in following Expression (28) for all the elements of the one-dimensional vector $Y_{1d}$ to obtain one-dimensional vector $Z_{1d}$ after the bit shift.

$$Z_{1d} = (Y_{1d}) >> N \quad (28)$$

It should be noted that as represented in following Expression (29), before the N-bit shift calculation, the value of 1<<(N−1) may be added as the offset to each of the elements of the one-dimensional vector $Z_{1d}$. It should be noted that in Expression (29), the vector E is one-dimensional vector in which the values of all the elements are 1.

$$Z_{1d} = (Y_{1d} + ((N-1)<<1) \cdot E) >> N \quad (29)$$

For example, the matrix IR (=$R^T$) of the inverse secondary transformation is the transpose of the matrix R of the secondary transformation depicted in FIG. 10, and also is 8-bit scaled matrix. Therefore, in the scaling portion 245, the value of N used in the normalization of the norm is 8. In general, in the case where the matrix IR (=$R^T$) of the inverse secondary transformation is N-bit scaled, an amount of bit shift of the normalization of the norm is N bits. The scaling portion 245 supplies the one-dimensional vector $Z_{1d}$ after the norm normalization obtained in the manner as described above to the matrix transforming portion 246.

The matrix transforming portion 246 receives as inputs thereof the one-dimensional vector $Z_{1d}$ after the norm normalization and the scanning identifier scanIdx for each sub-block (4×4 sub-block). Then, the matrix transforming portion 246 transforms one-dimensional vector $Z_{1d}$ supplied from the scaling portion 245 into the primary transformation coefficient Coeff_IS of the 4×4 matrix based on the scanning method specified by the scanning identifier scanIdx supplied thereto from the decoding portion 211. The matrix transforming portion 246 supplies the resulting primary transformation coefficient Coeff_IS to the inverse primary transformation portion 232.

As described above, the non-zero coefficient number deciding portion 241 sets the secondary transformation skip flag StSkipFlag based on the number of non-zero coefficients for each sub-block. In addition, the switch 242 controls the skip of the secondary transformation based on the secondary transformation skip flag StSkipFlag. By adopting such a procedure, since the secondary transformation for the sub-block having the sparse non-zero coefficients can be skipped, the reduction of the energy compaction can be suppressed, and the reduction of the coding efficiency can be suppressed.

<Flow of Image Decoding Processing>

Next, a description will be given with respect to pieces of processing which are executed by the image decoding apparatus 200 as described above. First, a description will be given with respect to an example of a flow of the image decoding processing with reference to a flow chart of FIG. 15.

When the image decoding processing is started, in Step S201, the decoding portion 211 decodes the bit stream (coded data) supplied to the image decoding apparatus 200 to obtain the header information Hinfo, the predictive mode information Pinfo, the transformation information Tinfo, the residue information Rinfo, the quantization transformation coefficient level, and the like.

In Step S202, the inverse quantization portion 212 inverse-quantizes the quantization transformation coefficient level obtained in the processing of Step 3201 to derive the transformation coefficient Coeff_IQ. The inverse quantization is inverse processing of the quantization which is executed in Step S105 (FIG. 11) of the image coding processing, and is the processing similar to the inverse quantization which is executed in Step S106 (FIG. 11) of the image coding processing.

In Step S203, the inverse transformation portion 213 inverse-transforms the transformation coefficient Coeff_IQ which is obtained in the processing of Step S202 to derive the predictive residue D'. The inverse transformation is the inverse processing of the transformation processing which is executed in Step S104 (FIG. 11) of the image coding processing, and is the processing similar to the inverse transformation which is executed in Step 3107 (FIG. 11) of the image coding processing.

In Step S204, the prediction portion 216 carries out the prediction with the same predictive mode as that in the prediction during the coding based on the predictive mode information Pinfo to produce the predictive image.

In Step S205, the calculation portion 214 adds the predictive image obtained in the processing of Step S204 to the predictive residue D' obtained from the processing of Step S203 to obtain the decoded image.

When the processing in Step S205 is ended, the image decoding processing is ended.

<Flow of Inverse Transformation Processing>

Next, a description will be given with respect to an example of the flow of the inverse transformation processing which is executed in Step S203 of FIG. 15 with reference to a flow chart of FIG. 16.

When the inverse transformation processing is started, in Step S221, the inverse secondary transformation portion 231 (switch 242) decides whether or not the secondary transformation identifier st_idx applies the inverse secondary transformation (st_idx>0). In the case where it is decided that the secondary transformation identifier st_idx is 0 (the secondary transformation identifier st_idx indicates the skip of the inverse secondary transformation), the inverse secondary transformation (pieces of processing from Step S222 to Step S230) is skipped, and the processing proceeds to Step S231. In a word, the inverse secondary transformation portion 231 (switch 242) supplies the secondary transformation coefficient Coeff_IQ obtained from the processing of Step S202 of FIG. 15 as the primary transformation coefficient Coeff_IS to the inverse primary transformation portion 232.

In addition, in the case where it is decided in Step 3221 that the secondary transformation identifier st_idx is larger than 0 (the secondary transformation identifier st_idx indicates carrying-out of the inverse secondary transformation), the processing proceeds to Step S222.

In Step S222, the inverse secondary transformation selecting portion 247 selects the matrix IR of the inverse secondary transformation specified by the secondary transformation identifier st_idx.

In Step S223, the inverse secondary transformation portion 231 selects unprocessed sub-block included in the transformation block of the processing target.

Figure 15:
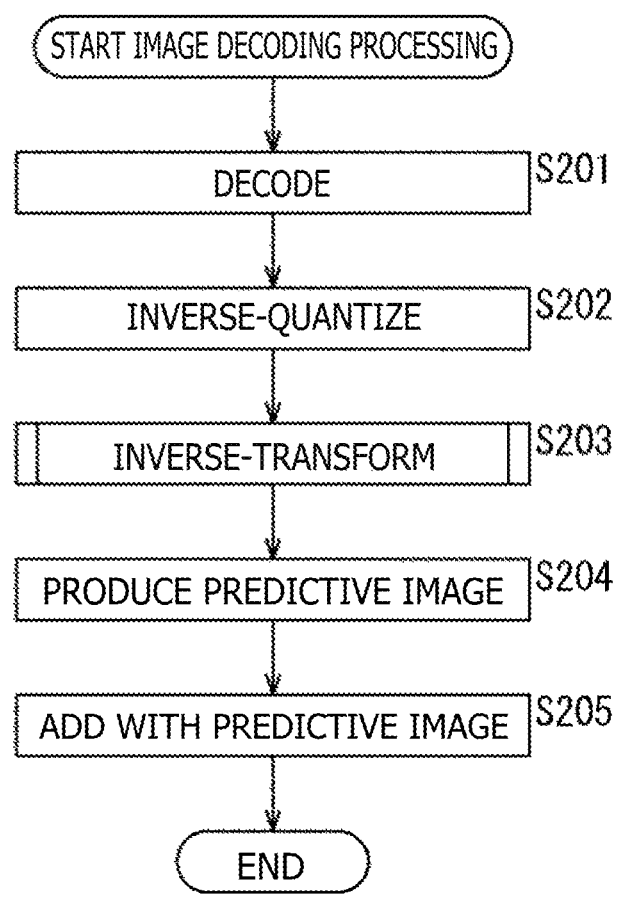
FIG. 15 is a flow chart explaining an example of a flow of image decoding processing.

In Step S224, the non-zero coefficient number deciding portion 241, as described above, derives the number numSigInSBK of non-zero coefficients of the transformation coefficient based on the secondary transformation coefficient Coeff_IQ of the sub-block unit which is obtained by the processing of Step S202 of FIG. 15. Then, the non-zero coefficient number deciding portion 241 derives the secondary transformation skip flag StSkipFlag by using the number numSigInSBK of non-zero coefficients of the transformation coefficient, and the threshold value TH.

In Step S225, the switch 242 decides whether or not the secondary transformation skip flag StSkipFlag obtained in the processing of Step S224 indicates the skip of the inverse secondary transformation. In the case where it is decided that the secondary transformation skip flag StSkipFlag indicates carrying-out of the secondary transformation, that is, the value of the secondary transformation skip flag StSkipFlag is 0, the processing proceeds to Step S226.

In Step S226, the rasterization portion 243 transforms the secondary transformation coefficient Coeff_IQ obtained by the processing of Step S202 of FIG. 15 into the one-dimensional vector $X_{1d}$ based on the scanning method specified with the scanning identifier scanIdx.

In Step S227, the matrix calculating portion 244 calculates the matrix product between the one-dimensional vector $X_{1d}$, and the matrix IR of the inverse secondary transformation obtained by the processing of Step S222 to obtain the one-dimensional vector $Y_{1d}$.

In Step S228, the scaling portion 245 normalizes the norm of the one-dimensional vector $Y_{1d}$ to obtain the one-dimensional vector $Z_{1d}$.

In Step S229, the matrix transforming portion 246 transforms the one-dimensional vector $Z_{1d}$ into the matrix of 4×4 based on the scanning method specified by the scanning identifier scanIdx to obtain the primary transformation coefficient Coeff_IS of the sub-block of the processing target. When the processing in Step S229 is ended, the processing proceeds to Step S230. In addition, in Step S225, in the case where the secondary transformation skip flag StSkipFlag indicates the skip of the inverse secondary transformation, that is, the value of the secondary transformation skip flag StSkipFlag is 1, the processing proceeds to Step S230.

In Step S230, the inverse secondary transformation portion 231 decides whether or not all the sub-blocks of the transformation block of the processing target have been processed. In the case where it is decided that the unprocessed sub-block is present, the processing is returned back to Step 3223, and the pieces of processing in and after the processing of Step S223 are repetitively executed. In a word, with respect to each of the sub-blocks of the transformation block of the processing target, the pieces of processing from Step S223 to Step S230 (inverse secondary transformation) are executed. In the case where it is decided in Step S230 that all the sub-blocks have been processed (the inverse secondary transformation of all the sub-blocks has been carried out or skipped), the processing proceeds to Step S231.

In Step S231, the inverse primary transformation portion 232 carries out the inverse primary transformation for the primary transformation coefficient Coeff_IS based on the primary transformation identifier pt_idx to derive the predictive residue D'. The predictive residue D' is then supplied to the calculation portion 214.

When the processing of Step S231 is ended, the inverse transformation processing is ended, and the processing is returned back to FIG. 15.

It should be noted that for the inverse transformation processing described above, in the feasible range, the pieces of processing of steps may be replaced with one another in order thereof, or the content of the pieces of processing may be changed. For example, in the case where it is decided in Step S221 that the secondary transformation identifier st_idx is 0, the unit matrix of 16×16 may be selected as the matrix IR of the inverse secondary transformation, and the pieces of processing from Step S222 to Step S230 may be executed.

By executing the pieces of processing in the manner as described above, the skip (execution) of the inverse secondary transformation can be controlled in the sub-block unit. Therefore, for the residue signal having the sparse non-zero coefficients, the reduction of the energy compaction can be suppressed. That is, the reduction of the coding efficiency can be suppressed. In other words, an increase of a load of the decoding (inverse secondary transformation) can be suppressed while the reduction of the coding efficiency is suppressed.

It should be noted that although in the above description, the description is given in such a way that the skip of the (inverse) secondary transformation is controlled for each sub-block, the control of the skip carried out for each sub-block can be applied not only to the (inverse) secondary transformation, but also to arbitrary transformation processing.

2. Second Embodiment

<Selection of Secondary Transformation Using Scanning Method>

Now, in the method described in any of NPL 1 and NPL 2, the secondary transformation has the matrices of the secondary transformations by the number of classes of the intra predictive mode and the number of secondary transformations corresponding to the classes. For this reason, for the purpose of holding the matrices of the secondary transformations, a giant memory size is required. For example, in the case of the method described in NPL 1, since the number of classes of the intra predictive mode is 12, and the number of secondary transformations for the classes is 3, 12*3=36 matrices are present. In addition, in the case of the method described in NPL 2, since the number of classes of the intra predictive mode is 35, and the number of secondary transformations for the classes is 5, 35*5=175 matrices are present.

Therefore, for example, in the case where the elements of the matrices are held with 9-bit accuracy, and in the case of the method described in NPL 1, a memory size as expressed in following Expression (30) is required. In addition, in the case of the method described in NPL 2, a memory size as expressed in following Expression (31) is required.

$$\text{Memory size}=9 \text{ bit}*16*16*36=829944 \text{ (bits)}=10368 \text{ (bytes)}=10.125 \text{ (KB)} \quad (30)$$

$$\text{Memory size}=9 \text{ bit}*16*16*175=403200 \text{ (bits)}=50400 \text{ (bytes)}=49.21875 \text{ (KB)} \quad (31)$$

When the amount of held data of the matrices of the (inverse) secondary transformation is increased in such a way, there is the possibility that the load of the coding/decoding is increased. In addition, since the required memory size is also increased, there is the possibility that the cost is increased.

Figure 17:
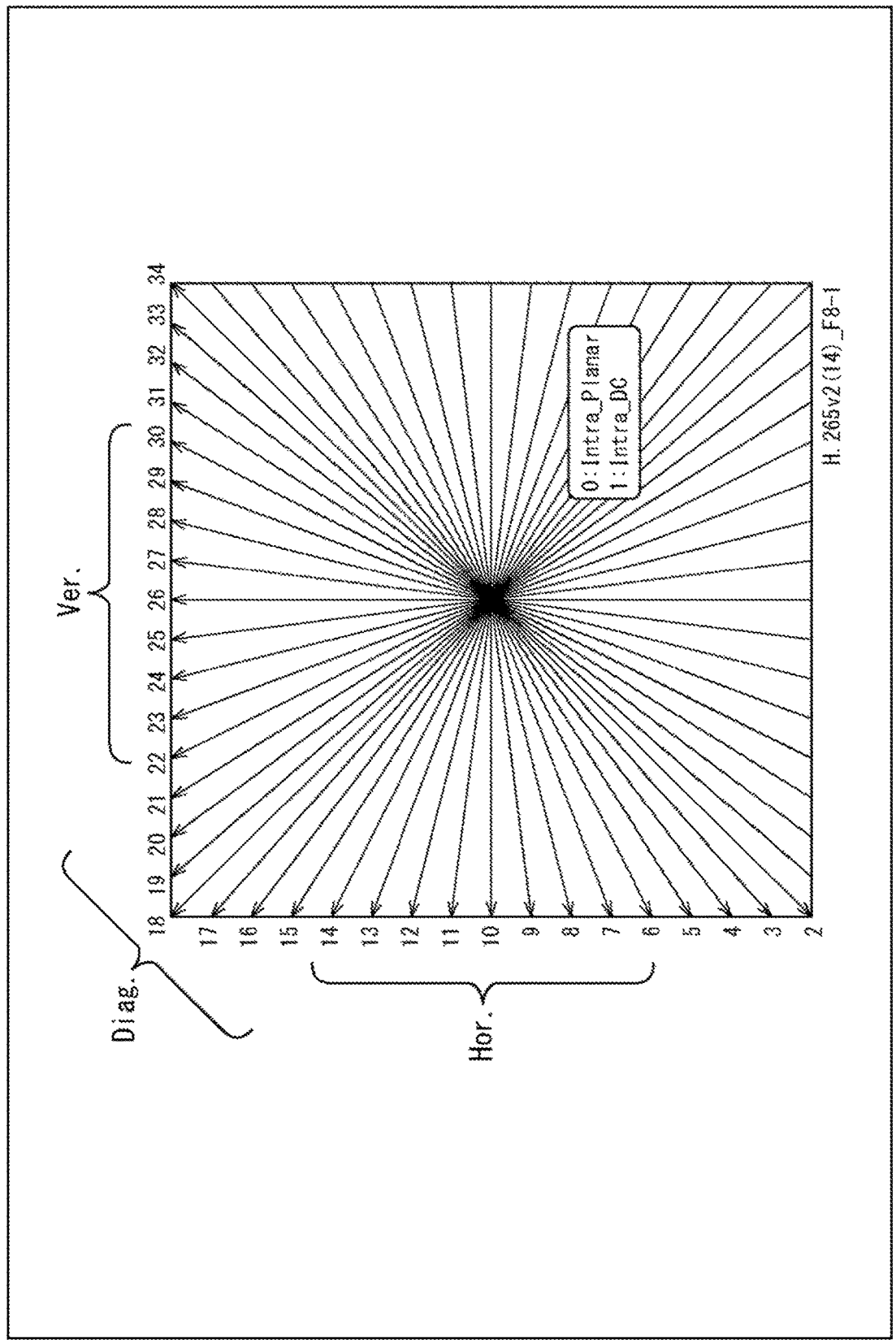
FIG. 17 is a diagram explaining an example of a relation between an intra predictive mode and a scanning method.

Then, the matrix R of the secondary transformation, or the matrix IR of the inverse secondary transformation is set based on the secondary transformation identifier and the scanning identifier. That is, by paying attention to that a direction of the intra predictive mode and the scanning direction correspond to each other, the class sorting of the intra predictive modes is replaced with the scanning identifier (scanIdx) as the information associated with the scanning method. FIG. 17 depicts an example of a correspondence relation between the intra predictive mode and the scanning identifier (scanIdx).

Five kinds of secondary transformations correspond to the values of the scanning identifier (scanIdx). The reason for this is because the secondary transformations are allocated for each secondary transformation identifier (st_idx). Therefore, in this case, the total number of secondary transformations becomes 3×5=15. In a word, the number of secondary transformations can be reduced as compared with the case of the method described in NPL 1 or NPL 2 described above. Then, in the case of the 9-bit accuracy, the memory size required for holding all the secondary transformations is expressed by following Expression (32).

$$\text{Memory size}=9 \text{ bit}*16*16=15=34560 \text{ (bits)}=4320 \text{ (bytes)}=4.21875 \text{ (KB)} \quad (32)$$

Therefore, an amount of data of the matrices of the secondary transformations can be largely reduced as compared with the case of Expression (30) or (31) described above (the case of the method described in NPL 1 or NPL 2). As a result, the increase in load of the coding/decoding can be suppressed, and the increase in memory size required for holding the matrix of the (inverse) secondary transformation can be suppressed.

<Transformation Portion>

In this case as well, the image coding apparatus 100 has the configuration basically similar to that in the case of the first embodiment. However, the image coding apparatus 100 in this case is provided with a setting portion, a rasterization portion, a matrix calculating portion, a scaling portion, and a matrix transforming portion. In this case, the setting portion sets the matrix of the transformation processing for the transformation coefficients based on the content of the transformation processing and the scanning method. The rasterization portion transforms the transformation coefficients obtained by transformation-processing the predictive residue as the difference between the image and the predictive image of that image into the one-dimensional vector. The matrix calculating portion carries out the matrix calculation for that one-dimensional vector by using the matrix set by the setting portion. The scaling portion carries out the scaling for the one-dimensional vector for which that matrix calculation is carried out. The matrix transforming portion matrix-transforms the scaled one-dimensional vector. In a word, in this case, the transformation portion 112 sets the matrix of the transformation processing for the transformation coefficients based on the content of the transformation processing and the scanning method, and transforms the transformation coefficients obtained by transformation-processing the predictive residue as the difference between the image and the predictive image of that image into the one-dimensional vector. The transformation portion 112 carries out the matrix calculation for that one-dimensional vector by using that set matrix, carries out the scaling for that one-dimensional vector for which that matrix calculation is carried out, and matrix-transforms the scaled one-dimensional vector.

Figure 18:
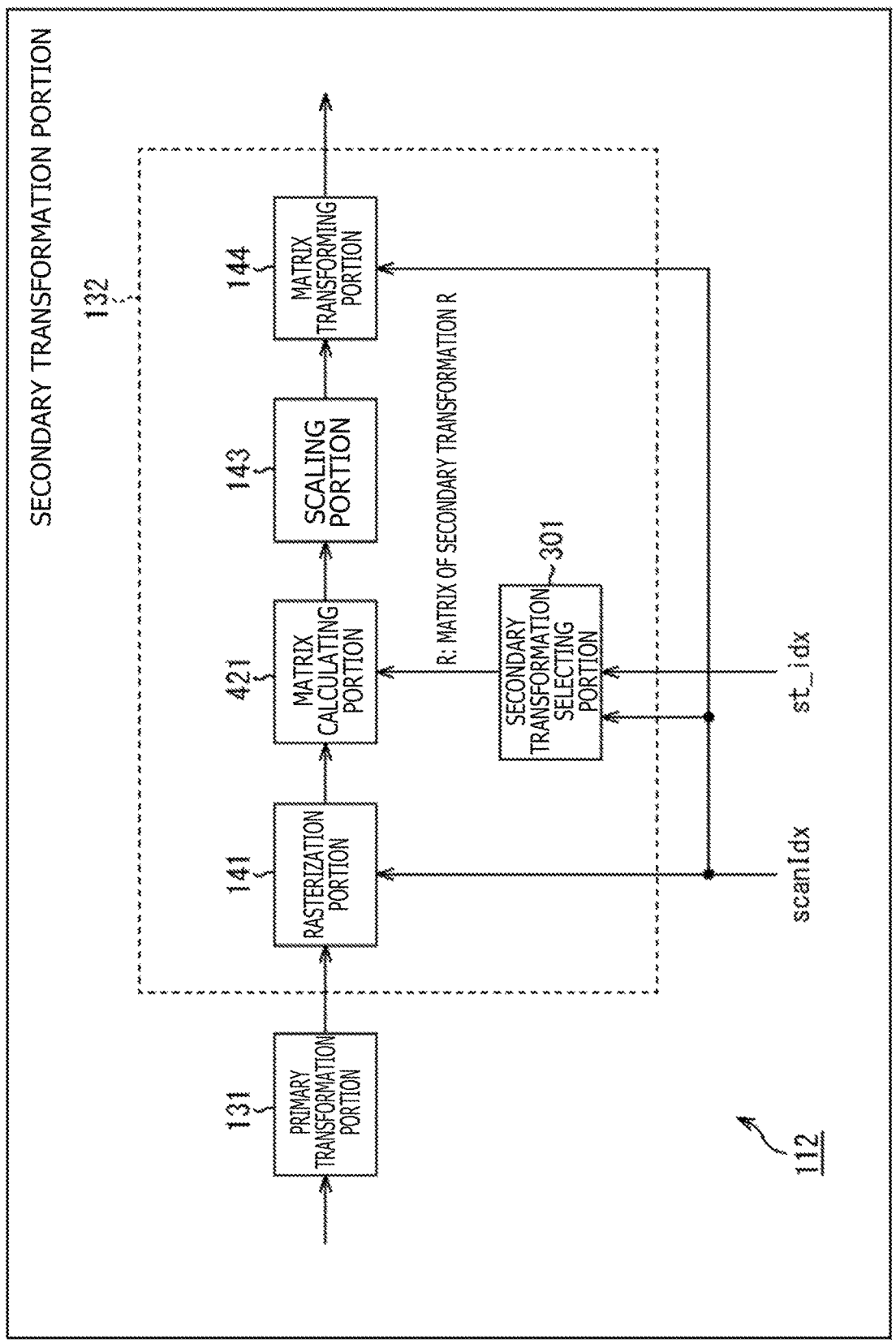
FIG. 18 is a block diagram depicting an example of a main configuration of a transformation portion.

FIG. 18 is a block diagram depicting an example of a main configuration of the transformation portion 112 in this case. As depicted in FIG. 18, the transformation portion 112 in this case as well has the configuration basically similar to that in the case (FIG. 8) of the first embodiment. However, a secondary transformation portion 132 in this case can omit the quantization portion 146 to the switch 148, and has a secondary transformation selecting portion 301 instead of the secondary transformation selecting portion 145.

The secondary transformation selecting portion 301 receives as inputs thereof the secondary transformation identifier st_idx and the scanning identifier scanIdx. The secondary transformation selecting portion 301 selects the matrix R of the secondary transformation based on the secondary transformation identifier st_idx and scanning identifier scanIdx thus inputted thereto, and supplies the matrix R of the secondary transformation to the matrix calculating portion 142.

<Secondary Transformation Selecting Portion>

Figure 19:
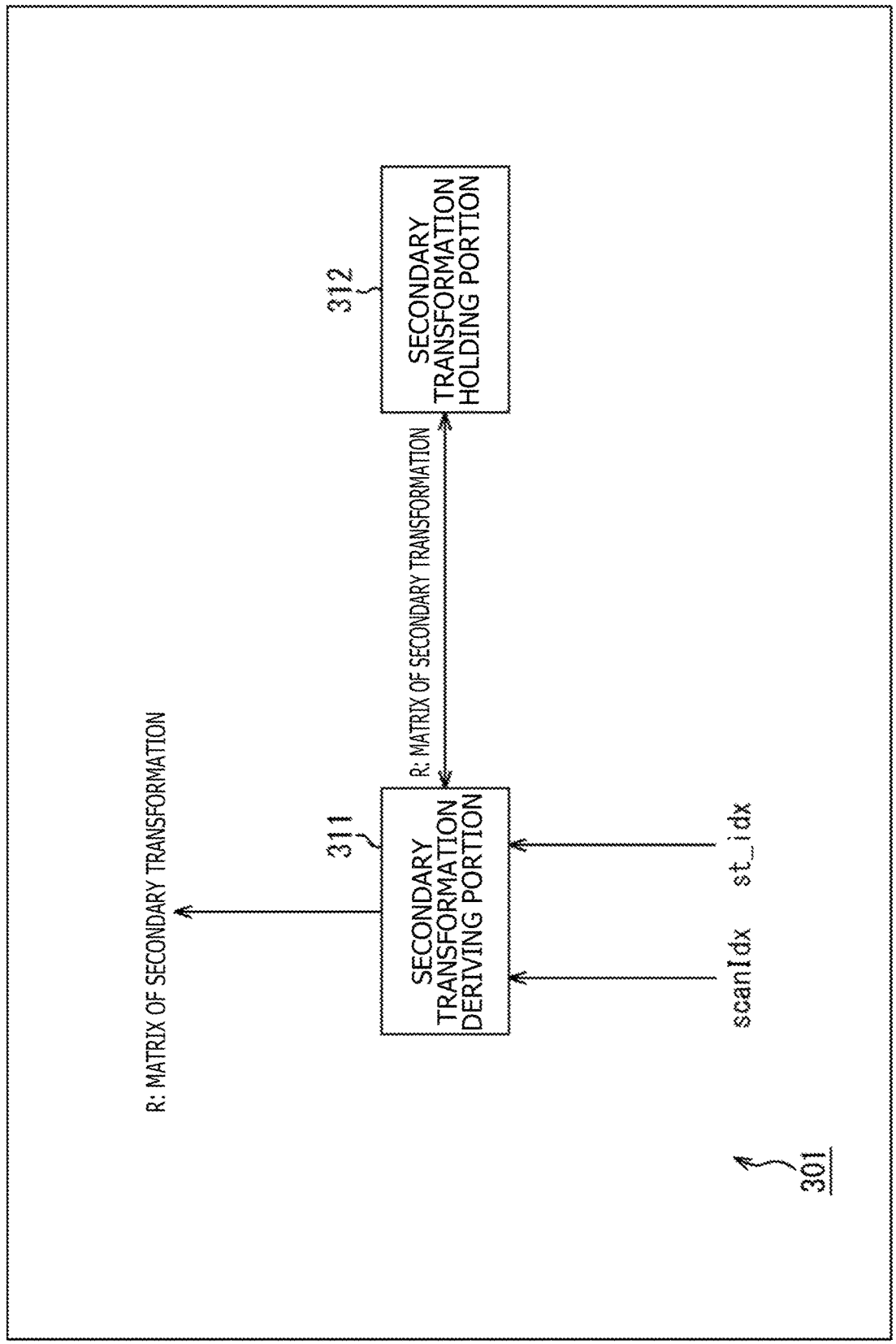
FIG. 19 is a block diagram depicting an example of a main configuration of a secondary transformation selecting portion.

FIG. 19 is a block diagram depicting an example of a main configuration of the secondary transformation selecting portion 301. As depicted in FIG. 19, the secondary transformation selecting portion 301 has a secondary transformation deriving portion 311 and a secondary transformation holding portion 312.

The secondary transformation deriving portion 311 receives as inputs thereof the secondary transformation identifier st_idx and the scanning identifier scanIdx. The secondary transformation deriving portion 311 reads out the matrix R of the corresponding secondary transformation from a secondary transformation matrix table LIST_FwdST[ ][ ] stored in the secondary transformation holding portion 312 so as to follow following Expression (33) based on the secondary transformation identifier st_idx and scanning identifier scanIdx inputted thereto, and outputs the matrix R of the corresponding secondary transformation to the outside. Here, the matrix R of the secondary transformation corresponding to the scanning identifier scanIdx every secondary transformation identifier st_idx is stored in the inverse secondary transformation matrix table LIST_FwdST[ ][ ].

$$R=\text{LIST\_FwdST[scanIdx][st\_idx]} \quad (33)$$

The secondary transformation holding portion 312 holds therein the secondary transformation matrix table LIST_FwdST[ ][ ] in which the matrix R of the secondary transformation corresponding to the scanning identifier scanIdx every secondary transformation identifier st_idx is stored. The matrix R of the corresponding secondary transformation is supplied to the secondary transformation deriving portion 311 based on an instruction issued from the secondary transformation deriving portion 311.

<Flow of Transformation Processing>

Figure 20:
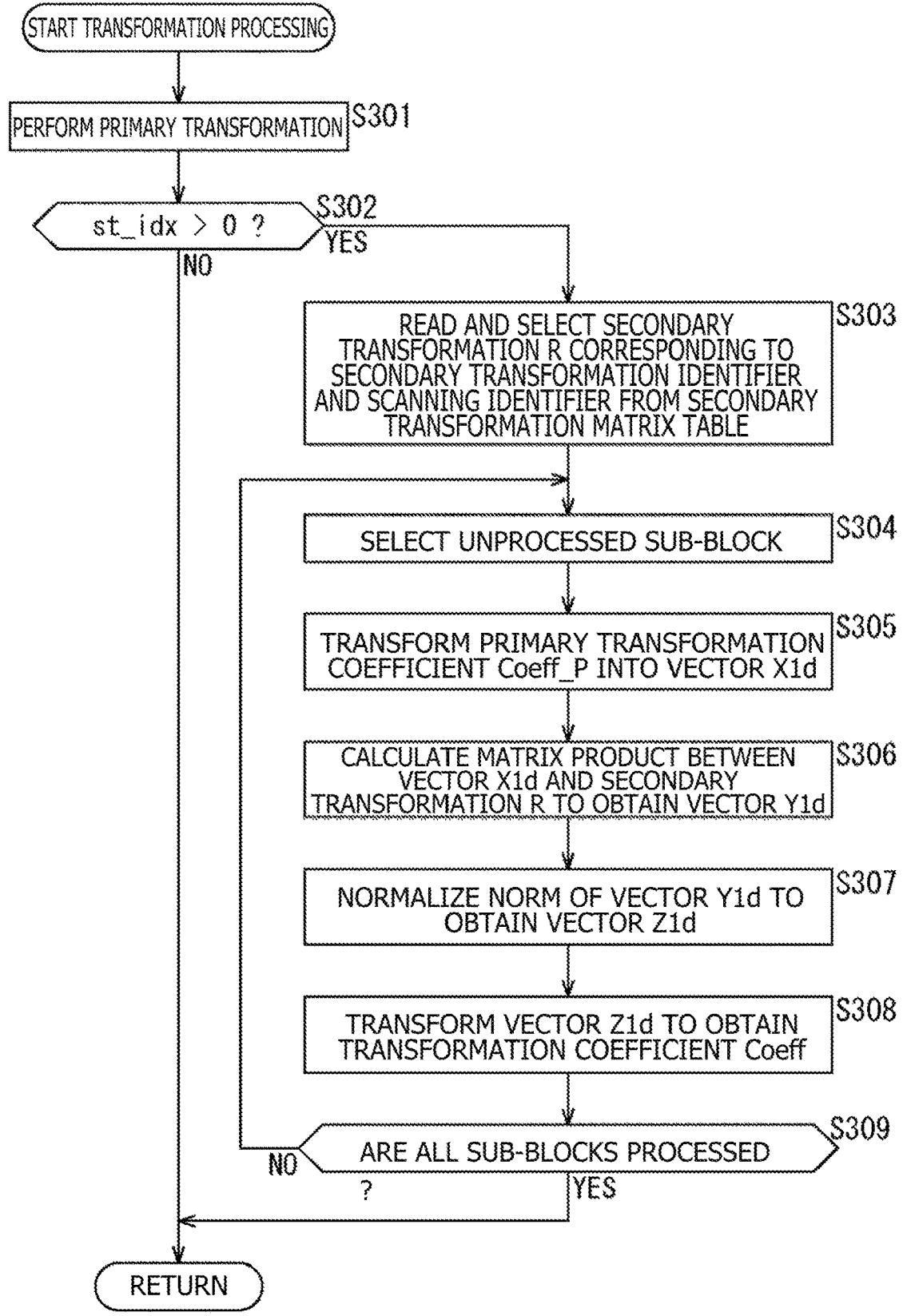
FIG. 20 is a flow chart explaining an example of a flow of transformation processing.

Now, a description will be given with respect to an example of a flow of pieces of processing which are executed by the image coding apparatus 100. In this case, the image coding apparatus 100 executes the image coding processing basically similarly to the case (FIG. 11) of the first embodiment. An example of a flow of the transformation processing in this case will now be described with reference to a flow chart of FIG. 20.

Figure 11:
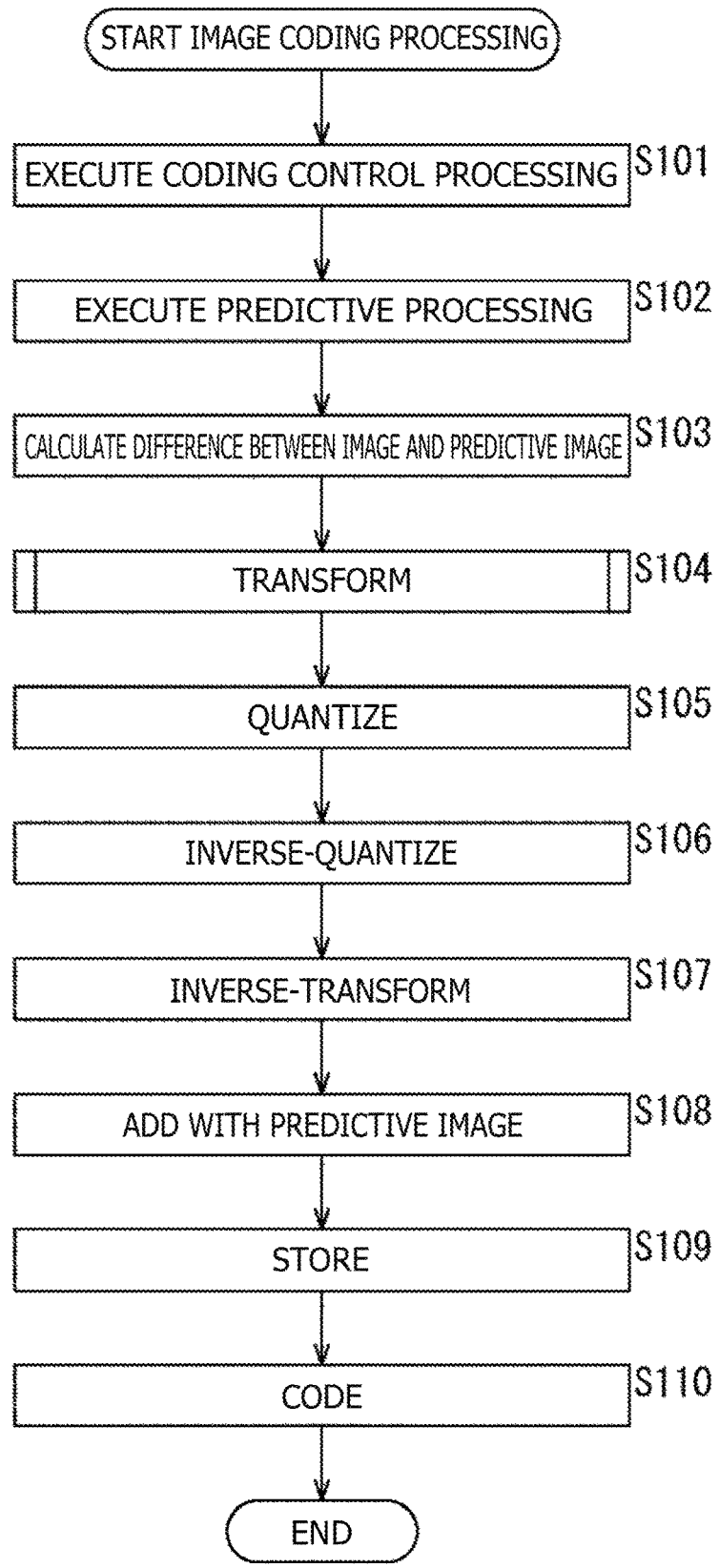
FIG. 11 is a flow chart explaining an example of a flow of image coding processing.
Figure 12:
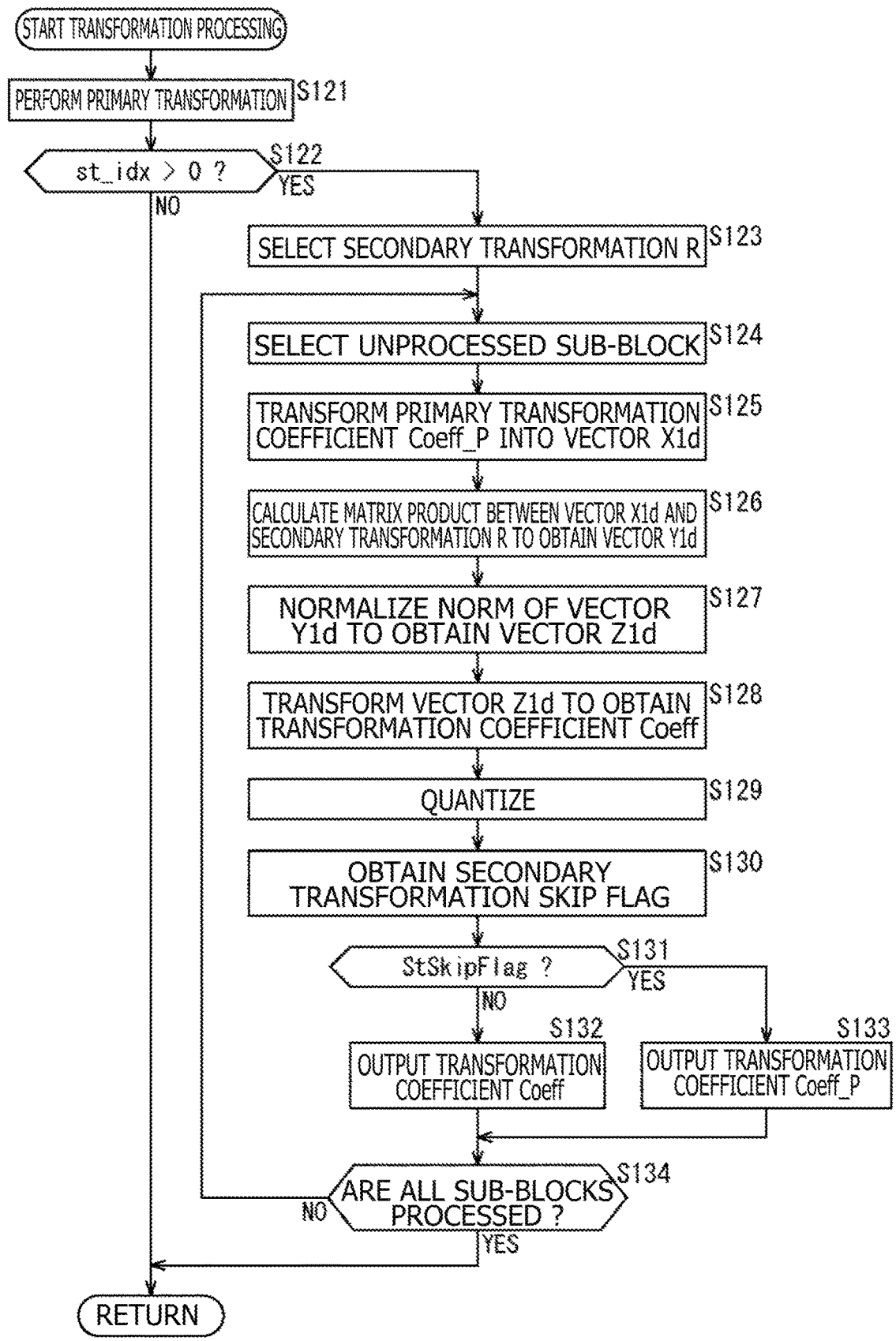
FIG. 12 is a flow chart explaining an example of a flow of transformation processing.

When the transformation processing is started, the pieces of processing of Step S301 and Step S302 are executed similarly to the pieces of processing of Step S121 and Step S122 of FIG. 12. In a word, in the case where it is decided that the secondary transformation identifier st_idx is 0 (indicating the skip of the secondary transformation), the secondary transformation (the pieces of processing from Step S303 to Step S309) is skipped, the transformation processing is ended, and the processing is returned back to FIG. 11. In a word, the secondary transformation portion 132 supplies the primary transformation coefficient Coeff_P as the transformation coefficient Coeff to the quantization portion 113.

In addition, in the case where it is decided in Step S302 that the secondary transformation identifier st_idx is larger than 0 (indicating carrying-out of the secondary transformation), the processing proceeds to Step S303.

In Step S303, the secondary transformation selecting portion 301 selects the matrix R of the secondary transformation corresponding to the secondary transformation identifier st_idx and the scanning identifier scanIdx. In a word, the secondary transformation deriving portion 311 reads out and selects the matrix R of the secondary transformation corresponding to the secondary transformation identifier st_idx and the scanning identifier scanIdx from the secondary transformation matrix table held in the secondary transformation holding portion 312.

Pieces of processing from Step S304 to Step S309 are executed similarly to the pieces of processing from Step S124 to Step S128, and Step S134 of FIG. 12. In a word, the pieces of processing from Step S304 to Step S309 are executed for each sub-block, thereby carrying out the secondary transformation for each sub-block. Then, in the case where it is decided in Step S309 that all the sub-blocks have been processed, the transformation processing is ended, and the processing is returned back to FIG. 11.

It should be noted that for the transformation processing, in the feasible range, the pieces of processing of steps may be replaced with one another in order thereof, or the content of the pieces of processing may be changed. For example, in the case where it is decided in Step S302 that the secondary transformation identifier st_idx is 0, the unit matrix of 16×16 may be selected as the matrix R of the secondary transformation, and the pieces of processing from Step S304 to Step S309 may be executed.

By executing the pieces of processing in the manner as described above, the matrix R of the secondary transformation can be selected based on the secondary transformation identifier st_idx and the scanning identifier scanIdx. Therefore, an amount of data of the matrix of the secondary transformation can be largely reduced. As a result, the increase in load of the coding can be suppressed, and the increase in memory size required for holding the matrix of the secondary transformation can be suppressed.

<Inverse Transformation Portion>

Next, an image decoding apparatus 200 will be described. In this case as well, the image decoding apparatus 200 has the configuration basically similar to that in the case of the first embodiment. However, the image decoding apparatus 200 in this case is provided with a setting portion, a rasterization portion, a matrix calculating portion, a scaling portion, and a matrix transforming portion. In this case, the setting portion sets the matrix of the inverse transformation processing for the transformation coefficients based on the content of the inverse transformation processing and the scanning method. The rasterization portion transforms the transformation coefficients for which the predictive residue as the difference between the image and the predictive image of that image is obtained by executing the inverse transformation processing into the one-dimensional vector. The matrix calculating portion carries out the matrix calculation for that one-dimensional vector by using the matrix set by the setting portion. The scaling portion carries out the scaling for the one-dimensional vector for which that matrix calculation is carried out. The matrix transforming portion matrix-transforms the scaled one-dimensional vector. In a word, the inverse transformation portion 213 sets the matrix of the inverse transformation processing for the transformation coefficients based on the content of the inverse transformation processing and the scanning method, and transforms the transformation coefficients for which the predictive residue as the difference between the image and the predictive image of that image is obtained by executing the inverse transformation processing into the one-dimensional vector. In addition, the inverse transformation portion 213 carries out the matrix calculation for that one-dimensional vector by using that set matrix, carries out the scaling for that one-dimensional vector for which that matrix calculation is carried out, and matrix-transforms the scaled one-dimensional vector.

Figure 21:
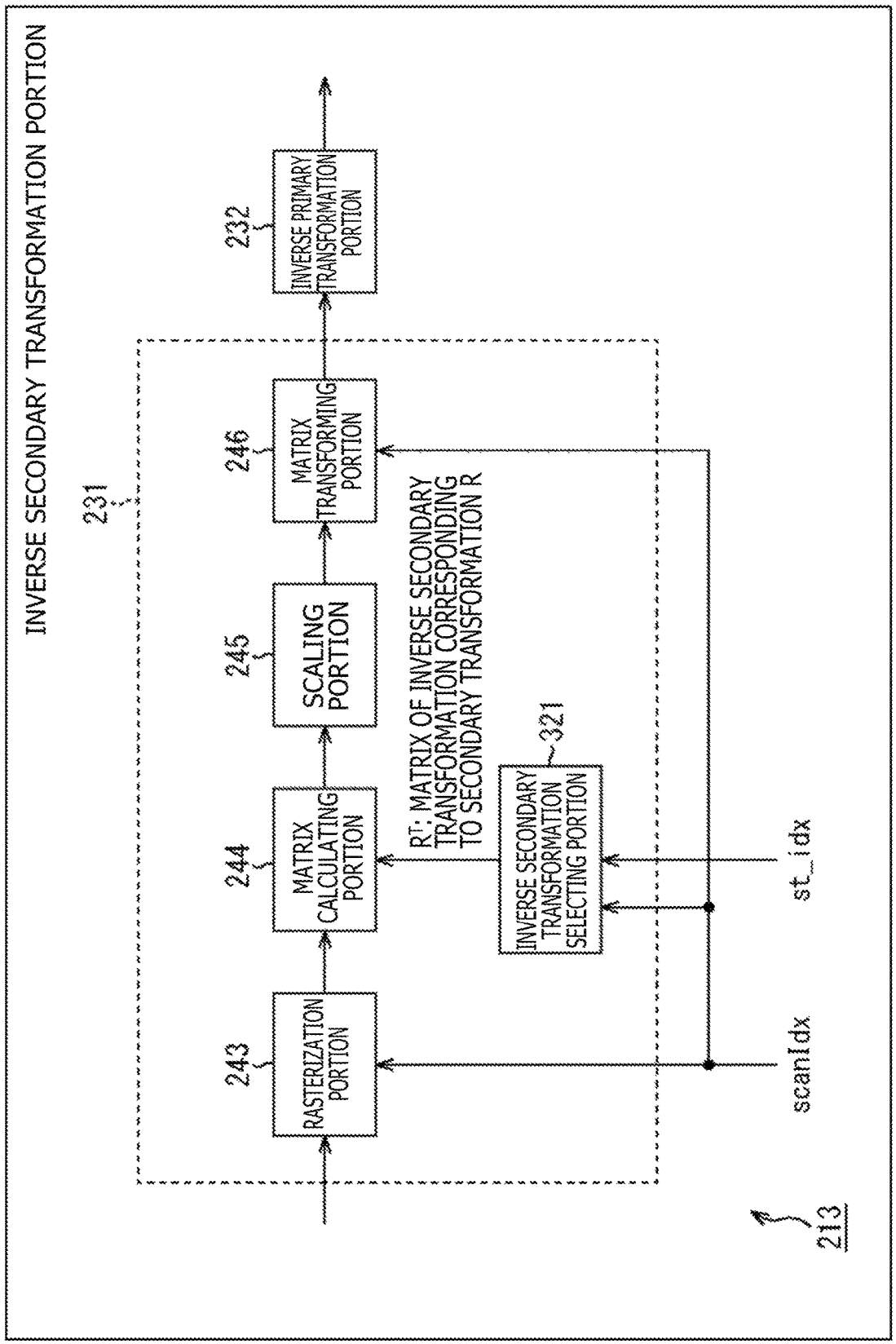
FIG. 21 is a block diagram depicting an example of a main configuration of an inverse transformation portion.

FIG. 21 is a block diagram depicting an example of a main configuration of the inverse transformation portion 213 in this case. As depicted in FIG. 21, the inverse transformation portion 213 in the case as well has the configuration basically similar to that in the case (FIG. 14) of the first embodiment. However, the inverse secondary transformation portion 231 in this case can omit the non-zero coefficient number deciding portion 241 and the switch 242. In addition, the inverse secondary transformation portion 231 has the inverse secondary transformation selecting portion 321 instead of the inverse secondary transformation selecting portion 247.

The inverse secondary transformation selecting portion 321 receives as inputs thereof the secondary transformation identifier st_idx and the scanning identifier scanIdx. The inverse secondary transformation selecting portion 321 selects the matrix IR of the inverse secondary transformation based on the secondary transformation identifier st_idx and scanning identifier scanIdx thus inputted thereto, and supplies the matrix IR of the inverse secondary transformation to the matrix calculating portion 244.

<Inverse Secondary Transformation Selecting Portion>

Figure 22:
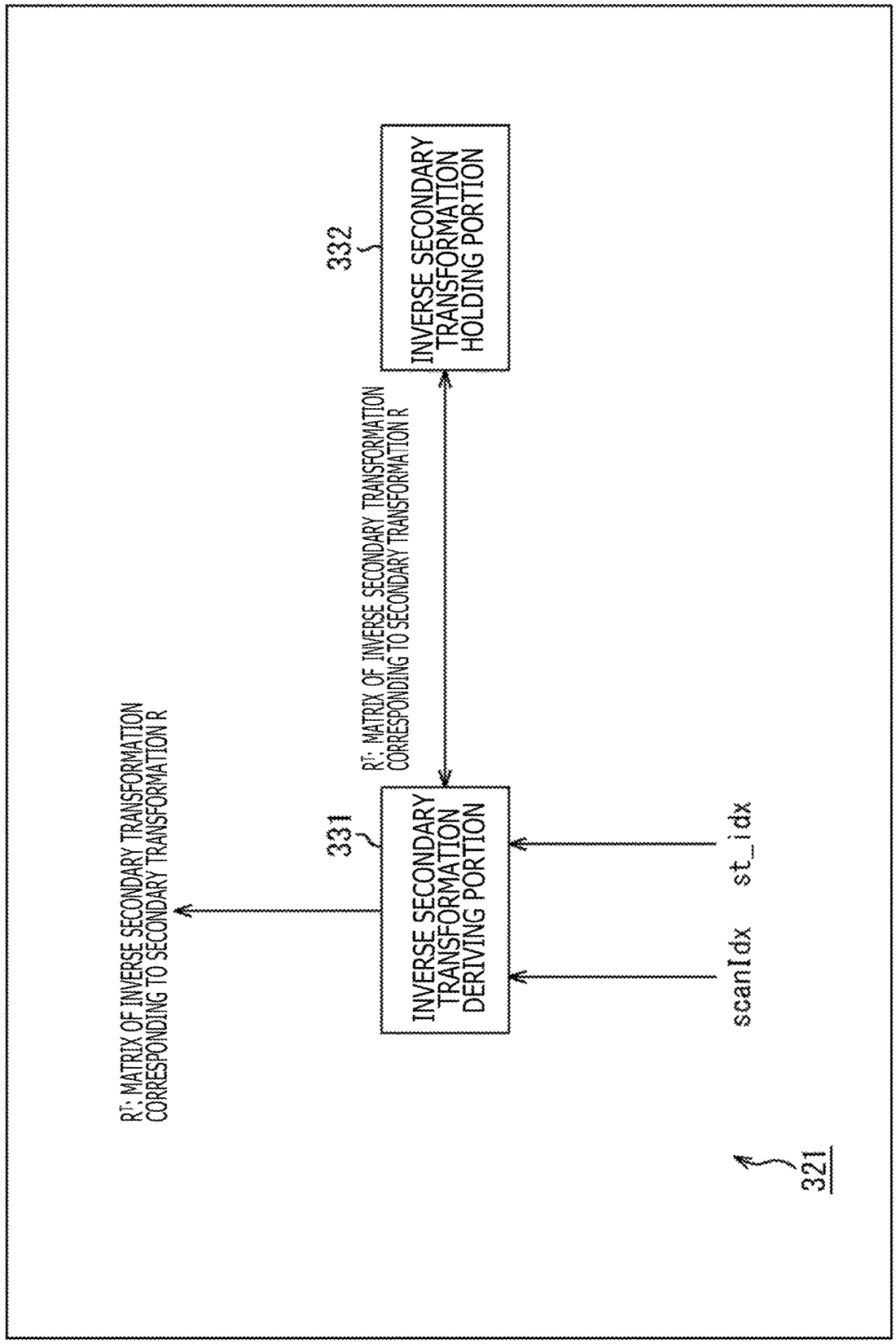
FIG. 22 is a block diagram depicting an example of a main configuration of an inverse secondary transformation selecting portion.

FIG. 22 is a block diagram depicting an example of a main configuration of the inverse secondary transformation selecting portion 321. As depicted in FIG. 22, the inverse secondary transformation selecting portion 321 has an inverse secondary transformation deriving portion 331 and an inverse secondary transformation holding portion 332.

The inverse secondary transformation deriving portion 331 receives as inputs thereof the secondary transformation identifier st_idx and the scanning identifier scanIdx. The inverse secondary transformation deriving portion 331 reads out the matrix IR ($=R^T$) of the corresponding inverse secondary transformation from an inverse secondary transformation matrix table LIST_InvST[ ][ ] stored in the inverse secondary transformation holding portion 332 so as to follow following Expression (34) based on the secondary transformation identifier st_idx and scanning identifier scanIdx inputted thereto, and outputs the matrix IR of the corresponding inverse secondary transformation to the outside. Here, the matrix IR of the inverse secondary transformation corresponding to the scanning identifier scanIdx every secondary transformation identifier st_idx is stored in the inverse secondary transformation matrix table LIST_InvST [ ] [ ].

$$IR = \text{LIST\_InvST}[\text{scanIdx}][\text{st\_idx}] \qquad (34)$$

The inverse secondary transformation holding portion 332 holds therein the inverse secondary transformation matrix table LIST_InvST[ ][ ] in which the matrix IR of the inverse secondary transformation corresponding to the scanning identifier scanIdx every secondary transformation identifier st_idx is stored. The inverse secondary transformation holding portion 332 supplies the matrix IR ($=R^T$) of the corresponding inverse secondary transformation to the inverse secondary transformation deriving portion 331 based on an instruction issued from the inverse secondary transformation deriving portion 331.

<Flow of Inverse Transformation Processing>

Figure 23:
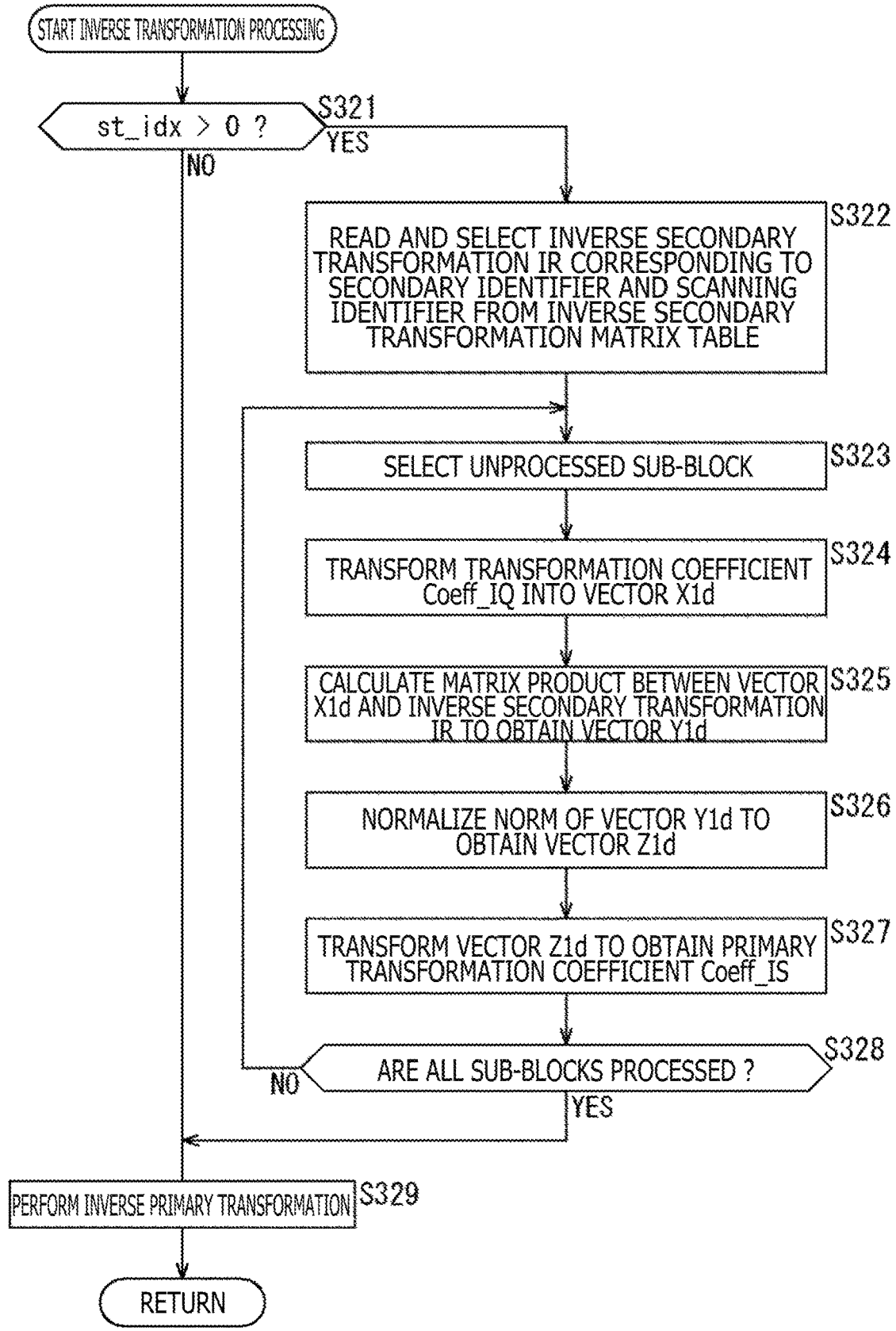
FIG. 23 is a flow chart explaining an example of a flow of inverse transformation processing.

Next, a description will be given with respect to an example of a flow of pieces of processing which are executed by the image decoding apparatus 200. In this case, the image decoding apparatus 200 executes the image decoding processing basically similarly to the case (FIG. 15) of the first embodiment. An example of a flow of the inverse transformation processing in this case will now be described with reference to a flow chart of FIG. 23.

When the inverse transformation processing is started, in Step S321, the inverse secondary transformation portion 231 decides whether or not the secondary transformation identifier st_idx applies the inverse secondary transformation (st_idx>0). In the case where it is decided that the secondary transformation identifier st_idx is 0 (the secondary transformation identifier st_idx indicates the skip of the inverse secondary transformation), the inverse secondary transformation (pieces of processing from Step S322 to Step S328) is skipped, and the processing proceeds to Step S329. In a word, the inverse secondary transformation portion 231 supplies the secondary transformation coefficient Coeff_IQ obtained by the processing of Step S202 of FIG. 15 as the primary transformation coefficient Coeff_IS to the inverse primary transformation portion 232.

In addition, in the case where it is decided in Step S321 that the secondary transformation identifier st_idx is larger than 0 (the secondary transformation identifier st_idx indicates carrying-out of the inverse secondary transformation), the processing proceeds to Step S322.

In Step S322, the inverse secondary transformation selecting portion 321 selects the matrix IR of the inverse secondary transformation corresponding to the secondary transformation identifier st_idx and the scanning identifier scanIdx. In a word, the inverse secondary transformation deriving portion 331 reads out and selects the matrix IR of the inverse secondary transformation corresponding to the secondary transformation identifier st_idx and the scanning identifier scanIdx from the inverse secondary transformation matrix table held in the inverse secondary transformation holding portion 332.

In Step S323, the inverse secondary transformation portion 231 selects the unprocessed sub-block included in the transformation block of the processing target.

Figure 16:
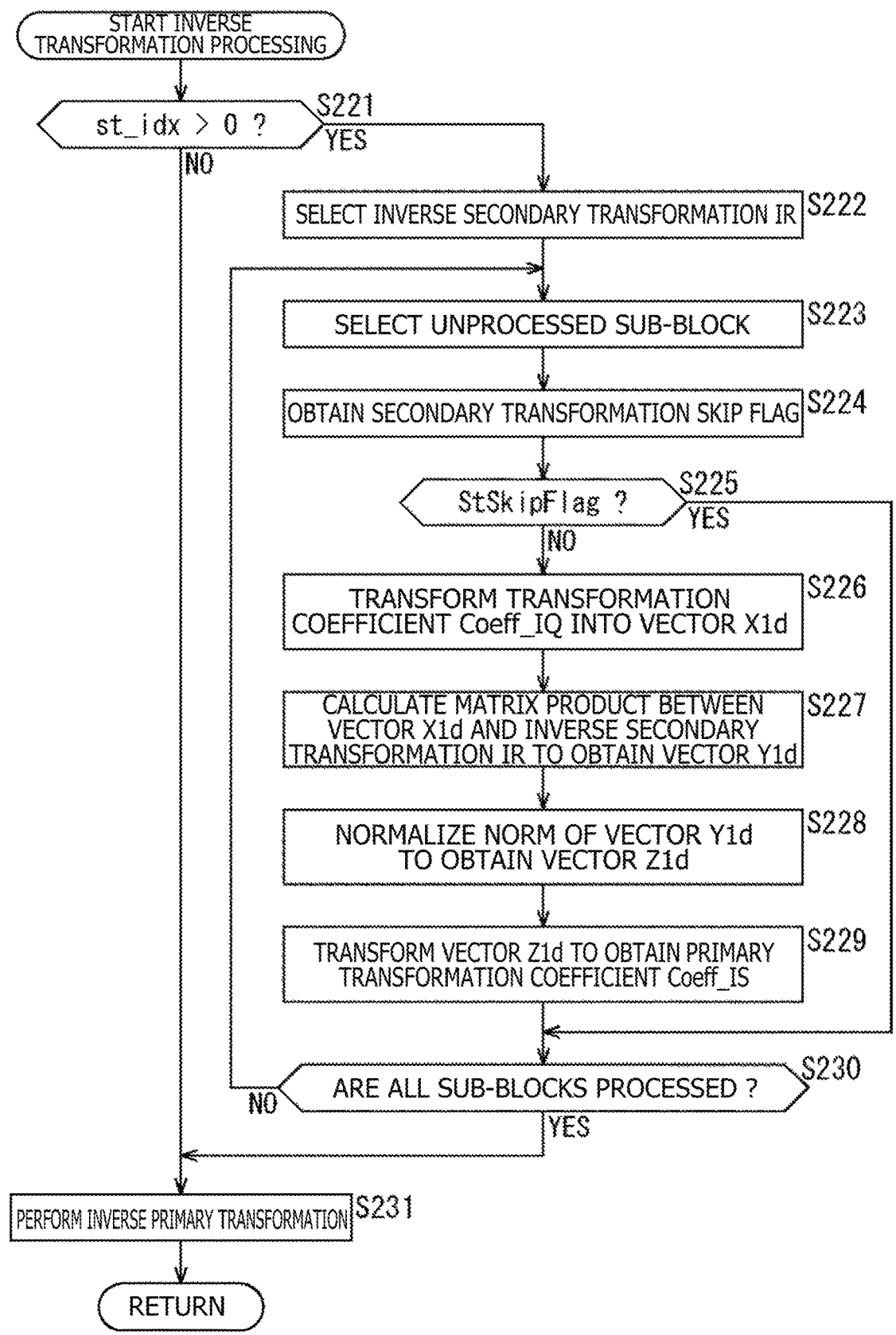
FIG. 16 is a flow chart explaining an example of a flow of inverse transformation processing.

Pieces of processing from Step S324 to Step S328 are executed similarly to the pieces of processing from Step 3226 to Step S230 of FIG. 16. In a word, the pieces of processing from Step S323 to Step S328 are executed for each sub-block, thereby carrying out the secondary transformation for each sub-block. Then, in the case where it is decided in Step S328 that all the sub-blocks have been processed, the processing proceeds to Step S329.

In Step S329, the inverse primary transformation portion 232 carries out the inverse primary transformation for the primary transformation coefficient Coeff_IS based on the primary transformation identifier pt_idx to derive the predictive residue D'. The predictive residue D' is supplied to the calculation portion 214.

When the processing in Step S231 is ended, the inverse transformation processing is ended, and the processing is returned back to FIG. 15.

It should be noted that for the inverse transformation processing described above, in the feasible range, the pieces of processing of steps may be replaced with one another in order thereof, or the content of the pieces of processing may be changed. For example, in the case where it is decided in Step S321 that the secondary transformation identifier st_idx is 0, the unit matrix of 16×16 may be selected as the matrix IR of the inverse secondary transformation, and the pieces of processing from Step S323 to Step 328 may be executed.

By executing the pieces of processing in the manner as described above, the matrix IR of the inverse secondary transformation can be selected based on the secondary transformation identifier st_idx and the scanning identifier scanIdx. Therefore, an amount of data of the matrices of the inverse secondary transformations can be largely reduced. As a result, the increase in load of the coding/decoding can be suppressed, and the increase in memory size required for holding the matrix of the (inverse) secondary transformation can be suppressed.

3. Third Embodiment

<Bandwidth Limitation>

NPL 1 states that in the case where the transformation block size is 64×64, after one or more orthogonal transformations are carried out for the predictive residue, the bandwidth limitation is carried out in such a way that the high-frequency component other than the low-frequency component of 32×32 at upper left is forcibly made 0, thereby reducing the calculation complexity or mounting cost of the decoder.

Figure 24:
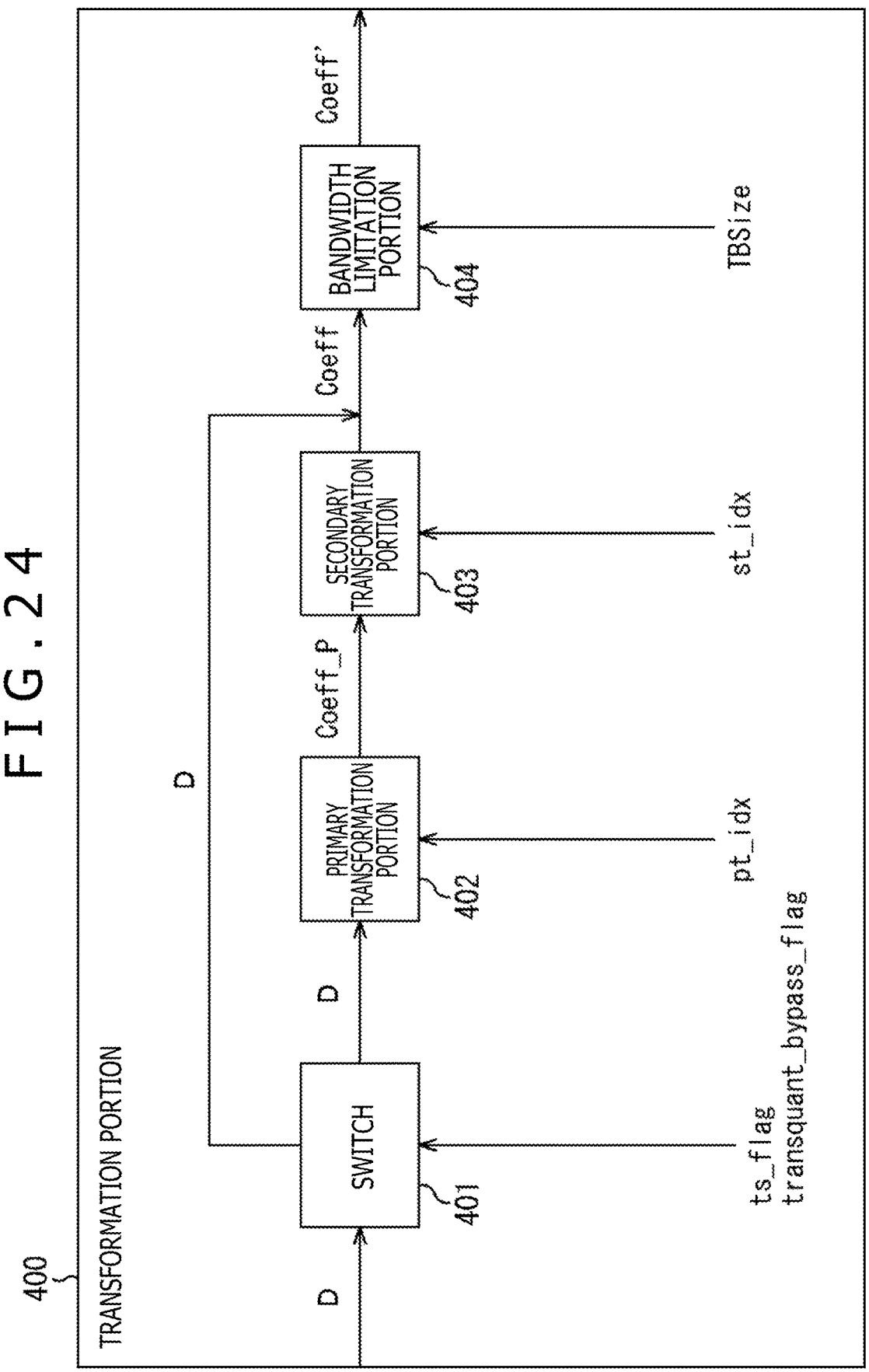
FIG. 24 is a block diagram depicting an example of a main configuration of a transformation portion.

FIG. 24 is a block diagram depicting an example of a main configuration of a transformation portion configured to carry out the primary transformation, the secondary transformation, and the bandwidth limitation for the predictive residue D by using the method described in NPL 1. As depicted in FIG. 24, the transformation portion 400 has a switch 401, a primary transformation portion 402, a secondary transformation portion 403, and a bandwidth limitation portion 404.

The switch 401 receives as inputs thereof a transformation skip flag ts_flag, a transformation quantization bypass flag transquant_bypass_flag, and the predictive residue D. The transformation skip flag ts_flag is information indicating whether or not the (inverse) primary transformation and the (inverse) secondary transformation are to be skipped in the target data unit. For example, in the case where the transformation skip flag ts_flag is 1 (true), the (inverse) primary transformation and the (inverse) secondary transformation are skipped. In addition, in the case where the transformation skip flag ts_flag is 0 (false), the (inverse) primary transformation and the (inverse) secondary transformation are carried out.

In addition, the transformation quantization bypass flag transquant_bypass_flag is information indicating whether or not the (inverse) primary transformation, the (inverse) secondary transformation, and the (inverse) quantization are to be skipped (bypassed) in the target data unit. For example, in the case where the transformation quantization bypass flag transquant_bypass_flag is 1 (true), the (inverse) primary transformation, the (inverse) secondary transformation, and the (inverse) quantization are bypassed. In addition, in the case where the transformation quantization bypass flag transquant_bypass_flag is 0 (false), the (inverse) primary transformation, the (inverse) secondary transformation, and the (inverse) quantization are not bypassed.

The switch 401 carries out the control for the skip of the primary transformation and the secondary transformation for the predictive residue D based on the transformation skip flag ts_flag and the transformation quantization bypass flag transquant_bypass_flag.

Specifically, in the case where either the transformation skip flag ts_flag or the transformation quantization bypass flag transquant_bypass_flag is 0, the switch 401 supplies the predictive residue D to the primary transformation portion 402, thereby causing the primary transformation and the secondary transformation to be carried out. On the other hand, in the case where either the transformation skip flag ts_flag or the transformation quantization bypass flag transquant_bypass_flag is 1, the switch 401 supplies the predictive residue D as the secondary transformation coefficient Coeff to the bandwidth limitation portion 404, thereby causing the primary transformation and the secondary transformation to be skipped.

The primary transformation portion 402, similarly to the case of the primary transformation portion 131 of FIG. 8, carries out the primary transformation for the predictive residue D based on the primary transformation identifier pt_idx to derive the primary transformation coefficient Coeff_P. The primary transformation identifier pt_idx is an identifier indicating which of the (inverse) primary transformations is applied to the (inverse) primary transformation in the vertical direction and in the horizontal direction in the target data unit (for example, refer to JVET-B1001, 2.5.1 Adaptive multiple Core transform. It is referred to as emt_idx as well in JEM). The primary transformation portion 402 supplies the primary transformation coefficient Coeff_P to the secondary transformation portion 403.

The secondary transformation portion 403 carries out the secondary transformation for the primary transformation coefficient Coeff_P supplied thereto from the primary transformation portion 402 based on the secondary transformation identifier st_idx by using the method described in NPL 1 to derive the secondary transformation coefficient Coeff. The secondary transformation portion 403 supplies the secondary transformation coefficient Coeff to the bandwidth limitation portion 404.

In the case where the block size TBSize of the processing target transformation block is 64×64, the bandwidth limitation portion 404 carries out the bandwidth limitation for the secondary transformation coefficient Coeff supplied thereto from either the switch 401 or the secondary transformation portion 403 in such a way that the high-frequency component is made 0 to derive a secondary transformation coefficient Coeff' after the bandwidth limitation. On the other hand, in the case where the block size TBSize of the processing target transformation block is not 64×64, the bandwidth limitation portion 404 causes the secondary transformation coefficient Coeff to become the secondary transformation coefficient Coeff' after the bandwidth limitation as it is. The bandwidth limitation portion 404 outputs the secondary transformation coefficient Coeff' after the bandwidth limitation.

As described above, in the transformation portion 400 of FIG. 24, even in the case where the primary transformation and the secondary transformation are skipped, when the block size TBSize is 64×64, the bandwidth limitation (low-pass filter processing) is carried out. However, in the case where the primary transformation and the secondary transformation are skipped, the secondary transformation coefficient Coeff inputted to the bandwidth limitation portion 404 is the predictive residue D. Therefore, the bandwidth limitation portion 404 shall carry out the bandwidth limitation for the predictive residue D, and the distortion is increased due to the bandwidth limitation.

Figure 25:
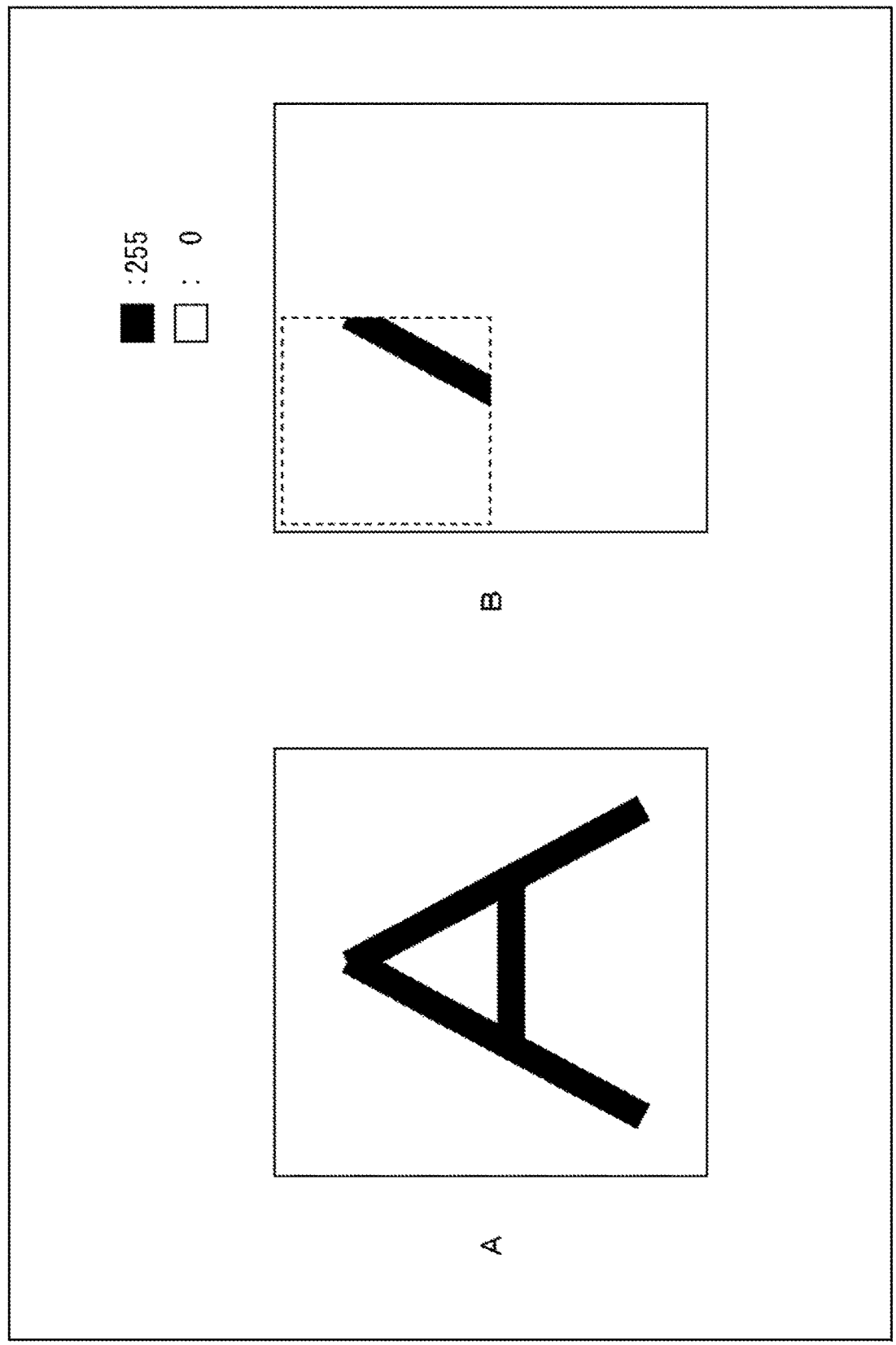
FIG. 25 is a diagram explaining bandwidth limitation.

For example, in the case where the predictive residue D of the transformation block of 64×64 is an image of 64×64 depicted in A of FIG. 25, when the primary transformation and the secondary transformation are skipped, the image of 64×64 depicted in A of FIG. 25 is inputted to the bandwidth limitation portion 404 as the secondary transformation coefficient Coeff. Therefore, if the bandwidth limitation portion 404 carries out the bandwidth limitation in such a way that each of the transformation coefficients other than the transformation coefficient of 32×32 at the upper left of the transformation block is made 0 as the high-frequency component, then, the secondary transformation coefficient Coeff' after the bandwidth limitation becomes an image of 64×64 depicted in B of FIG. 25. Therefore, in the secondary transformation coefficient Coeff' after the bandwidth limitation, the distortion is increased. As a result, the coding efficiency is reduced. In addition, although the transformation quantization bypass is carried out for the purpose of carrying out the lossless coding, the lossless coding cannot be carried out.

It should be noted that in FIG. 25, a white color area is an area in which a pixel value is 0, and a black color area is an area in which a pixel value is 255.

<Prohibition of Bandwidth Limitation at Time of Transformation Skip or Transformation Quantization Bypass>

In the third embodiment, the bandwidth limitation for the secondary transformation coefficient Coeff is controlled based on the transformation skip flag ts_flag and the transformation quantization bypass flag transquant_bypass_flag. In addition, the bandwidth limitation for the secondary transformation coefficient Coeff_IQ which is obtained through the inverse quantization is controlled based on the transformation skip flag ts_flag and the transformation quantization bypass flag transquant_bypass_flag. Specifically, in the case where either the transformation skip flag ts_flag or the transformation quantization bypass flag transquant_bypass_flag is 1, the (inverse) primary transformation, the (inverse) secondary transformation, and the bandwidth limitation are skipped.

By adopting such a procedure, it is prohibited to apply the bandwidth limitation to the secondary transformation coefficient Coeff (Coeff_IQ) as the predictive residue D, that is, the secondary transformation coefficient of the pixel area. Therefore, the increase in the distortion is suppressed. As a result, the reduction of the coding efficiency can be suppressed. In addition, by carrying out the transformation quantization bypass, the lossless coding can be carried out.

<Image Coding Apparatus>

The third embodiment of the image coding apparatus as the image processing apparatus to which the present technique is applied is the same in configuration as FIG. 7 except for the transformation information Tinfo, the transformation portion, and the inverse transformation portion. Therefore, in the following, only the transformation information Tinfo, the transformation portion, and the inverse transformation portion will be described.

In the third embodiment, the transformation information Tinfo includes the transformation skip flag ts_flag, the transformation quantization bypass flag transquant_bypass_flag, the primary transformation identifier pt_idx, the secondary transformation identifier st_idx and the block size TBSize.

In addition, the inverse transformation which is carried out by the inverse transformation portion in the third embodiment is the inverse processing of the transformation which is carried out by the transformation portion, and is the processing similar to the inverse transformation which is carried out in an image decoding apparatus which will be described later. Therefore, the inverse transformation will be described in a description relating to the image decoding apparatus later.

<Transformation Portion>

Figure 26:
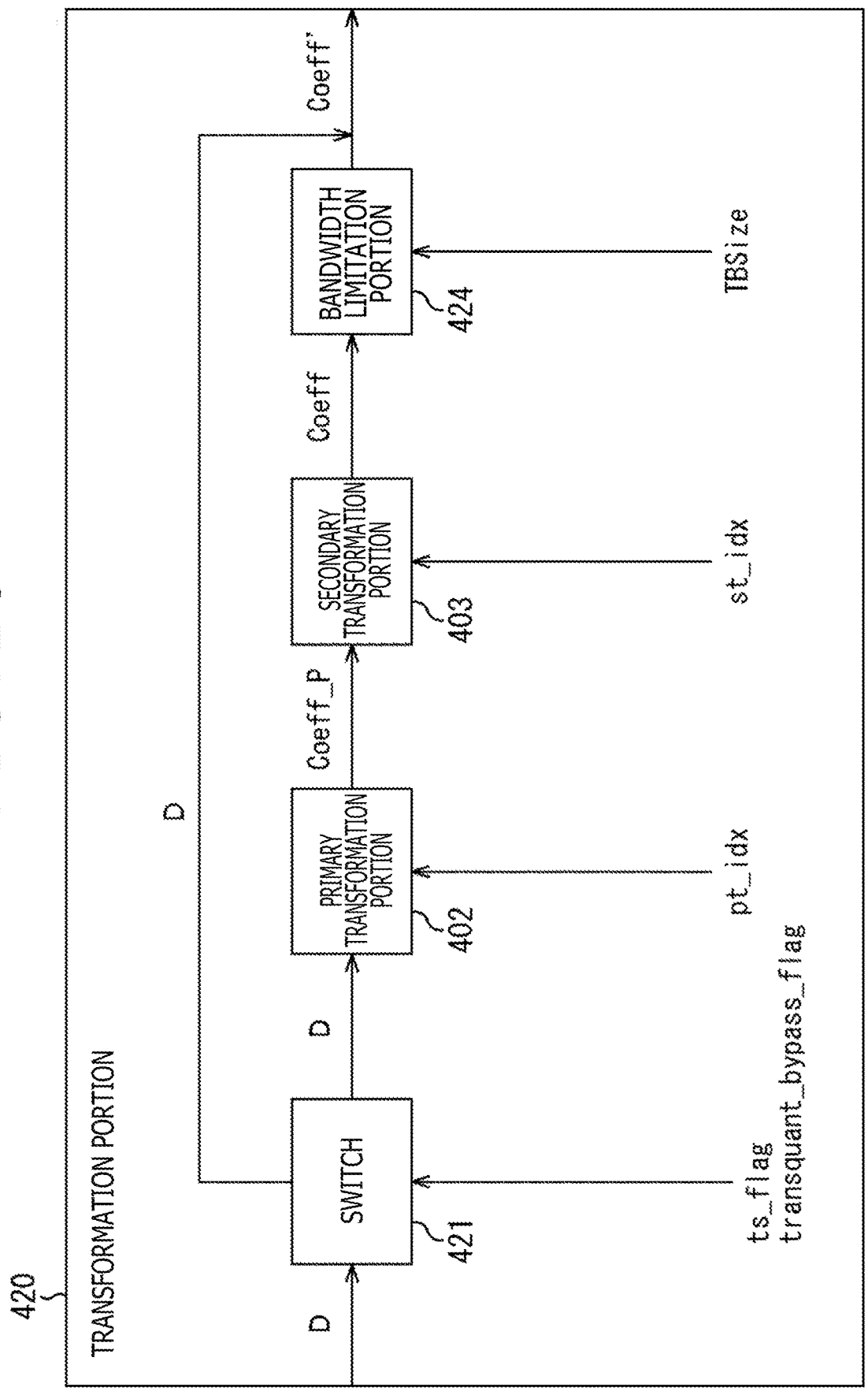
FIG. 26 is a block diagram depicting an example of a main configuration of a transformation portion.

FIG. 26 is a block diagram depicting an example of a main configuration of the transformation portion in the third embodiment of the image coding apparatus as the image processing apparatus to which the present technique is applied.

Of the constituent elements depicted in FIG. 26, the same constituent elements as those of FIG. 24 are assigned with the same reference signs. A repeated description thereof will be suitably omitted.

The transformation portion 420 of FIG. 26 is different in configuration from the transformation portion 400 in that a switch 421 and a bandwidth limitation portion 424 are provided instead of the switch 401 and the bandwidth limitation portion 404.

The transformation skip flag ts_flag and the transformation quantization bypass flag transquant_bypass_flag are supplied from the control portion 101 to the switch 421 of the transformation portion 420, and the predictive residue D is supplied from the calculation portion 101 to the switch 421 of the transformation portion 420. The switch 421 controls the skip of the primary transformation, the secondary transformation and the bandwidth limitation for the predictive residue D based on the transformation skip flag ts_flag and the transformation quantization bypass flag transquant_bypass_flag.

Specifically, in the case where either the transformation skip flag ts_flag or the transformation quantization bypass flag transquant_bypass_flag is 0, the switch 421 supplies the predictive residue D to the primary transformation portion 402, thereby causing the primary transformation, the secondary transformation, and the bandwidth limitation to be carried out. On the other hand, in the case where either the transformation skip flag ts_flag or the transformation quantization bypass flag transquant_bypass_flag is 1, the switch 421 (control portion) supplies the predictive residue D as the secondary transformation coefficient Coeff' after the bandwidth limitation to the quantization portion 113, thereby causing the primary transformation, the secondary transformation, and the bandwidth limitation to be skipped.

The bandwidth limitation portion 424 carries out the bandwidth limitation for the secondary transformation coefficient Coeff outputted from the secondary transformation portion 403 in such a way that the high-frequency component is made 0 based on the block size TBSize supplied thereto from the control portion 101 to derive the secondary transformation coefficient Coeff' after the bandwidth limitation. The bandwidth limitation portion 424 supplies the secondary transformation coefficient Coeff' after the bandwidth limitation to the quantization portion 113.

Specifically, in the case where the block size TBSize is smaller than the predetermined block size TH_TBSize, the bandwidth limitation portion 424 supplies the secondary transformation coefficient Coeff as the secondary transformation coefficient Coeff' after the bandwidth limitation to the quantization portion 113 without carrying out the bandwidth limitation for the secondary transformation coefficient Coeff.

On the other hand, in the case where the block size TBSize is equal to or larger than the predetermined block size TH TBSize, the bandwidth limitation portion 424 derives the secondary transformation coefficient Coeff(i, j)' after the bandwidth limitation every coordinates (i, j) within the transformation block so as to follow following Expression (35) by using the bandwidth limitation filter H(i, j) and the secondary transformation coefficient Coeff(i, j).

[Math. 6]

$$\text{Coeff}(i,j)' = \text{Coeff}(i,j) * H(i,j) \ (i=0, \ldots, TBXSize-1, j=0 \ldots, TBYSize-1) \quad (35)$$

It should be noted that the bandwidth limitation filter H(i, j) is defined by following Expression (36)

[Math. 7]

$$H(i, j) = \begin{cases} 1 & \begin{pmatrix} i = 0, \ldots, (TBXSize \gg 1) - 1, \\ j = 0, \ldots, (TBYSize \gg 1) - 1 \end{pmatrix} \\ 0 & (\text{otherwise}) \end{cases} \quad (36)$$

In addition, TBXSize and TBYSize represent a size of a transverse width, and a size of a longitudinal width of the processing target transformation block, respectively. According to Expression (35) and Expression (36), the high-frequency component of the secondary transformation coefficient Coeff(i, j)' becomes 0. The bandwidth limitation portion 424 supplies the secondary transformation coefficient Coeff' after the bandwidth limitation which is derived in the manner as described above to the quantization portion 113.

<Flow of Image Coding Processing>

The image coding processing which is executed by the third embodiment of the image coding apparatus as the image processing apparatus to which the present technique is applied is similar to the image coding processing of FIG. 11 except for the transformation processing of Step S104 and the inverse transformation processing of Step S107. Since the inverse transformation processing is the inverse processing of the transformation processing and is executed similarly to the inverse transformation processing which is executed in image decoding processing which will be described later, in this case, only the transformation processing will now be described.

<Flow of Transformation Processing>

Figure 27:
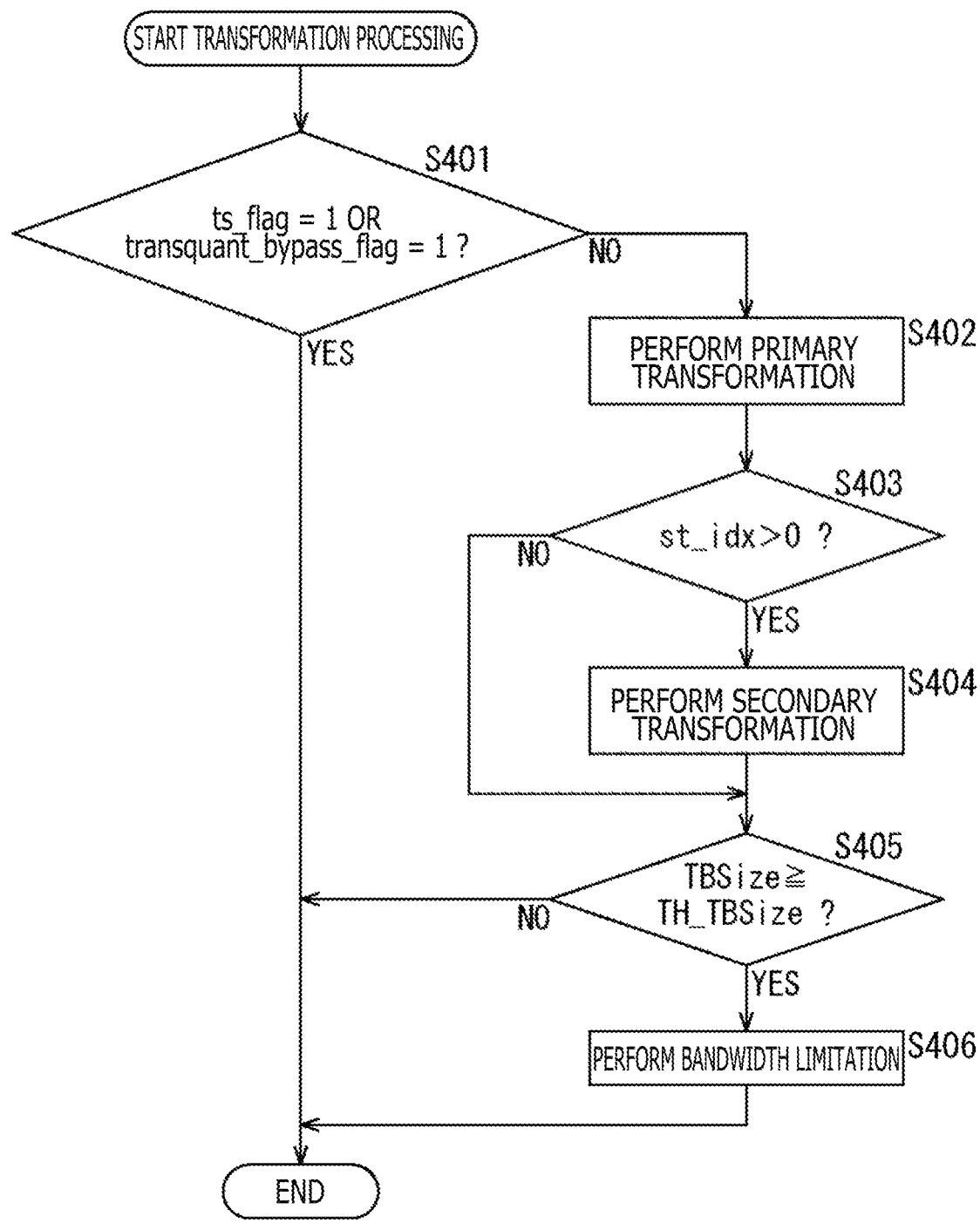
FIG. 27 is a flow chart explaining an example of a flow of transformation processing.

FIG. 27 is a flow chart explaining an example of a flow of the transformation processing which is executed by the third embodiment of the image coding apparatus as the image processing apparatus to which the present technique is applied.

When the transformation processing is started, in Step 3401, the switch 421 decides whether or not either the transformation skip flag ts_flag or transformation quantization bypass flag transquant_bypass_flag supplied from the control portion 101 is 1.

In the case where it is decided in Step S401 that either the transformation skip flag ts_flag or the transformation quantization bypass flag transquant_bypass_flag is 1, the switch 421 decides that the primary transformation, the secondary transformation, and the bandwidth limitation are skipped. Then, the switch 421 supplies the predictive residue D supplied thereto from the calculation portion 111 as the secondary transformation coefficient Coeff' after the bandwidth limitation to the quantization portion 113 without executing the pieces of processing from Step S402 to Step S406, and the processing is ended.

On the other hand, in the case where it is decided in Step S401 that the transformation skip flag ts_flag and the transformation quantization bypass flag transquant_bypass_flag are each 0, the switch 421 decides that the primary transformation, the secondary transformation, and the bandwidth limitation are carried out. Then, the switch 421 supplies the predictive residue D to the primary transformation portion 402, and the processing proceeds to S402.

In Step S402, the primary transformation portion 402 carries out the primary transformation for the predictive residue D supplied thereto from the switch 421 based on the primary transformation identifier pt_idx supplied thereto from the control portion 101 to derive the primary transformation coefficient Coeff_P. The primary transformation portion 402 supplies the primary transformation coefficient Coeff_P to the secondary transformation portion 403.

In Step S403, the secondary transformation portion 403 decides whether or not the secondary transformation identifier st_idx is larger than 0. In the case where it is decided in Step S403 that the secondary transformation identifier st_idx is larger than 0, that is, in the case where the secondary transformation identifier st_idx indicates carrying-out of the secondary transformation, the processing proceeds to Step S404.

In Step S404, the secondary transformation portion 403 carries out the secondary transformation, corresponding to the secondary transformation identifier st_idx, for the primary transformation coefficient Coeff_P to derive the secondary transformation coefficient Coeff. The secondary transformation portion 403 supplies the secondary transformation coefficient Coeff to the bandwidth limitation portion 424, and the processing proceeds to Step S405.

On the other hand, in the case where it is decided in Step S403 that the secondary transformation identifier st_idx is not larger than 0, that is, in the case where the secondary transformation identifier st_idx indicates the skip of the secondary transformation, the secondary transformation portion 403 skips the processing of Step S404. Then, the secondary transformation portion 403 supplies the primary transformation coefficient Coeff_P obtained in the processing of Step S402, as the secondary transformation coefficient Coeff, to the bandwidth limitation portion 424. Then, the processing proceeds to Step S405.

In Step S405, the bandwidth limitation portion 424 decides whether or not the block size TBSize of the processing target transformation block is equal to or larger than a predetermined block size TH_TBSize. In the case where it is decided in Step 3405 that the block size TBSize is equal to or larger than the predetermined block size TH TBSize, the processing proceeds to Step S406.

In Step S406, the bandwidth limitation portion 424 carries out the bandwidth limitation by applying a bandwidth limitation filter H defined by Expression (36) described above to the secondary transformation coefficient Coeff so as to follow Expression (35) described above to derive the secondary transformation coefficient Coeff' after the bandwidth limitation. Then, the bandwidth limitation portion 424 supplies the secondary transformation coefficient Coeff' after the bandwidth limitation to the quantization portion 113, and the processing is ended.

On the other hand, in the case where it is decided in Step S405 that the block size TBSize is smaller than the predetermined block size TH_TBSize, the bandwidth limitation portion 424 skips the processing of Step S406. Then, the bandwidth limitation portion 424 supplies the secondary transformation coefficient Coeff as the secondary transformation coefficient Coeff' after the bandwidth limitation as it is to the quantization portion 113, and the processing is ended.

It should be noted that for the transformation processing, in the feasible range, the pieces of processing of steps may be replaced with one another in order thereof, or the content of the pieces of processing may be changed. For example, in the case where it is decided in Step S403 that the secondary transformation identifier st_idx is not larger than 0, the unit matrix may be selected as the matrix R of the secondary transformation, and the processing of Step S404 may be executed.

As described above, in the case where neither the transformation skip nor the transformation quantization bypass is carried out, the switch 421 supplies the predictive residue D to the bandwidth limitation portion 424 through the primary transformation portion 402 and the secondary transformation portion 403. As a result, in the case where the block size TBSize is equal to or larger than the predetermined block size TH_TBSize, the bandwidth limitation portion 424 carries out the bandwidth limitation in such a way that the high-frequency component of the secondary transformation coefficient Coeff is made 0. Therefore, in this case, the image coding apparatus has to code only the low-frequency component of the secondary transformation coefficient Coeff, and thus the coding processing of the secondary transformation coefficient Coeff can be omitted.

In addition, in the case where either the transformation skip or the transformation quantization bypass is carried out, the switch 421 does not supply the predictive residue D to the bandwidth limitation portion 424. As a result, even when the block size TBSize is equal to or larger than the predetermined block size TH TBSize, the bandwidth limitation portion 424 does not carry out the bandwidth limitation for the secondary transformation coefficient Coeff as the predictive residue D. That is, in the case where either the transformation skip or the transformation quantization bypass is carried out, the bandwidth limitation is also skipped. Therefore, even when either the transformation skip or the transformation quantization bypass is carried out, as compared with the case where the bandwidth limitation is carried out, the transformation skip or the transformation quantization bypass is carried out, and it is possible to prevent the increase of the distortion when the block size TBSize is equal to larger than the predetermined block size TH_TBSize. As a result, the reduction of the coding efficiency can be suppressed, that is, the coding efficiency can be improved. In addition, the transformation quantization bypass is carried out, which enables the lossless coding to be carried out.

<Image Decoding Apparatus>

Next, a description will be given with respect to the decoding of the coded data obtained through the coding processing in the manner as described above. The third embodiment of the image decoding apparatus as the image processing apparatus to which the present technique is applied is the same in configuration as the case of FIG. 13 except for the transformation information Tinfo and the configuration of an inverse transformation portion. Since the transformation information Tinfo is described above, in the following, only the inverse transformation portion will be described.

<Inverse Transformation Portion>

Figure 28:
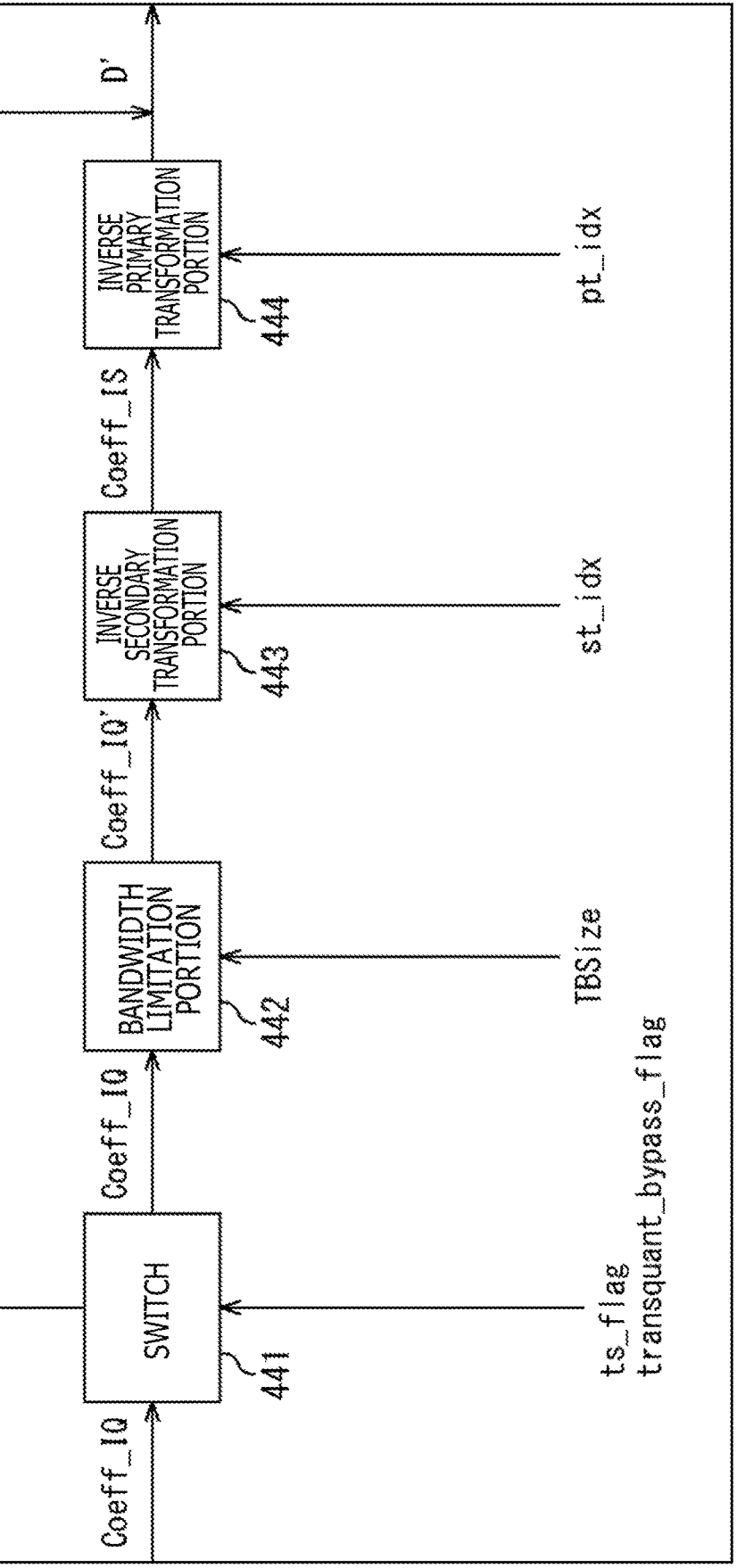
FIG. 28 is a block diagram depicting an example of a main configuration of an inverse transformation portion.

FIG. 28 is a block diagram depicting an example of a main configuration of the inverse transformation portion in the third embodiment of the image decoding apparatus as the image processing apparatus to which the present technique is applied.

As depicted in FIG. 28, the inverse transformation portion 440 has a switch 441, a bandwidth limitation portion 442, an inverse secondary transformation portion 443, and an inverse primary transformation portion 444.

The transformation skip flag ts_flag and the transformation quantization bypass flag transquant_bypass_flag are supplied from the decoding portion 211 to the switch 441, and the secondary transformation coefficient Coeff_IQ is supplied from the inverse quantization portion 212 to the switch 441. The switch 441 controls the skip of the bandwidth limitation, the inverse secondary transformation, and the inverse primary transformation for the secondary transformation coefficient Coeff_IQ based on the transformation skip flag ts_flag and the transformation quantization bypass flag transquant_bypass_flag.

Specifically, in the case where either the transformation skip flag ts_flag or the transformation quantization bypass flag transquant_bypass_flag is 0, the switch 441 supplies the secondary transformation coefficient Coeff_IQ to the bandwidth limitation portion 442, thereby causing the bandwidth limitation, the inverse secondary transformation, and the inverse primary transformation to be carried out. On the other hand, in the case where either the transformation skip flag ts_flag or the transformation quantization bypass flag transquant_bypass_flag is 1, the switch 441 (control portion) supplies the secondary transformation coefficient Coeff_IQ as the predictive residue D' to the calculation portion 214, thereby causing the bandwidth limitation, the inverse secondary transformation, and the inverse primary transformation to be skipped.

The bandwidth limitation portion 442 carries out the bandwidth limitation for the secondary transformation coefficient Coeff_IQ supplied thereto from the switch 441 in such a way that the high-frequency component is made 0 based on the block size TBSize of the processing target transformation block supplied thereto from the decoding portion 211 to derive the secondary transformation coefficient Coeff_IQ' after the bandwidth limitation. The bandwidth limitation portion 442 supplies the secondary transformation coefficient Coeff_IQ' after the bandwidth limitation to the inverse secondary transformation portion 443.

Specifically, in the case where the block size TBSize is smaller than the predetermined block size TH_TBSize, the bandwidth limitation portion 442 supplies the secondary transformation coefficient Coeff_IQ as the secondary transformation coefficient Coeff_IQ' after the bandwidth limitation to the inverse secondary transformation portion 443 without carry out the bandwidth limitation for the secondary transformation coefficient Coeff_IQ.

On the other hand, in the case where the block size TBSize is equal to or larger than the predetermined block size TH_TBSize, the bandwidth limitation portion 442 applies the bandwidth limitation filter H represented in Expression (35) described above to the secondary transformation coefficient Coeff_IQ to derive a secondary transformation coefficient Coeff_IQ(i, j)'.

That is, the bandwidth limitation portion 442 derives the secondary transformation coefficient Coeff_IQ(i, j)' after the bandwidth limitation so as to follow following Expression (37) by using the bandwidth limitation filter H(i, j) and the secondary transformation coefficient Coeff_IQ(i, j) every coordinates (i, j) within the transformation block.

[Math. 8]

$$\text{Coeff\_Q}(i,j)' = \text{Coeff\_IQ}(i,j) * H(i,j) \ (i=0,\ldots,\text{TBXSize}-1, j=0,\ldots,\text{TBYSize}-1) \quad (37)$$

According to Expression (37), the high-frequency component of the secondary transformation coefficient Coeff_IQ (i, j)' becomes 0. The bandwidth limitation portion 442 supplies the secondary transformation coefficient Coeff_IQ' after the bandwidth limitation which is derived in the manner as described above to the inverse secondary transformation portion 443.

The inverse secondary transformation portion 443 carries out the inverse secondary transformation for the secondary transformation coefficient Coeff_IQ' after the bandwidth limitation which is supplied thereto from the bandwidth limitation portion 442 based on the secondary transformation identifier st_idx supplied thereto from the decoding portion 211 to derive the primary transformation coefficient Coeff_IS. The inverse secondary transformation portion 443 supplies the primary transformation coefficient Coeff_IS to the inverse primary transformation portion 444.

The inverse primary transformation portion 444 carries out the inverse primary transformation similarly to the case of the inverse primary transformation portion 232 of FIG. 14 for the primary transformation coefficient Coeff_IS supplied thereto from the inverse secondary transformation portion 443 based on the primary transformation identifier pt_idx to derive the predictive residue D'. The inverse primary transformation portion 444 supplies the predictive residue D' thus derived to the calculation portion 214.

<Flow of Image Decoding Processing>

Since the image decoding processing executed by the third embodiment of the image decoding apparatus as the image processing apparatus to which the present technique is applied is similar to the image decoding processing of FIG. 15 except for the inverse transformation processing of Step S203, in the following, only the inverse transformation processing will be described.

<Flow of Inverse Transformation Processing>

Figure 29:
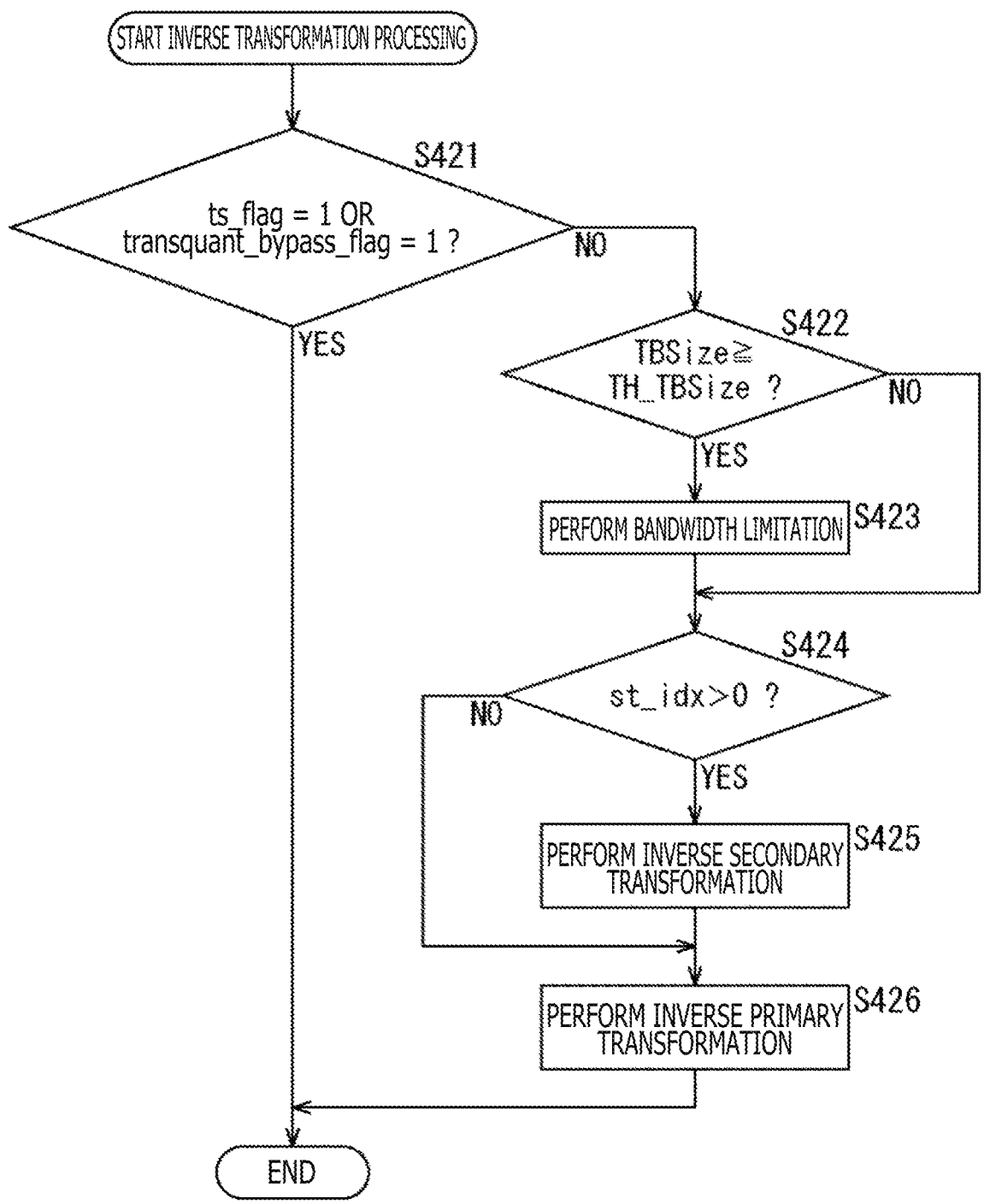
FIG. 29 is a flow chart explaining an example of a flow of inverse transformation processing.

FIG. 29 is a flow chart explaining an example of a flow of the inverse transformation processing which is executed in the third embodiment of the image decoding apparatus as the image processing apparatus to which the present technique is applied.

When the inverse transformation processing is started, in Step S421, the switch 441 decides whether or not either the transformation skip flag ts_flag or transformation quantization bypass flag transquant_bypass_flag which is supplied from the decoding portion 211 is 1.

In the case where it is decided in Step S421 that either the transformation skip flag ts_flag or transformation quantization bypass flag transquant_bypass_flag is 1, the switch 441 decides that the bandwidth limitation, the inverse secondary transformation, and the inverse primary transformation are to be skipped. Then, the switch 441 supplies the secondary transformation coefficient Coeff_IQ supplied thereto from the inverse quantization portion 212 as the predictive residue D' to the calculation portion 214 without executing the pieces of processing from Step S422 to Step S426, and the processing is ended.

On the other hand, in the case where it is decided in Step S421 that the transformation skip flag ts_flag and the transformation quantization bypass flag transquant_bypass_flag are each 0, the switch 441 decides that the bandwidth limitation, the inverse secondary transformation, and the inverse primary transformation are to be carried out. Then, the switch 441 supplies the secondary transformation coefficient Coeff_IQ supplied thereto from the inverse quantization portion 212 to the bandwidth limitation portion 442. Then, the processing proceeds to Step S422.

In Step S422, the bandwidth limitation portion 442 decides whether or not the block size TBSize of the processing target transformation block is equal to or larger than the predetermined block size TH_TBSize. In the case where it is decided in Step S422 that the block size TBSize is equal to or larger than the predetermined block size TH_TBSize, the processing proceeds to Step S423.

In Step S423, the bandwidth limitation portion 442 carries out the bandwidth limitation by applying a bandwidth limitation filter H to the secondary transformation coefficient Coeff_IQ to derive the secondary transformation coefficient Coeff_IQ' after the bandwidth limitation. Then, the bandwidth limitation portion 424 supplies the secondary transformation coefficient Coeff_IQ' after the bandwidth limitation to the inverse secondary transformation portion 443, and the processing proceeds to Step S424.

On the other hand, in the case where it is decided in Step S422 that the block size TBSize is smaller than the predetermined block size TH TBSize, the bandwidth limitation portion 442 skips the processing of Step S423. Then, the bandwidth limitation portion 442 supplies the secondary transformation coefficient Coeff_IQ as the secondary transformation coefficient Coeff_IQ' after the bandwidth limitation to the inverse secondary transformation portion 443 as it is. Then, the processing proceeds to Step S424.

In Step S424, the inverse secondary transformation portion 443 decides whether or not the secondary transformation identifier st_idx is larger than 0. In the case where it is decided in Step S424 that the secondary transformation identifier st_idx is larger than 0, that is, in the case where the secondary transformation identifier st_idx indicates carrying-out of the inverse secondary transformation, the processing proceeds to Step S425.

In Step S425, the inverse secondary transformation portion 443 carries out the inverse secondary transformation, corresponding to the secondary transformation identifier st_idx, for the secondary transformation coefficient Coeff_IQ' after the bandwidth limitation supplied thereto from the bandwidth limitation portion 442 to derive the primary transformation coefficient Coeff_P. The inverse secondary transformation portion 443 supplies the primary transformation coefficient Coeff_P to the inverse primary transformation portion 444. Then, the processing proceeds to Step S426.

On the other hand, in the case where it is decided in Step S424 that the secondary transformation identifier st_idx is not larger than 0, that is, in the case where the secondary transformation identifier st_idx indicates the skip of the inverse secondary transformation, the inverse secondary transformation portion 443 skips the processing of Step S425. Then, the inverse secondary transformation portion 443 supplies the secondary transformation coefficient Coeff_IQ' after the bandwidth limitation as the primary transformation coefficient Coeff_IS to the inverse primary transformation portion 444. Then, the processing proceeds to Step S426.

In Step S426, the inverse primary transformation portion 444 carries out the inverse primary transformation for the primary transformation coefficient Coeff_IS supplied thereto from the inverse secondary transformation portion 443 to derive the predictive residue D', and supplies the resulting predictive residue D' to the calculation portion 214. Then, the processing is ended.

It should be noted that for the inverse transformation processing described above, in the feasible range, the pieces of processing of steps may be replaced with one another in order thereof, or the content of the pieces of processing may be changed. For example, in the case where it is decided in Step S424 that the secondary transformation identifier st_idx is not larger than 0, the unit matrix may be selected as the matrix IR of the inverse secondary transformation, and the processing of Step S425 may be executed.

As described above, in the case where neither the inverse transformation skip, nor the skip of the inverse quantization and the inverse transformation (hereinafter, referred to as the inverse quantization inverse transformation bypass) is carried out, the switch 441 supplies the secondary transformation coefficient Coeff_IQ to the bandwidth limitation portion 442. As a result, in the case where the block size TBSize is equal to or larger than the predetermined block size TH TBSize, the bandwidth limitation portion 442 carries out the bandwidth limitation in such a way that the high-frequency component of the secondary transformation coefficient Coeff_IQ is made 0. Therefore, in this case, the image decoding apparatus has to inverse transform only the low-frequency component of the secondary transformation coefficient Coeff_IQ, and thus the inverse transformation processing of the secondary transformation coefficient Coeff_IQ can be reduced.

In addition, in the case where either the transformation skip or the inverse quantization inverse transformation bypass is carried out, the switch 441 does not supply the secondary transformation coefficient Coeff_IQ to the bandwidth limitation portion 442. As a result, even in the case where the block size TBSize is equal to or larger than the predetermined block size TH TBSize, the bandwidth limitation portion 442 does not carry out the bandwidth limitation for the secondary transformation coefficient Coeff_IQ as the predictive residue. That is, in the case where either the inverse transformation skip or the inverse quantization inverse transformation bypass is carried out, even the bandwidth limitation is skipped. Therefore, in the case where either the transformation skip or the transformation quantization bypass is carried out, even the bandwidth limitation is skipped, thereby enabling the coded data for which the increase in distortion is prevented to be decoded. As a result, the coded data for which the coding efficiency is improved can be decoded. In addition, the coded data which is obtained through the lossless-coding by the transformation quantization bypass can be lossless-decoded.

Incidentally, in the above description, the bandwidth limitation is carried out in the third embodiment of the image decoding apparatus. However, in the case where the bit stream restriction that "in the case where the block size TBSize is equal to or larger than the predetermined block size TH_TBSize, the non-zero coefficient is limited within the low-frequency area ((TH_TBSize>>1)×(TH_TBSize>>1)) at the upper left" is provided, the bandwidth limitation may not be carried out. The bit stream restriction can also be expressed as "when the transformation skip flag ts_flag and the transformation quantization bypass flag transquant_bypass_flag are each 0, and the block size TBSize is equal to the predetermined block size TH_TBSize, the values of the last non-zero coefficient X coordinate (last_sig_coeff_x_pos) and the last non-zero coefficient Y coordinate (last_sig_coeff_y_pos) indicating the position of the last non-zero coefficient within the transformation block are each a value within the range of 0 to (TH_TBSize/2)−1."

In addition, the predetermined block size TH_TBSize can be set to an arbitrary value in addition to 64×64.

Moreover, the method for the secondary transformation in the third embodiment is by no means limited to the method described in NPL 1. For example, the method for the secondary transformation in the third embodiment may be any of the methods in the first and second embodiments. In addition, the secondary transformation coefficient may be clipped so as to be limited within a predetermined range.

4. Fourth Embodiment

<Shape of CU, PU, and TU>

Figure 30:
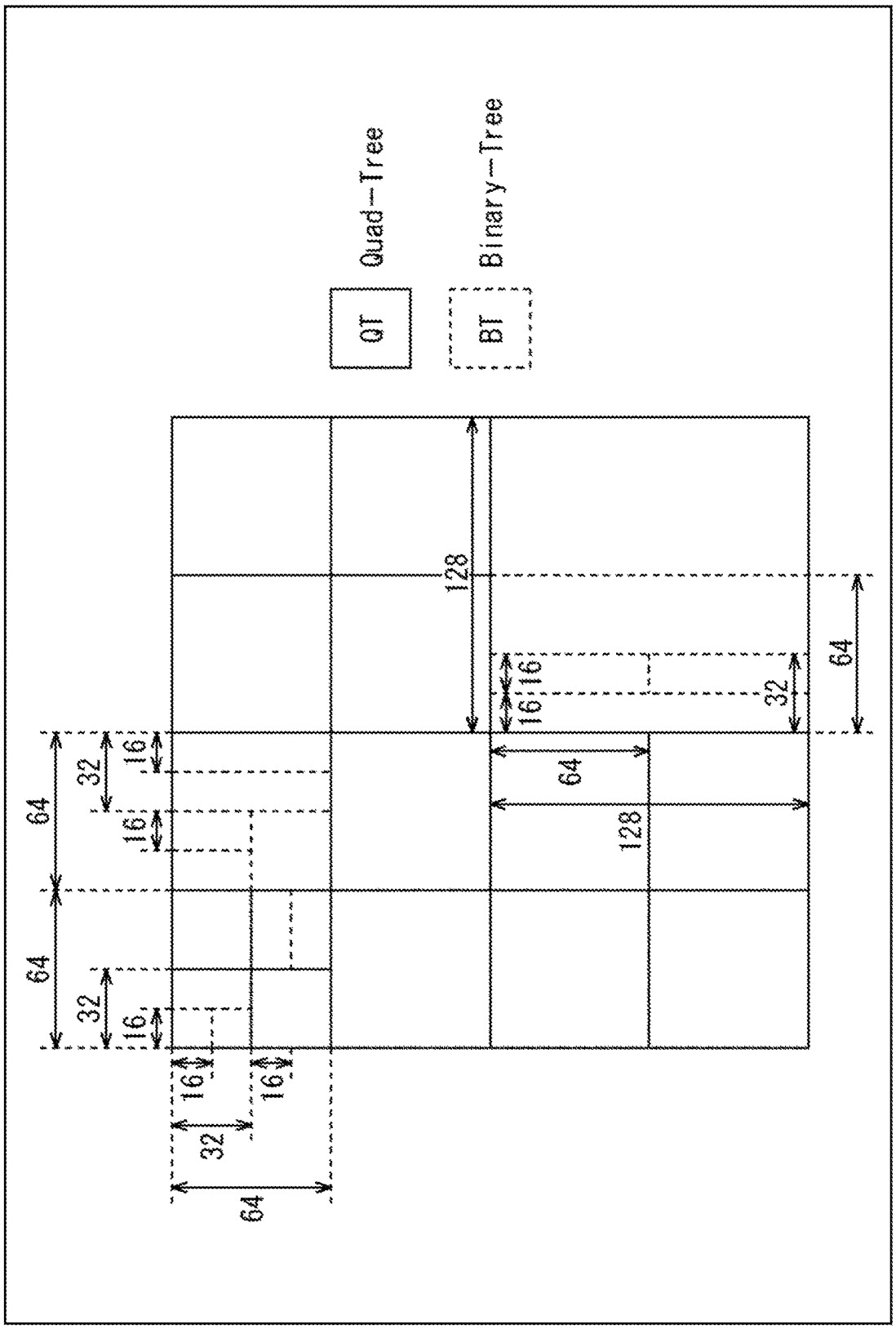
FIG. 30 is a diagram explaining shapes of CU, PU, and TU.

FIG. 30 is a view explaining a shape of the CU, the PU, and the TU in a fourth embodiment.

The CU, PU, and TU in the fourth embodiment are the CU, PU and TU of a QTBT (Quad tree plus binary tree)

described in JVET-C0024, "EE2.1: Quadtree plus binary tree structure integration with JEM tools."

Specifically, in the block partition of the CU in the fourth embodiment, one block can be partitioned not only into the sub-blocks of 4 (=2×2), but also to the sub-blocks of 2 (=1×2, 2×1). That is, in the fourth embodiment, the partition of one block into four or two sub-blocks is recursively repeated, thereby carrying out the block partition of the CU. As a result, the tree structure of the Quad-Tree shape or a Binary-Tree shape of the horizontal direction or the vertical direction is formed.

As a result, it is possible that the shape of the CU is not only a square, but also an oblong. For example, it is possible that in the case where the LCU size is 128×128, the size of the CU (size w of the horizontal direction×size h of the vertical direction), as depicted in FIG. 30 is not only the size of the square such as 128×128, 64×64, 32×32, 16×16, 8×8, or 4×4, but also the size of the oblong such as 128×64, 128×32, 128×16, 128×8, 128×4, 64×128, 32×128, 16×128, 8×128, 4×128, 64×32, 64×16, 64×8, 64×4, 32×64, 16×64, 8×64, 4×64, 32×16, 32×8, 32×4, 16×32, 8×32, 4×32, 16×8, 16×4, 8×16, 4×16, 8×4, or 4×8. In addition, in the fourth embodiment, the PU and the TU are each identical to the CU.

<Image Coding Apparatus>

A fourth embodiment of the image coding apparatus as the image processing apparatus to which the present technique is applied is the same in configuration as the third embodiment except for transformation information Tinfo, a transformation portion, and an inverse transformation portion. Therefore, in the following, only the transformation information Tinfo, the transformation portion, and the inverse transformation portion will be described.

The transformation information Tinfo in the fourth embodiment is the same as the transformation information Tinfo in the third embodiment except that a size TBXSize of a transverse width (a size of the horizontal direction) of the transformation block and a size TBYSize of the longitudinal width (a size of the vertical direction) thereof are included instead of the block size TBSize.

In addition, the inverse transformation carried out by the inverse transformation portion in the fourth embodiment is the inverse processing of the transformation carried out by the transformation portion, and is the processing similar to that of the inverse transformation carried out by an image decoding apparatus which will be described later. Therefore, that inverse transformation will be described in a description relating to the image decoding apparatus later.

<Transformation Portion>

Figure 31:
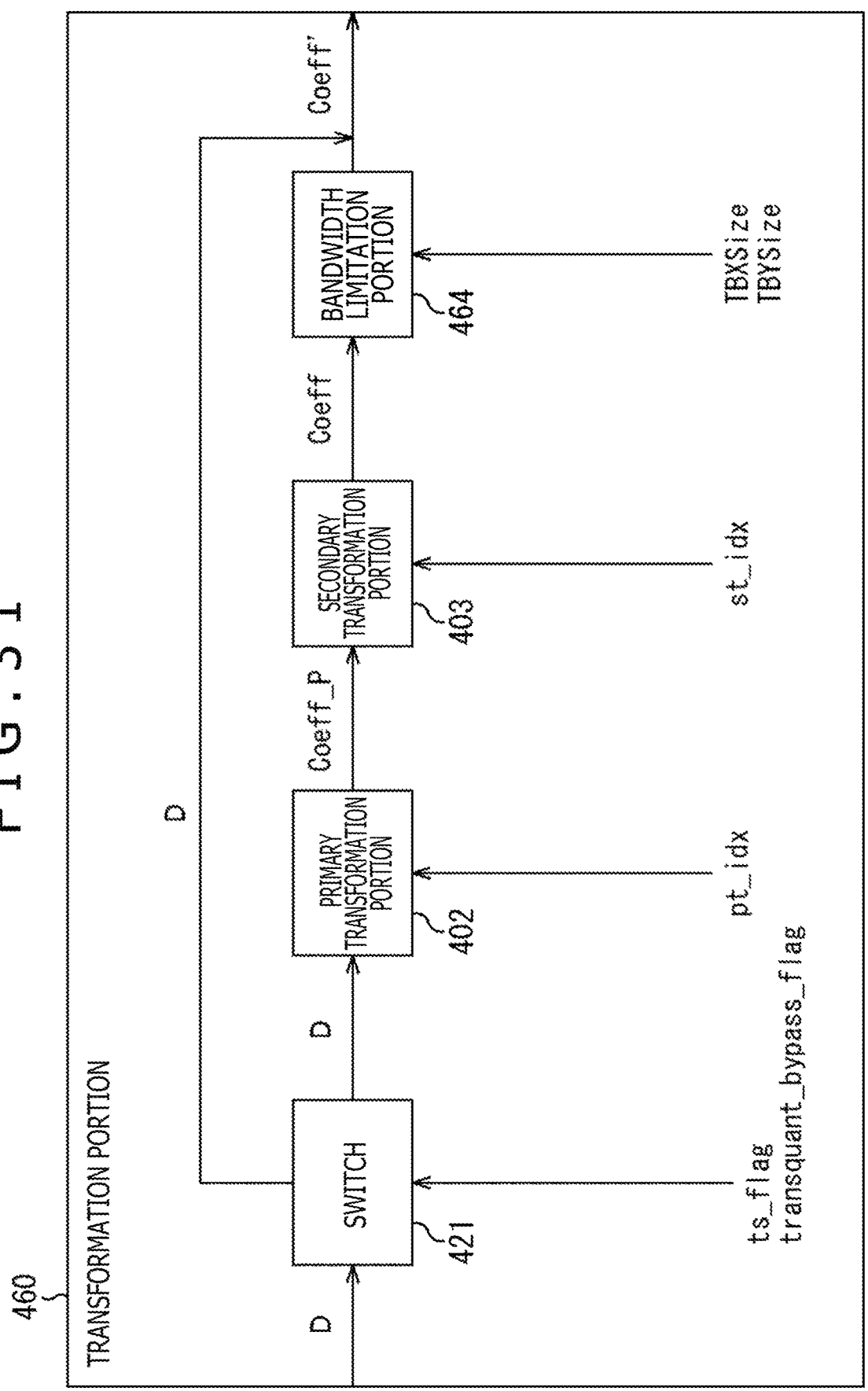
FIG. 31 is a block diagram depicting an example of a main configuration of a transformation portion.

FIG. 31 is a block diagram depicting an example of a main configuration of the transformation portion in the fourth embodiment of the image coding apparatus as the image processing apparatus to which the present technique is applied.

Of constituent elements depicted in FIG. 31, the same constituent elements as those of FIG. 26 are assigned by the same reference signs. A repeated description will be suitably omitted.

The transformation portion 460 of FIG. 31 is different in configuration from the transformation portion 420 of FIG. 26 in that a bandwidth limitation portion 464 is provided instead of the bandwidth limitation portion 404.

The bandwidth limitation portion 464 of the transformation portion 460 carries out the bandwidth limitation for the secondary transformation coefficient Coeff outputted from the secondary transformation portion 403 in such a way that the high-frequency component is made 0 based on the size TBXSize of the horizontal direction and size TBYSize of the vertical direction which are supplied thereto from the control portion 101 to derive the secondary transformation coefficient Coeff' after the bandwidth limitation. The bandwidth limitation portion 464 supplies the secondary transformation coefficient Coeff' after the bandwidth limitation to the quantization portion 113.

Specifically, in the case where larger one max(TBXSize, TBYSize) of the size TBXSize of the horizontal direction and the size TBYSize of the vertical direction is smaller than a predetermined size THSize (max(TBXSize, TBYSize) <THSize), the bandwidth limitation portion 464 does not carry out the bandwidth limitation for the secondary transformation coefficient Coeff, and supplies the secondary transformation coefficient Coeff as the secondary transformation coefficient Coeff' after the bandwidth limitation to the quantization portion 113.

On the other hand, in the case where max(TBXSize, TBYSize) is equal to or larger than the predetermined size THSize (max(TBXSize, TBYSize)>=THSize), the bandwidth limitation portion 464 derives the secondary transformation coefficient Coeff(i, j)' after the bandwidth limitation so as to follow Expression (35) described above every coordinates (i, j) of the pixel unit within the transformation block. That is, in the case where a value of a logical value of the conditional equation max(TBXSize, TBYSize)>=THSize is 1 (true), the bandwidth limitation portion 464 carries out the bandwidth limitation and when max(TBXSize, TBYSize)>=THSize is 0 (false), the bandwidth limitation portion 464 does not carry out the bandwidth limitation.

It should be noted that the bandwidth limitation filter H(i, j) is defined by following Expression (38).

[Math. 9]

$$H(i, j) = \begin{cases} 1 & ((i >> N) < TH \, \&\& \, ((j >> M) < TH) \\ 0 & ((i >> N) \geq TH \, || \, ((j >> M) \geq TH) \end{cases} \quad (38)$$

TH is the threshold value. According to Expression (35) and Expression (38), in the case where the sub-block of $2^N \times 2^M$, as the processing unit within the transformation block in the secondary transformation, including the coordinates (i, j) is the sub-block other than the square-shaped area composed of the sub-block of TH×TH at the upper left, the secondary transformation coefficient Coeff(i, j)' becomes 0. That is, the high-frequency component of the secondary transformation coefficient Coeff(i, j)' becomes 0. The bandwidth limitation portion 464 supplies the secondary transformation coefficient Coeff' after the bandwidth limitation which is derived in the manner as described above to the quantization portion 113.

<Example of Bandwidth Limitation Filter>

Figure 32:
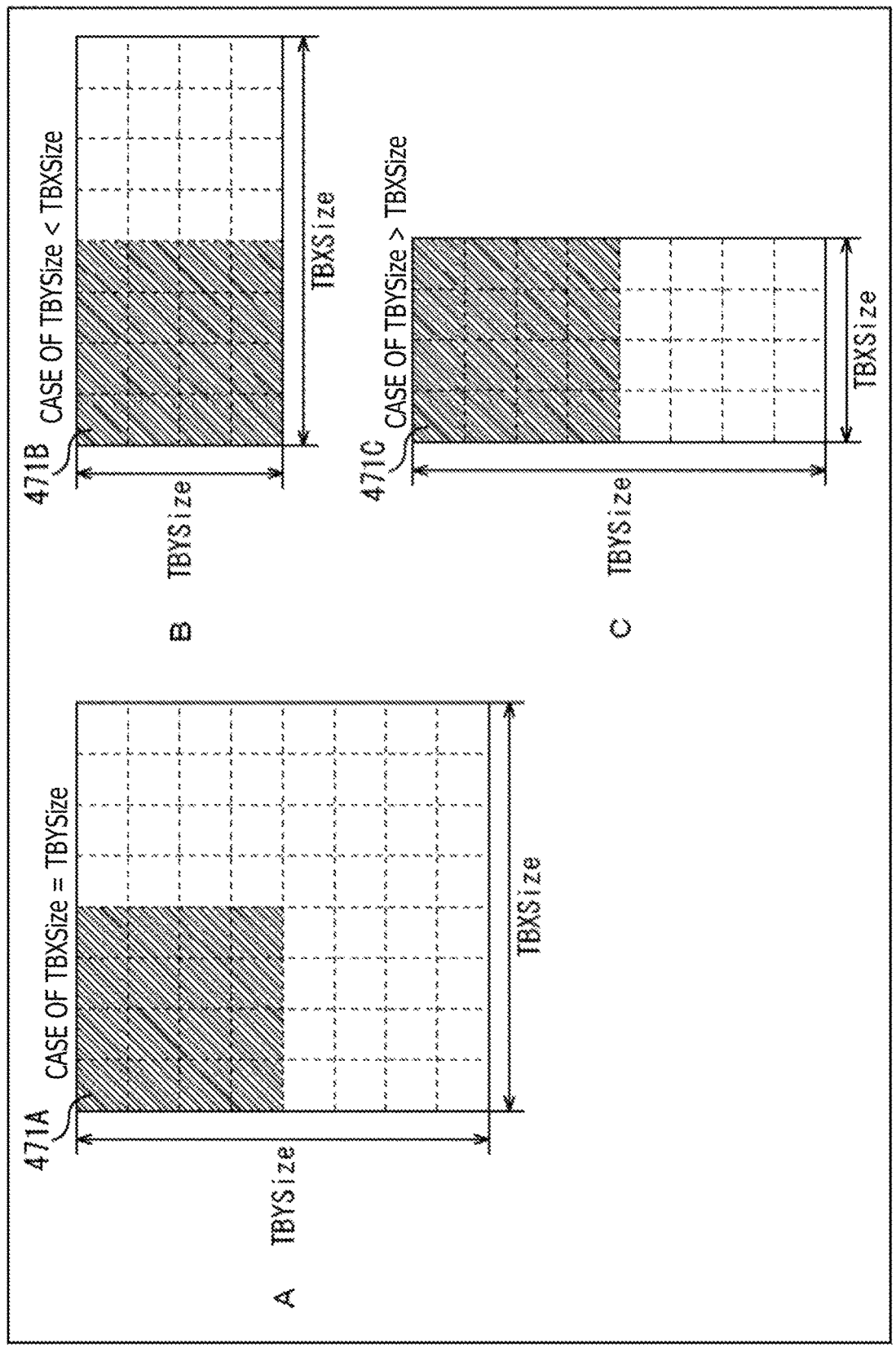
FIG. 32 is a diagram depicting an example of a bandwidth limitation filter.

FIG. 32 is a view depicting an example of the bandwidth limitation filter H(i, j).

In FIG. 32, a rectangle of a solid line indicates the transformation block and a rectangle of a dotted line indicates the sub-block. This also applies to the case of FIG. 36 to FIG. 38 which will be described later. In addition, in the example of FIG. 32, the size of the sub-block is $2^2 \times 2^2$, the size THSize is the size of eight sub-blocks, and the threshold value TH in the bandwidth limitation filter H(i, j) is 4. In addition, A of FIG. 32 depicts an example in which the transformation block size TBXSize×TBYSize has a size (the transformation block size of 32×32) of the sub-block of 8×8.

B of FIG. 32 depicts an example in which the transformation block size TBXSize×TBYSize has a size (the transformation block size of 32×16) of the sub-block of 8×4. In addition, C of FIG. 32 depicts an example in which the transformation block size TBXSize×TBYSize has a size (the transformation block size of 16×32) of the sub-block of 4×8.

In this case, when as depicted in A of FIG. 32, the size TBXSize of the horizontal direction and the size TBYSize of vertical direction are each the size of eight sub-blocks, the bandwidth limitation filter H(i, j) is set. At this time, the bandwidth limitation filter H(i, j) of the coordinates (i, j) included in a sub-block group 471A of 4×4 given an oblique line in the figure at the upper left is 1. The bandwidth limitation filter H(i, j) of the coordinates (i, j) within the sub-block other than the sub-block group 471A is 0.

In addition, even when as depicted in B of FIG. 32, the size TBXSize of the horizontal direction is the size of the eight sub-blocks, and the size TBYSize of the vertical direction is the size of the four sub-blocks smaller than the size TBXSize of the horizontal direction, the bandwidth limitation filter H(i, j) is set. At this time, the bandwidth limitation filter H(i, j) of the coordinates (i, j) included in the sub-block group 471B of 4×4 given an oblique line in the figure on the left-hand side is 1. The bandwidth limitation filter H(i, j) of the coordinates (i, j) within the sub-block other than the sub-block group 471B is 0.

Moreover, even when as depicted in C of FIG. 32, the size TBXSize of the horizontal direction is the size of the four sub-blocks, and the size TBYSize of the vertical direction is the size of the eight sub-blocks larger than the size TBXSize of the horizontal direction, the bandwidth limitation filter H(i, j) is set. At this time, the bandwidth limitation filter H(i, j) of the coordinates (i, j) included in the sub-block group 471C of 4×4 given an oblique line in the figure on the upper side is 1. The bandwidth limitation filter H(i, j) of the coordinates (i, j) within the sub-block other than the sub-block group 471C is 0.

As described above, in the case where max(TBXSize, TBYSize) is equal to or larger than the size THSize, the bandwidth limitation filter H(i, j) is set either to 0 or to 1 in response to the position of the sub-block including the coordinates (i, j).

<Flow of Image Coding Processing>

The image coding processing executed by the fourth embodiment of the image coding apparatus as the image processing apparatus to which the present technique is applied is similar to the case of the image coding processing in the third embodiment except for transformation processing and inverse transformation processing. Since the inverse transformation processing is inverse processing of the transformation processing and is executed similarly to inverse transformation processing which shall be executed in the image decoding processing which will be described later, in this case, only the transformation processing will now be described.

<Flow of Transformation Processing>

Figure 33:
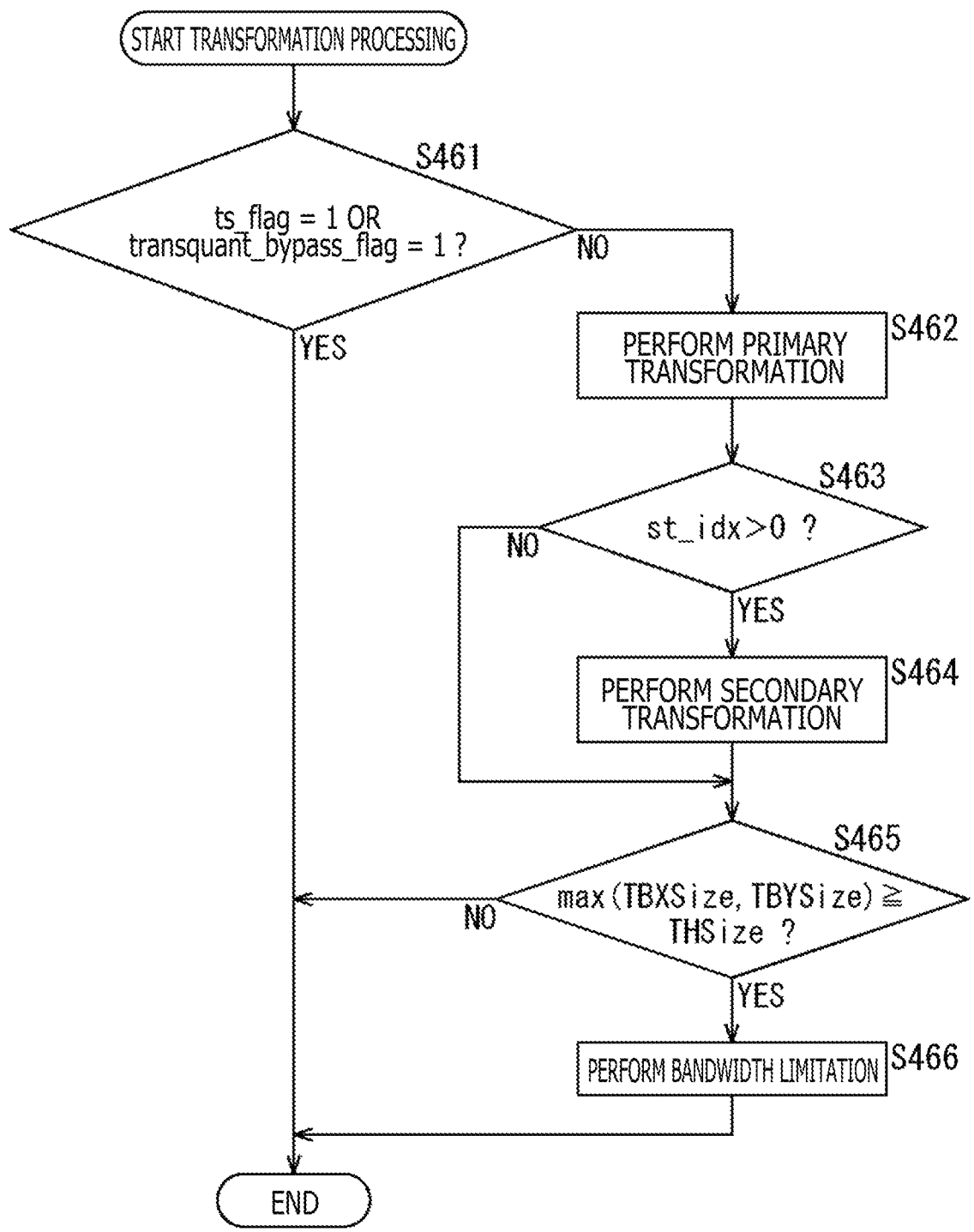
FIG. 33 is a flow chart explaining an example of a flow of transformation processing.

FIG. 33 is a flow chart explaining an example of a flow of the transformation processing which is executed by the fourth embodiment of the image coding apparatus as the image processing apparatus to which the present technique is applied.

Since pieces of processing from Step S461 to Step S464 are similar to those of the processing from Step S401 to Step S404 of FIG. 27, a description thereof is omitted here.

In Step S465, the bandwidth limitation portion 464 decides whether or not max(TBXSize, TBYSize) of the processing target transformation block is equal to or larger than the predetermined size THSize. In the case where it is decided in Step S465 that max(TBXSize, TBYSize) is equal to or larger than the predetermined size THSize, the processing proceeds to Step S466.

In Step S466, the bandwidth limitation portion 464 carries out the bandwidth limitation for the secondary transformation coefficient Coeff by applying the bandwidth limitation filter H defined by Expression (38) described above so as to follow Expression (35) described above to derive the secondary transformation coefficient Coeff' after the bandwidth limitation. Then, the bandwidth limitation portion 464 supplies the secondary transformation coefficient Coeff' after the bandwidth limitation to the quantization portion 113, and the processing is ended.

On the other hand, in the case where it is decided in Step S465 that max(TBXSize, TBYSize) is smaller than the predetermined size THSize, the bandwidth limitation portion 464 skips the processing of Step S466. Then, the bandwidth limitation portion 464 supplies the secondary transformation coefficient Coeff as the secondary transformation coefficient Coeff' after the bandwidth limitation to the quantization portion 113 as it is, and the processing is ended.

It should be noted that for the transformation processing described above, in the feasible range, the pieces of processing of steps may be replaced with one another in order thereof, or the content of the pieces of processing may be changed. For example, in the case where it is decided in Step 3463 that the secondary transformation identifier st_idx is not larger than 0, the unit matrix may be selected as the matrix R of the secondary transformation, and the processing of Step S464 may be executed.

As described above, the bandwidth limitation portion 464 carries out the bandwidth limitation based on the size TBXSize of the horizontal direction and the size TBYSize of the vertical direction of the transformation block. Therefore, even in the case where the shape of the transformation block is oblong, the bandwidth limitation can be suitably carried out.

In addition, the bandwidth limitation portion 464 sets the area in which the secondary transformation coefficient Coeff is made 0 by the bandwidth limitation to an area other than the square area composed of the sub-block of TH×TH. Therefore, even in the case where the shape of the transformation block is oblong, the secondary transformation coefficient Coeff of the area other than the square area having the predetermined size can be made 0.

<Image Decoding Apparatus>

Next, a description will be given with respect to the decoding of the coded data which is obtained through the coding in the manner described above. The fourth embodiment of the image decoding apparatus as the image processing apparatus to which the present technique is applied is the same in configuration as the third embodiment except for the configuration of the transformation information Tinfo and an inverse transformation portion. Since the transformation information Tinfo is described above, in the following, only the inverse transformation portion will be described.

<Inverse Transformation Portion>

Figure 34:
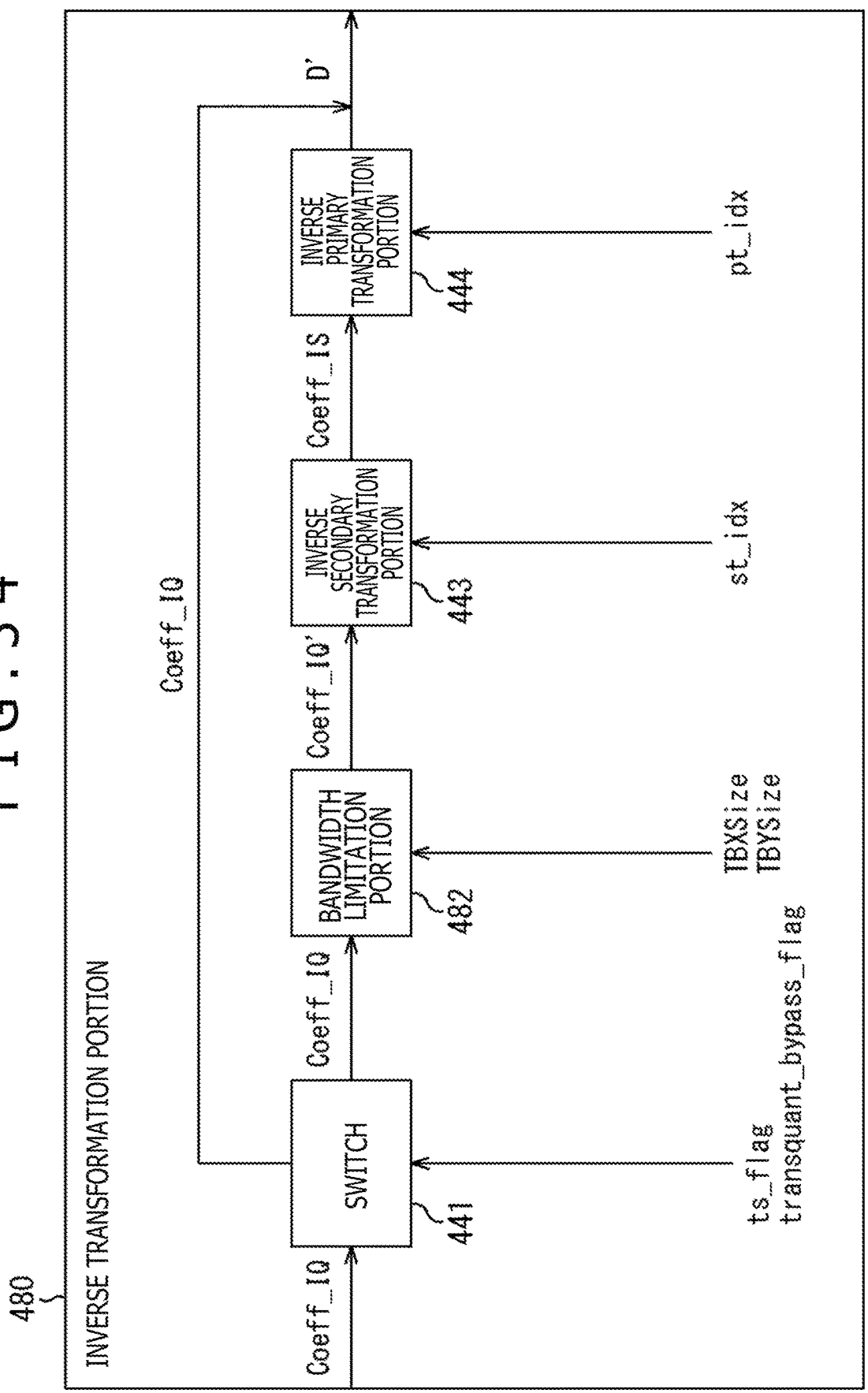
FIG. 34 is a block diagram depicting an example of a main configuration of an inverse transformation portion.

FIG. 34 is a block diagram depicting an example of a main configuration of the inverse transformation portion in the fourth embodiment of the image decoding apparatus as the image processing apparatus to which the present technique is applied.

Of the constituent elements depicted in FIG. 34, the same constituent elements as those of FIG. 28 are assigned the same reference signs. A repeated description will be suitably omitted here.

The inverse transformation portion 480 of FIG. 34 is different in configuration from the inverse transformation portion 440 of FIG. 28 in that a bandwidth limitation portion 482 is provided instead of the bandwidth limitation portion 442.

The bandwidth limitation portion 482 of the inverse transformation portion 480 carries out the bandwidth limitation for the secondary transformation coefficient Coeff_IQ supplied thereto from the switch 441 in such a way that the high-frequency component is made 0 based on the size TBXSize of the horizontal direction and the size TBYSize of the vertical direction of the processing target transformation block supplied thereto from the decoding portion 211 to derive the secondary transformation coefficient Coeff_IQ' after the bandwidth limitation. The bandwidth limitation portion 482 supplies the secondary transformation coefficient Coeff_IQ' after the bandwidth limitation to the inverse secondary transformation portion 443.

Specifically, in the case where max(TBXSize, TBYSize) is smaller than the predetermined size THSize, the bandwidth limitation portion 482 supplies the secondary transformation coefficient Coeff_IQ as the secondary transformation coefficient Coeff_IQ' after the bandwidth limitation to the inverse secondary transformation portion 443 without carrying out the bandwidth limitation for the secondary transformation coefficient Coeff_IQ.

On the other hand, in the case where max(TBXSize, TBYSize) is equal to or larger than the predetermined size THSize, the bandwidth limitation portion 482 applies the bandwidth limitation filter H defined by Expression (38) described above to the secondary transformation coefficient Coeff_IQ so as to follow Expression (37) described above. The bandwidth limitation portion 482 supplies the resulting secondary transformation coefficient Coeff_IQ' after the bandwidth limitation to the inverse secondary transformation portion 443.

<Flow of Image Decoding Processing>

The image decoding processing executed by the fourth embodiment of the image decoding apparatus as the image processing apparatus to which the present technique is applied is similar to the image decoding processing of FIG. 15 except for inverse transformation processing of Step S203. Therefore, in the following, only the inverse transformation processing will now be described.

<Flow of Inverse Transformation Processing>

Figure 35:
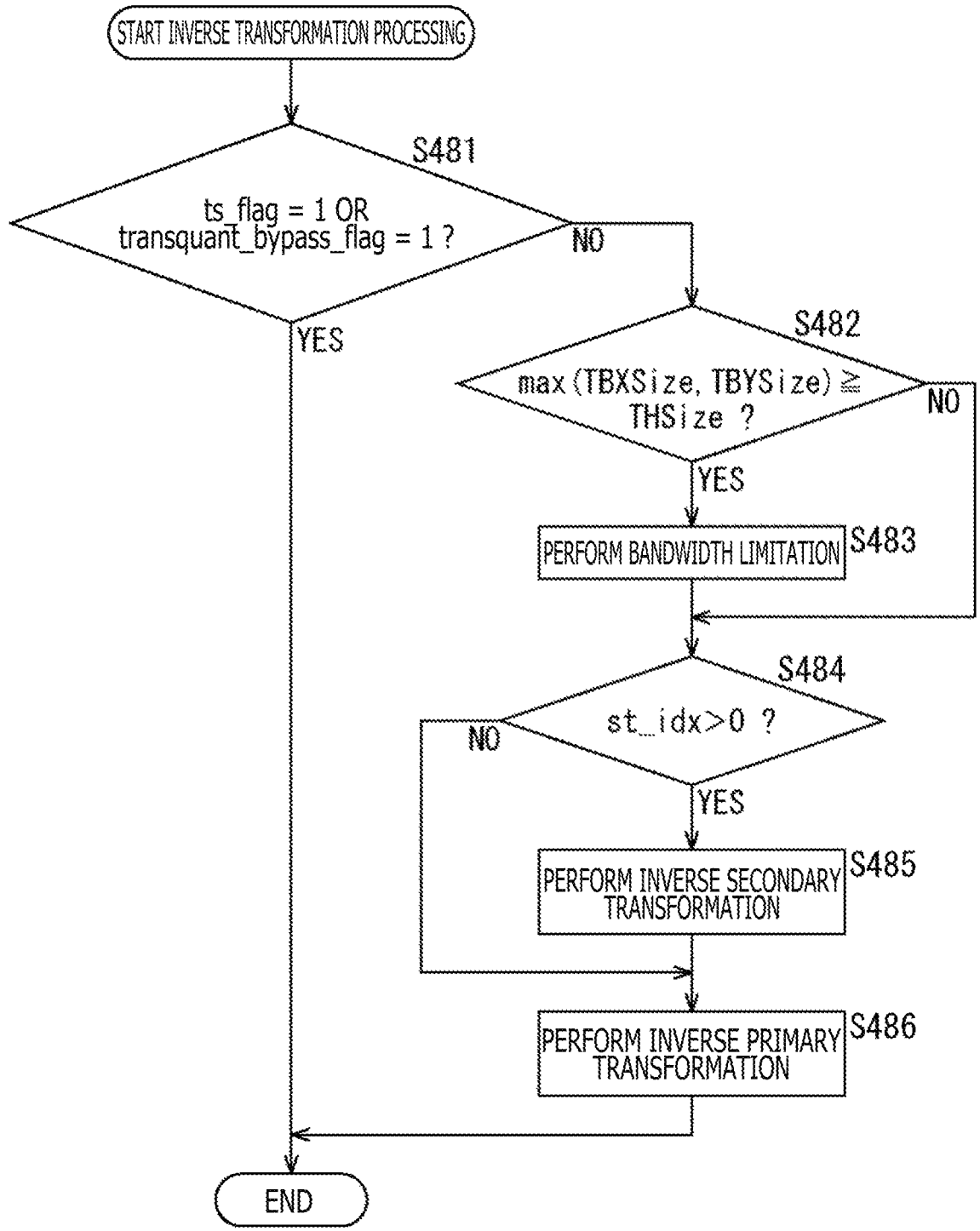
FIG. 35 is a flow chart explaining an example of a flow of inverse transformation processing.

FIG. 35 is a flow chart explaining an example of a flow of the inverse transformation processing which is executed by the fourth embodiment of the image decoding apparatus as the image processing apparatus to which the present technique is applied.

When the inverse transformation processing is started, in Step S481, the switch 441 decides whether or not the transformation skip flag ts_flag or the transformation quantization bypass flag transquant_bypass_flag which is supplied thereto from the decoding portion 211 is 1.

In the case where it is decided in Step S481 that the transformation skip flag ts_flag or the transformation quantization bypass flag transquant_bypass_flag is 1, the switch 441 decides that the bandwidth limitation, the inverse secondary transformation, and the inverse primary transformation are to be skipped. Then, the switch 441 supplies the secondary transformation coefficient Coeff_IQ supplied thereto from the inverse quantization portion 212 as the predictive residue D' to the calculation portion 214 without executing the pieces of processing from Step S482 to Step S486. Then, the processing is ended.

On the other hand, in the case where it is decided in Step S481 that the transformation skip flag ts_flag and the transformation quantization bypass flag transquant_bypass_flag are each 0, the switch 441 decides that the bandwidth limitation, the inverse secondary transformation, and the inverse primary transformation should be carried out. Then, the switch 441 supplies the secondary transformation coefficient Coeff_IQ supplied thereto from the inverse quantization portion 212 to the bandwidth limitation portion 482. Then, the processing proceeds to Step S482.

In Step S482, the bandwidth limitation portion 482 decides whether or not max(TBXSize, TBYSize) is equal to or larger than the predetermined size THSize. In the case where it is decided in Step S482 that max(TBXSize, TBYSize) is equal to or larger than the predetermined size THSize, the processing proceeds to Step S483.

In Step S483, the bandwidth limitation portion 482 carries out the bandwidth limitation for the secondary transformation coefficient Coeff_IQ defined by Expression (38) described above by applying the bandwidth limitation filter H so as to follow Expression (37) described above to derive the secondary transformation coefficient Coeff_IQ' after the bandwidth limitation. Then, the bandwidth limitation portion 464 supplies the secondary transformation coefficient Coeff_IQ' after the bandwidth limitation to the inverse secondary transformation portion 443. Then, the processing proceeds to Step S484.

On the other hand, in the case where it is decided in Step S482 that max(TBXSize, TBYSize) is smaller than the predetermined size THSize, the bandwidth limitation portion 482 skips the processing of Step S483. Then, the bandwidth limitation portion 482 supplies the secondary transformation coefficient Coeff_IQ as the secondary transformation coefficient Coeff_IQ' after the bandwidth limitation to the inverse secondary transformation portion 443 as it is. Then, the processing proceeds to Step S484.

Since pieces of processing from Step S484 to Step S486 are similar to the pieces of processing from Step S424 to Step S426 of FIG. 29, a description thereof is omitted here.

As described above, the bandwidth limitation portion 482 carries out the bandwidth limitation based on the size TBXSize of the horizontal direction and the size TBYSize of the vertical direction of the transformation block. Therefore, even in the case where the shape of the transformation block is oblong, the bandwidth limitation can be suitably carried out.

In addition, the bandwidth limitation portion 482 sets the area in which the secondary transformation coefficient Coeff is made 0 by the bandwidth limitation to an area other than the square area composed of the sub-block of TH×TH. Therefore, even in the case where the shape of the transformation block is oblong, the secondary transformation coefficient Coeff of the area other than the square area having a predetermined size can be made 0.

Incidentally, in the above description, the bandwidth limitation is carried out in the fourth embodiment of the image decoding apparatus. However, in the case where the bit stream restriction that "in the case where max(TBXSize, TBYSize) is equal to or larger than the predetermined size THSize, the non-zero coefficient is limited within the low-frequency area (for example, the area of (THSize>>1)×(THSize>>1) at the upper left" is provided, the bandwidth limitation may not be carried out. The bit stream restriction can also be expressed as "when the transformation skip flag ts_flag and the transformation quantization bypass flag transquant_bypass_flag are each 0, and max(TBXSIze, TBYSize) of the transformation block is equal to or larger than the predetermined size THSize, the values of the last non-zero coefficient X coordinate (last_sig_coeff_x_pos) and the last non-zero coefficient Y coordinate (last_sig_coeff_y_pos) are each a value within the range of 0 to a predetermined value (for example, (THSize/2)−1)."

In addition, the method for the secondary transformation in the fourth embodiment is by no means limited to the method described in NPL 1. For example, the method for the secondary transformation in the fourth embodiment may be the method in the first or second embodiment. In addition, the secondary transformation coefficient may be clipped so as to be limited within the predetermined range.

Moreover, a method of deciding whether or not the bandwidth limitation is carried out is not limited to the method described above as long as it is a method of deciding whether or not a size of a transformation block is equal to or larger than a predetermined size based on the size TBXSize of the horizontal direction (or a logarithmic value log 2TBXSize) and the Size TBYSize of the vertical direction (or a logarithmic value log 2TBYSize).

For example, the bandwidth limitation portion 464 (482) may carry out the bandwidth limitation in the case where max(log 2TBXSize, log 2TBYSize) as larger one of the logarithmic value of the size TBXSize of the horizontal direction and the logarithmic value of the size TBYSize of the vertical direction is equal to or larger than a predetermined threshold value log 2THSize (in the case where a logical value of max(log 2TBXSize, log 2TBYSize)>=log 2THSize) is 1 (true)). In addition, the bandwidth limitation portion 464 (482) may carry out the bandwidth limitation in the case where a sum or a product of the size TBXSize of the horizontal direction and the size TBYSize of the vertical direction is equal to or larger than the predetermined threshold value TH_Size (in the case where the logical value of TBXSize+TBYSize>=TH_Size or TBXSize*TBYSize>=TH_Size is 1 (true)). Moreover, the bandwidth limitation portion 464 (482) may carry out the bandwidth limitation in the case where a sum of a logarithmic value of the size TBXSize of the horizontal direction and a logarithmic value of the size TBYSize of the vertical direction is equal to or larger than a predetermined threshold value log 2THSize (in the case where a logical value of log 2TBXSize+log 2TBYSize>=log 2THSize is 1 (true)). In these cases, when the logical value is 0 (false), the bandwidth limitation is not carried out.

In addition, the bandwidth limitation portion 464 (482) may set the bandwidth limitation filter H(i, j) to 0 or 1 in response to not the position of the sub-block including the coordinates (i, j), but the position of the coordinates (i, j). In this case, the bandwidth limitation filter H(i, j) is defined by following Expression (39).

[Math. 10]

$$H(i, j) = \begin{cases} 1 & (i < TH \,\&\&\, j < TH) \\ 0 & ((i \geq TH \,||\, j \geq TH) \end{cases} \quad (39)$$

<Other Examples of Bandwidth Limitation Filter>

Figure 36:
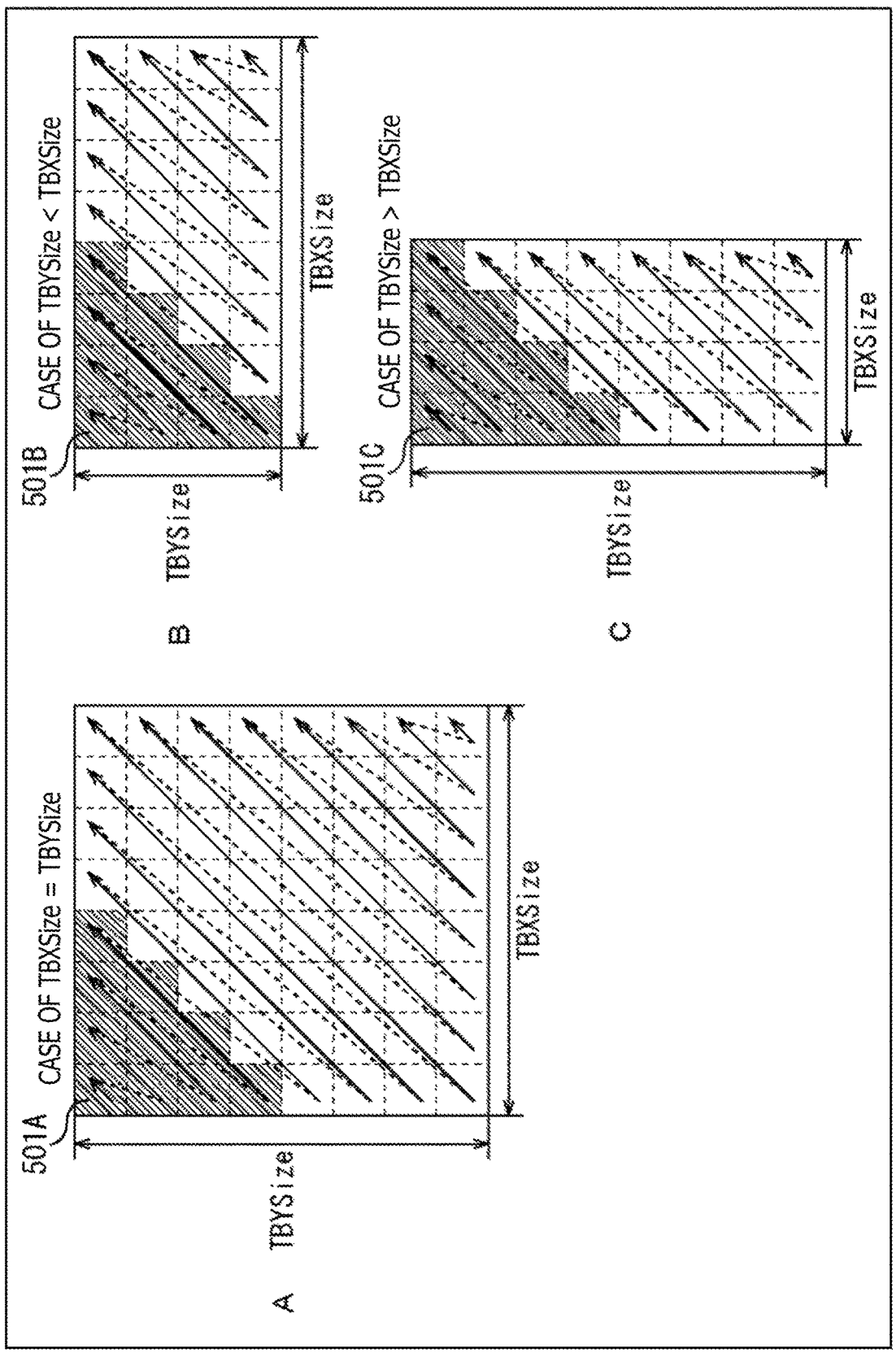
FIG. 36 is a diagram depicting another example of a bandwidth limitation filter.
Figure 37:
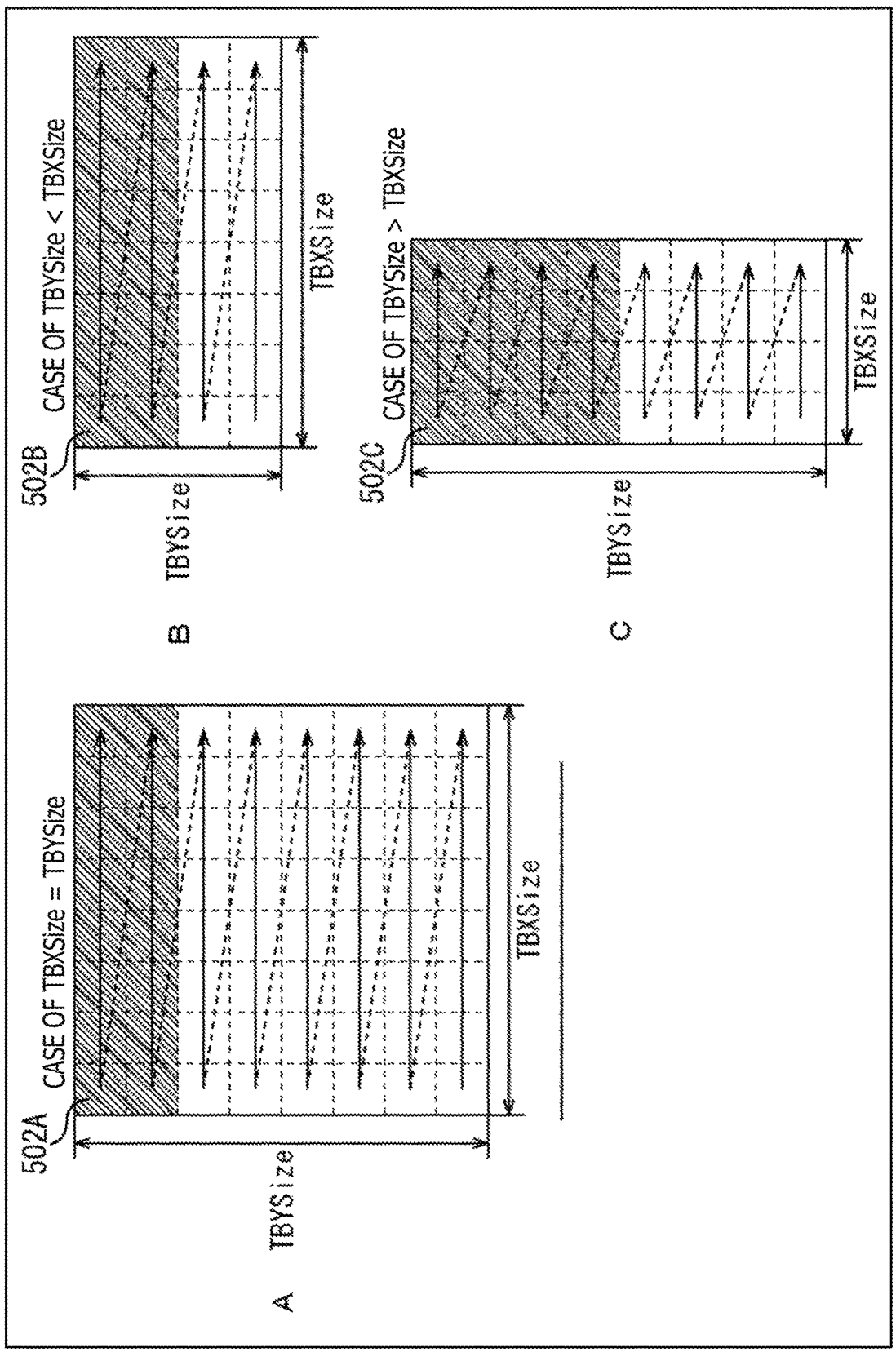
FIG. 37 is a diagram depicting still another example of a bandwidth limitation filter.
Figure 38:
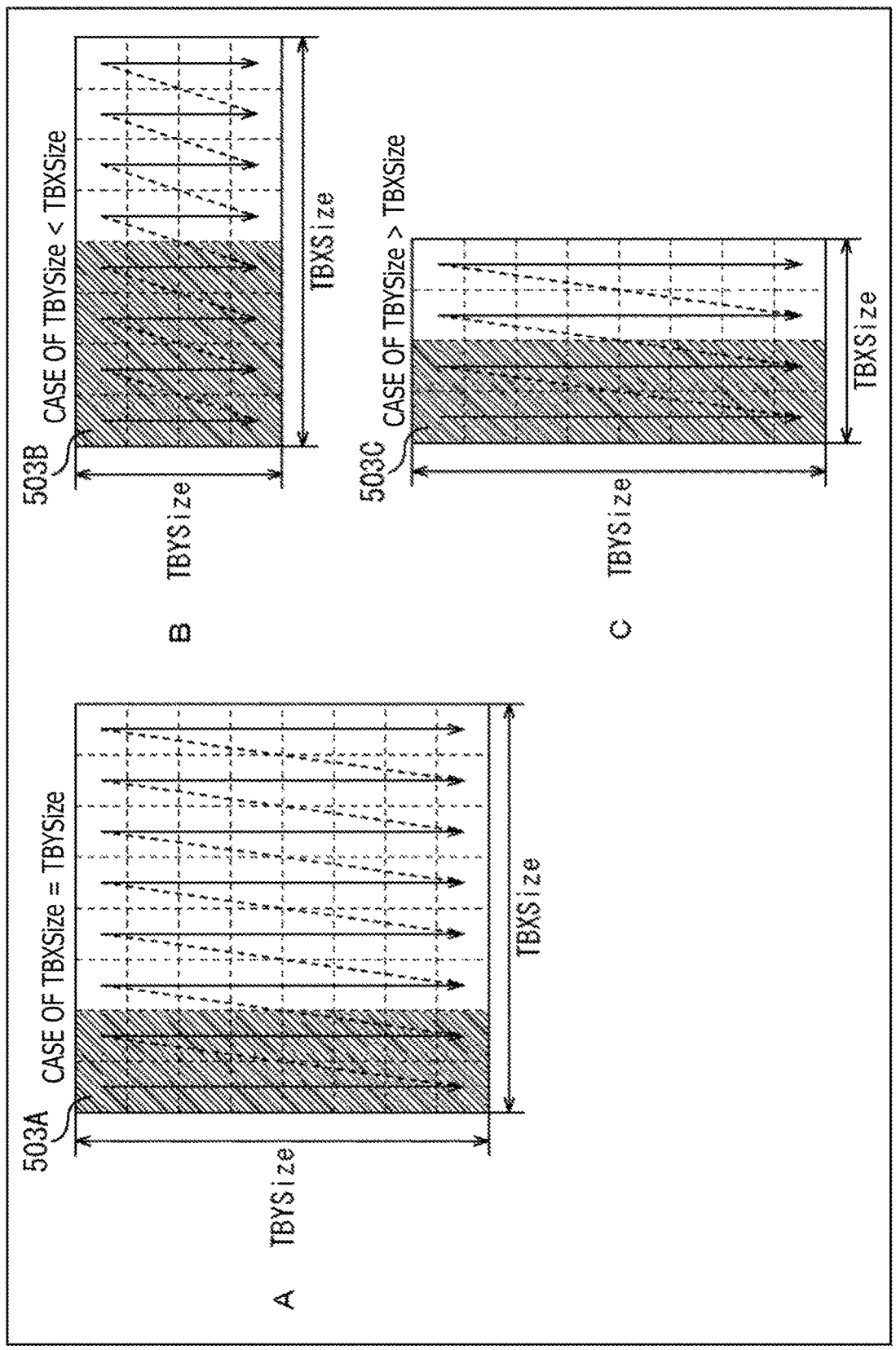
FIG. 38 is a diagram depicting yet another example of a bandwidth limitation filter.

FIG. 36 to FIG. 38 are views depicting other examples of the bandwidth limitation filter H(i, j).

In each of the examples from FIG. 36 to FIG. 38, the bandwidth limitation filter H(i, j) is defined by following Expression (40) based on the processing order (scanning order) sbk_scanorder(i>>N, j>>M) of the sub-blocks including the coordinates (i, j). It should be noted that the scanning order sbk_scanorder (i>>N, j>>M) of the sub-blocks is determined based on the scanning identifier scanIdx and the size of the transformation block.

[Math. 11]

$$H(i, j) = \begin{cases} 1 & (\text{sbk\_scanorder}(i >> N, j >> M) < THscanorder) \\ 0 & (\text{sbk\_scanorder}(i >> N, j >> M) \geq THscanorder) \end{cases} \quad (40)$$

THscanorder is a threshold value. In Expression (40), the threshold value THscanorder, for example, can be made alpha (alpha is a value of 0 to 1) times the total number of the sub-blocks within the transformation block.

According to Expression (35) and Expression (40), in the case where the scanning order sbk_scanorder(i>>N, j>>M) of the sub-blocks of $2^N \times 2^M$ including the coordinates (i, j) is equal to or larger than the threshold value THscanorder, the secondary transformation coefficient Coeff(i, j)' becomes 0. That is, the secondary transformation coefficient Coeff(i, j)' of each of the sub-blocks of the high-frequency components other than THscanorder sub-blocks of which the scanning order is early becomes 0.

In addition, in each of examples from FIG. 36 to FIG. 38, the size of the sub-block is $2^2 \times 2^2$, and the size THSize is the size of eight sub-blocks. Moreover, in the example of FIG. 36, the threshold value THscanorder in the bandwidth limitation filter H(i, j) is 10, and in each of the examples of FIG. 37 and FIG. 38, the threshold value THscanorder in the bandwidth limitation filter H(i, j) is 16. In addition, A of FIG. 36 to A of FIG. 38 each depict an example in which a transformation block size TBXSize×TBYSize is a size (transformation block size of 32×32) composed of the sub-block of 8×8. B of FIG. 36 to B of FIG. 38 each depict an example in which a transformation block size TBXSize× TBYSize is a size (transformation block size of 32×16) composed of the sub-block of 8×4. C of FIG. 36 to C of FIG. 38 each depict an example in which a transformation block size TBXSize×TBYSize is a size (transformation block size of 16×32) composed of the sub-block of 4×8.

In this case, when as depicted in A of FIG. 36 to A of FIG. 38, the size TBXSize of the horizontal direction and the size TBYSize of the vertical direction are each a size of eight sub-blocks, the bandwidth limitation filter H(i, j) is set.

In the case where as depicted in A of FIG. 36, the sub-blocks are scanned in a diagonal direction (up-right diagonal scan), the bandwidth limitation filter H(i, j) of the coordinates (i, j) included in the sub-block group 501A given ten oblique lines in the figure at the upper left is 1, and the bandwidth limitation filter H(i, j) of the coordinates (i, j) within the sub-blocks other than the sub-block group 501A is 0.

In addition, in the case where as depicted in A of FIG. 37, the sub-blocks are scanned in the horizontal direction (horizontal fast scan), the bandwidth limitation filter H(i, j) of the coordinates (i, j) included in the sub-block group 502A given 16 oblique lines in the figure on the upper side is 1, and the bandwidth limitation filter H(i, j) of the coordinates (i, j) within the sub-blocks other than the sub-block group 502A is 0.

In the case where, as depicted in A of FIG. 38, sub-blocks are scanned in the vertical direction (vertical fast scan), the bandwidth limitation filter H(i, j) of the coordinates (i, j)

included in the sub-block group 503A given 16 oblique lines in the figure on the left side is 1, and the bandwidth limitation filter H(i, j) of the coordinates (i, j) within the sub-blocks other than the sub-block group 503A is 0.

In addition, even when as depicted in B of FIG. 36 to B of FIG. 38, the size TBXSize of the horizontal direction is a size of eight sub-blocks, and the size TBYSize of the vertical direction is a size of four sub-blocks smaller than the size TBXSize of the horizontal direction, the bandwidth limitation filter H(i, j) is set.

In the case where as depicted in B of FIG. 36, the sub-blocks are scanned in the diagonal direction, the bandwidth limitation filter H(i, j) of the coordinates (i, j) included in the sub-block group 501B given ten oblique lines in the figure at the upper left is 1, and the bandwidth limitation filter H(i, j) of the coordinates (i, j) within the sub-blocks other than the sub-block group 501B is 0.

In addition, in the case where as depicted in B of FIG. 37, the sub-blocks are scanned in the horizontal direction, the bandwidth limitation filter H(i, j) of the coordinates (i, j) included in the sub-block group 502B given 16 oblique lines in the figure on the upper side is 1, and the bandwidth limitation filter H(i, j) of the coordinates (i, j) within the sub-blocks other than the sub-block group 502B is 0.

In the case where as depicted in B of FIG. 38, the sub-blocks are scanned in the vertical direction, the bandwidth limitation filter H(i, j) of the coordinates (i, j) included in the sub-block group 503B given 16 oblique lines in the figure on the left side is 1, and the bandwidth limitation filter H(i, j) of the coordinates (i, j) within the sub-blocks other than the sub-block group 503B is 0.

Moreover, even when as depicted in C of FIG. 36 to C of FIG. 38, the size TBXSize of the horizontal direction is a size of four sub-blocks, and the size TBYSize of the vertical direction is a size of eight sub-blocks larger than the size TBXSize of the horizontal direction, the bandwidth limitation filter H(i, j) is set.

In the case where as depicted in C of FIG. 36, the sub-blocks are scanned in the diagonal direction, the bandwidth limitation filter H(i, j) of the coordinates (i, j) included in the sub-block group 501C given ten oblique lines in the figure at the upper left is 1, and the bandwidth limitation filter H(i, j) of the coordinates (i, j) within the sub-blocks other than the sub-block group 501C is 0.

In addition, in the case where as depicted in C of FIG. 37, the sub-blocks are scanned in the horizontal direction, the bandwidth limitation filter H(i, j) of the coordinates (i, j) included in the sub-block group 502C given 16 oblique lines in the figure on the upper side is 1, and the bandwidth limitation filter H(i, j) of the coordinates (i, j) within the sub-blocks other than the sub-block group 502C is 0.

In the case where as depicted in C of FIG. 38, the sub-blocks are scanned in the vertical direction, the bandwidth limitation filter H(i, j) of the coordinates (i, j) included in the sub-block group 503C given 16 oblique lines in the figure on the left side is 1, and the bandwidth limitation filter H(i, j) of the coordinates (i, j) within the sub-blocks other than the sub-block group 503C is 0.

As described above, in the examples of FIG. 36 to FIG. 38, in the case where max(TBXSize, TBYSize) is equal to or larger than the size THSize, the bandwidth limitation filter H(i, j) is set either to 0 or to 1 based on the scanning order of the sub-blocks including the coordinates (i, j). It should be noted that although in the examples of FIG. 36 to FIG. 38, the threshold value THscanorder is different between the case where the sub-blocks are scanned in the diagonal direction and the case where the sub-blocks are scanned either in the horizontal direction or in the vertical direction, the threshold value THscanorder in the former case and the threshold value THscanorder in the latter case may be identical to each other.

It should be noted that the bandwidth limitation filter H(i, j) may be defined based on a scanning order coef_scanorder (i, j) of the coordinates (i, j) so as to follow following Expression (41). The scanning order coef_scanorder(i, j) is determined based on the scanning identifier scanIdx and the size of the transformation block.

[Math. 12]

$$H(i, j) = \begin{cases} 1 & (\text{coef\_scanorder}(i, j) < THscanorder) \\ 0 & (\text{coef\_scanorder}(i, j) \geq THscanorder) \end{cases} \quad (41)$$

In Expression (41), the threshold value THscanorder, for example, can be made alpha (alpha is a value of 0 to 1) times the total number (TBXSize×TBYSize) of pixels within the transformation block.

<Another Example of Flow of Transformation Processing/Inverse Transformation Processing>

In the fourth embodiment, the bandwidth limitation may be controlled based on not only the size of the transformation block, but also a bandwidth limitation filter valid flag bandpass_filter_enabled_flag indicating whether or not the bandwidth limitation filter is applied in the case where the size of the transformation block is equal to or larger than the predetermined size of the block. In this case, the control portion 101 causes the bandwidth limitation filter valid flag bandpass_filter_enabled_flag to be included in the coding parameters in units of the SPS, the PPS, the SH, the CU or the like. The bandwidth limitation filter valid flag bandpass_filter_enabled_flag is supplied to the coding portion 114 to be coded and, in addition thereto, is supplied to the bandwidth limitation portion 464 of the transformation portion 460.

Figure 39:
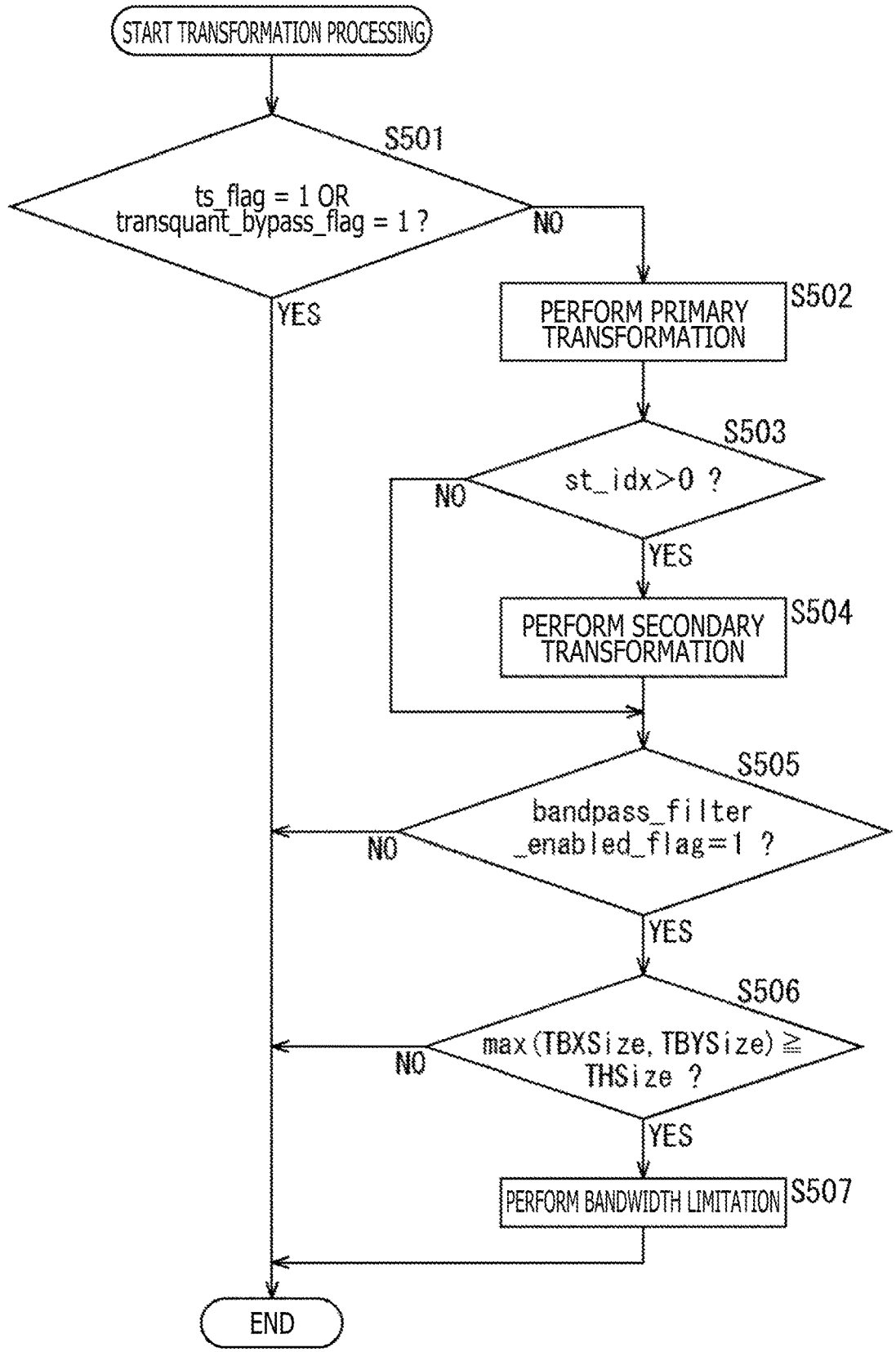
FIG. 39 is a flow chart explaining another example of a flow of transformation processing.

FIG. 39 is a flow chart explaining an example of a flow of transformation processing of the transformation portion 460 in this case.

Since the pieces of processing from Step S501 to Step S504 of FIG. 39 are similar to those of processing from Step S461 to Step 3464 of FIG. 33, a description thereof is omitted here.

In Step 3505, the bandwidth limitation portion 464 decides whether or not the bandwidth limitation filter valid flag bandpass_filter_enabled_flag is 1 (true) indicating that the bandwidth limitation filter is applied in the case where the size of the transformation block is equal to or larger than the predetermined size of the block. In the case where it is decided in Step 3505 that the bandwidth limitation filter valid flag bandpass_filter_enabled_flag is 1, the processing proceeds to Step S506. Since pieces of processing of Step S506 and Step 3507 are similar to those of processing of Step S465 and Step S466 of FIG. 33, a description thereof is omitted here.

On the other hand, in the case where it is decided in Step S505 that the bandwidth limitation filter valid flag bandpass_filter_enabled_flag is 0 (false) indicating that the bandwidth limitation filter is not applied even when the size of the transformation block is equal to or larger than the predetermined size of the block, the transformation processing is ended.

As described above, the bandwidth limitation portion 464 controls whether or not the bandwidth limitation filter for limiting the non-zero coefficient within the low-frequency region is applied in the case where the block size of the rectangular transformation block composed of a square or an oblong is equal to or larger than the predetermined block size based on the bandwidth limitation filter valid flag bandpass_filter_enabled_flag.

Specifically, in the case where the bandwidth limitation filter valid flag bandpass_filter_enabled_flag is 1 (true), when the transformation block size is equal to or larger than the predetermined block size, the bandwidth limitation portion 464 carries out the bandwidth limitation in such a way that the transformation coefficient of the high-frequency component is forcibly made to be 0. Therefore, the coding portion 114 codes only the non-zero coefficient of the low-frequency component of the transformation block. Therefore, the coding processing of the non-zero coefficient can be reduced while the coding efficiency is maintained.

In addition, in the case where the bandwidth limitation filter valid flag bandpass_filter_enabled_flag is 0 (false), even when the transformation block size is equal to or larger than the predetermined block size, the bandwidth limitation portion 464 does not carry out the bandwidth limitation. Therefore, the coding portion 114 codes the non-zero coefficient which is present from the low-frequency component to the high-frequency component. Therefore, in the large transformation block, as compared with the case where the bandwidth limitation filter is applied, the reproducibility of the high-frequency component is increased, and the coding efficiency is enhanced.

Moreover, the bandwidth limitation filter valid flag bandpass_filter_enabled_flag is set for each predetermined unit (such as SPS, PPS, SH, or CU). Therefore, the bandwidth limitation portion 464 can adaptively control for each predetermined unit whether or not the bandwidth limitation filter is applied in the case where the transformation block size is equal or the larger than the predetermined block size by using the bandwidth limitation filter valid flag bandpass_filter_enabled_flag.

In addition, in the fourth embodiment, in the case where the bandwidth limitation is controlled based on not only the transformation block size but also the bandwidth limitation filter valid flag bandpass_filter_enabled_flag, the decoding portion 211 decodes the coded data of the coded parameter including the bandwidth limitation filter valid flag bandpass_filter_enabled_flag in the predetermined unit (such as SPS, PPS, SH or CU). The bandwidth limitation filter valid flag bandpass_filter_enabled_flag obtained as a result of the decoding is supplied to the bandwidth limitation portion 482 of the inverse transformation portion 480.

Figure 40:
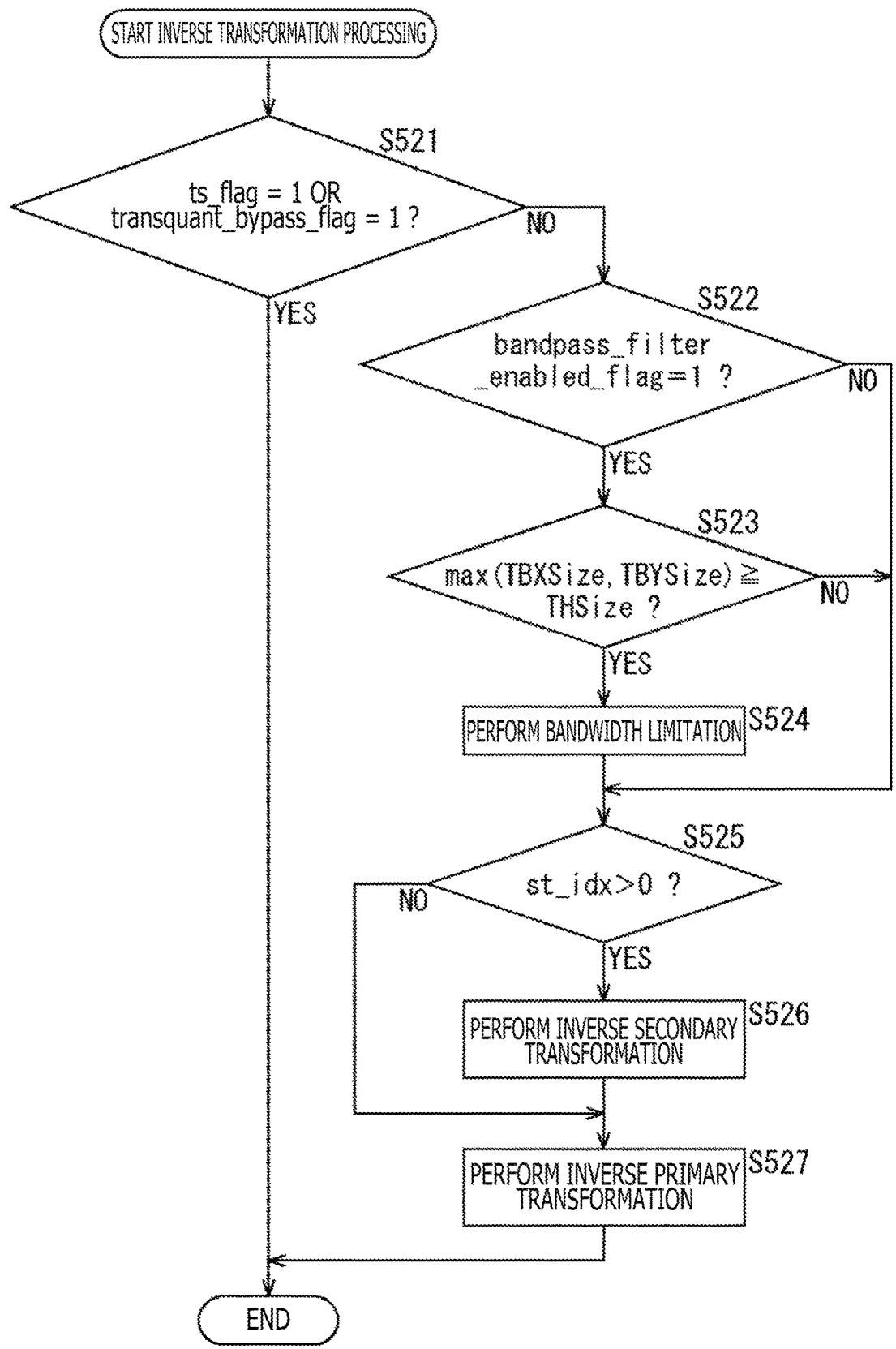
FIG. 40 is a flow chart explaining another example of a flow of inverse transformation processing.

FIG. 40 is a flow chart explaining an example of a flow of the inverse transformation processing of the inverse transformation portion 480 in this case.

In Step S521 of FIG. 40, the switch 441 decides whether or not the transformation skip flag ts_flag or the transformation quantization bypass flag transquant_bypass_flag supplied thereto from the decoding portion 211 is 1.

In the case where it is decided in Step S521 that the transformation skip flag ts_flag or the transformation quantization bypass flag transquant_bypass_flag is 1, the switch 441 decides that the bandwidth limitation, the inverse secondary transformation, and the inverse primary transformation are to be skipped. Then, the switch 441 supplies the secondary transformation coefficient Coeff_IQ supplied thereto from the inverse quantization portion 212 as the predictive residue D' to the calculation portion 214 without executing the pieces of processing from S522 to Step S527. Then, the processing is ended.

On the other hand, in the case where it is decided in Step S521 that the transformation skip flag ts_flag and the transformation quantization bypass flag transquant_bypass_flag are each 0, the switch 441 supplies the secondary transformation coefficient Coeff_IQ supplied thereto from the inverse quantization portion 212 to the bandwidth limitation portion 482. Then, the processing proceeds to Step S522.

In Step S522, the bandwidth limitation portion 482 decides whether or not the value of the bandwidth limitation filter valid flag bandpass_filter_enabled_flag is 1 (true). In the case where it is decided in Step S522 that the value of the bandwidth limitation filter valid flag is 1 (true), the processing proceeds to Step S523. Since the pieces of processing from Step S523 to Step S527 are similar to those of processing from Step S482 to Step S486 of FIG. 35, a description thereof is omitted here.

In the case where it is decided in Step S522 that the value of the bandwidth limitation filter valid flag is 0 (false), the processing skips the pieces of processing of Step S523 and Step 3524, and proceeds to Step S525.

As described above, the bandwidth limitation portion 482 controls whether or not the bandwidth limitation filter for limiting the non-zero coefficient within the low-frequency region is applied in the case where the block size of the rectangular transformation block having the shape of square or oblong is equal to or larger than the predetermined block size based on the bandwidth limitation filter valid flag bandpass_filter_enabled_flag.

Specifically, in the case where the bandwidth limitation filter valid flag bandpass_filter_enabled_flag is 1 (true), when the transformation block size is equal to or larger than the predetermined block size, the bandwidth limitation portion 482 carries out the bandwidth limitation in such a way that the transformation coefficient of the high-frequency component is forcibly made to be 0. Therefore, the calculation portion 214 decodes only the non-zero coefficient of the low-frequency component of the transformation block. Therefore, the decoding processing for the non-zero coefficient can be reduced while the coding efficiency is maintained. In addition, since it is only necessary that the inverse transformation portion 213 executes the processing of the inverse transformation only for the non-zero coefficient of the low-frequency component of the transformation block, an amount of processing of the inverse transformation can be reduced. Therefore, the calculation complexity and the mounting cost of the image decoding apparatus can be reduced as compared with the case where the image coding apparatus does not carry out the bandwidth limitation.

In addition, in the case where the bandwidth limitation filter valid flag bandpass_filter_enabled_flag is 0 (false), even when the transformation block is equal to or larger than the predetermined block size, the bandwidth limitation portion 482 does not carry out the bandwidth limitation. Therefore, the calculation portion 214 decodes the non-zero coefficient which is present from the low-frequency component to the high-frequency component. Therefore, in the large transformation block, as compared with the case where the bandwidth limitation filter is applied, the reproducibility of the high-frequency component is increased, and the image quality of the decoded image is enhanced.

Moreover, the bandwidth limitation filter valid flag bandpass_filter_enabled_flag is set for each predetermined unit (such as SPS, PPS, SH, or CU). Therefore, the bandwidth limitation portion 482 can adaptively control for each predetermined unit whether or not the bandwidth limitation filter is applied in the case where the transformation block size is equal or the larger than the predetermined block size by using the bandwidth limitation filter valid flag bandpass_filter_enabled_flag.

Incidentally, in the examples of FIG. 39 and FIG. 40, it is decided whether or not the transformation block size is equal to or larger than the predetermined block size depending on whether or not max(TBXSize, TBYSize) is equal to or larger than the predetermined size THSize. However, the decision may also be carried out by using any of the other methods described above.

In addition, in the third embodiment as well, similarly to the case of the fourth embodiment, the bandwidth limitation may be controlled based on not only the transformation block size but also the bandwidth limitation filter valid flag bandpass_filter_enabled_flag.

5. Fifth Embodiment

<Data Unit of Information>

The data unit with which the information associated with the image described above and the information associated with coding/decoding of the image are set (or the data unit of the target data) is arbitrary, and is by no means limited to the example described above. For example, these pieces of information may be set for each TU, TB, PU, PB, CU, LCU, sub-block, block, tile, slice, picture, sequence or component, or these pieces of data of the data units may be made the target. Needless to say, the data unit is set for each piece of information. In a word, all the pieces of information may not be set (or may not be made the target) for each data unit. It should be noted that the storage place of these pieces of information is arbitrary, and thus these pieces of information may be stored in the header of the data unit described above, the parameter set or the like. In addition, these pieces of information may also be stored in a plurality of places.

<Control Information>

The control information associated with the present technique which has been described in the embodiments described above may be transmitted from the coding side to the decoding side. For example, control information (for example, enabled_flag) used to control whether or not the application of the present technique described above is permitted (or prohibited) may be transmitted. In addition, for example, the control information used to specify an upper limit or a lower limit of the block size with which the application of the present technique described above is permitted (or prohibited) or both the upper limit and the lower limit may be transmitted.

<Coding/Decoding>

The present technique can be applied to the coding/decoding of an arbitrary image for which the primary transformation and the secondary transformation (the inverse secondary transformation and the inverse primary transformation) are carried out. In a word, the specification of the transformation (inverse transformation), the quantization (inverse quantization), the coding (decoding), the prediction, and the like is arbitrary, and is by no means limited to the examples described above. For example, the (inverse) transformations (that is, three or more (inverse) transformations) other than the (inverse) primary transformation and the (inverse) secondary transformation may be carried out in the transformation (inverse transformation). In addition, the coding (decoding) may adopt a reversible system, or an irreversible system. Moreover, the quantization (inverse quantization), the prediction, and the like may be omitted. In addition, processing such as filter processing which has not been described above may be executed.

<Application Field of Present Technique>

The system, the apparatus, the processing portion or the like to which the present technique is applied can be utilized in an arbitrary field such as traffic, medical care, crime prevention, agriculture, animal husbandry, mining industry, beauty, factory, consumer electronics, weather, or natural surveillance.

For example, the present technique can also be applied to a system or a device for transmitting an image used for appreciation. In addition, for example, the present technique can also be applied to a system or a device used for traffic. Moreover, for example, the present technique can also be applied to a system or a device used for security. In addition, for example, the present technique can also be applied to a system or a device used for sports. Moreover, for example, the present technique can also be applied to a system or a device used for agriculture. In addition, for example, the present technique can also be applied to a system or a device used for animal husbandry. Moreover, the present technique can also be applied to a system or a device for monitoring a natural state of a volcano, a forest, the ocean, and the like. In addition, the present technique, for example, can be applied to a weather observation system or a weather observation apparatus for observing the weather, temperature, humidity, wind speed, day length or the like. Furthermore, the present technique, for example, can also be applied to a system, a device or the like for observing the ecology of the wildlife such as birds, fishes, reptiles, amphibians, mammalians, insects, or plants.

<Application to Multi-View Image Coding/Decoding System>

The series of processing described above can be applied to a multi-view image coding/decoding system for coding/decoding a multi-view image including an image of a plurality of views. In this case, it is only necessary that in coding/decoding of each of the views, the present technique is applied.

<Application to Layer Image Coding/Decoding System>

In addition, the series of processing described above can be applied to layer image coding (scalable coding)/decoding system for coding/decoding a layer image which is formed into a plurality of layers (hierarchized) so as to have a scalability function with respect to a predetermined parameter. In this case, it is only necessary that in coding/decoding of each of the layers, the present technique is applied.

<Computer>

The series of processing described above can be executed by hardware, or can be executed by software. In the case where the series of processing are executed by the software, a program composing the software is installed in a computer. Here, the computer includes a computer incorporated in a dedicated hardware, a computer which can carry out various kinds of functions by installing various kinds of programs, for example, a general-purpose personal computer, and the like.

Figure 41:
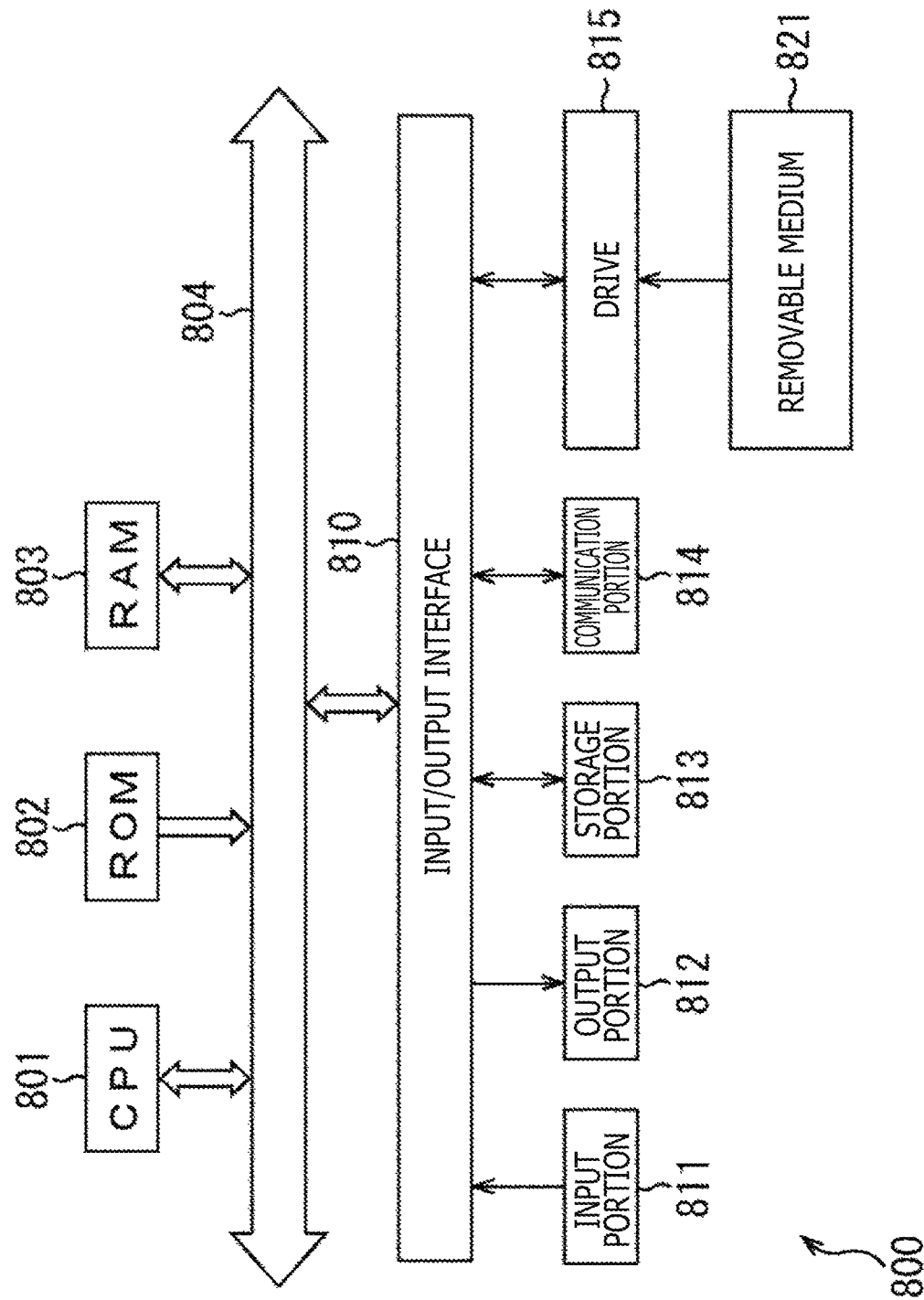
FIG. 41 is a block diagram depicting an example of a main configuration of a computer.

FIG. 41 is a block diagram depicting an example of a configuration of hardware of a computer which executes the series of processing in accordance with a program.

In a computer 800 depicted in FIG. 41, a Central Processing Unit (CPU) 801, a Read Only Memory (ROM) 802, a Random Access Memory (RAM) 803 are connected to one another through a bus 804.

The bus 804 is also connected to an input/output interface 810. An input portion 811, an output portion 812, a storage portion 813, a communication portion 814, and a drive 815 are connected to the input/output interface 810.

The input portion 811, for example, includes a keyboard, a mouse, a microphone, a touch panel, an input terminal or the like. The output portion 812, for example, includes a display, a speaker, an output terminal or the like. The storage portion 813, for example, includes a hard disc, a RAM disc, a non-volatile memory or the like. The communication portion 814, for example, includes a network interface. The drive 815 drives a removable medium 821 such as a magnetic disc, an optical disc, a magneto-optical disc or a semiconductor memory.

In the computer configured in the manner as described above, the CPU 801, for example, loads a program stored in the storage portion 813 into the RAM 803 through the input/output interface 810 and the bus 804, and executes the program, thereby executing the series of processing described above. Data or the like which is necessary to execute the various kinds of processing by the CPU 801 is also suitably stored in the RAM 803.

The program which is to be executed by the computer (CPU 801), for example, can be recorded in the removable medium 821 as a package medium or the like to be applied. In this case, the drive 815 is equipped with the removable medium 821, thereby enabling the program to be installed in the storage portion 813 through the input/output interface 810.

In addition, that program can be provided through a wired or wireless transmission medium such as a local area network, the Internet, or digital satellite broadcasting. In this case, the program can be received at the communication portion 814 and can be installed in the storage portion 813.

In addition thereto, the program can also be previously installed in the ROM 802 or the storage portion 813.

<Application of Present Technique>

The image coding apparatus 100 and the image decoding apparatus 200 according to the embodiments described above, for example, can be applied to various electronic apparatuses such as a transmission apparatus or a reception apparatus in delivery of satellite broadcasting, cable broadcasting such as cable TV, or the Internet, and delivery to a terminal by cellular communication, or a recording apparatus for recording an image in a medium such as an optical disc, a magnetic disc and a flash memory, or a reproducing apparatus for reproducing the image from these recording media.

First Application Example: Television Receiver

Figure 42:
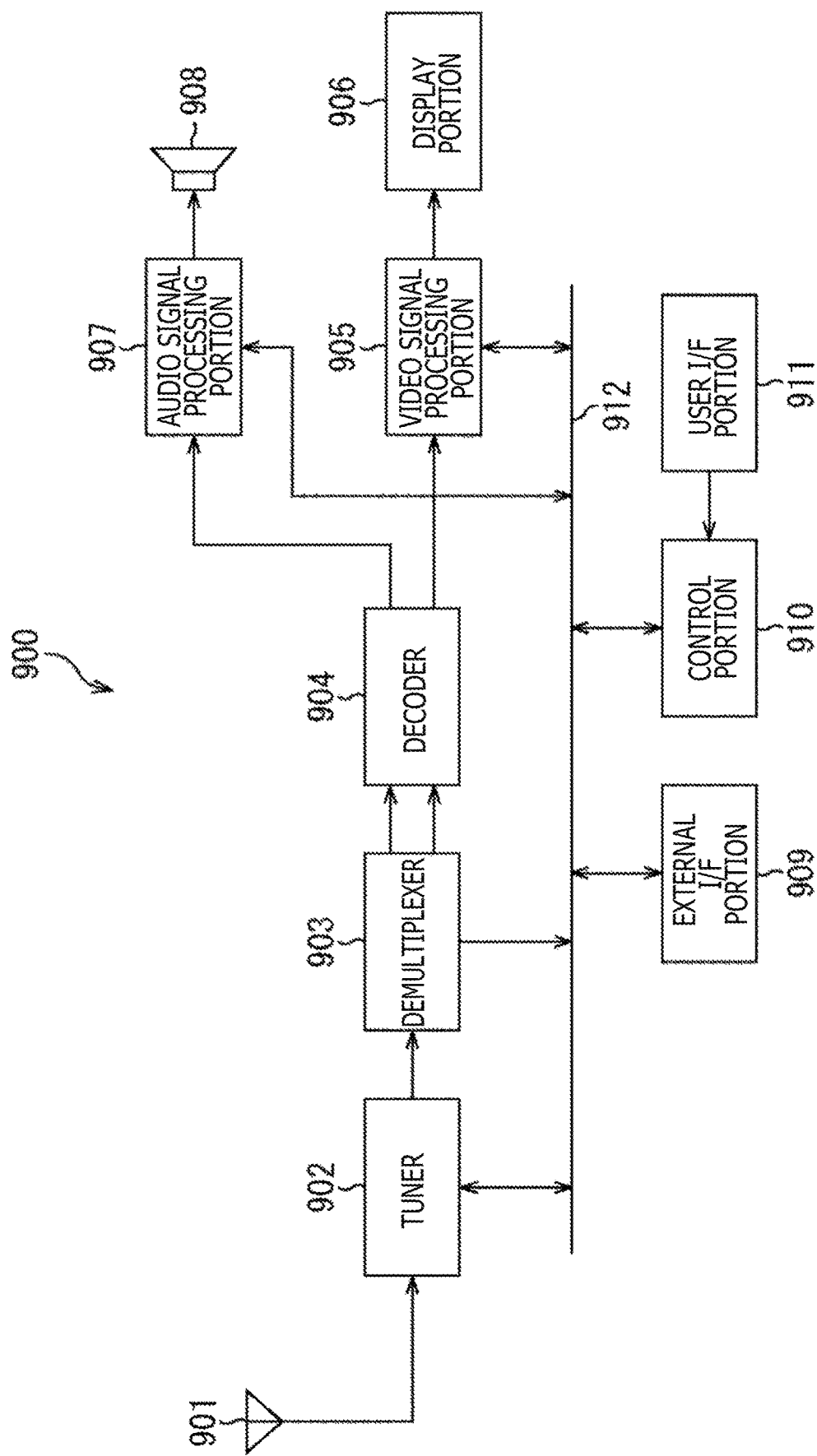
FIG. 42 is a block diagram depicting an example of a schematic configuration of a television apparatus.

FIG. 42 depicts an example of a schematic configuration of a television apparatus to which suitable one of the embodiments described above is applied. The television apparatus 900 includes an antenna 901, a tuner 902, a demultiplexer 903, a decoder 904, a video signal processing portion 905, a display portion 906, an audio signal processing portion 907, a speaker 908, an external interface (I/F) portion 909, a control portion 910, a user interface (I/F) portion 911, and a bus 912.

The tuner 902 extracts a signal of a desired channel from the broadcasting signal received through the antenna 901, and demodulates the extracted signal. Then, the tuner 902 outputs a coded bit stream obtained through the demodulation to the demultiplexer 903. That is, the tuner 902 has a role as a transmission portion in the television apparatus 900 for receiving the coded stream in which the image is coded.

The demultiplexer 903 separates a video stream and an audio stream of a program of a viewing target from the coded bit stream, and outputs the video stream and the audio stream which are obtained through the separation to the decoder 904. In addition, the demultiplexer 903 extracts auxiliary data such as Electronic Program Guide (EPG) from the coded bit stream, and supplies the data thus extracted to the control portion 910. It should be noted that in the case where the coded bit stream is scrambled, the demultiplexer 903 may carry out the descrambling.

The decoder 904 decodes the video stream and the audio stream which are inputted thereto from the demultiplexer 903. Then, the decoder 904 outputs the video data produced through the decoding processing to the video signal processing portion 905. In addition, the decoder 904 outputs the audio data produced through the decoding processing to the audio signal processing portion 907.

The video signal processing portion 905 reproduces the video data inputted thereto from the decoder 904, and causes the display portion 906 to display thereon the video. In addition, the video signal processing portion 905 may cause the display portion 906 to display thereon an application image screen supplied through a network. In addition, the video signal processing portion 905 may execute additional processing such as noise removal for the video data in response to the setting. Moreover, the video signal processing portion 905, for example, may produce an image of a Graphical User Interface (GUI) such as a menu, a button, or a cursor, and may superimpose the image thus produced on the output image.

The display portion 906 is driven in accordance with a drive signal supplied thereto from the video signal processing portion 905 to display thereon a video or an image on a video surface of a display device (for example, a liquid crystal display, a plasma display, an Organic ElectroLuminescence Display (OELD) or the like).

The audio signal processing portion 907 executes reproducing processing such as D/A conversion and amplification for the audio data inputted thereto from the decoder 904, and causes the speaker 908 to output the sound. In addition, the audio signal processing portion 907 may execute additional processing such as the noise removal for the audio data.

The external interface portion 909 is an interface through which the television apparatus 900 and an external apparatus or a network are connected to each other. For example, the video stream or the audio stream which is received through the external interface portion 909 may be decoded by the decoder 904. That is, the external interface portion 909 also has the role as the transmission portion in the television apparatus 900 which receives the coded stream in which the image is coded.

The control portion 910 has a processor such as a CPU, and memories such as a RAM and a ROM. The memory stores therein the program which is to be executed by the CPU, program data, EPG data, data acquired through the network, and the like. The program stored in the memory, for example, is read out by the CPU at the time of activation of the television apparatus 900 to be executed. By executing the program, the CPU controls an operation of the television apparatus 900 in accordance with a manipulation signal, for example, inputted thereto from the user interface portion 911.

The user interface portion 911 is connected to the control portion 910. The user interface portion 911, for example, has a button and a switch with which a user manipulates the television apparatus 900, a reception portion configured to receive a remote control signal, and the like. The user interface portion 911 detects a manipulation by the user through these constituent elements to produce a manipulation signal, and outputs the manipulation signal thus produced to the control portion 910.

The tuner 902, the demultiplexer 903, the decoder 904, the video signal processing portion 905, the audio signal processing portion 907, the external interface portion 909, and the control portion 910 are connected to one another through the bus 912.

In the television apparatus 900 configured in such a manner, the decoder 904 may have a function of the image decoding apparatus 200 described above. In a word, the decoder 904 may decode the coded data in accordance with suitable one of the methods described in the embodiments described above. By adopting such a procedure, the television apparatus 900 can offer the effects similar to those of the embodiments described above by referring to FIG. 1 to FIG. 23.

In addition, in the television apparatus 900 configured in such a manner, the video signal processing portion 905, for example, may code the image data supplied thereto from the decoder 904, and may be able to output the resulting coded data to the outside of the television apparatus 900 through the external interface portion 909. Then, the video signal processing portion 905 may have a function of the image coding apparatus 100 described above. In a word, the video signal processing portion 905 may code the image data supplied thereto from the decoder 904 in accordance with suitable one of the methods described in the embodiments described above. By adopting such a procedure, the television apparatus 900 can offer the effects similar to those of the embodiments described above by referring to FIG. 1 to FIG. 23.

Second Application Example: Portable Telephone

Figure 43:
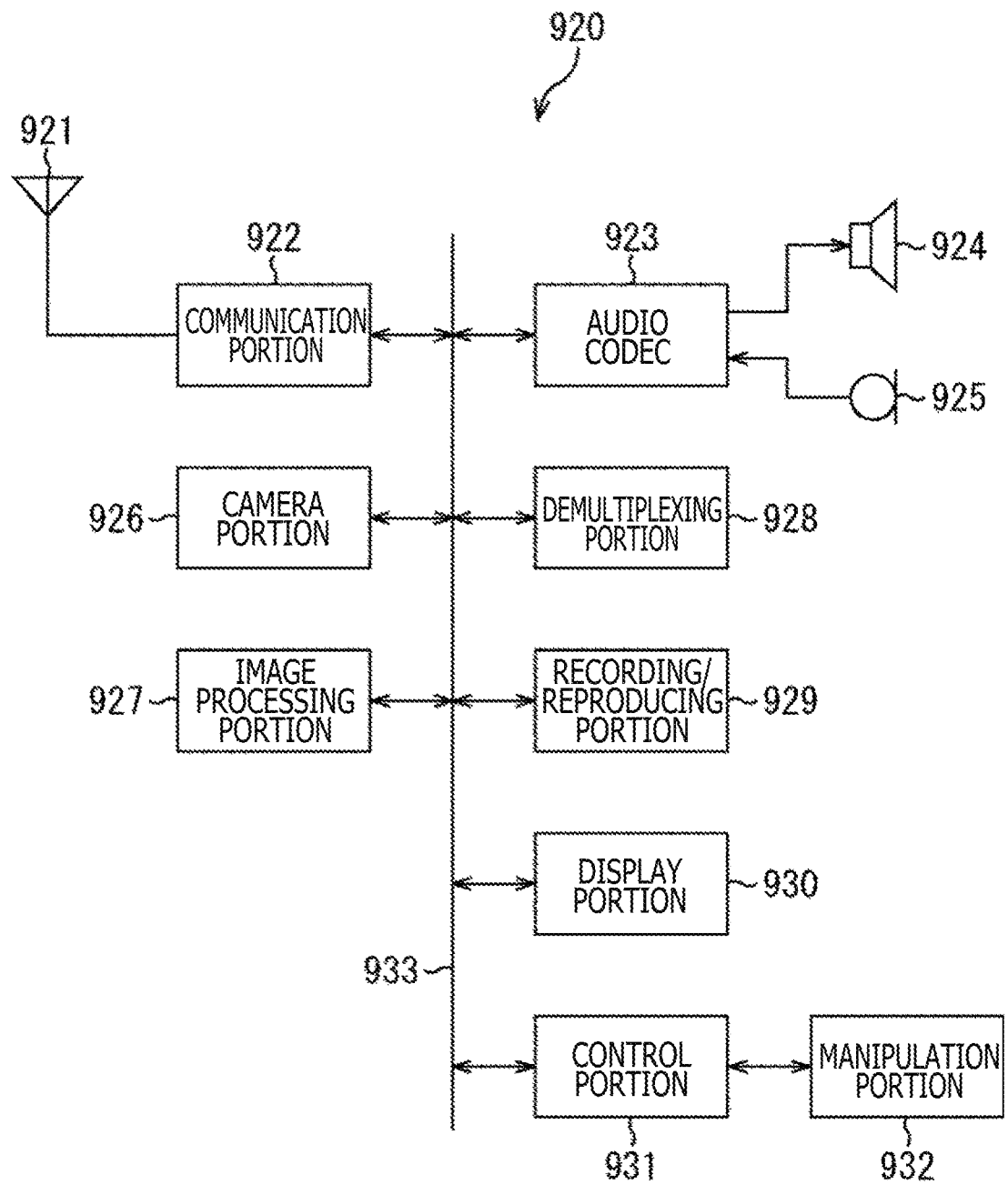
FIG. 43 is a block diagram depicting an example of a schematic configuration of a mobile phone.

FIG. 43 depicts an example of a schematic configuration of a portable telephone to which suitable one of the embodiments described above is applied. The portable telephone 920 includes an antenna 921, a communication portion 922, an audio codec 923, a speaker 924, a microphone 925, a camera portion 926, an image processing portion 927, a demultiplexing portion 928, a recording/reproducing portion 929, a display portion 930, a control portion 931, a manipulation portion 932, and a bus 933.

The antenna 921 is connected to the communication portion 922. The speaker 924 and the microphone 925 are connected to the audio codec 923. The manipulation portion 932 is connected to the control portion 931. The communication portion 922, the audio codec 923, the camera portion 926, the image processing portion 927, the demultiplexing portion 928, the recording/reproducing portion 929, the display portion 930, and the control portion 931 are connected to one another through the bus 933.

The portable telephone 920 carries out the operations such as the transmission/reception of the audio signal, the transmission/reception of an e-mail or image data, the image capturing of an image, and the recording of data in various operation modes including an audio telephone call mode, a data communication mode, an image capturing mode, and a TV phone mode.

In the audio telephone call mode, an analog audio signal produced by the microphone 925 is supplied to the audio codec 923. The audio codec 923 converts the analog audio signal into the audio data, and A/D-converts and compresses the resulting audio data. Then, the audio codec 923 outputs the audio data after the compression to the communication portion 922. The communication portion 922 codes and modulates the audio data to produce a transmission signal. Then, the communication portion 922 transmits the resulting transmission signal to a base station (not depicted) through the antenna 921. In addition, the communication portion 922 amplifies and frequency-converts the wireless signal received through the antenna 921 to acquire a received signal. Then, the communication portion 922 modulates and decodes the received signal to produce the audio data, and outputs the resulting audio data to the audio codec 923. The audio codec 923 expands and D/A-converts the audio data to produce an analog audio signal. Then, the audio codec 923 supplies the resulting audio signal to the speaker 924 which is in turn caused to output the sound.

In addition, in the data communication mode, for example, the control portion 931 produces character data composing the e-mail in response to a manipulation made by the user through the manipulation portion 932. In addition, the control portion 931 causes the display portion 930 to display thereon characters. In addition, the control portion 931 produces e-mail data in response to a transmission instruction issued from the user through the manipulation portion 932, and outputs the resulting e-mail data to the communication portion 922. The communication portion 922 codes and modulates the e-mail data to produce a transmission signal. Then, the communication portion 922 transmits the resulting transmission signal to the base station (not depicted) through the antenna 921. In addition, the communication portion 922 amplifies and frequency-converts the wireless signal received through the antenna 921 to acquire the received signal. Then, the communication portion 922 demodulates and decodes the received signal to restore the e-mail data, and outputs the resulting e-mail data to the control portion 931. The control portion 931 causes the display portion 930 to display thereon the content of the e-mail, and supplies the e-mail data to the recording/reproducing portion 929 to cause the recording/reproducing portion 929 to write the e-mail data to the storage medium.

The recording/reproducing portion 929 has a readable and writable arbitrary recording medium. For example, the storage medium may be a built-in recording medium such as a RAM or a flash memory, or may be an external-mounted storage medium such as a hard disc, a magnetic disc, a magneto-optical disc, an optical disc, a Universal Serial Bus (USB) memory, or a memory card.

In addition, in the photographing mode, for example, the camera portion 926 images a subject to produce image data, and outputs the resulting image data to the image processing portion 927. The image processing portion 927 codes an image data inputted thereto from the camera portion 926, and supplies the coded stream to the recording/reproducing portion 929 to cause the recording/reproducing portion 929 to write the coded stream to the storage medium thereof.

Moreover, in the image display mode, the recording/reproducing portion 929 reads out the coded stream recorded in the storage medium, and outputs the coded stream thus read out to the image processing portion 927. The image processing portion 927 decodes the coded stream inputted thereto from the recording/reproducing portion 929, and supplies the image data to the display portion 930 to cause the display portion 930 to display thereon the image.

In addition, in the TV phone mode, for example, the demultiplexing portion 928 multiplexes the video stream coded by the image processing portion 927 and the audio stream inputted thereto from the audio codec 923, and outputs the stream obtained through the multiplexing to the communication portion 922. The communication portion 922 codes and modulates the stream to produce a transmission signal. Then, the communication portion 922 transmits the resulting transmission signal to the base station (not depicted) through the antenna 921. In addition, the communication portion 922 amplifies and frequency-converts the wireless signal received through the antenna 921 to acquire the reception signal. The coded bit stream may be included in the transmission signal and the reception signal. Then, the communication portion 922 demodulates and decodes the reception signal to restore the stream, and outputs the restored stream to the demultiplexing portion 928. The demultiplexing portion 928 separates the video stream and the audio stream from the inputted stream, and outputs the video stream and the audio stream to the image processing portion 927 and the audio codec 923, respectively. The image processing portion 927 decodes the video stream to produce a video data. The resulting video data is supplied to the display portion 930, and the display portion 930 displays thereon a series of images. The audio codec 923 expands and D/A-converts the audio stream to produce an analog audio signal. Then, the audio codec 923 supplies the resulting audio signal to the speaker 924 to cause the speaker 924 to output the sound.

In the portable telephone 920 configured in such a manner, for example, the image processing portion 927 may have the function of the image coding apparatus 100 described above. In a word, the image processing portion 927 may code the image data in accordance with suitable one of the methods described in the embodiments described above. By adopting such a procedure, the portable telephone 920 can offer the effects similar to those of the embodiments described with reference to FIG. 1 to FIG. 23.

In addition, in the portable telephone 920 configured in such a manner, for example, the image processing portion 927 may have the function of the image decoding apparatus 200 described above. In a word, the image processing portion 927 may decode the coded data in accordance with suitable one of the methods described in the above embodiments. By adopting such a procedure, the portable telephone 920 can offer the effects similar to those of the embodiments described with reference to FIG. 1 to FIG. 23.

Third Application Example: Recording/Reproducing Apparatus

Figure 44:
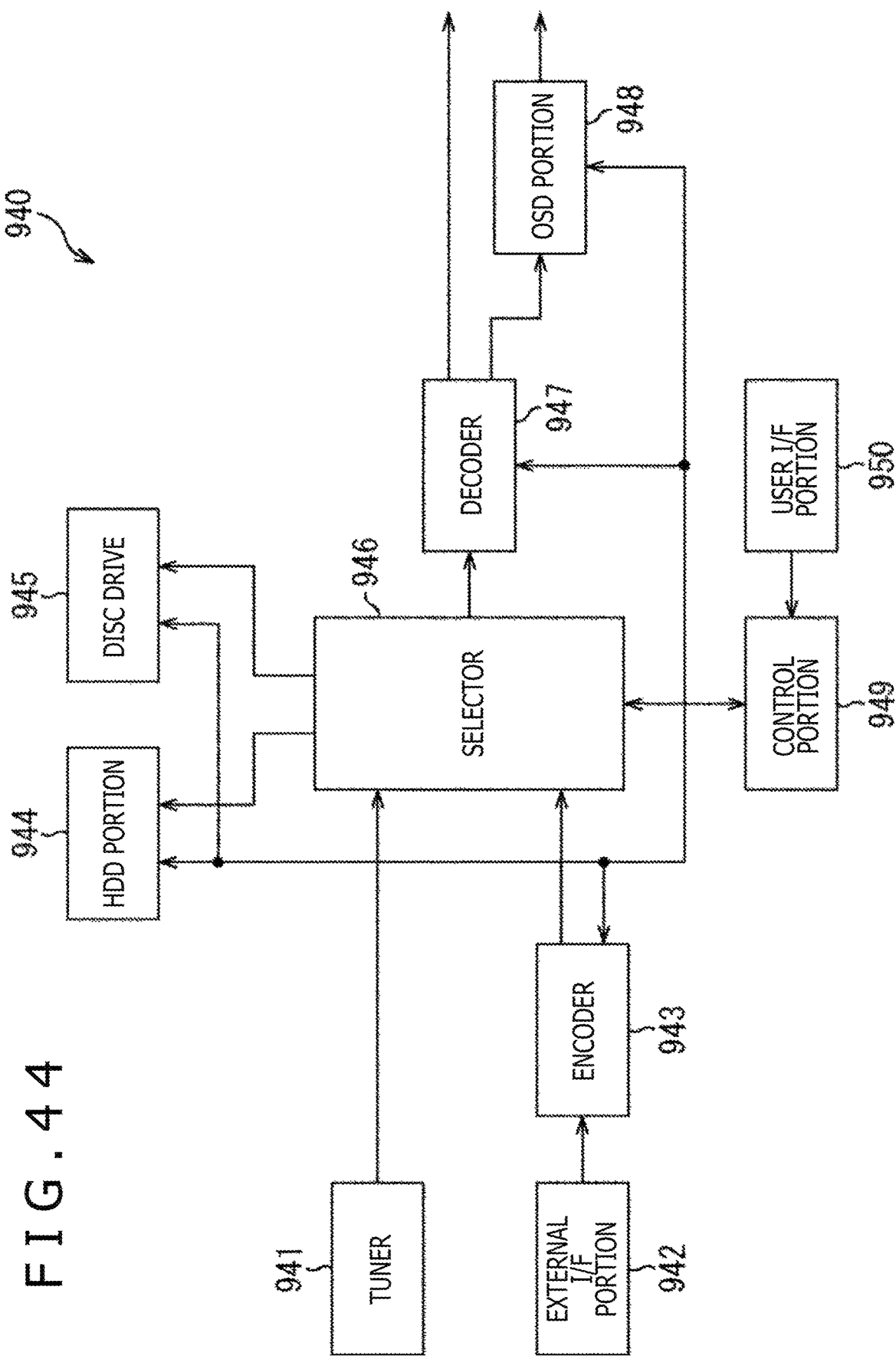
FIG. 44 is a block diagram depicting an example of a schematic configuration of a recording/reproducing apparatus.

FIG. 44 depicts an example of a schematic configuration of a recording/reproducing apparatus to which suitable one of the embodiments described above is applied. The recording/reproducing apparatus 940, for example, codes the audio data and video data of a received broadcasting program, and records the coded data in a recording medium. In addition, the recording/reproducing apparatus 940, for example, may code the audio data and the video data which are acquired from other apparatus, and may record the coded data in the recording medium. In addition, the recording/reproducing apparatus 940, for example, reproduces the data recorded in the recording medium on a monitor and a speaker in accordance with an instruction of the user. At this time, the recording/reproducing apparatus 940 decodes the audio data and the video data.

The recording/reproducing apparatus 940 includes a tuner 941, an external interface (I/F) portion 942, an encoder 943, a Hard Disc Drive (HDD) portion 944, a disc drive 945, a selector 946, a decoder 947, an On-Screen Display (OSD) portion 948, a control portion 949, and a user interface (I/F) portion 950.

The tuner 941 extracts a signal of a desired channel from a broadcasting signal received through an antenna (not depicted), and demodulates the extracted signal. Then, the tuner 941 outputs a coded bit stream obtained through the demodulation to the selector 946. That is, the tuner 941 has a role as a transmission portion in the recording/reproducing apparatus 940.

The external interface portion 942 is an interface through which the recording/reproducing apparatus 940 and an external apparatus or a network are connected to each other. The external interface portion 942, for example, may be an Institute of Electrical and Electronic Engineers (IEEE) 1394 interface, a network interface, a USB interface, or a flash memory interface, or the like. For example, the video data and the audio data which are received through the external interface portion 942 are inputted to the encoder 943. That is, the external interface portion 942 has the role as the transmission portion in the recording/reproducing apparatus 940.

In the case where the video data and the audio data which are inputted from the external interface portion 942 are not coded, the encoder 943 codes the video data and the audio data. Then, the encoder 943 outputs the coded bit stream to the selector 946.

The HDD portion 944 records coded bit stream obtained by compressing data associated with content such as video and audio, various kinds of programs, and other data in an internal hard disc. In addition, the HDD portion 944, at the time of reproduction of the video and the audio, reads out these pieces of data from the hard disc.

The disc drive 945 carries out the recording and reading out of the data in and from the mounted recording medium. The recording medium mounted on the disc drive 945, for example, may be a Digital Versatile Disc (DVD), a disc (DVD-Video, or DVD-Random Access Memory (DVD-RAM), a DVD-Recordable (DVD-R), a DVD-Rewritable (DVD-RW), a DVD+Recordable (DVD+R), a DVD+Rewritable (DVD+RW) or the like), Blu-ray (registered trademark) disc or the like.

The selector 946, at the time of recording of the video and the audio, selects the coded bit stream inputted thereto from either the tuner 941 or the encoder 943, and outputs the coded bit stream thus selected to either the HDD 944 or the disc drive 945. In addition, the selector 946, at the time of reproduction of the video and the audio, outputs the coded bit stream inputted thereto from either the HDD 944 or the disc drive 945 to the decoder 947.

The decoder 947 decodes the coded bit stream to produce the video data and the audio data. Then, the decoder 947 outputs the resulting video data to the OSD portion 948. In addition, the decoder 947 outputs the resulting audio data to an external speaker.

The OSD portion 948 reproduces the video data inputted thereto from the decoder 947 to display the resulting video. In addition, the OSD portion 948, for example, may superimpose an image of GUI such as a menu, a button or a cursor on the displayed video.

The control portion 949 has a processor such as a CPU, and memories such as a RAM and a ROM. The memory stores therein a program which is to be executed by the CPU, program data and the like. The program stored in the memory, for example, is read out by the CPU at the time of activation of the recording/reproducing apparatus 940 to be executed. By executing the program, the CPU, for example, controls an operation of the recording/reproducing apparatus 940 in response to a manipulation signal inputted thereto from the user interface portion 950.

The user interface portion 950 is connected to the control portion 949. The user interface portion 950, for example, has a button and a switch for manipulating the recording/reproducing apparatus 940 by the user, a reception portion of a remote control signal, and the like. The user interface portion 950 detects the manipulation by the user through these constituent elements to produce a manipulation signal, and outputs the resulting manipulation signal to the control portion 949.

In the recording/reproducing apparatus 940 configured in such a manner, for example, the encoder 943 may have the function of the image coding apparatus 100 described above. In a word, the encoder 943 may code the image data in accordance with the suitable one of the methods in the embodiments described above. By adopting such a procedure, the recording/reproducing apparatus 940 can offer the effects similar to those of the embodiments described with reference to FIG. 1 to FIG. 23.

In addition, in the recording/reproducing apparatus 940 configured in such a manner, for example, the decoder 947 may have the function of the image decoding apparatus 200 described above. In a word, the decoder 947 may decode the coded data in accordance with suitable one of the methods described in the above embodiments. By adopting such a procedure, the recording/reproducing apparatus 940 can offer the effects similar to those of the embodiments described with reference to FIG. 1 to FIG. 23.

Fourth Application Example: Image Pickup Apparatus

Figure 45:
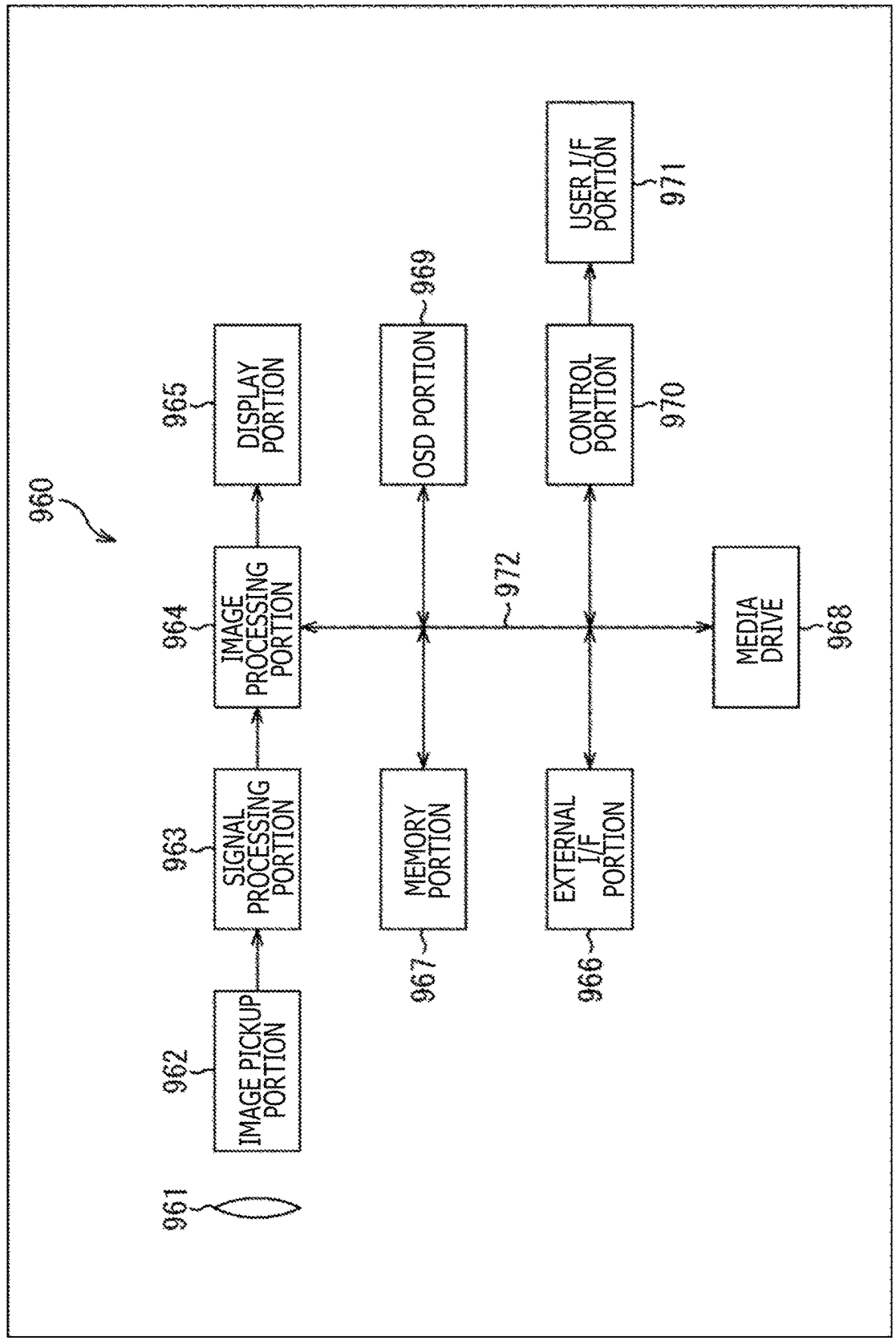
FIG. 45 is a block diagram depicting an example of a schematic configuration of an image pickup apparatus.

FIG. 45 depicts an example of a schematic configuration of an image pickup apparatus to which suitable one of the embodiments described above is applied. The image pickup apparatus 960 images a subject to produce an image, and codes the image data which is in turn recorded in a recording medium.

The image pickup apparatus 960 includes an optical block 961, an image pickup portion 962, a signal processing portion 963, an image processing portion 964, a display portion 965, an external interface (I/F) portion 966, a memory portion 967, a media drive 968, an OSD portion 969, a control portion 970, a user interface (I/F) portion 971, and a bus 972.

The optical block 961 is connected to the image pickup portion 962. The image pickup portion 962 is connected to the signal processing portion 963. The display portion 965 is connected to the image processing portion 964. The user interface portion 971 is connected to the control portion 970. The image processing portion 964, the external interface portion 966, the memory portion 967, the media drive 968, the OSD portion 969, and the control portion 970 are connected to one another through the bus 972.

The optical block 961 has a focus lens, a stop mechanism and the like. The optical block 961 forms an optical image of a subject on an imaging surface of the image pickup portion 962. The image pickup portion 962 has an image sensor such as a Charge Coupled Derive (CCD) or a Complementary Metal Oxide Semiconductor (CMOS), and transforms the optical image formed on the imaging surface into an image signal as an electric signal through photoelectric conversion. Then, the image pickup portion 962 outputs the image signal to the signal processing portion 963.

The signal processing portion 963 executes various pieces of camera signal processing such as knee correction, gamma correction, and color correction for the image signal inputted thereto from the image pickup portion 962. The signal processing portion 963 outputs the image data after the camera signal processing to the image processing portion 964.

The image processing portion 964 codes the image data inputted thereto from the signal processing portion 963 to produce the coded data. Then, the image processing portion 964 outputs the resulting coded data to either the external interface portion 966 or the media drive 968. In addition, the image processing portion 964 decodes the coded data inputted thereto either from the external interface portion 966 or from the media drive 968 to produce the image data. Then, the image processing portion 964 outputs the resulting image data to the display portion 965. In addition, the image processing portion 964 may output the image data inputted thereto from the signal processing portion 963 to the display portion 965, and may cause the display portion 965 to display thereon the image. In addition, the image processing portion 964 may superimpose data for display acquired from the OSD portion 969 on the image to be outputted to the display portion 965.

The OSD portion 969, for example, produces an image of GUI such as a menu, a button or a cursor, and outputs the resulting image to the image processing portion 964.

The external interface portion 966, for example, is configured in the form of a USB input/output terminal. For example, at the time of printing of an image, the image pickup apparatus 960 and a printer are connected to each other through the external interface portion 966. In addition, a drive is connected to the external interface portion 966 as may be necessary. For example, a removable medium such as a magnetic disc or an optical disc can be mounted to the drive, and a program read out from the removable medium can be installed in the image pickup apparatus 960. Moreover, the external interface portion 966 may be configured in the form of a network interface which is connected to a network such as a LAN or the Internet. That is, the external interface portion 966 has a role as a transmission portion in the image pickup apparatus 960.

A recording medium mounted to the media drive 968, for example, may be an arbitrary readable and writable removable medium such as a magnetic disc, a magneto optical disc, an optical disc, or a semiconductor memory. In addition, the recording medium may be fixedly mounted to the media drive 968 and, for example, a non-transportable storage portion such as a built-in hard disc drive or a Solid State Drive (SSD) may be configured.

The control portion 970 has a processor such as a CPU, and memories such as a RAM and a ROM. The memory stores therein a program which is to be executed by the CPU, program data, and the like. The program stored in the memory, for example, is read out at the time of the activation of the image pickup apparatus 960 by the CPU, and is executed. The CPU executes the program, thereby, for example, controlling the operation of the image pickup apparatus 960 in accordance with a manipulation signal inputted thereto from the user interface portion 971.

The user interface portion 971 is connected to the control portion 970. The user interface portion 971, for example, has a button, a switch and the like for the user manipulating the image pickup apparatus 960. The user interface portion 971 detects the manipulation by the user through these constituent elements to produce a manipulation signal, and outputs the resulting manipulation signal to the control portion 970.

In the image pickup apparatus 960 configured in such a manner, for example, the image processing portion 964 may have the function of the image coding apparatus 100 described above. In a word, the image processing portion 964 may code the image data in accordance with suitable one of the methods described in the above embodiments. By adopting such a procedure, the image pickup apparatus 960 can offer the effects similar to those of the embodiments described above with reference to FIG. 1 to FIG. 23.

In addition, in the image pickup apparatus 960 configured in such a manner, for example, the image processing portion 964 may have the function of the image decoding apparatus 200 described above. In a word, the image processing portion 964 may decode the coded data in accordance with suitable one of the methods described in the above embodiments. By adopting such a procedure, the image pickup apparatus 960 can offer the effects similar to those of the embodiments described above with reference to FIG. 1 to FIG. 23.

Fifth Application Example: Video Set

Figure 46:
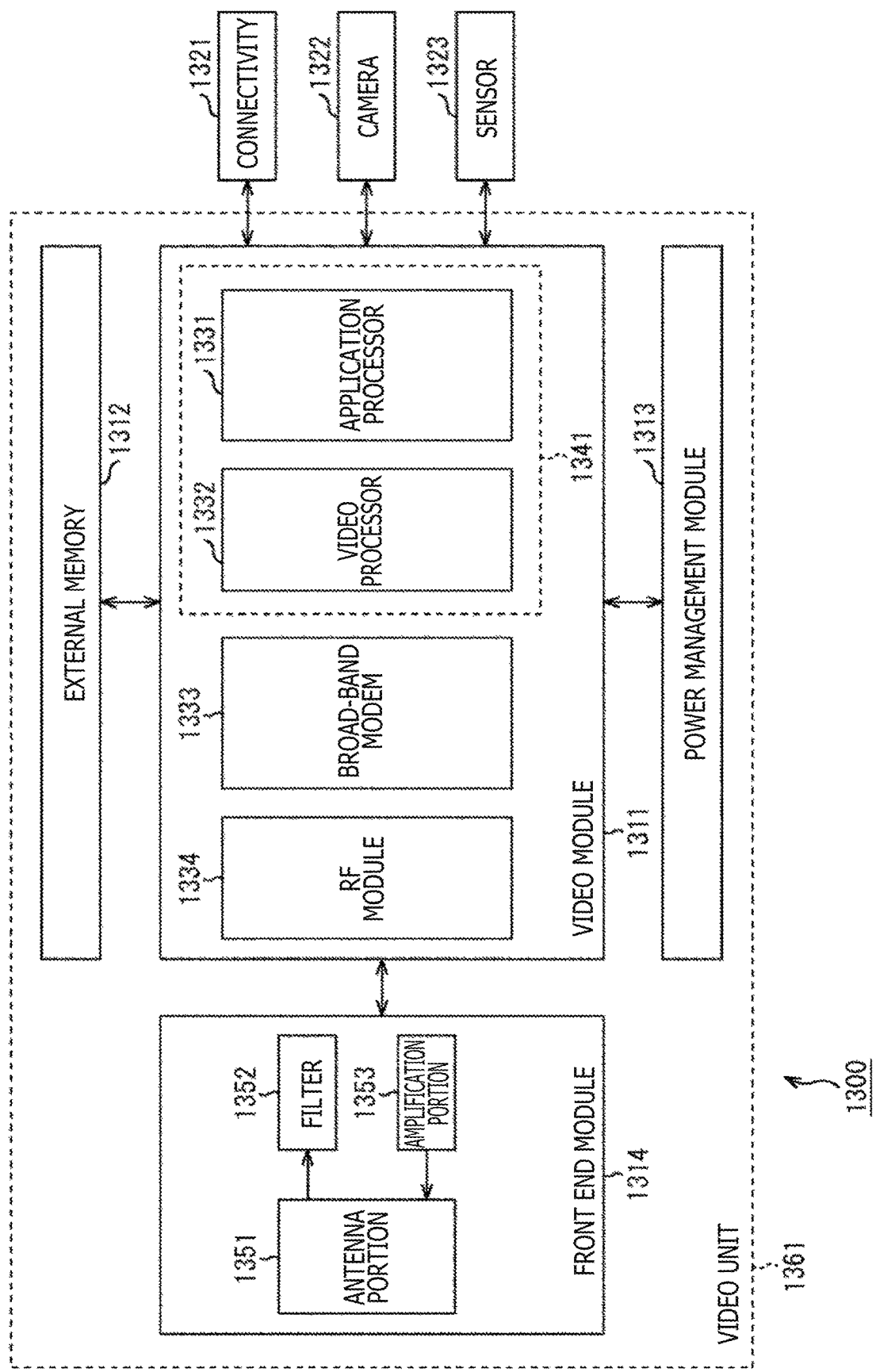
FIG. 46 is a block diagram depicting an example of a schematic configuration of a video set.

In addition, the present technique can also be implemented as all the configurations mounted to an arbitrary apparatus or an apparatus composing a system, for example, a processor as a system Large Scale Integration (LSI) or the like, a module using a plurality of processors or the like, a unit using a plurality of modules or the like, a set in which other functions are further added to a unit, and the like (that is, a configuration of a part of an apparatus). FIG. 46 depicts an example of a schematic configuration of a video set to which the present technique is applied.

In recent years, the multi-functionalization of the electronic apparatuses has been progressed. In the development and manufacture of the electronic apparatuses, in the case where a part of the configuration is implemented as sale, offer or the like, not only the case where the implementation is carried out as the configuration having one function, but also the case where a plurality of configurations having the associated functions are combined so that the implementation is carried out as one set having a plurality of functions have often been seen.

The video set 1300 depicted in FIG. 46 has a such a multi-functionalized configuration, and is obtained by combining a device having a function associated with the coding or the decoding (coding, decoding or both of them) of the image with a device having other functions associated with that function.

As depicted in FIG. 46, the video set 1300 has a module group including a video module 1311, an external memory 1312, a power management module 1313, a front-end module 1314, and the like, and a device having associated functions including a connectivity 1321, a camera 1322, a sensor 1323, and the like.

In the module, some component functions associated with one another are collected into a component having a unified function. Although a concrete physical configuration is arbitrary, for example, it is considered as the module that a plurality of processors having respective functions, electronic circuit elements such as a resistor and a capacitor, other devices, and the like are arranged on a circuit board to be integrated with one another. In addition, it is also considered that a module is combined with other modules, a processor, and the like to obtain a new module.

In the case of an example of FIG. 46, the video module 1311 is obtained by combining configurations having functions associated with the image processing with one another. The video module 1311 has an application processor, a video processor, a broad-band modem 1333, and an RF module 1334.

The processor is obtained by integrating configurations having predetermined functions on a semiconductor chip with one another based on System on a Chip (SoC), and for example, is referred to as a Large Scale Integration (LSI) or the like. The configuration having the predetermined functions may be a logic circuit (hardware configuration), may be a CPU, a ROM, a RAM and the like, and a program executed by using those (software configuration), or may be obtained by combining both of them with each other. For example, the processor may have a logic circuit, a CPU, a ROM, a RAM, and the like, may be realized by a logic circuit (hardware configuration) in some functions thereof, and may be realized by a program (software configuration) executed by a CPU in other functions thereof.

The application processor 1331 of FIG. 46 is a processor for executing an application associated with the image processing. For the purpose of realizing the predetermined function, the application executed in the application processor 1331 not only executes arithmetic operation processing, but also, for example, can control a configuration of inside or outside of the video module 1311 such as the video processor 1332 as may be necessary.

The video processor 1332 is a processor having a function associated with the coding/decoding (coding, decoding or both of them) of the image.

In the broad-band modem 1333, data (digital signal) which is transmitted through wired or wireless (or both of them) broad-band communication which is made through a broad-band line such as the Internet or a public telephone network, for example, is digital-modulated to be converted into an analog signal, and the analog signal which is received through the broad-band communication is demodulated to be converted into data (digital signal). The broad-band modem 1333, for example, processes arbitrary information such as the image data which is processed by the video processor 1332, the stream into which the image data is coded, the application program, and the set data.

The RF module 1334 is a module for carrying out the frequency conversion, the modulation/demodulation, the amplification, the filter processing, and the like for a Radio Frequency (RF) signal which is transmitted/received through the antenna. For example, the RF module 1334 carries out the frequency conversion or the like for a base-band signal produced by the broad-band modem 1333 to produce the RF signal. In addition, for example, the RF module 1334 carries out the frequency conversion or the like for the RF signal which is received through the front end module 1314 to produce a base-band signal.

It should be noted that as depicted by a dotted line 1341 in FIG. 46, the application processor 1331 and the video processor 1332 may be integrated with each other to be configured as one processor.

The external memory 1312 is a module which is provided outside the video module 1311 and which has a storage device utilized by the video module 1311. The storage device of the external memory 1312 may be realized by any physical configuration. However, since in general, the storage device of the external memory 1312 is often utilized for storage of large capacity data such as image data of a frame unit, the storage device is desirably realized by a relatively inexpensive and large capacity semiconductor memory such as a Dynamic Random Access Memory (DRAM).

The power management module 1313 manages and controls the supply of the electric power to the video module 1311 (the constituent elements within the video module 1311).

The front end module 1314 is a module which provides a front end function (circuits at transmission/reception ends on the antenna side) for the RF module 1334. As depicted in FIG. 46, the front end module 1314, for example, has an antenna portion 1351, a filter 1352, and an amplification portion 1353.

The antenna portion 1351 has an antenna for transmitting/receiving a wireless signal, and a peripheral configuration thereof. The antenna portion 1351 transmits a signal supplied thereto from the amplification portion 1353 as a wireless signal, and supplies a received wireless signal as an electric signal (RF signal) to the filter 1352. The filter 1352 executes filter processing or the like for the RF signal which is received through the antenna portion 1351, and supplies the RF signal after the processing to the RF module 1334. The amplification portion 1353 amplifies the RF signal supplied thereto from the RF module 1334 and supplies the RF signal thus amplified to the antenna portion 1351.

The connectivity 1321 is a module having a function associated with connection to the outside. A physical configuration of the connectivity 1321 is arbitrary. For example, the connectivity 1321 has a configuration having a communication function other than that complying with a communication standard to which the broad-band modem 1333 corresponds, an external input/output terminal, and the like.

For example, the connectivity 1321 may have a module having a communication function complying with a wireless communication standard such as Bluetooth (registered trademark), IEEE 802.11 (for example, Wireless Fidelity (Wi-Fi) (registered trademark)), Near Field Communication (NFC), or InfraRed Data Association (IrDA), an antenna through which a signal complying with that standard is transmitted/received, and the like. In addition, for example, the connectivity 1321 may have a module having a communication function complying with a wired communication standard such as a Universal Serial Bus (USB), or High-Definition Multimedia Interface (HDMI) (registered trademark), and a terminal complying with that standard. Moreover, for example, the connectivity 1321 may have other data (signal) transmission function or the like such as that of an analog input/output terminal.

It should be noted that the connectivity 1321 may include a device of transmission destination of the data (signal). For example, the connectivity 1321 may have a drive (including not only a drive of a removable medium, but also a hard disc, a Solid State Drive (SSD), a Network Attached Storage (NAS), or the like) for reading out or writing the data from or to a recording medium such as a magnetic disc, an optical disk, a magneto-optical disc, a semiconductor memory or the like. In addition, the connectivity 1321 may have an output device (a monitor, a speaker or the like) for an image or audio.

The camera 1322 is a module having a function of imaging a subject and obtaining image data associated with the subject. The image data obtained through the imaging with the camera 1322, for example, is supplied to the video processor 1332 to be coded.

The sensor 1323 is a module having the arbitrary sensor function such as an audio sensor, an ultra-sonic wave sensor, an optical sensor, an illuminance sensor, an infrared ray sensor, an image sensor, a rotation sensor, an angle sensor, an angular velocity sensor, a speed sensor, an acceleration sensor, a tilt sensor, a magnetic identification sensor, a shock sensor, or a temperature sensor. The data detected with the sensor 1323, for example, is supplied to the application processor 1331, and is then utilized by an application or the like.

The configuration described as the module in the above may be realized as a processor, or conversely the configuration described as the processor in the above may be realized as a module.

In the video set 1300 having the configuration as described above, as will be described later, the present technique can be applied to the video processor 1332. Therefore, the video set 1300 can be implemented as a set to which the present technique is applied.

<Example of Configuration of Video Processor>

Figure 47:
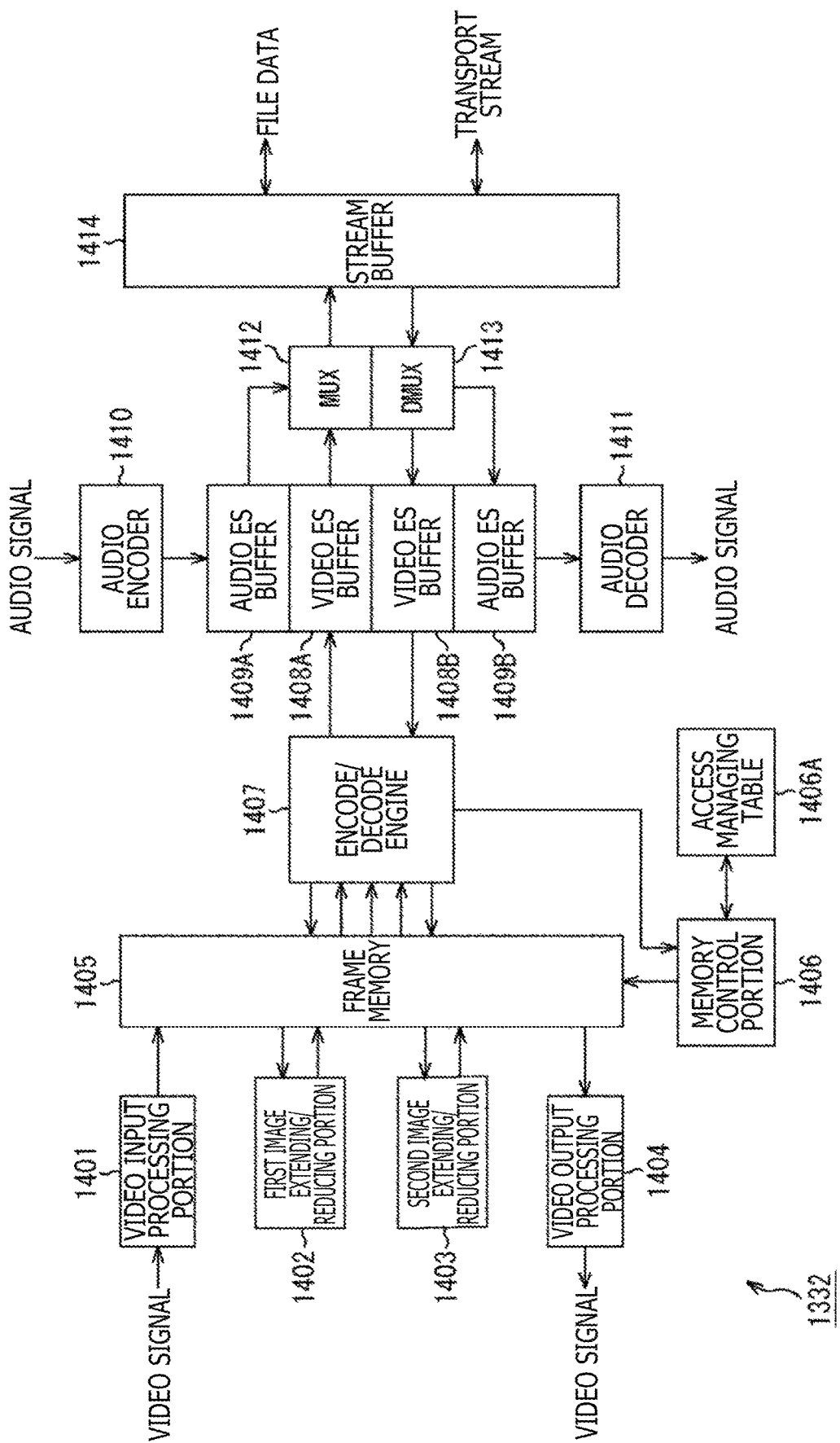
FIG. 47 is a block diagram depicting an example of a schematic configuration of a video processor.

FIG. 47 depicts an example of a schematic configuration of the video processor 1332 (FIG. 46) to which the present technique is applied.

In the case of an example of FIG. 47, the video processor 1332 has a function of receiving as input thereof a video signal and an audio signal and coding the video signal and the audio signal in accordance with a predetermined system and a function of decoding the coded video data and audio data and reproducing and outputting the video signal and the audio signal.

As depicted in FIG. 47, the video processor 1332 has a video input processing portion 1401, a first image extending/reducing portion 1402, a second image extending/reducing portion 1403, a video outputting processing portion 1404, a frame memory 1405, and a memory control portion 1406. In addition, the video processor 1332 has an encode/decode engine 1407, video Elementary Stream (ES) buffers 1408A and 1408B, and audio ES buffers 1409A and 1409B. Moreover, the video processor 1332 has an audio encoder 1410, an audio decoder 1411, a Multiplexer (MUX) 1402, a Demultiplexer (DMUX) 1413, and a stream buffer 1414.

The video input processing portion 1401, for example, acquires a video signal inputted thereto from the connectivity 1321 (FIG. 46) or the like, and transforms the video signal into digital image data. The first image extending/reducing portion 1402 carries out format conversion, extending/reducing processing for an image, and the like for the image data. The second image extending/reducing portion 1403 executes the extending/reducing for an image, in accordance with the format in a destination of output through the video output processing portion 1404, for the image data, the format conversion, the extending/reducing processing for the image, and the like similar to those in the first image extending/reducing portion 1402. The video output processing portion 1404 carries out the format conversion, the conversion into the analog signal, or the like for the image data, and outputs the resulting image data as a reproduced video signal to the connectivity 1321 or the like, for example.

The frame memory 1405 is a memory for image data which is shared among the video input processing portion 1401, the first image extending/reducing portion 1402, the second image extending/reducing portion 1403, the video output processing portion 1404, and the encode/decode engine 1407. The frame memory 1405, for example, is realized in the form of a semiconductor memory such as a DRAM.

The memory control portion 1406, in response to a synchronous signal sent from the encode/decode engine 1407, controls an access of writing/recording to/from the frame memory 1405 in accordance with access schedule to the frame memory 1405 which is written to the access management table 1406A. The access management table 1406A is updated by the memory control portion 1406 in response to the pieces of processing executed by the encode/ decode engine 1407, the first image extending/reducing portion 1402, the second image extending/reducing portion 1403, and the like.

The encode/decode engine 1407 executes the encode processing of the image data, and the decode processing of the video stream as the data obtained by coding the image data. For example, the encode/decode engine 1407 codes the image data read out from the frame memory 1405, and successively writes the coded image data as the video stream to the video ES buffer 1408A. In addition, for example, the encode/decode engine 1407 successively reads out the video streams sent from the video ES buffer 1408B to decode the video streams thus read out, and successively writes the decoded video streams as the image data to the frame memory 1405. In the coding processing or the decoding processing, the encode/decode engine 1407 uses the frame memory 1405 as a work area. In addition, for example, at a timing of start of the processing for each macro-block, the encode/decode engine 1407 outputs the synchronous signal to the memory control portion 1406.

The video ES buffer 1408A buffers the video stream produced by the encode/decode engine 1407, and supplies the resulting video stream to the multiplexer (MUX) 1412. The video ES buffer 1408B buffers the video stream supplied thereto from the demultiplexer (DMUX) 1413, and supplies the resulting video stream to the encode/decode engine 1407.

The audio ES buffer 1409A buffers the audio stream produced by the audio encoder 1410, and supplies the resulting audio stream to the multiplexer (MUX) 1412. The audio ES buffer 1409B buffers the audio stream supplied thereto from the demultiplexer (DMUX) 1413, and supplies the resulting the audio stream to the audio decoder 1411.

The audio encoder 1410, for example, subjects the audio signal inputted thereto from the connectivity 1321 or the like, for example, to the digital conversion and, for example, codes the resulting audio signal in accordance with a predetermined system such as an MPEG audio system or an AudioCode number 3 (AC3) system. The audio encoder 1410 successively writes audio streams as data obtained by coding the audio signal to the audio ES buffer 1409A. The audio decoder 1411 decodes the audio stream supplied thereto from the audio ES buffer 1409B, for example, converts the resulting audio stream into the analog signal, and supplies the resulting analog signal as the reproduced audio signal to, for example, the connectivity 1321 or the like.

The multiplexer (MUX) 1412 multiplexes the video stream and the audio stream. A method for the multiplexing (that is, the format of a bit stream produced by the multiplexing) is arbitrary. In addition, during the multiplexing, the multiplexer (MUX) 1412 can also add predetermined header information or the like to the bit stream. In a word, the multiplexer (MUX) 1412 can convert the format of the stream by the multiplexing. For example, the multiplexer (MUX) 1412 multiplexes the video stream and the audio stream to convert the resulting stream into a transport stream as a bit stream of a format for transfer. In addition, for example, the multiplexer (MUX) 1412 multiplexes the video stream and the audio stream to convert the resulting stream into data (file data) of a file format for recording.

The demultiplexer (DMUX) 1413 demultiplexes the bit stream, in which the video stream and the audio stream are multiplexed, in accordance with a method corresponding to the multiplexing by the multiplexer (MUX) 1412. In a word, the demultiplexer (DMUX) 1413 extracts the video stream and the audio stream from the bit stream read out from the stream buffer 1414 (separates the video stream and the audio stream from each other). In a word, the demultiplexer (DMUX) 1413 can convert the format of the stream by the demultiplexing (can carry out inverse transformation of the transformation by the multiplexer (MUX) 1412). For example, the demultiplexer (DMUX) 1413, for example, acquires the transport stream supplied thereto from the connectivity 1321, the broad-band modem 1333 or the like through the stream buffer 1414, and demultiplexes the transport stream thus acquired, thereby enabling the resulting stream to be converted into the video stream and the audio stream. In addition, the demultiplexer (DMUX) 1413, for example, acquires the file data read out from the various kinds of recording media by, for example, the connectivity 1321 through the stream buffer 1414, and demultiplexes the file data thus acquired, thereby enabling the resulting data to be converted into the video stream and the audio stream.

The stream buffer 1414 buffers the bit stream. For example, the stream buffer 1414 buffers the transport stream supplied thereto from the multiplexer (MUX) 1412, and supplies the transport stream, for example, to the connectivity 1321, the broad-band modem 1333, or the like at a predetermined timing or in response to a request issued from the outside or the like.

In addition, for example, the stream buffer 1414 buffers the file data supplied thereto from the multiplexer (MUX) 1412, and supplies the file data, for example, to the connectivity 1321 or the like at a predetermined timing or in response to a request issued from the outside, and causes the connectivity 1321 or the like to record the file data in various kinds of recording media.

Moreover, the stream buffer 1414, for example, buffers the transport stream acquired through the connectivity 1321, the broad-band modem 1333 or the like, and supplies the transport stream thus acquired to the demultiplexer (DMUX) 1413 at a predetermined timing or in response to a request issued from the outside or the like.

In addition, the stream buffer 1414, for example, buffers the file data read out from various kinds of recording media in the connectivity 1321 or the like, and supplies the file data thus buffered to the demultiplexer (DMUX) 1413 at a predetermined timing or in response to a request issued from the outside or the like.

Next, a description will be given with respect to an example of an operation of the video processor 1332 having such a configuration. For example, the video signal inputted from the connectivity 1321 or the like to the video processor 1332 is transformed into the digital image data in accordance with a predetermined system such as 4:2:2Y/Cb/Cr system or the like in the video input processing portion 1401, and the resulting digital image data is successively written to the frame memory 1405. The digital image data is read out to either the first image extending/reducing portion 1402 or the second image extending/reducing portion 1403, is subjected to the format conversion into the predetermined system such as the 4:2:0Y/Cb/Cr system, and the extending/reducing processing, and is written to the frame memory 1405 again. The image data is coded by the encode/decode engine 1407, and is then written as the video stream to the video ES buffer 1408A.

In addition, the audio signal inputted from the connectivity 1321 or the like to the video processor 1332 is coded by the audio encoder 1410, and is written as the audio stream to the audio ES buffer 1409A.

The video stream in the video ES buffer 1408A, and the audio stream in the audio ES buffer 1409A are read out to the multiplexer (MUX) 1412 to be multiplexed and then transformed into the transport stream, the file data or the like. After the transport stream produced by the multiplexer (MUX) 1412 is buffered in the stream buffer 1414, the transport stream thus buffered is outputted to the external network, for example, through the connectivity 1321, the broad-band modem 1333 or the like. In addition, after the file data produced by the multiplexer (MUX) 1412 is buffered in the stream buffer 1414, the file data thus buffered, for example, is outputted to the connectivity 1321 or the like and then recorded in various kinds of recording media.

In addition, after the transport stream inputted from the external network to the video processor 1332 through, for example, the connectivity 1321, the broad-band modem 1333 or the like is buffered in the stream buffer 1414, the transport stream thus buffered is demultiplexed by the demultiplexer (DMUX) 1413. In addition, after the file data which is read out from various kinds of recording media, for example, in the connectivity 1321 or the like and is inputted to the video processor 1332 is buffered in the stream buffer 1414, the file data thus buffered is demultiplexed by the demultiplexer (DMUX) 1413. In a word, either the transparent stream or the file data inputted to the video processor 1332 is separated into the video stream and the audio stream by the demultiplexer (DMUX) 1413.

The audio stream is supplied to the audio decoder 1411 through the audio ES buffer 1409B and is decoded to reproduce the audio signal. In addition, after the video stream is written to the video ES buffer 1408B, the video stream is successively read out by the encode/decode engine 1407 to be decoded and then written to the frame memory 1405. The decoded image data is subjected to the extending/reducing processing by the second image extending/reducing portion 1403 to be written to the frame memory 1405. Then, the decoded image data is read out to the video output processing portion 1404 and is format-converted so as to follow a predetermined system such as the 4:2:2Y/Cb/Cr system, and moreover is converted into an analog signal, so that the video signal is reproduced and outputted.

In the case where the present technique is applied to the video processor 1332 configured in such a manner, it is only necessary that the present technique pertaining to the embodiments described above is applied to the encode/decode engine 1407. In a word, for example, the encode/decode engine 1407 may have the function of the image coding apparatus 100 described above or the function of the image decoding apparatus 200 or both of the functions. By adopting such a procedure, the video processor 1332 can offer the effects similar to those of the embodiments described by referring to FIG. 1 to FIG. 23.

It should be noted that in the encode/decode engine 1407, the present technique (that is, the function of the image coding apparatus 100 or the function of the image decoding apparatus 200 or both of the functions) may be realized by the hardware such as the logic circuit, may be realized by the software such as the incorporated program, or may be realized by both of them.

<Example of Another Configuration of Video Processor>

Figure 48:
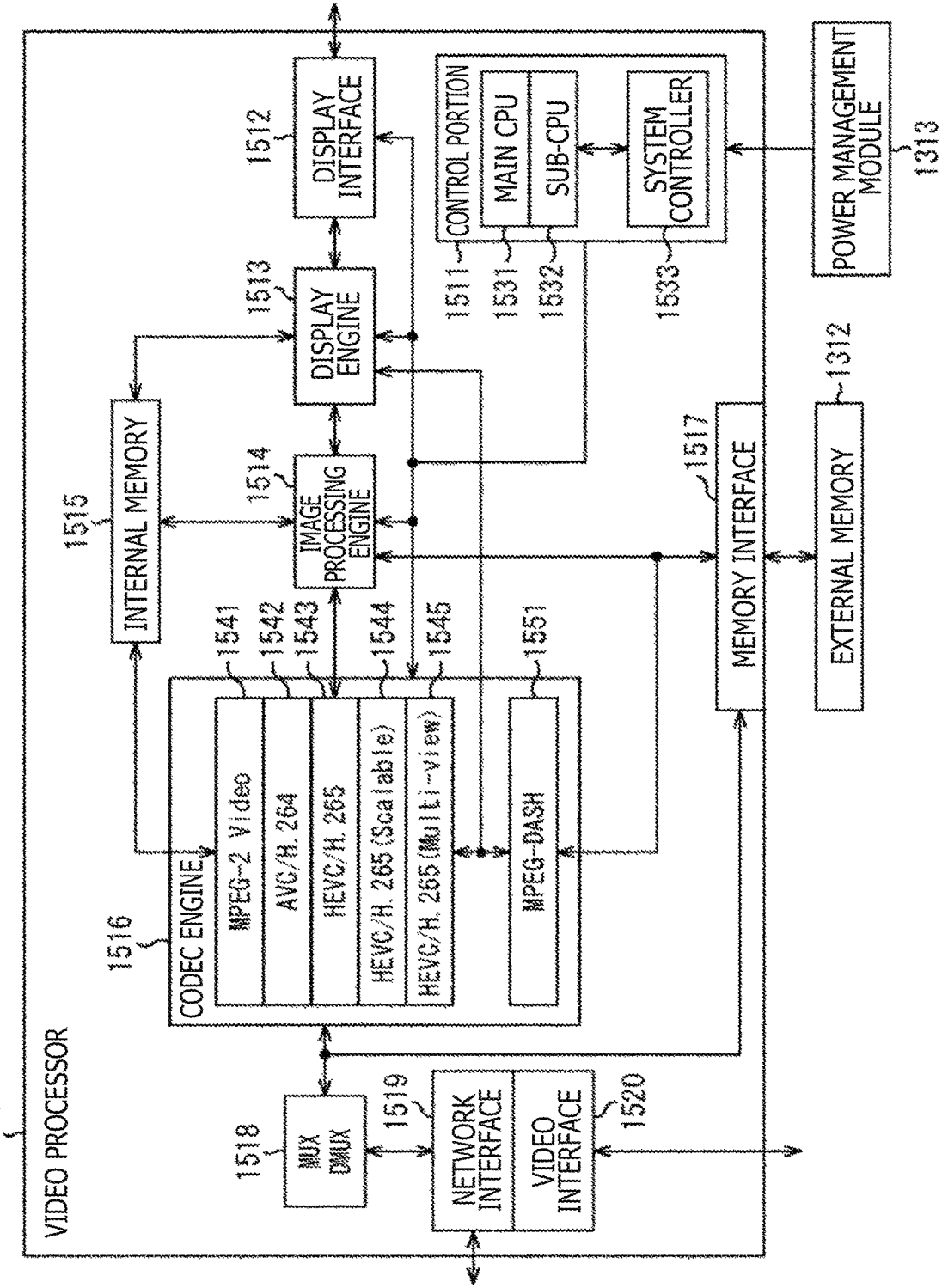
FIG. 48 is a block diagram depicting another example of a schematic configuration of a video processor.

FIG. 48 depicts another example of a schematic configuration of the video processor 1332 to which the present technique is applied. In the case of the example of FIG. 48, the video processor 1332 has a function of coding/decoding the video data in accordance with a predetermined system.

More specifically, as depicted in FIG. 48, the video processor 1332 has a control portion 1511, a display interface 1512, a display engine 1513, an image processing engine 1514, and an internal memory 1515. In addition, the video processor 1332 has a codec engine 1516, a memory interface 1517, a multiplexer/demultiplexer (MUX DMUX) 1518, a network interface 1519, and a video interface 1520.

The control portion 1511 controls operations of the processing portions, within the video processor 1332, such as the display interface 1512, the display engine 1513, the image processing engine 1514, and the codec engine 1516.

As depicted in FIG. 48, the control portion 1511 has a main CPU 1531, a sub-CPU 1532, and a system controller 1533. The main CPU 1531 executes a program or the like for controlling the operations of the processing portions within the video processor 1332. The main CPU 1531 produces control signals in accordance with the program or the like, and supplies the control signals to the respective processing portions (in a word, controls the operations of the processing portions). The sub-CPU 1532 plays an auxiliary role of the main CPU 1531. For example, the sub-CPU 1532 carries out a child process, a sub-routine or the like of a program or the like which the main CPU 1531 executes. The system controller 1533 controls the operations of the main CPU 1531 and the sub-CPU 1532 such as the specification of the program which the main CPU 1531 and the sub-CPU 1532 execute, or the like.

The display interface 1512 outputs the image data to, for example, the connectivity 1321 or the like under the control by the control portion 1511. For example, the display interface 1512 converts the image data of the digital data into the analog signal, and outputs the analog signal as the reproduced video signal or the image data of the digital data as it is to a monitor device or the like of the connectivity 1321.

The display engine 1513 executes various kinds of pieces of conversion processing such as the format conversion, the size conversion, and the color gamut conversion for the image data so as for the image data to follow the hardware specification of the monitor device or the like for displaying thereon that image under the control of the control portion 1511.

The image processing engine 1514 executes the predetermined image processing such as the filter processing for the improvement in the image quality for the image data under the control of the control portion 1511.

The internal memory 1515 is a memory, provided inside the video processor 1332, which is shared by the display engine 1513, the image processing engine 1514, and the codec engine 1516. The internal memory 1515, for example, is utilized for the exchange of the data which is carried out among by the display engine 1513, the image processing engine 1514, and the codec engine 1516. For example, the internal memory 1515 stores therein the data which is supplied thereto from the display engine 1513, the image processing engine 1514, or the codec engine 1516, and supplies that data to the display engine 1513, the image processing engine 1514, or the codec engine 1516 as may be necessary (for example, in response to a request). The internal memory 1515 may be realized by any storage device. In general, however, the internal memory 1515 is utilized for the storage of the small-capacity data such as the image data or parameters of the block unit in many cases. Therefore, for example, the internal memory 1515 is desirably realized by the semiconductor memory which, although having the relatively small capacity (for example, as compared with the external memory 1312), is high in response speed, for example, like a Static Random Access Memory (SRAM).

The codec engine 1516 executes the processing of the coding or decoding of the image data. The coding/decoding system to which the codec engine 1516 corresponds is arbitrary, the number of coding/decoding system may be one or two or more. For example, the codec engine 1516 may have a codec function of a plurality of coding/decoding systems, and the coding of the image data or the decoding of the coded data may be carried out in accordance with selected one of the plurality of coding/decoding systems.

In the examples depicted in FIG. 48, the codec engine 1516, as the functional blocks of the processing relating to the codec, for example, has MPEG-2 Video 1541. AVC/H.264 1542, HEVC/H.265 1543, HEVC/H.265 (Scalable) 1544, HEVC/H.265 (Multi-view) 1545, and MPEG-DASH 1551.

MPEG-2 Video 1541 is a functional block for coding or decoding the image data in accordance with the MPEG-2 system. AVC/H.264 1542 is a functional block for coding or decoding the image data in accordance with the AVC system. HEVC/H.265 1543 is a functional block for coding or decoding the image data in accordance with the HEVC system. HEVC/H.265 (Scalable) 1544 is a functional block for scalable coding or scalable decoding the image data in accordance with HEVC system. HEVC/H.265 (Multi-view) 1545 a functional block for multi-view-coding or multi-view-decoding the image data in accordance with HEVC system.

MPEG-DASH 1551 is a functional block for transmitting/receiving the image data in accordance with MPEG-Dynamic Adaptive Streaming over HTTP (MPEG-DASH) system. MPEG-DASH is the technique for carrying out the streaming of the video by using HyperText Transfer Protocol (HTTP). It is one of the features of the MPEG-DASH that suitable one of a plurality of pieces of previously prepared coded data in which the resolutions or the like are different from one another is selected in the segment unit and is transmitted. The MPEG-DASH 1551 carries out the production of the stream complying with the standard, the transmission control of the stream, and the like, and with respect to the coding/decoding of the image data, utilizes MPEG-2 Video 1541 to HEVC/H.265 (Multi-view) 1545.

The memory interface 1517 is an interface for the external memory 1312. The data supplied from the image processing engine 1514 or the codec engine 1516 is supplied to the external memory 1312 through the memory interface 1517. In addition, the data read out from the external memory 1312 is supplied to the video processor 1332 (either the image processing engine 1514 or the codec engine 1516) through the memory interface 1517.

The multiplexer/demultiplexer (MUX DMUX) 1518 carries out the multiplexing or demultiplexing of the various kinds of data associated with the image, such as the bit stream of the coded data, the image data and the video signal. The multiplexing/demultiplexing method is arbitrary. For example, during the multiplexing, the multiplexer/demultiplexer (MUX DMUX) 1518 can not only collect a plurality of pieces of data into one piece of data, but also add the predetermined header information or the like to the one piece of data. In addition, during the demultiplexing, the multiplexer/demultiplexer (MUX DMUX) 1518 can not only partition one piece of data into a plurality of pieces of data, but also add the predetermined header information or the like to each of the pieces of data obtained through the partition. In a word, the multiplexer/demultiplexer (MUX DMUX) 1518 can convert the format of the data by the multiplexing/demultiplexing. For example, the multiplexer/demultiplexer (MUX DMUX) 1518 can multiplex the bit streams to transform the resulting bit stream into the transport stream as the bit stream of the format for transfer, or the data (file data) of the file format for recording. Needless to say, the inverse transformation thereof can also be carried out by the demultiplexing.

The network interface 1519, for example, is an interface for the broad-band modem 1333, the connectivity 1321 or the like. The video interface 1520, for example, is an interface for the connectivity 1321, the camera 1322, or the like.

Next, a description will be given with respect to an example of an operation of such a video processor 1332. For example, when the transport stream is received from the external network through the connectivity 1321, the broad-band modem 1333 or the like, that transport stream is supplied to the multiplexer/demultiplexer (MUX DMUX) 1518 through the network interface 1519 to be demultiplexed, and is decoded by the codec engine 1516. The image data obtained through the decoding by the codec engine 1516, and for example is subjected to the predetermined image processing by the image processing engine 1514, is subjected to the predetermined transformation by the display engine 1513, for example, is supplied to the connectivity 1321 or the like through the display interface 1512, and the resulting image is displayed on the monitor. In addition, for example, the image data obtained through the decoding by the codec engine 1516 is re-coded by the codec engine 1516, and is multiplexed by the multiplexer/demultiplexer (MUX DMUX) 1518 to be transformed into the file data. The resulting file data, for example, is outputted to the connectivity 1321 or the like through the video interface 1520 to be recorded in various kinds of recording media.

Moreover, for example, the file data of the coded data, obtained through the coding of the image data, which is read out from a recording medium (not depicted) by the connectivity 1321 or the like is supplied to the multiplexer/demultiplexer (MUX DMUX) 1518 through the video interface 1520 to be demultiplexed, and is decoded by the codec engine 1516. The image data obtained through the decoding by the codec engine 1516 is subjected to the predetermined image processing by the image processing engine 1514, is subjected to the predetermined transformation by the display engine 1513 and, for example, is supplied to the connectivity 1321 or the like through the display interface 1512. Then, the resulting image is displayed on the monitor. In addition, for example, the image data obtained through the decoding by the codec engine 1516 is re-coded by the codec engine 1516, and is multiplexed by the multiplexer/demultiplexer (MUX DMUX) 1518 to be transformed into the transport stream. Then, the resulting transport stream, for example, is supplied to the connectivity 1321, the broad-band modem 1333 or the like through the network interface 1519, and is transmitted to another apparatus (not depicted).

It should be noted that the exchange of the image data and other data between the processing portions within the video processor 1332, for example, is carried out by utilizing the internal memory 1515 or the external memory 1312. In addition, the power management module 1313, for example, controls the supply of the electric power to the control portion 1511.

In the case where the present technique is applied to the video processor 1332 configured in such a manner, it is only necessary that the present technique pertaining to the embodiments described above is applied to the codec engine 1516. In a word, for example, it is only necessary that the codec engine 1516 has the function of the image coding apparatus 100 described above or the function of the image decoding apparatus 200 or both of them. By adopting such a procedure, the video processor 1332 can offer the effects similar to those of the embodiments described above by referring to FIG. 1 to FIG. 23.

It should be noted that in the codec engine 1516, the present technique (that is, the function of the image coding apparatus 100) may be realized by the hardware such as the logic circuit, may be realized by the software such as the incorporated program, or may be realized by both of them.

Although two examples of the configuration of the video processor 1332 have been exemplified so far, the configuration of the video processor 1332 is arbitrary, and thus arbitrary configurations other than the two examples described above may be available. In addition, although the video processor 1332 may be configured in the form of one semiconductor chip, the video processor 1332 may also be configured in the form of a plurality of semiconductor chips. For example, the video processor 1332 may be configured in the form of a three-dimensional lamination LSI in which a plurality of semiconductors are laminated on one another. In addition, the video processor 1332 may be realized as a plurality of LSIs.

<Examples of Application to Apparatus>

The video set 1300 can be incorporated in various kinds of apparatuses for processing the image data. For example, the video set 1300 can be incorporated in the television apparatus 900 (FIG. 2), the portable telephone 920 (FIG. 43), the recording/reproducing apparatus 940 (FIG. 44), the image pickup apparatus 960 (FIG. 45), and the like. By incorporating the video set 1300 in the apparatus, that apparatus can offer the effects similar to those of the embodiments described above by referring to FIG. 1 to FIG. 23.

It should be noted that even in the case of a part of the constituent elements of the video set 1300 described above, the part can be implemented as the constituent element to which the present technique is applied as long as the part includes the video processor 1332. For example, only the video processor 1332 can be implemented as the video processor to which the present technique is applied. In addition, for example, the processor, the video module 131 or the like indicated by a dotted line 1341 as described above can be implemented as the processor, the module or the like to which the present technique is applied. Moreover, for example, the video module 1311, the external memory 1312, the power management module 1313, and the front end module 1314 can be combined with one another to also be implemented as the video unit 1361 to which the present technique is applied. Any of the configurations can offer the effects similar to those of the embodiments described above by referring to FIG. 1 to FIG. 23.

In a word, any configuration can be incorporated in the various kinds of apparatuses for processing the image data similarly to the case of the video set 1300 as long as the configuration includes the video processor 1332. For example, the video processor 1332, the processor indicated by the dotted line 1341, the video module 1311, or the video unit 1361 can be incorporated in the television apparatus 900 (FIG. 42), the portable telephone 920 (FIG. 43), the recording/reproducing apparatus 940 (FIG. 44), the image pickup apparatus 960 (FIG. 45), and the like. Then, by incorporating any of the configurations to which the present technique is applied in the apparatus, the apparatus can offer the effects similar to those of the embodiments described above by referring to FIG. 1 to FIG. 23 similarly to the case of the video set 1300.

Sixth Application Example: Network System

In addition, the present technique can also be applied to a network system configured by a plurality of apparatuses.

FIG. 49 depicts an example of a schematic configuration of a network system to which the present technique is applied.

The network system 1600 depicted in FIG. 49 is a system in which apparatuses exchange the information associated with an image (moving image) through the network. A cloud service 1601 of the network system 1600 is a system for providing a service relating to an image (moving image) for a terminal such as a computer 1611, an Audio Visual (AV) apparatus 1612, a portable type information processing terminal 1613, an Internet of Things (IoT) device 1614 or the like which is transmissibly connected to the cloud service 1601. For example, the cloud service 1601 provides the supply service of the content of the image (moving image) like the so-called moving image delivery (on-demand or live delivery) for a terminal. In addition, for example, the cloud service 1601 provides a backup service for receiving content of the image (moving image) from the terminal, and storing the content thus received. In addition, for example, the cloud service 1601 provides a service for mediating the exchange of the content of the image (moving image) between terminals.

A physical configuration of the cloud service 1601 is arbitrary. For example, the cloud service 1601 may have various kinds of servers such as a server for preserving and managing a moving image, a server for delivering a moving image to a terminal, a server for acquiring the moving image from the terminal, and a server for managing users (terminals) and charges, and an arbitrary network such as the Internet or a LAN.

The computer 1611, for example, is configured by an information processing apparatus such as a personal computer, a server or a work station. An AV apparatus 1612, for example, is configured by an image processing apparatus such as a television receiver, a hard disc recorder, a game apparatus or a camera. The portable type information processing terminal 1613, for example, is configured by a portable type information processing apparatus such as a note type personal computer, a tablet terminal, a portable telephone, or a smart phone. The IoT device 1614, for example, is configured by an arbitrary object, for executing processing associated with an image, such as a machine, consumer electronics, furniture, other things, an IC tag, or a card type device. These terminals can each have the communication function and can be connected to the cloud service 1601 (establish a session), thereby carrying out the exchange of the information with the cloud service 1601 (carrying out the communication). In addition, each of the terminals can communicate with another terminal. The communication between the terminals may be carried out through the cloud service 1601, or may be carried out without going through the cloud service 1601.

When the present technique is applied to the network system 1600 as described above, and the data associated with the image (moving image) is exchanged between the terminals or between the terminal and the cloud service 1601, the image data may be coded/decoded as described above in the embodiments. In a word, the terminals (the computer 1611 to the IoT device 1614) and the cloud service 1601 may each have the function of the image coding apparatus 100 or the image decoding apparatus 200 described above. By adopting such a procedure, the terminals (the computer 1611 to the IoT device 1614) or the cloud service 1601 exchanging the image data can offer the effects similar to those of the embodiments described above by referring to FIG. 1 to FIG. 23.

<Others>

Incidentally, the various kinds of pieces of information associated with the coded data (bit stream) may be multiplexed with the coded data to be transmitted or recorded, or may be transmitted or recorded as different pieces of data associated with the coded data without going through being multiplexed with the coded data. Here, the term "be associated with," for example, means that when one piece of data is processed, the other piece of data may utilized (may be linked). In a word, the pieces of data associated with each other may be collected as one piece of data, or may be made individual pieces of data. For example, the information associated with the coded data (image) may be transmitted in a transmission path different from that of the coded data (image). In addition, for example, the information associated with the coded data (image) may be recorded in a recording medium (or a different recording area of the same recording medium) different from that for the coded data (image). It should be noted that the wording "be associated with" may not be the entire data, but may be a part of the data. For example, the image and the information corresponding to that image may be associated with each other in an arbitrary unit such as a plurality of frames, one frame, or a part within a frame.

In addition, as described above, in the present specification, the term such as "synthesize," "multiplex," "add," "integrate," "include," "store," "put in," "plug in," or "insert into," for example, means that a plurality of things is collected into one thing such as that the coded data and the meta data are collected into one piece of data, and means one method of "be associated with" described above.

In addition, the embodiments of the present technique are by no means limited to the embodiments described above, and various changes can be made without departing from the subject matter of the present technique.

For example, in the present specification, the system means a set of a plurality of constituent elements (apparatus, module (component) and the like), and it does not matter whether or not all the constituent elements lie in the same chassis. Therefore, a plurality of apparatuses which are accommodated in different chassis, and are connected to one another through a network, and one apparatus in which a plurality of modules are accommodated in one chassis are each a system.

In addition, a configuration which is described as one apparatus (or a processing portion) may be partitioned so as to be configured as a plurality of apparatuses (or the processing portions). Contrary to this, the constituent elements which are described as a plurality of apparatuses (or the processing portions) in the above description may be collected so as to be configured as one apparatus (or processing portion). In addition, needless to say, constituent elements other than the constituent elements described above may be added to the constituent elements of the apparatuses (or the processing portions). Moreover, if the configuration and the operation are substantially the same in terms of the whole system, a part of the configuration of certain apparatus (certain processing portion) may be included in a configuration of another apparatus (or another processing portion).

In addition, for example, the present technique can adopt a configuration of cloud computing for processing one function so as to be shared among a plurality of apparatuses in a shared and cooperative manner through a network.

In addition, for example, the program described above can be executed in an arbitrary apparatus. In this case, it is only necessary that the apparatus has a necessary function (such as a functional block), and thus can obtain the necessary information.

In addition, for example, the steps described in the flow charts described above can be not only executed in one apparatus, but also executed by a plurality of apparatuses in a shared manner. Moreover, in the case where a plurality of pieces of processing are included in one step, the plurality of pieces of processing included in the one step can be not only executed in one apparatus, but also executed by a plurality of apparatuses in a shared manner.

Incidentally, the program which is to be executed by the computer may be executed in processing in steps describing the program, in a time-series manner along the order described in the present specification, or may be individually executed in parallel or at a necessary timing such as when a call is made. Moreover, the pieces of processing in steps describing this program may be executed in parallel to the pieces of processing of other program, or may be executed in combination with the pieces of processing of other program.

It should be noted that a plurality of present techniques described above in the present specification can be each independently and solely implemented unless the conflict is caused. Needless to say, a plurality of arbitrary present technique can also be implemented in combination with one another. For example, the present technique described in any of the embodiments can also be implemented in combination with the present technique described in other embodiment. In addition, the arbitrary present technique described above can be implemented in combination with any of other technique not described above.

It should be noted that the present technique can also adopt the following constitutions.

(1)

An image processing apparatus, including: a control portion configured to, in the case where primary transformation as transformation processing for a predictive residue as a difference between an image and a predictive image of the image and secondary transformation as transformation processing for a primary transformation coefficient obtained by subjecting the predictive residue to the primary transformation are caused to be skipped, also cause bandwidth limitation for a secondary transformation coefficient obtained by subjecting the primary transformation coefficient to the secondary transformation to be skipped.

(2)

The image processing apparatus according to (1), in which, in the case where the primary transformation is not caused to be skipped, when a transformation block size of the primary transformation and the secondary transformation is equal to or larger than a predetermined size, the control portion causes the bandwidth limitation for the secondary transformation coefficient to be carried out.

(3)

The image processing apparatus according to (2), in which, in the case where the inverse primary transformation is not caused to be skipped, the control portion causes the bandwidth limitation for the secondary transformation coefficient to be carried out based on a size of a horizontal direction and a size of a vertical direction of the transformation block of the inverse primary transformation and the inverse secondary transformation.

(4)

The image processing apparatus according to (3), in which, in the case where the inverse primary transformation is not caused to be skipped, when larger one of the size of the horizontal direction and the size of the vertical direction of the transformation block is equal to or larger than a predetermined value, the control portion causes the bandwidth limitation for the secondary transformation coefficient to be carried out.

(5)

The image processing apparatus according to (3), in which, in the case where the inverse primary transformation is not caused to be skipped, when a sum or a product of the size of the horizontal direction and the size of the vertical direction of the transformation block is equal to or larger than a predetermined value, the control portion causes the bandwidth limitation for the secondary transformation coefficient to be carried out.

(6)

The image processing apparatus according to any one of (2) to (5), in which the secondary transformation coefficient after the bandwidth limitation of an area other than a square area having a predetermined size within an oblong transformation block of the inverse primary transformation and the inverse secondary transformation is made 0, thereby carrying out the bandwidth limitation.

(7)

The image processing apparatus according to any one of (2) to (5), in which, of pixels composing a transformation block of the inverse primary transformation and the inverse secondary transformation, the secondary transformation coefficient after the bandwidth limitation of a pixel having a processing order equal to or larger than a predetermined value is made 0, thereby carrying out the bandwidth limitation.

(8)

An image processing method, including:

by an image processing apparatus, a control step of, in the case where primary transformation as transformation processing for a predictive residue as a difference between an image and a predictive image of the image and secondary transformation as transformation processing for a primary transformation coefficient obtained by subjecting the predictive residue to the primary transformation are caused to be skipped, also causing bandwidth limitation for a secondary transformation coefficient obtained by subjecting the primary transformation coefficient to the secondary transformation to be skipped.

(9)

An image processing apparatus, including:

a control portion configured to, in the case where inverse primary transformation as inverse transformation of primary transformation as transformation processing for a predictive residue as a difference between an image and a predictive image of the image and inverse secondary transformation as inverse transformation of secondary transformation as transformation processing for a primary transformation coefficient obtained by subjecting the predictive residue to the primary transformation are caused to be skipped, also cause bandwidth limitation for a secondary transformation coefficient obtained by subjecting the primary transformation coefficient to the secondary transformation so as for the primary transformation coefficient to undergo the bandwidth limitation to be skipped.

(10)

The image processing apparatus according to (9), in which, in the case where the inverse primary transformation is not caused to be skipped, when a transformation block size of the inverse primary transformation and the inverse secondary transformation is equal to or larger than a predetermined size, the control portion causes the bandwidth limitation for the secondary transformation coefficient to be carried out.

(11)

The image processing apparatus according to (10), in which, in the case where the inverse primary transformation is not caused to be skipped, the control portion causes the bandwidth limitation for the secondary transformation coefficient to be carried out based on a size of a horizontal direction and a size of a vertical direction of the transformation block of the inverse primary transformation and the inverse secondary transformation.

(12)

The image processing apparatus according to (11), in which, in the case where the inverse primary transformation is not caused to be skipped, when larger one of the size of the horizontal direction and the size of the vertical direction of the transformation block is equal to or larger than a predetermined value, the control portion causes the bandwidth limitation for the secondary transformation coefficient to be carried out.

(13)

The image processing apparatus according to (11), in which, in the case where the inverse primary transformation is not caused to be skipped, when a sum or a product of the size of the horizontal direction and the size of the vertical direction of the transformation block is equal to or larger than a predetermined value, the control portion causes the bandwidth limitation for the secondary transformation coefficient to be carried out.

(14)

The image processing apparatus according to (10), in which the secondary transformation coefficient after the bandwidth limitation of an area other than a square area having a predetermined size within an oblong transformation block of the inverse primary transformation and the inverse secondary transformation is made 0, thereby carrying out the bandwidth limitation.

(15)

The image processing apparatus according to (10), in which, of pixels composing a transformation block of the inverse primary transformation and the inverse secondary transformation, the secondary transformation coefficient after the bandwidth limitation of a pixel having a processing order equal to or larger than a predetermined value is made 0, thereby carrying out the bandwidth limitation.

(16)

An image processing method, including:

by an image processing apparatus, a control step of, in the case where inverse primary transformation as inverse transformation of primary transformation as transformation processing for a predictive residue as a difference between an image and a predictive image of the image and inverse secondary transformation as inverse transformation of secondary transformation as transformation processing for a primary transformation coefficient obtained by subjecting the predictive residue to the primary transformation are caused to be skipped, also causing bandwidth limitation for a secondary transformation coefficient obtained by subjecting the primary transformation coefficient to the secondary transformation so as for the primary transformation coefficient to undergo the bandwidth limitation to be skipped.

(17)

An image processing apparatus, including:

a control portion configured to control, for each sub-block, skip of transformation processing for a transformation coefficient obtained from a predictive residue as a difference between an image and a predictive image of the image based on the number of non-zero coefficients of the transformation coefficient for each sub-block.

(18)

The image processing apparatus according to (17), in which the control portion controls, for each sub-block, skip of secondary transformation for a primary transformation coefficient obtained by subjecting the predictive residue to primary transformation based on the number of non-zero coefficients of the transformation coefficient for each sub-block.

(19)

The image processing apparatus according to (17) or (18), further including:

a decision portion configured to decide for each sub-block whether or not the secondary transformation is to be skipped based on a quantization primary transformation coefficient obtained by quantizing the primary transformation coefficient and a quantization secondary transformation coefficient obtained by quantizing a secondary transformation coefficient obtained by subjecting the primary transformation coefficient to the secondary transformation, in which the control portion is configured to control, for each sub-block, the skip of the secondary transformation for the primary transformation coefficient in response to a result of the decision by the decision portion.

(20)

The image processing apparatus according to any one of (17) to (19), in which the decision portion obtains the number of non-zero coefficients of the quantization primary transformation coefficient and the number of non-zero coefficients of the quantization secondary transformation coefficient, and decides, for each sub-block, whether or not the secondary transformation is to be skipped based on the resulting number of non-zero coefficients of the quantization primary transformation coefficient and the resulting number of non-zero coefficients of the quantization secondary transformation coefficient, and a predetermined threshold value.

(21)

The image processing apparatus according to any one of (17) to (20), in which, in the case where the number of non-zero coefficients of the quantization primary transformation coefficient is equal to or smaller than the number of non-zero coefficients of the quantization secondary transformation coefficients, and in the case where the number of non-zero coefficients of the quantization primary transformation coefficient or the number of non-zero coefficients of the quantization secondary transformation coefficient is equal to or smaller than the threshold value, the decision portion decides that the secondary transformation is to be skipped.

(22)

The image processing apparatus according to any one of (17) to (21), further including:

a quantization portion configured to quantize the primary transformation coefficient to obtain the quantization primary transformation coefficient, and quantize the secondary transformation coefficient to obtain the quantization secondary transformation coefficient, in which the decision portion is configured to decide for each sub-block whether or not the secondary transformation is to be skipped based on the quantization primary transformation coefficient and the quantization secondary transformation coefficient which are obtained through the quantization by the quantization portion.

(23)

The image processing apparatus according to any one of (17) to (22), in which the primary transformation is orthogonal transformation, and the secondary transformation is transformation processing for transforming the primary transformation coefficient into a one-dimensional vector, carrying out matrix calculation for the one-dimensional vector, scaling the one-dimensional vector for which the matrix calculation is carried out, and matrix-transforming the one-dimensional vector thus scaled.

(24)

The image processing apparatus according to any one of (17) to (23), further including:

a primary transformation portion configured to carry out the primary transformation; and a secondary transformation portion configured to carry out the secondary transformation in accordance with the control by the control portion.

(25)

The image processing apparatus according to any one of (17) to (24), further including:

a quantization portion configured to quantize either a secondary transformation coefficient obtained by subjecting the primary transformation coefficient to the secondary transformation by the secondary transformation portion, or the primary transformation coefficient; and a coding portion configured to code a quantization transformation coefficient level obtained by quantizing either the secondary transformation coefficient or the primary transformation coefficient by the quantization portion.

(26)

An image processing method, including:

controlling, for each sub-block, skip of transformation processing for a transformation coefficient obtained from a predictive residue as a difference between an image and a predictive image of the image based on the number of non-zero coefficients of the transformation coefficient for each sub-block.

(27)

An image processing apparatus, including:

a control portion configured to control, for each sub-block, skip of inverse transformation processing for a transformation coefficient from which a predictive residue as a difference between an image and a predictive image of the image is obtained by executing inverse transformation processing based on the number of non-zero coefficients of the transformation coefficient for each sub-block.

(28)

The image processing apparatus according to (27), in which the control portion controls, for each sub-block, skip of inverse secondary transformation for a secondary transformation coefficient obtained by decoding coded data based on the number of non-zero coefficients of the transformation coefficient for each sub-block.

(29)

The image processing apparatus according to (27) or (28), further including:

a decision portion configured to decide for each sub-block whether or not the inverse secondary transformation is to be skipped based on the secondary transformation coefficient, in which the control portion is configured to control, for each sub-block, the skip of the inverse secondary transformation in response to a result of decision by the decision portion.

(30)

The image processing apparatus according to any one of (27) to (29), in which, in the case where the number of non-zero coefficients of the secondary transformation coefficient is equal to or smaller than a predetermined threshold value, the decision portion decides that the inverse secondary transformation is caused to be skipped.

(31)

The image processing apparatus according to any one of (27) to (30), in which the inverse secondary transformation is transformation processing for transforming the secondary transformation coefficient into a one-dimensional vector, carrying out matrix calculation for the one-dimensional vector, scaling the one-dimensional vector for which the matrix calculation is carried out, and matrix-transforming the one-dimensional vector thus scaled.

(32)

The image processing apparatus according to any one of (27) to (31), further including:

an inverse secondary transformation portion configured to carry out the inverse secondary transformation in accordance with the control by the control portion.

(33)

The image processing apparatus according to any one of (27) to (32), further including:

an inverse primary transformation portion configured to carry out inverse primary transformation for transforming a primary transformation coefficient obtained by subjecting the second transformation coefficient to the inverse secondary transformation by the inverse secondary transformation portion into the predictive residue.

(34)

The image processing apparatus according to any one of (27) to (33), further including:

an inverse quantization portion configured to inverse-quantize a quantization transformation coefficient level obtained by decoding the coded data, in which the inverse secondary transformation portion is configured to carry out the inverse secondary transformation, in accordance with the control by the control portion, for the secondary transformation coefficient obtained by inverse-quantizing the quantization transformation coefficient level by the inverse quantization portion.

(35)

The image processing apparatus according to any one of (27) to (34), further including:

a decoding portion configured to decode the coded data, in which the inverse quantization portion is configured to inverse-quantize the quantization transformation coefficient level obtained by decoding the coded data by the decoding portion.

(36)

An image processing method, including:

controlling, for each sub-block, skip of inverse transformation processing for a transformation coefficient from which a predictive residue as a difference between an image and a predictive image of the image is obtained by executing inverse transformation processing based on the number of non-zero coefficients of the transformation coefficient for each sub-block.

(37)

An image processing apparatus, including:

a setting portion configured to set a matrix of transformation processing for a transformation coefficient based on content of the transformation processing and a scanning method;

a rasterization portion configured to transform a transformation coefficient obtained by transformation-processing a predictive residue as a difference between an image and a predictive image of the image into a one-dimensional vector;

a matrix calculating portion configured to carry out matrix calculation for the one-dimensional vector by using the matrix set by the setting portion;

a scaling portion configured to scale the one-dimensional vector for which the matrix calculation is carried out; and a matrix transforming portion configured to matrix-transform the scaled one-dimensional vector.

(38)

The image processing apparatus according to (37), further including:

a storage portion configured to store candidates of the matrix, in which the setting portion is configured to set the matrix by selecting the matrix corresponding to content of the transformation processing and the scanning method from the candidates of the matrix stored in the storage portion.

(39)

The image processing apparatus according to (37) or (38), in which the setting portion sets the matrix corresponding to the content of the transformation processing and the scanning method adopted in the rasterization portion and the matrix transforming portion.

(40)

The image processing apparatus according to any one of (37) to (39), in which the setting portion sets the matrix based on a transformation identifier indicating the content of the transformation processing and a scanning identifier as information associated with the scanning method.

(41)

The image processing apparatus according to any one of (37) to (40), in which the transformation identifier is a secondary transformation identifier indicating content of secondary transformation for a primary transformation coefficient obtained by subjecting the predictive residue to primary transformation, and the setting portion is configured to set a matrix of the secondary transformation for the primary transformation coefficient obtained by subjecting the predictive residue to the primary transformation based on the secondary transformation identifier and the scanning identifier.

(42)

The image processing apparatus according to any one of (37) to (41), in which the primary transformation is orthogonal transformation.

(43)

The image processing apparatus according to any one of (37) to (42), further including:

a primary transformation portion configured to carry out the primary transformation.

(44)

The image processing apparatus according to any one of (37) to (43), further including:

a quantization portion configured to quantize a secondary transformation coefficient obtained by matrix-transforming the scaled one-dimensional vector by the matrix transforming portion.

(45)

The image processing apparatus according to any one of (37) to (44), further including:

a coding portion configured to code a quantization transformation coefficient level obtained by quantizing the secondary transformation coefficient by the quantization portion.

(46)

An image processing method, including:

setting a matrix of transformation processing for a transformation coefficient based on a content of the transformation processing and a scanning method;

transforming transformation coefficients obtained by transformation-processing a predictive residue as a difference between an image and a predictive image of the image into a one-dimensional vector;

carrying out matrix calculation for the one-dimensional vector by using the matrix set by the setting portion;

scaling the one-dimensional vector for which the matrix calculation is carried out; and matrix-transforming the scaled one-dimensional vector.

An image processing method, comprising:

setting a matrix of transformation processing for a transformation coefficient based on content of the transformation processing and a scanning method;

transforming a transformation coefficient obtained by transformation-processing a predictive residue as a difference between an image and a predictive image of the image into a one-dimensional vector;

carrying out matrix calculation for the one-dimensional vector by using the set matrix;

scaling the one-dimensional vector for which the matrix calculation is carried out; and matrix-transforming the scaled one-dimensional vector.

(47)

An image processing apparatus, including:

a setting portion configured to set a matrix of inverse transformation processing for a transformation coefficient based on content of the inverse transformation processing and a scanning method;

a rasterization portion configured to transform a transformation coefficient from which a predictive residue as a difference between an image and a predictive image of the image is obtained by executing inverse transformation processing into a one-dimensional vector;

a matrix calculating portion configured to carry out matrix calculation for the one-dimensional vector by using the matrix set by the setting portion;

a scaling portion configured to scale the one-dimensional vector for which the matrix calculation is carried out; and a matrix transforming portion configured to matrix-transform the scaled one-dimensional vector.

(48)

The image processing apparatus according to (47), further including:

a storage portion configured to store candidates of the matrix, in which the setting portion is configured to set the matrix by selecting the matrix corresponding to content of the inverse transformation processing and the scanning method from the candidates of the matrix stored in the storage portion.

(49)

The image processing apparatus according to (47) or (49), in which the setting portion sets the matrix corresponding to the content of the inverse transformation processing and the scanning method adopted in the rasterization portion and the matrix transforming portion.

(50)

The image processing apparatus according to any one of (47) to (49), in which the setting portion sets the matrix based on a transformation identifier indicating the content of the inverse transformation processing and a scanning identifier as information associated with the scanning method.

(51)

The image processing apparatus according to any one of (47) to (50), in which the transformation identifier is a secondary transformation identifier indicating a content of inverse secondary transformation for a secondary transformation coefficient obtained by decoding coded data, the setting portion is configured to set a matrix of the inverse secondary transformation based on the secondary transformation identifier and the scanning identifier, the rasterization portion is configured to transform the secondary transformation coefficient into the one-dimensional vector, and the matrix transforming portion is configured to matrix-transform the scaled one-dimensional vector to obtain a primary transformation coefficient.

(52)

The image processing apparatus according to any one of (47) to (51), further including:

an inverse primary transformation portion configured to subject the primary transformation coefficient obtained by the matrix transforming portion to the inverse primary transformation to obtain the predictive residue.

(53)

The image processing apparatus according to any one of (47) to (52), in which the inverse primary transformation is inverse orthogonal transformation.

(54)

The image processing apparatus according to any one of (47) to (53), further including:

an inverse quantization portion configured to inverse-quantize a quantization transformation coefficient level obtained by decoding coded data, in which the rasterization portion is configured to transform the secondary transformation coefficient obtained by inverse-quantizing the quantization transformation coefficient level by the inverse quantization portion into the one-dimensional vector.

(55)

The image processing apparatus according to any one of (47) to (54), further including:

a decoding portion configured to decode the coded data, in which the inverse quantization portion is configured to inverse-quantize the quantization transformation coefficient level obtained by decoding the coded data by the decoding portion.

(56)

An image processing method, including:

setting a matrix of inverse transformation processing for a transformation coefficient based on content of the inverse transformation processing and a scanning method;

transforming a transformation coefficient for which a predictive residue as a difference between an image and a predictive image of the image is obtained by executing inverse transformation processing into a one-dimensional vector;

carrying out matrix calculation for the one-dimensional vector by using the set matrix;

scaling the one-dimensional vector for which the matrix calculation is carried out; and
matrix-transforming the scaled one-dimensional vector.

REFERENCE SIGNS LIST

100 . . . Image coding apparatus, 101 . . . Control portion, 111 . . . Calculation portion, 112 . . . Transformation portion, 113 . . . Quantization portion, 114 . . . Coding portion, 115 . . . Inverse quantization portion, 116 . . . Inverse transformation portion, 117 . . . Calculation portion, 118 . . . Frame memory, 119 . . . Prediction portion, 131 . . . Primary transformation portion, 132 . . . Secondary transformation portion, 141 . . . Rasterization portion, 142 . . . Matrix calculating portion, 143 . . . Scaling portion, 144 . . . Matrix transforming portion, 145 . . . Secondary transformation selecting portion, 146 . . . Quantization portion, 147 . . . Non-zero coefficient number deciding portion, 148 . . . Switch, 200 . . . Image decoding apparatus, 211 . . . Decoding portion, 212 . . . Inverse quantization portion, 213 . . . Inverse transformation portion, 214 . . . Calculation portion, 215 . . . Frame memory, 216 . . . Prediction portion, 231 . . . Inverse secondary transformation portion, 232 . . . Inverse primary transformation portion, 241 . . . Non-zero coefficient number deciding portion, 242 . . . Switch, 243 . . . Rasterization portion, 244 . . . Matrix calculating portion, 245 . . . Scaling portion, 246 . . . Matrix transforming portion, 247 . . . Inverse secondary transformation selecting portion, 301 . . . Secondary transformation selecting portion, 311 . . . Secondary transformation deriving portion, 312 . . . Secondary transformation holding portion, 321 . . . Inverse secondary transformation selecting portion, 331 . . . Inverse secondary transformation deriving portion, 332 . . . Inverse secondary transformation holding portion, 421, 441 . . . Switch

The invention claimed is:

1. An image processing apparatus, comprising:
a control portion configured to skip bandwidth limitation for a secondary transformation coefficient obtained by subjecting primary transformation coefficient to secondary transformation, based on primary transformation and secondary transformation being skipped, the primary transformation being transformation processing for a predictive residue as a difference between an image and a predictive image of the image and the secondary transformation being transformation processing for a primary transformation coefficient obtained by subjecting the predictive residue to the primary transformation,
wherein the control portion is implemented via at least one processor.

2. An image processing method, comprising:
by an image processing apparatus,
skipping bandwidth limitation for a secondary transformation coefficient obtained by subjecting primary transformation coefficient to secondary transformation, based on primary transformation and secondary transformation being skipped, the primary transformation being transformation processing for a predictive residue as a difference between an image and a predictive image of the image and the secondary transformation being transformation processing for a primary transformation coefficient obtained by subjecting the predictive residue to the primary transformation.

3. An image processing apparatus, comprising:
a control portion configured to skip bandwidth limitation for a secondary transformation coefficient obtained by subjecting a primary transformation coefficient to a secondary transformation so as for the primary transformation coefficient to undergo the bandwidth limitation, based on inverse primary transformation and inverse secondary transformation being skipped, the inverse primary transformation being inverse transformation of primary transformation as transformation processing for a predictive residue as a difference between an image and a predictive image of the image and the inverse secondary transformation being inverse transformation of secondary transformation as transformation processing for a primary transformation coefficient obtained by subjecting the predictive residue to the primary transformation,
wherein the control portion is implemented via at least one processor.

4. The image processing apparatus according to claim 3, wherein, in a case where the inverse primary transformation is not caused to be skipped, when a transformation block size of the inverse primary transformation and the inverse secondary transformation is equal to or larger than a predetermined size, the control portion is further configured to cause the bandwidth limitation for the secondary transformation coefficient to be carried out.

5. The image processing apparatus according to claim 4, wherein, in a case where the inverse primary transformation is not caused to be skipped, the control portion is further configured to cause the bandwidth limitation for the secondary transformation coefficient to be carried out based on a size of a horizontal direction and a size of a vertical direction of the transformation block of the inverse primary transformation and the inverse secondary transformation.

6. The image processing apparatus according to claim 5, wherein, in a case where the inverse primary transformation is not caused to be skipped, when larger one of the size of the horizontal direction and the size of the vertical direction of the transformation block is equal to or larger than a predetermined value, the control portion is further configured to cause the bandwidth limitation for the secondary transformation coefficient to be carried out.

7. The image processing apparatus according to claim 5, wherein, in a case where the inverse primary transformation is not caused to be skipped, when a sum or a product of the size of the horizontal direction and the size of the vertical direction of the transformation block is equal to or larger than a predetermined value, the control portion is further configured to cause the bandwidth limitation for the secondary transformation coefficient to be carried out.

8. The image processing apparatus according to claim 4, wherein the secondary transformation coefficient after the bandwidth limitation of an area other than a square area having a predetermined size within an oblong transformation block of the inverse primary transformation and the inverse secondary transformation is made 0, thereby carrying out the bandwidth limitation.

9. The image processing apparatus according to claim 4, wherein, of pixels composing a transformation block of the inverse primary transformation and the inverse secondary transformation, the secondary transformation coefficient after the bandwidth limitation of a pixel having a processing order equal to or larger than a predetermined value is made 0, thereby carrying out the bandwidth limitation.

10. An image processing method, comprising:
by an image processing apparatus,
skipping bandwidth limitation for a secondary transformation coefficient obtained by subjecting a primary transformation coefficient to a secondary transformation so as for the primary transformation coefficient to undergo the bandwidth limitation, based on inverse primary transformation and inverse secondary transformation being skipped, the inverse primary transformation being inverse transformation of primary transformation as transformation processing for a predictive residue as a difference between an image and a predictive image of the image and the inverse secondary transformation as inverse transformation of secondary transformation being transformation processing for a primary transformation coefficient obtained by subjecting the predictive residue to the primary transformation.

* * * * *